United States Patent [19]

Tyrrell et al.

[11] Patent Number: 5,185,736
[45] Date of Patent: Feb. 9, 1993

[54] SYNCHRONOUS OPTICAL TRANSMISSION SYSTEM

[76] Inventors: Raymond E. Tyrrell; O. Lamar Bishop; William E. Powell; Dale L. Krisher; William H. Stephenson; M. Rodney Briscoe, all of Raleigh; Hal A. Thorne, Wendell; Claude M. Hurlocker, Raleigh; V. Paul Runyon, Raleigh; Timothy J. Williams, Raleigh; Joseph E. Sutherland, Raleigh; William B. Weeber, Apex; Michael J. Gingell, Raleigh; Kenneth J. Stoia, Raleigh; William J. Fox, Raleigh; Jeffrey P. Jones, Raleigh; Richard M. Czerwiec, Raleigh; Ertugrul Baydar, Raleigh; Heinrich T. Sonnenberg, Raleigh; Richard Peters, Raleigh; Gus C. Sanders, Raleigh; Richard J. Sanders, Jr., Raleigh; Francis G. Noser, Raleigh; Joseph L. Smith, Raleigh; Jak Yaemsiri, Raleigh; Camille A. Abu-Saba, Clayton; Patrick M. Farrell, Raleigh, all of N.C.; Wenkwei Rou, Phoenix, Ariz.; Victor W. Wilkerson, Durham, N.C.; Mohammad S. Arani, Raleigh, N.C.; Stephen C. Dunning, Cary, N.C.; Keith Bernhardt, Raleigh, N.C.; Dana Merrill, Raleigh, N.C.

[21] Appl. No.: 351,861

[22] Filed: May 12, 1989

[51] Int. Cl.⁵ .................. H04J 3/00; G02F 1/00

[52] U.S. Cl. .................... 370/55; 370/84; 359/136

[58] Field of Search .......... 370/84, 4, 3, 55, 68; 455/600, 606, 607, 609, 613, 617, 618, 619

[56] References Cited

U.S. PATENT DOCUMENTS 4,858,232  8/1989  Diaz et al. .................. 370/85.15
4,872,157  10/1989  Hemmady et al. ............ 370/58.1

OTHER PUBLICATIONS

Proceedings IEEE Global Telecommunications Conference, Tokio, 15-18, Nov. 1987, vol. 1, New York, US, pp. 485-489, N. B. Sandesara et al.: 'Synchronous Optical Network Format and Terminal Applications'.
Proceedings IEE Global Telecommunications Conference, Hollywood, Fla., Nov. 28, and Dec. 1, 1988, vol. 2, New York, US, pp. 908-986—N. B. Sandesara et al.: 'SONET Intra Office Interconnect Signal'.

Primary Examiner—Douglas W. Olms
Assistant Examiner—Melvin Marcelo
Attorney, Agent, or Firm—Ware, Fressola, Van Der Sluys & Adolphson

[57] ABSTRACT

A synchronous optical transmission system for interfacing SONET formatted channels to lower speed channels in either a SONET format or otherwise. The transmission system incorporates a fiber transmission system, terminal multiplexers and add/drop multiplexers that in turn incorporate a plurality of features, such as parallel scrambling circuitry, frame synchronization circuitry and the like.

21 Claims, 43 Drawing Sheets

Microfiche Appendix Included
(36 Microfiche, 63 Pages)

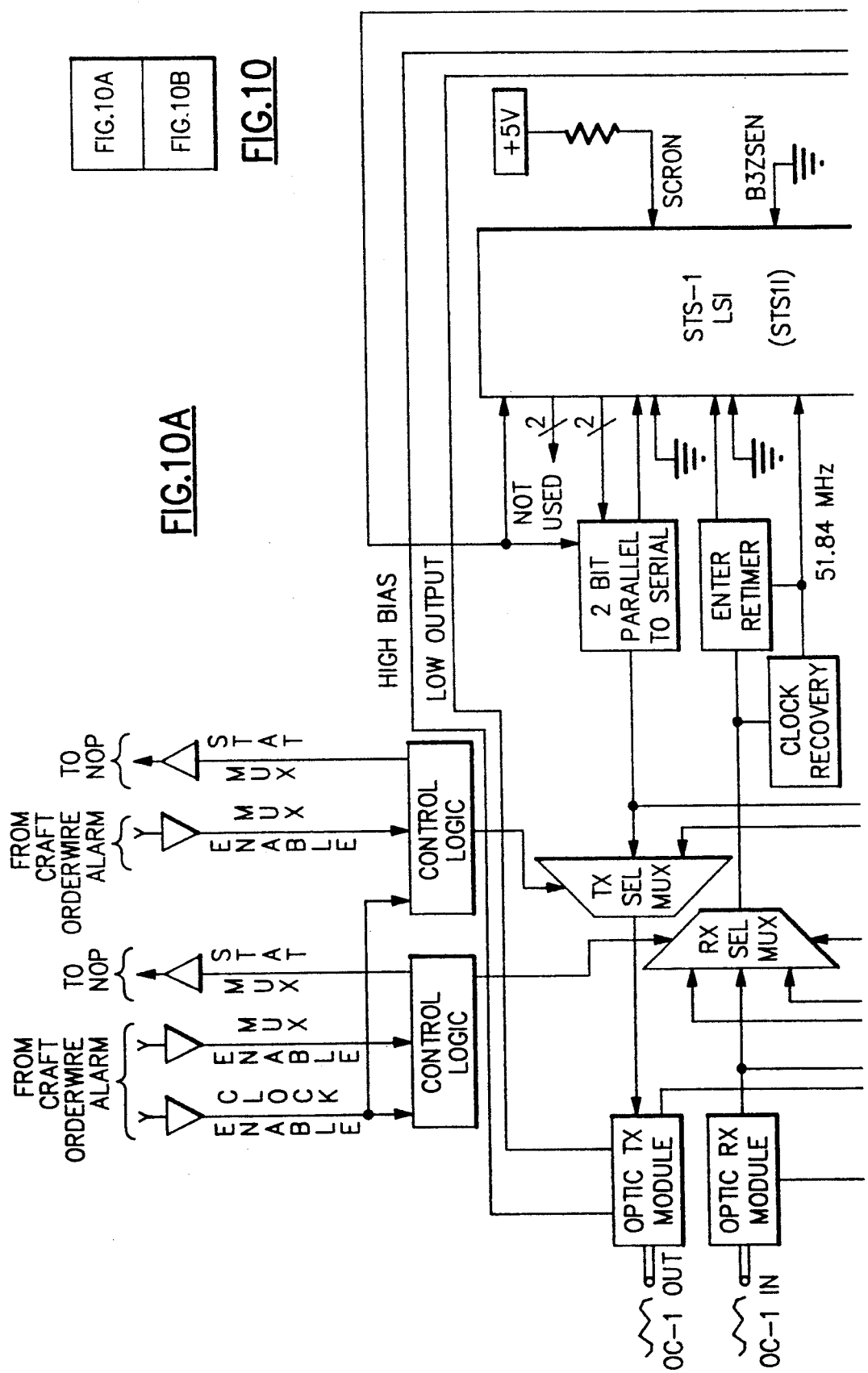

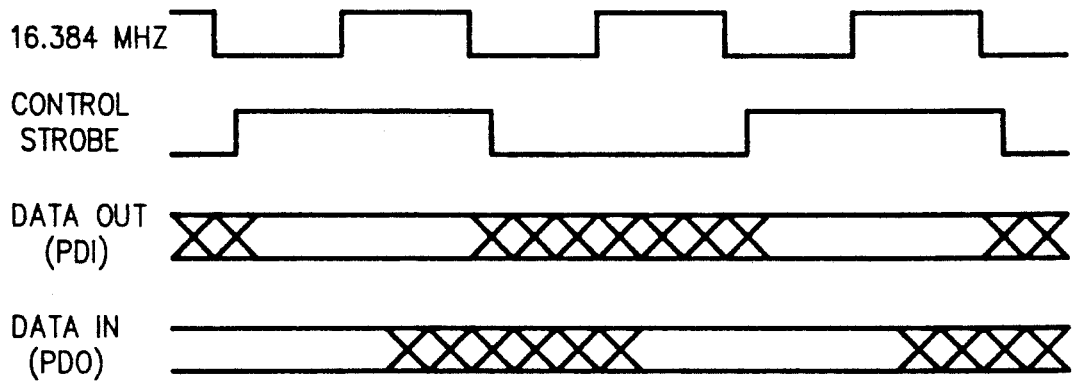
THE FTM1 PBA CLOCKS IN AND CLOCKS OUT DATA
USING THE RISING EDGE OF THE 16.384 MHZ CLOCK
WHEN THE CONTROL STROBE IS ACTIVE.
DATA SET-UP AND HOLD TIMES RELATIVE TO THE
CLOCK ARE NOMINALLY 30 NS.
FIG.14
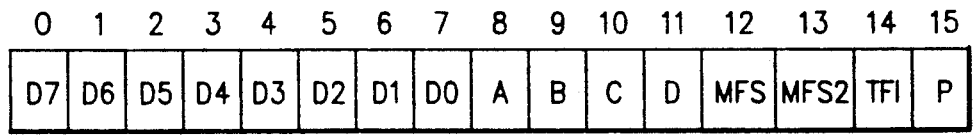
PAYLOAD WORD FORMAT
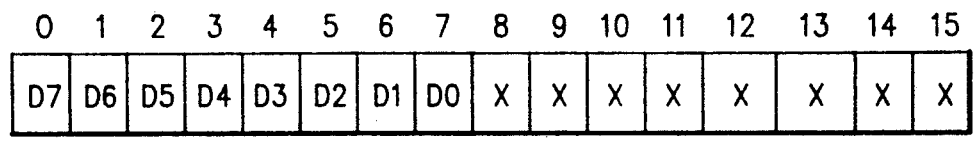
OVERHEAD WORD FORMAT
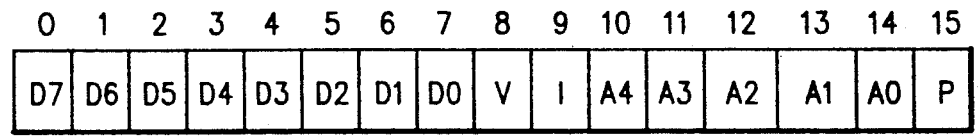
VI CHANNEL WORD FORMAT
FIG.15

| FIG.16A | FIG.16B |

THE STT1 PBA CLOCKS IN AND CLOCKS OUT DATA
USING THE RISING EDGE OF THE 16.384 MHZ CLOCK
WHEN THE CONTROL STROBE IS ACTIVE.
DATA SET-UP AND HOLD TIMES RELATIVE TO THE
CLOCK ARE NOMINALLY 30 NS.

| CONTROL PATTERN | [HH] | [LLLHLHL] | [S] |
|---|---|---|---|
| | PREFIX | COMMAND CODE | COMMAND |
| | | | S=H TO ENABLE |
| | | | S=L TO DISABLE |

IN STATES 0 THROUGH 7, MUX CONTROL IS LOW.
IN STATES 8 THROUGH 15, MUX CONTROL IS HIGH.

STARTING IN STATE 0, SEQUENCE A1-A10 TURNS ON THE SWITCH.
STARTING IN STATE 8, SEQUENCE B1-B10 TURNS OFF THE SWITCH.

A1-A10   1100010101 ⟶ MUX CONTROL HIGH
B1-B10   1100010100 ⟶ MUX CONTROL LOW

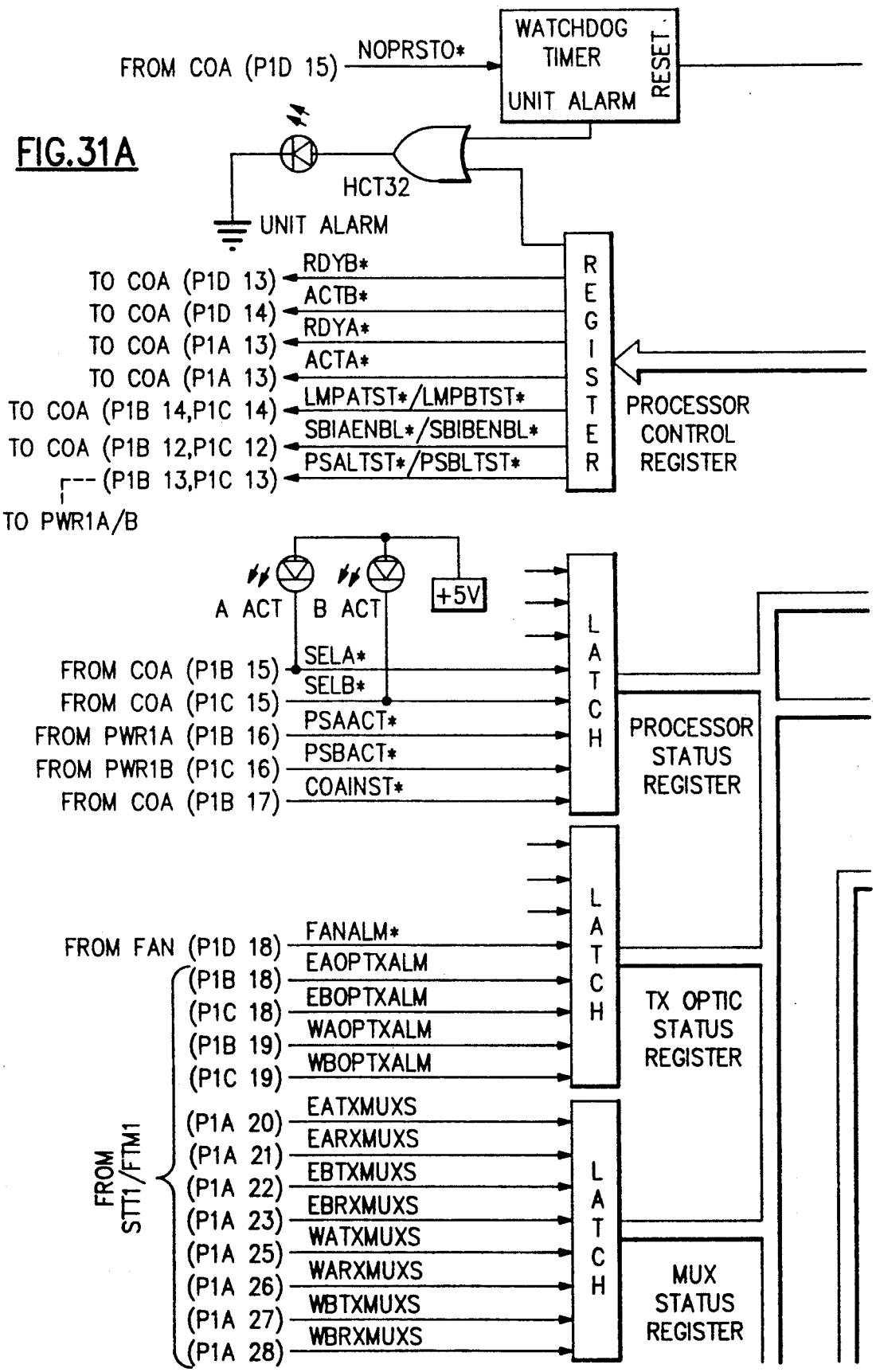

SYNCHRONOUS OPTICAL TRANSMISSION SYSTEM

REFERENCE TO MICROFICHE APPENDIX

The present application includes a "Microfiche Appendix" containing thirty-six sheets of microfiche in format A3 (63 frames per sheet, 9 columns by 7 rows).

TECHNICAL FIELD

The present invention is directed to a transmission system particularly suited for interconnection with high speed data channels conforming to the synchronous optical network (SONET) standard. The transmission system comprises a fiber optic transmission system, terminal multiplexers and add/drop multiplexers which combine to form a system for terminating and adding lower speed channels to a high speed channel conforming to the SONET standard, as well as to interface high speed channels, including SONET high speed channels, to higher speed SONET channels.

BACKGROUND OF THE INVENTION

A standard has been developed and adopted, directed to a high speed data channel, its associated digital hierarchy, as well as associated optical interface rates and formats for use therein known as the American National Standards Institute, Inc's. "Digital Hierarchy Optical Interface Rates and Format Specification", document T1.105-1988. This document is hereby incorporated by reference. This standard describes the base rate and format along with a multiplexing scheme which defines a modular family of rates and formats available for use in optical interfaces. This standard defines what is called a syychronous transport signal (STS) operating at level one which is the basic logical building block signal that defines all other STS levels greater than one. Within the STS basic signal, is a byte interleave multiplexing scheme with the basic signal divided into a transport overhead section and a portion which contains a payload, which typically contains lower speed telephonic communication channels and their associated path overhead.

Although the synchronous optical network standard has been defined, devices which interface with it in an overall transmission system have, to date, not been implemented. The present invention is directed to such a transmission system, and in particular defines three basic devices; a fiber transmission system, a terminal multiplexer and an add/drop multiplexer. Each device is able to interface with a high speed signal conforming to the SONET standard and is particularly suited for interfacing such high speed signals to typically lower speed signals of either a different standard, such as the digital signal standards (DS-0, DS-1, DS-2, DS-3, etc.) or lower speed SONET signals such as an STS-1 signal.

SUMMARY OF THE INVENTION

A synchronous optical transmission system is presented which comprises three constituent devices, namely; fiber transmission systems (FTS's) terminal multiplexers (TM's) and add/drop multiplexers (ADM's). Each device performs an interfacing function with regard to high speed data channels conforming to the synchronous optical network standard (SONET).

More particularly, the FTS is directed to a device for interfacing high speed signals conforming to the digital signal-3 standard (DS-3) operating at 44.736 mbit/s to an optical carrier-3 (OC-3) level signal operating at 155.52 mbit/s. The FTS is also able to interface a signal conforming to the SONET standard but in an electrical format, that is, a proposed SONET electrical interface standard STSX-1 operating at 51.84 mbit/s, to an optical carrier level 3 signal operating at 155.52 mbit/s. The FTS contains redundant modules for interfacing with either path A or path B used in telephony to convey high speed channel information.

The terminal multiplexer according to the present invention contains redundant high speed ports for interfacing to a SONET STS-1 signal (either electrically via the STSX-1 standard or fiber optically via the OC-1 standard), as well as low speed ports for communicating with DS-1 channels typically operating at 1.544 megabits per second. The DS-1 interface is software provisional for communicating with DS-1 standards conforming to the superframe (SF), extended superframe (ESF), and TR8 framing formats commonly used in telephony. The low speed ports communicable with DS-1 signals are connected to the high speed redundant ports via time slot multiplexers (TSM's).

The time slot multiplexers provide a communication path for provisioning an alarm from the high speed interface to the low speed interface via a network controller. The network controller in turn monitors the system performance and provides A/B path switching (for the redundant paths commonly used in telecommunications) as well as status information communicated to a craft/orderwire/alarm (COA) module. This COA module monitors the A and B paths and determines which side should be active.

Furthermore the terminal multiplexer provides the required DS-1 grooming when it is equipped with time slot multiplexers and has the capability to route any of 28 DS-1's located within a SONET payload to any one of the 28 DS-1 low speed ports.

The add/drop multiplexer is functionally similar to the terminal multiplexer and in addition is equipped with east and west high speed interfaces so as to allow lower speed channels to be dropped or added at the add/drop multiplexer location.

The combined devices can therefore be interconnected to the fiber optic media or coaxial media (for electrical interfaces conforming to the SONET standard) so as to provide the mechanism for an overall transmission system using the SONET standard.

OBJECTS OF THE INVENTION

It is a principal object of the present invention to provide a synchronous optical transmission system comprising a fiber transmission system, a terminal multiplexer, and add/drop multiplexer, each for interfacing with a high speed channel conforming to the SONET standard.

Another object of the present invention is to provide a synchronous optical transmission system wherein the fiber transmission system forming part of the overall transmission system is able to interface SONET channels operating at different data rates.

A further object to the present invention is to provide a fiber transmission system capable of interfacing a SONET high speed channel to a DS-3 type high speed channel.

Another object of the present invention is to provide a terminal multiplexer for interfacing a SONET high speed channel to a plurality of lower speed channels.

Another object of the present invention is to provide an add/drop multiplexer able to interface a SONET high speed channel to lower speed channels, as well as to add and drop lower speed channels at a particular add/drop multiplexer location.

A still further object of the present invention is to provide a fiber transmission system, terminal multiplexer, and add/drop multiplexer, each containing internal serial busses conforming to a serial transport frame format wherein data is contained in an internal channel wherein the internal channel comprises a first portion for containing such data and a second portion for containing associated control information.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, in which:

FIG. 10, comprising FIGS. 10A and 10B, is a functional block diagram of the fiber optics transceiver.

FIG. 14 is a timing diagram showing fiber optics transceiver timing to a TSM/TSI.

FIG. 15 illustrates the word format for payload overhead and VI channel associated with the fiber optics transceiver.

FIG. 31, comprising FIGS. 31A, 31B, 31C, 31D, is an overall block diagram of the single network element controller.

BEST MODE FOR CARRYING OUT THE INVENTION

Figure 1:
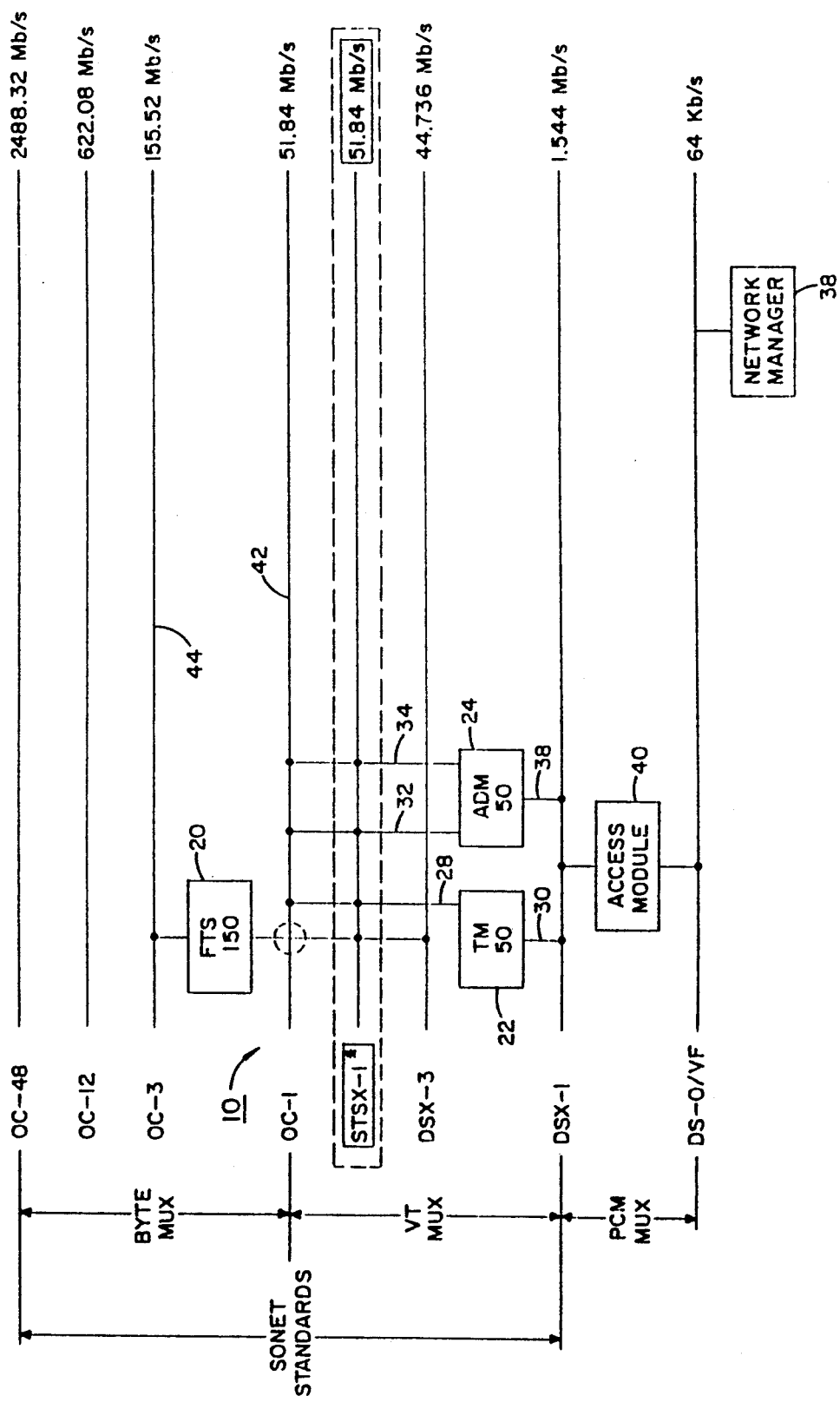
FIG. 1 is a block diagram of a synchronous optical transmission system according to the present invention, illustrating a fiber transmission system, a terminal multiplexer, and an add/drop multiplexer for use in interfacing with one or more high speed channels conforming to the synchronous optical network standard (SONET).
Figure 5:
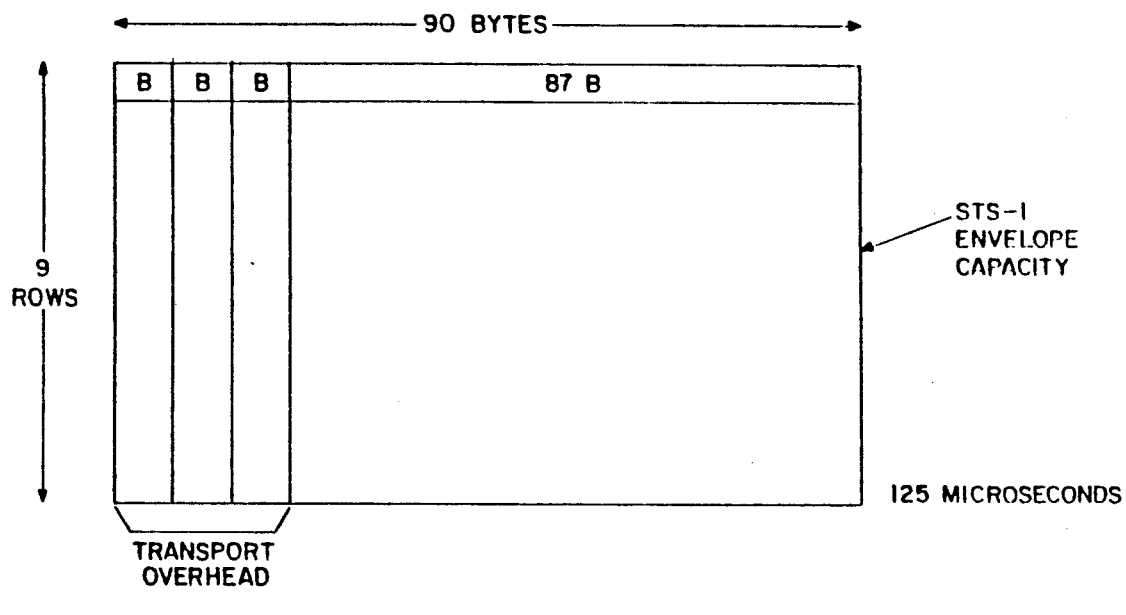
FIG. 5 is a diagram showing the frame format for a synchronous transport signal frame, specifically an STS-1 frame illustrating both transport overhead in an envelope capacity.

FIG. 1 illustrates a synchronous optical transmission system 10 comprising an FTS 20, ATM 22 and an ADM 24, that can interface with an optical carrier (fiber optic) transmission medium such as the optical carrier medium operating within the Synchronous Optical Network (SONET) standard adopted by the American National Standards Institute, Inc. (ANSI) as set forth in their standard No. T1.105-1988 entitled "Digital Hierarchy Optical Interface Rates and Formats Specification". This standard is hereby incorporated by reference. According to the SONET standard an optical carrier level (such as OC-1, OC-3, OC-12, OC-48) is the signal that results from an optical conversion of a Synchronous Transport Signal (STS) operating at the same level. The STS-1 (STS level 1) is defined as the basic building block signal with a transfer rate of 51.840 megabits per second (Mbit/s). Thus an STS-N optical carrier level is simply the level 1 rate multiplied by N, where N is an integer equal to or greater than one. The STS bit stream is presented in a frame where the STS-1 frame comprises 810 bytes which can be visualized as nine rows, each 90 bytes wide (see FIG. 5), with the frame period equal to 125 microseconds. The first three columns comprise what is called transport overhead, which in turn comprises section and line overhead. Section overhead deals with the SONET section layer which is directed to the transport of STS-N frames across the physical medium.

The line overhead deals with the line layer which is directed to the transport of Path layer payload. The payload is a synchronous payload whose envelope can reside across parts of two STS-N envelopes (see FIG. 5).

Figure 6:
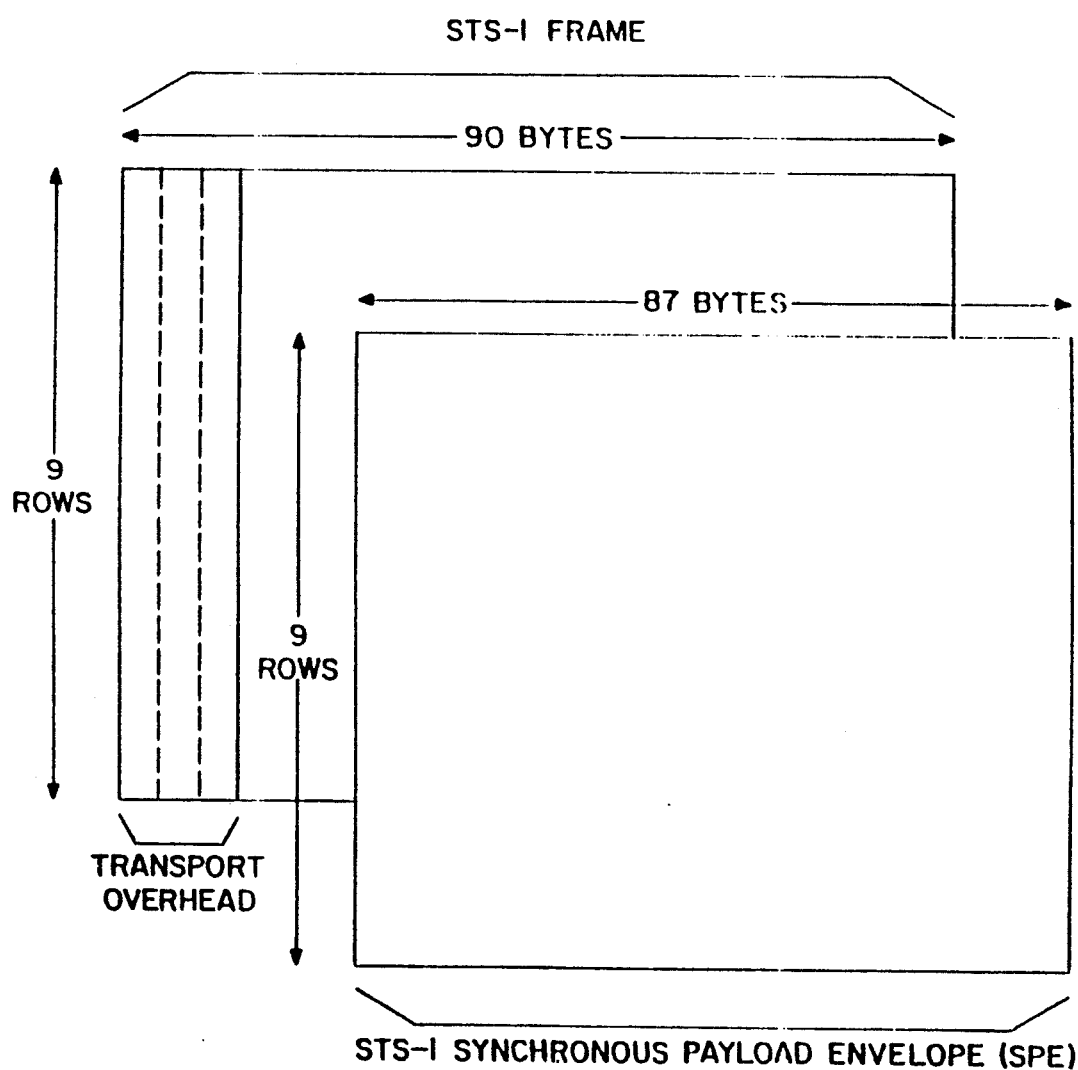
FIG. 6 is a diagram illustrating the synchronous payload envelope for transport within the STS envelope capacity.

The synchronous payload envelope (SPE) consists of nine rows, each 87 columns wide as shown in FIG. 6. The first column contains path overhead leaving 774 bytes available for payload. It is within this payload that channels of telephonic information, comprising channels conforming to various digital signal standards, are contained. As seen in FIG. 1, these standards include DS-0 (64 kbits/s), DS 1 (1.544 mbits/s) and DS-3 (44.736 mbits/s).

The fiber transmission system (FTS) 20 is interconnected between an OC-3 carrier operating at 155.52 megabits per second and an electrical DS-3 standard operating at 44.736 megabits per second. The fiber transmission system can also connect to a 55.84 megabits per second electrical interface identified as STSX-1. This interface is an electrical implementation of the synchronized optical network interface (SONET).

The terminal multiplexer (TM) 22 has a high speed port 28 operating at 51.84 mbits/s that can be equipped with either an electrical interface (STSX-1 electrical path) or a fiber optic interface for operation with the OC-1 SONET Standard. The low speed port 30 of the terminal multiplexer is interfaced with a DSX-1 electrical telephony standard operating at 1.544 megabits per second. Each DS-1 interface can incorporate up to 24 DS-0 channels each operating at 64 kilobits per second. The terminal multiplexer therefor interfaces from 1-28 DS1 channels with one OC-1 or one STSX-1 carrier.

The add/drop multiplexer (ADM) 24 is functionally identical to the terminal multiplexer except that the ADM is equipped with east and west high speed interfaces 32 and 34, respectively. The low speed port 38 is similar in operation to the low speed port 30 associated with the terminal multiplexer.

The access module 40 provides conventional interfacing between DS-0 channels operating at 64 kilobits per second and DS-1 channels operating at 1.544 megabits per second. Although used with transmission system 10, it does not form a part of the system described herein since it does not interface with the high speed SONET channels.

Figure 2:
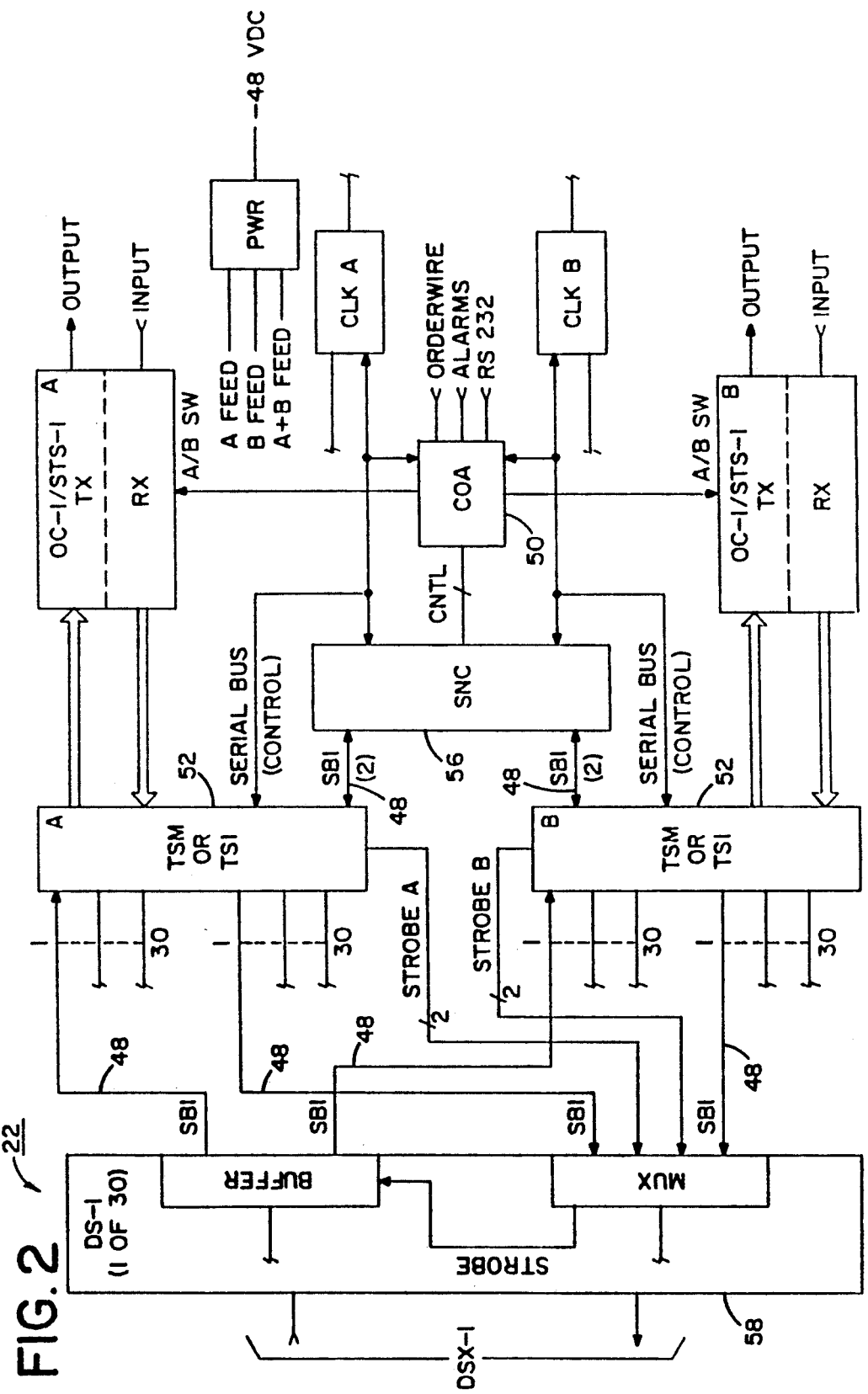
FIG. 2 is an overall block diagram of a terminal multiplexer as shown in FIG. 1.
Figure 3:
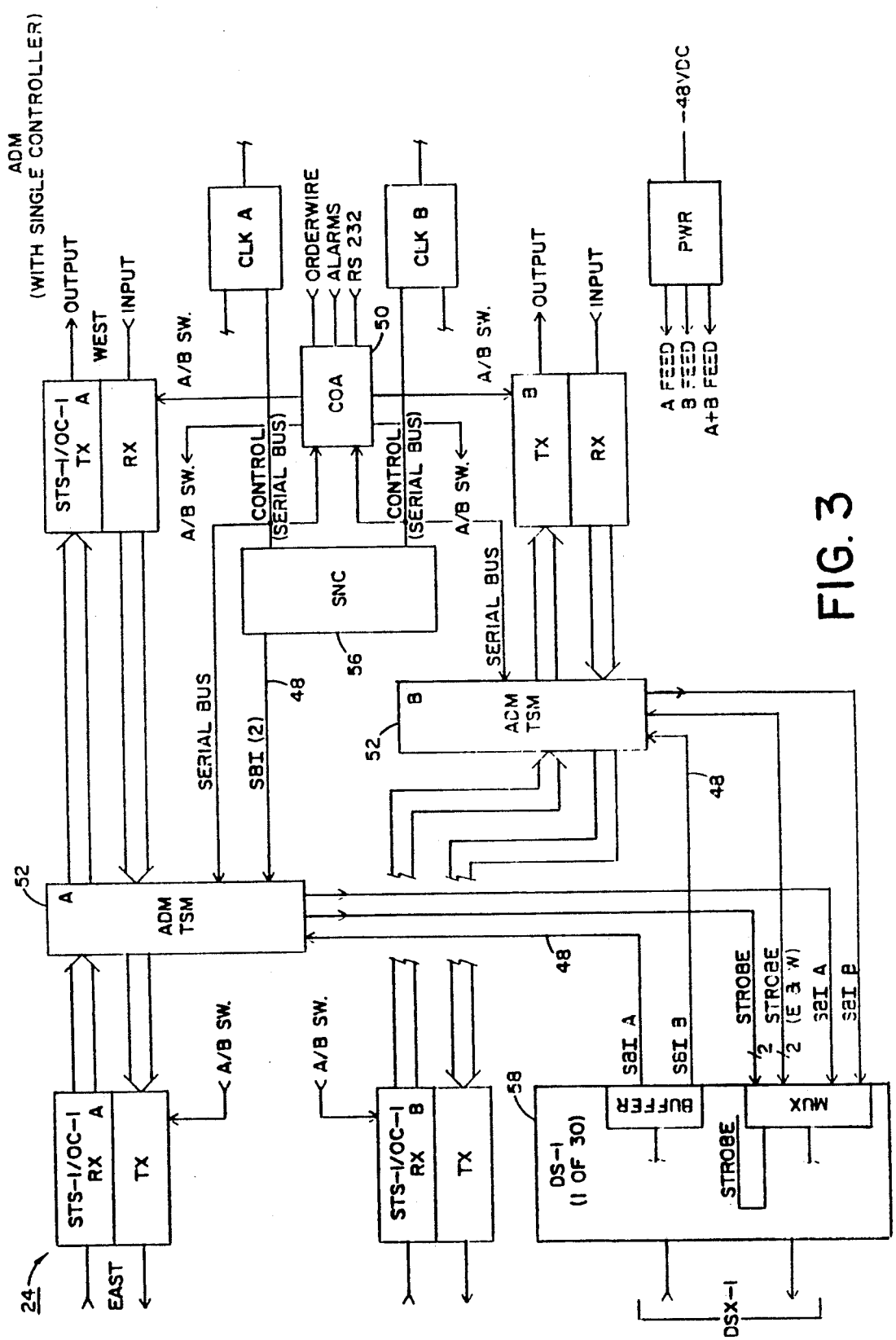
FIG. 3 is a block diagram of an add/drop multiplexer shown in FIG. 1.
Figure 4:
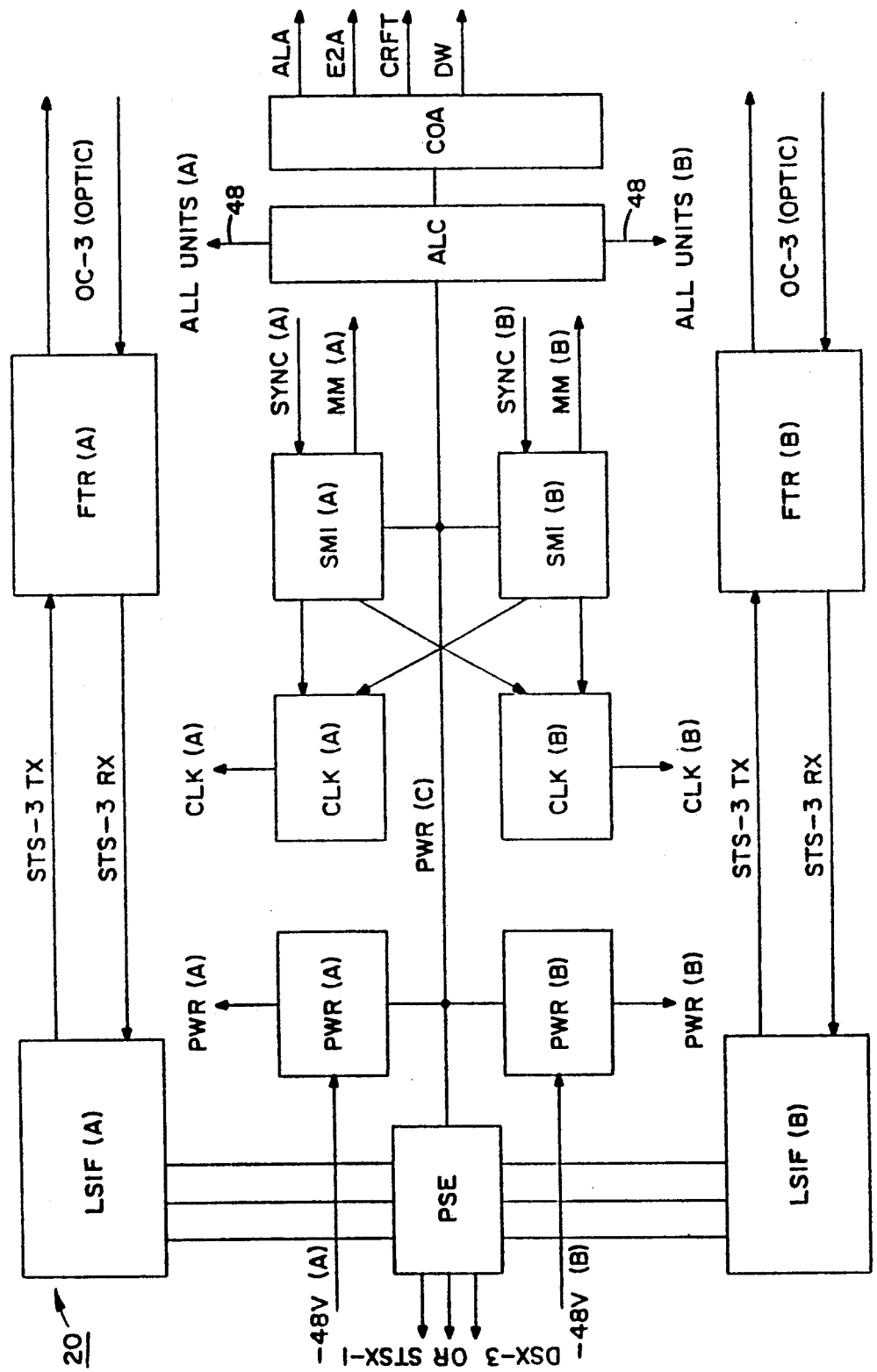
FIG. 4 is an overall block diagram of the fiber transmission system shown in FIG. 1.

As seen in FIGS. 2, 3 and 4 the terminal multiplexer 22, add/drop multiplexer 24, and the fiber transmission system 20 each use serial busses 48 which utilize the serial transport frame format of the present invention. By each device using the same serial transport frame format for the exchange of information within modules comprising the respective device, a straightforward implementation for transferring information between modules is achieved. Further information concerning the serial transport frame format is present in a copending application assigned to the present assignee, entitled "Serial Transport Frame Format Method", inventors Raymond E. Tyrrell et al, which is hereby incorporated by reference.

The serial transport frame format comprises sixteen bits per channel of information. There are 32 channels per frame. The first bit of each channel (bit #0) is the most significant (MSB) and the sixteenth bit is the least significant (LSB).

For telephony information the first eight bits of each channel comprise data (bits D0 through D7) while the remaining bits represent associated control information (bits C0 through C7). The associated control bits may represent any type of control information depending upon the nature of the associated channel data and the needs of the modules interconnected to a serial bus transferring information within this format. This associated control information may comprise address information regarding the channel data, timing information regarding the channel data, data valid and interrupt bits (V and I bits) and parity information regarding the channel. In all situations, the associated control bits represent information respecting the channel data or are "don't care" bits; i.e., bits that convey no particular information regarding the channel data.

Channel zero of each serial transport frame format represents synchronization data and associated control information.

For the device implementations shown in FIGS. 1, 2 and 3, each terminal multiplexer 22 and each add/drop multiplexer 24 can interface up to 28 DS-1 channels each operating at 1.544 megabits per second with one STSX-1 or one OC-1 channel. Each serial bus is called a serial link and is identified by a number corresponding to its link number. A serial link conveys information in the serial transport frame format, and thus 32 channels are associated with each serial link.

DEVICE IMPLEMENTATION

The fiber transmission system, terminal multiplexer, and add/drop multiplexer each comprise the modules set forth in their respective FIGS. 2, 3 and 4. Each of these modules comprise a plurality of integrated circuits including application specific integrated circuits as set forth in FIGS. 7, 8 and 9 for the terminal multiplexer, add/drop multiplexer and fiber transmission system respectively.

The detailed information concerning the modules presented in FIGS. 2, 3 and 4 are set forth in a plurality of documents set forth in Appendix A, as described in Table 1. Table 1 presents a brief description of each document forming Appendix A and these documents provide the detailed description of the overall devices themselves as well as the modules contained therein.

Figure 7:
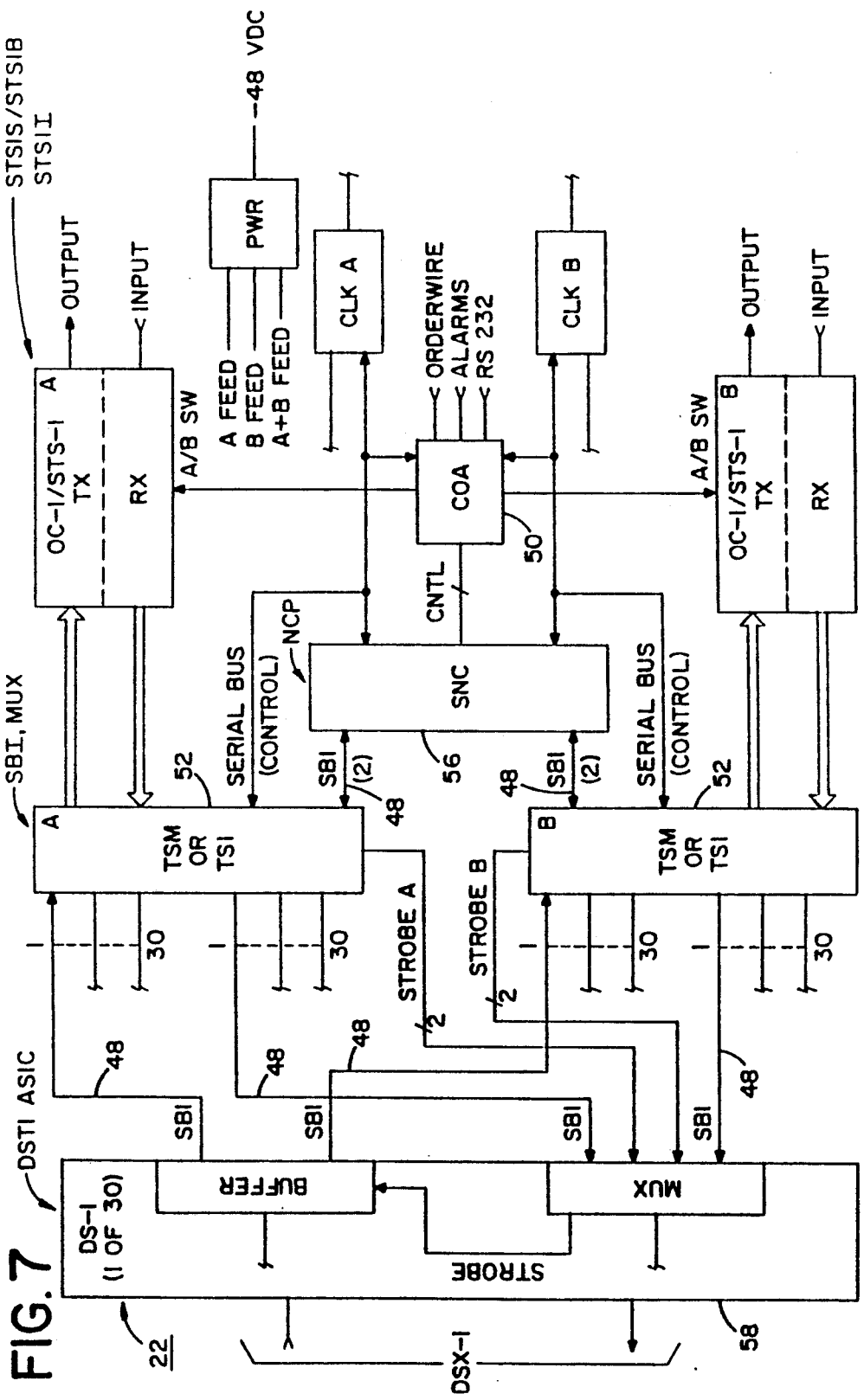
FIG. 7 is a block diagram of the terminal multiplexer showing application specific integrated circuit (ASIC) identification and locations.
Figure 8:
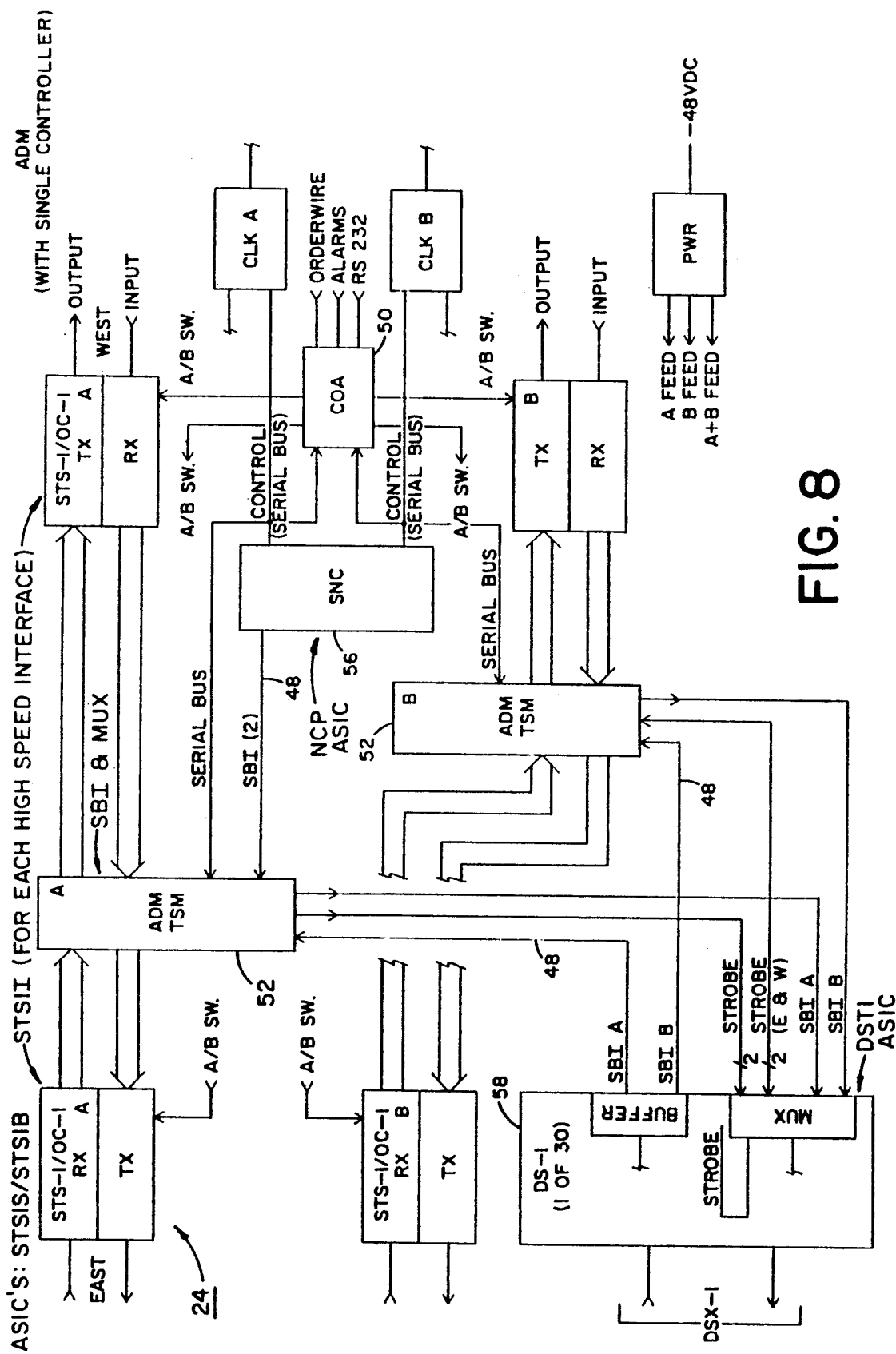
FIG. 8 is a block diagram of the add/drop multiplexer showing ASIC identifications and locations.
Figure 9:
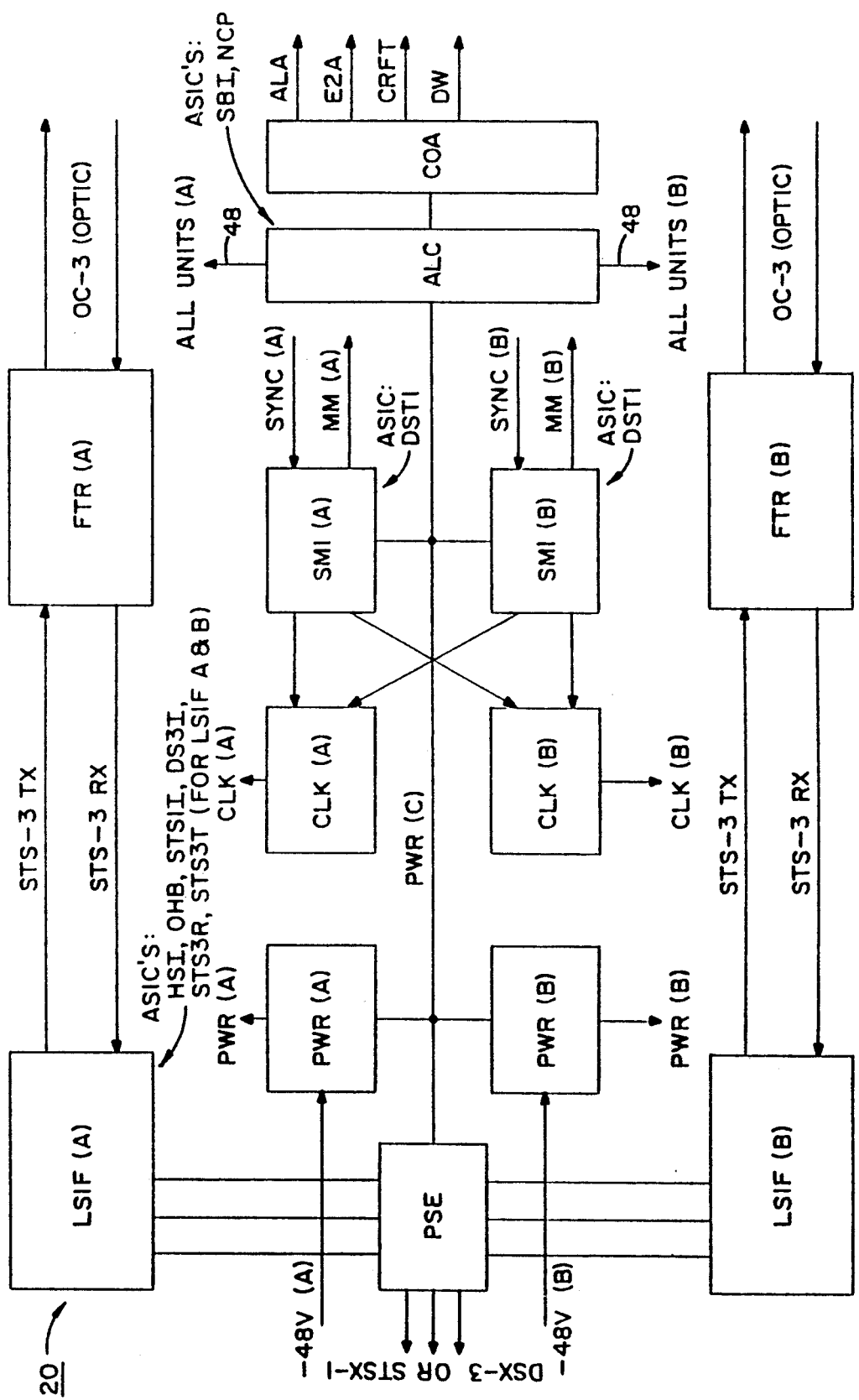
FIG. 9 is a block diagram of the fiber transmission system showing ASIC identification and locations.

Furthermore, the enclosed microfiche appendix contains detailed information via netlists for implementing each of the referenced application specific integrated (ASIC's) circuits set forth in FIGS. 7, 8 and 9 as well as the detailed information concerning the program instructions, or firmware, contained in the programmable read only memories (PROM's) contained within the modules set forth in FIGS. 7–8. The overall result is that the combination of the technical descriptions set forth in Appendix A with the detailed circuit descriptions and program listings set forth in the microfiche appendix is a description of the fiber transmission system, terminal multiplexer and add/drop multiplexer.

It should be noted that with regard to the netlists, they are presented in one of two formats; namely, in what is known as the Lasar TM format, a simulator format defined by Teradyne, Inc. of Boston, Mass., or in a format conforming to that of LSI Logic Corporation of Milpitas, Calif. The particular formats associated with a particular netlist are identified at the beginning of the respective ASIC netlist.

TABLE 1

Technical Descriptions Forming Appendix A

Name

Terminal Multiplexer, Add/Drop Multiplexer

This document presents detailed technical information concerning the overall terminal multiplexer 22 and add/drop multiplexer 24 shown in FIGS. 1, 2, 3 7 and 8.

Fiber Transmission System

This document provides a detailed description of the FTS as shown in FIGS. 1, 4 and 7.

Fiber Optics Transceiver

This document provides a description of the medium power optical interface for use in the terminal multiplexer and add/drop multiplexer devices.

Electrical Transceiver (STT1)

This document presents detailed information concerning the interface between a SONET channel operating at 51.84 megahertz using B3ZS encoding to a signal conforming AMI. The output portion of the associated module accepts the data from the TSM and develops a STSX-1 compatible signal.

DS-1 Interface

This document presents detailed information of a DS-1 line interface module for both byte and bit synchronous DS-1 interfaces, which in turn interface one DS-1 signal to a serial bus conforming to the serial transport frame format.

Time Slot Multiplexer for the Terminal Multiplexer Device

This document describes the time slot multiplexer associated with the terminal multiplexer and specifically discloses how this module provides cross-connection between serial busses conforming to the serial transport frame format and an internal parallel bus conforming to a parallel bus format as defined in the TM and ADM technical description.

TSM for ADM

This document provides the technical information for the time slot multiplexer associated with the ADM and specifically provides the information concerning the module's cross-connection of DS-1 signals, orderwire, data communication, V and I data, path tracer, and user channels associated with the serial busses conforming to the serial transport frame format. It also sets forth the serial microprocessor interface which allows the control processor to reconfigures the cross-connection functions of the time slot multiplexer.

Single Network Controller

This document defines the operation of the single network controller (SNC) which is a non-redundant control element for use with both the TM and ADM devices. This document defines the microprocessor used as well as the interfacing of this device with serial links conforming to this serial transport frame format and the serial microprocessor communication bus.

Craft Orderwire Alarm (COA)

This document describes detailed information concerning the COA which is responsible for determining the A or B path for the associated TM or ADM or FTS as well as providing communication interfaces to the outside world. It also describes the functioning of orderwire information as well as alarm logic interfacing and data communication channel reprovisioning with regard to bypassing such channels upon detection of the network controller failure (ADM version).

Detailed information concerning the operation of this bypass reprovisioning operation is set forth in a copending application assigned to the present assignee entitled, Data Communication By-pass Apparatus and Method inventors Raymond E. Tyrrell and Manal E. Afify Ser. No. 351,389, filed May 12, 1989, now U.S. Pat. No. 4,964,095.

Clock

This description presents the detailed information concerning the clock module used in the TM, ADM, and FFS devices.

Optical Transmitter/Optical Receiver (FTR1)

This description provides detailed information concerning the optical transmitter and optical receiver used in the FTS device.

Low Speed Interface (LSIF)

This document presents detailed information concerning the low speed interface used in the FTS as seen in FIGS. 4 and 9.

Protection Switch Element (PSE1)

This document provides detailed information concerning the protection switch element forming part of the FTS device.

Synchronization/Maintenance Interface (SMI1)

This document provides detailed information concerning the synchronization/maintenance module forming part of the FTS device.

Alarm/control Processor (ALT101)

This document provides detailed information concerning the alarm/controller module forming part of the FTS. This device serves as both a simplex or dual controller and provides alarm collection and performance monitoring of the equipment and facilities associated with the FTS.

SUMMARY

The present synchronous optical transmission system is an implementation of a transmission system which is able to interface with signals conforming to the synchronous optical network standard as well as with lower speed signals of that same standard and with the lower speed signals associated with standard telephony information such as DS-1 and DS-3 formatted signals. The fiber transmission system of the present invention provides the interfacing between OC-3 and OC-1 or STSX-1 signals, while the terminal multiplexer interfaces OC-1 and STSX-1 signals with lower speed DS-1 signals, along with the necessary grooming and signalling requirements to interface these various signals. The add/drop multiplexer of the present invention is similar to the terminal multiplexer but further provides for adding and dropping of DS-1 signals and the provisioning of east and west signals as they pass through the ADM.

Each of these devices further utilize an internal serial bus structure conforming to a serial transport frame format which provides a simple and straightforward method of interfacing modules within the various devices.

In addition, the add/drop multiplexer of the present invention provides a bypass apparatus for allowing specified low speed channels forming part of the high speed SONET channel to be passed through the add/drop multiplexer upon detection of improper operation of the associated network controller.

Furthermore, the TM and ADM comprise circuitry for interfacing the high speed data formatted to the SONET standard so as to translate the signal bits in the SONET format standard into the standards associated with lower speed signals such as DS-1 signalling. Detailed information concerning this aspect of the present invention is presented in a copending application entitled "SONET Receiver Signalling Translator", inventors Ertugrul Baydar and Timothy J. Williams, Ser. No. 350,591, filed May 11, 1989, assigned to the present assignee and hereby incorporated by reference.

It also includes within the ADM and TM modules circuitry for translating signalling bits associated with lower level channels such as DS-1 signals into the higher speed SONET formatted signal wherein the signalling bits are stored in a different format. Detailed information concerning this aspect of the present invention is presented in a copending application entitled "SONET Transmit Signalling Translator:, inventors Ertugrul Baydar and Timothy J. Williams, Ser. No. 350,717, filed May 11, 1989, assigned to the present assignee and hereby incorporated by reference.

The TM's and ADM's associated with the present invention further include circuitry for filtering and thereby compensating for errors which may be contained within the path overhead byte (H4) associated with the SONET high speed channel. Detailed information concerning this aspect of the present invention is presented in a copending application entitled, "SONET H4 Byte Receiver and Filter", inventors Timothy J. Williams and Ertugrul Baydar, Ser. No. 351,538, filed May 12, 1989, assigned to the present assignee, which is hereby incorporated by reference. The TM and ADM for the present invention further include circuitry for generating a SONET H4 byte so as to extract the H4 bytes from the received high speed SONET channel and for sequentially generating H4 bytes for each frame, as well as for comparing at least a portion of the extracted H4 byte with a similar portion of the generated H4 bytes and thereby providing an output indicative of a match or lack thereof and with associated counters providing the means for resetting the counter upon loading the extracted H4 byte into the generating means. Detailed information concerning this aspect of the TM and ADM is presented in an application entitled, "SONET H4 Byte Generator", assigned to the present assignee, inventors Timothy J. Williams and Ertugrul Baydar Ser. No. 351,184, filed May 12, 1989, now U.S. Pat. No. 4,001,708, which is hereby incorporated by reference.

Furthermore the serial transport frame format can convey information concerning embedded control information specifically including a V for valid bit and and I for interrupt bit which provides a method of generating messages which are equally accessible to both intelligent and non-intelligent elements. Details concerning this aspect of the present invention is provided in an application entitled, "Embedded Control Technique for Distributed Control Apparatus", Ser. No. 349,716, filed May 10, 1989, now U.S. Pat. No. 5,027,349 based upon continuation application, Ser. No. 547,383, filed Jul. 3, 1990, assigned to the present assignee, inventor Hal A. Thorne, which is hereby incorporated by reference.

Furthermore the TM and ADM's of the present invention incorporate a parallel frame synchronization circuit and method as set forth in detail in an application entitled, "Parallel Frame Synchronization Circuit and Method", inventors William H. Stephenson, Jr. et al, Ser. No. 351,723 filed May 12, 1989, assigned to the present assignee and hereby incorporated by reference.

The TM and ADM of the present invention also incorporates a transfer strobe time delay selector and method for performing this time delay as set forth in an application entitled, "Transfer Strobe Time Delay Selector and Method for Performing Same", inventors Milton R. Briscoe and Raymond E. Tyrrell, Ser. No. 351,016 filed May 12, 1989, assigned to the present assignee and hereby incorporated by reference.

Finally, the SONET high speed data channel requirements for scrambling the data within the channel according to a designated algorithm $(1+X^6+X^7)$ is performed in a parallel fashion within the devices of the present invention which is set forth in detail in copending application entitled, "Parallel Pseudo-Random Generator for Emulating a Serial Pseudo-Random Generator and Method for Carrying Out the Same", inventors William E. Powell, et al, Ser. No. 351,175, filed May 12, 1989, now U.S. Pat. No. 5,031,129, assigned to the present assignee and hereby incorporated by reference.

Thus what has been described is an overall synchronous optical transmission system incorporating a fiber transmission system, terminal multiplexer and add/drop multiplexer, as well as the specific devices themselves having capabilities as set forth above.

It will thus be seen that the objects set forth above and those made apparent from the preceding description are efficiently attained and, since certain changes may be made in carrying out the above devices and associated system without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

TECHNICAL DESCRIPTION FOR
SONET TERMINAL MULTIPLEXER, 50 MHz,
SONET ADD/DROP MULTIPLEXER, 50 MHz,
SONET ADD/DROP MULTIPLEXER CORE, 50 MHz, 625201-023-501

1.0 TM/ADM-50 Architectural Overview

The TM/ADM-50 Multiplexers belong to a family of Alcatel SONET products.

1.1 Terminal Multiplexer

The Terminal Multiplexer (TM-50) consists of redundant high speed ports (51.84 Mb/s) that may be equipped with either electrical (STSX-1) or fiber optic (OC-1) interfaces. The low speed ports may be equipped with 1 to 28 "Locked VT" DS1 Interfaces. The DS1 Interfaces are software provisionable for Bit Synchronous or Byte Synchronous modes. The Byte Synchronous mode is software provisionable for SF, ESF, or TR8 framing formats (Note: the Bit Synchronous mode is used for transparent transport of TR8 signals). The low speed ports are connected to the high speed ports via redundant Time Slot Muxs (TSM). The TSM also provides the communication path for provisioning and alarms from the high speed and low speed interfaces to the Controller. The Controller monitors the system performance and provides A/B switch status information to the Craft/Orderwire/Alarm (COA) Unit. The COA unit monitors the A and B sides and determines which side should be active. The A and B sides are "bank" switched, i.e., each side consists of a Power Supply, Clock, Time Slot Mux, and the High Speed Interface(s). The DS1 Transceivers and Controller are not redundant and have both A and B sides.

The COA also provides the alarm interfaces, orderwire interfaces, and the craft interfaces.

The TM-50 provides DS1 grooming when equipped with TSMs. A future TSI option will provide DS0 and/or DS1 grooming. The TM-50 can be changed from DS1 only to DS0 and/or DS1 grooming by replacing the TSMs with TSIs and replacing the Controller software load.

The TM-50 equipped with DS1 grooming has the capability to route any of the 28 DS1s located in the SONET payload to any one of the 28 DS1 low speed ports. The TM-50 equipped with DS0 grooming can in addition to routing any DS0 from the SONET payload to any DS1 low speed port, can connect any DS0 between DS1 ports.

The grooming may be provisioned from the local Craft Port, (front panel connection) or remotely from a modem (wire wrap pins provided) or via the OS Channel embedded in the SONET overhead.

The TM-50 is programmable to use frequency references from the high speed ports, any one of the 28 low speed ports, redundant external DS1 BITS sources, or default to 20 ppm references located on the Clock Units. The reference priority sequence is programmable.

The TM-50 provides 2 analog interfaces to an external orderwire panel. The TM-50 uses the interfaces to terminate the SONET Express and local Orderwires.

A Network Mediator will be available to provide external access to the ESF data channels, SONET User, Growth, and DataCom Channels.

The TM-50 occupies ¼ of a 8 rack space subframe (4 per subframe). See FIG. 2.

1.2 Add/Drop Multiplexer

The Add/Drop Multiplexer (ADM-50) is functionally identical to the TM-50 except the ADM-50 is equipped with East and West High Speed Interfaces. The ADM-50 provides DS1 grooming when equipped with TSMs. A future TSI option will provide DS0 and/or DS1 grooming. The ADM-50 can be changed from DS1 only to DS0 and/or DS1 grooming by replacing the TSMs with TSIs and replacing the Controller software load.

The ADM-50 equipped with DS1 grooming has the capability to route any of the 28 DS1s located in the SONET payload from the East or West to any one of the 28 DS1 ports. The ADM-50 equipped with DS0 grooming can in addition to routing any DS0 from the SONET payload, East or West, to any DS1 low speed port, can connect any DS0 between DS1 ports. The ADM-50 equipped with DS0 grooming can also groom from the East to West and West to East high speed ports.

The ADM-50 provides 2 analog interfaces to an external orderwire panel. The ADM-50 uses the interfaces to terminate the East and West local Orderwires. The ADM-50 through connects the Express Orderwire.

The ADM-50 requires ⅓ of a subframe (3 per subframe). See FIG. 3.

2.0 System Functions

2.1 A/B Switchover

The A/B Switchover function is designed to be compatible with both redundant and non-redundant Controllers. Currently the TM/ADM-50 is equipped with non-redundant Controllers. The A and B equipment sides have three possible states, Active, Ready and Not Ready. The Active state indicates that the side is the currently active side, handling traffic. The Ready state indicates that the side is ready and able to be active but is not the currently the active side. The Not Ready state indicates that the side is not able to handle traffic. Only one side of the system can be active at a time. (see 625212-001-501 for state tables).

The redundant Controller (DNC) provides two signals, Ready and Active, that indicates the state of the equipment (TSI/TSM, STS-1/OC-1 interface and System Clock). Initially the Controller asserts the Ready signal (if able to be ready) to the COA. The COA then determines which side is to be active and sends an "Active" select line to the selected Controller. The selected Controller then acknowledges with an Active output signal to the COA. The Active and Ready signals are separately asserted. The normal state is for the active and ready lines both to be asserted when active; however, some conditions allow for the active line to be asserted and the ready line not asserted (i.e. active but not ready).

Assuming that the A side is selected, the Controller will deactivate the Ready line when a service effecting failure (SONET B2 threshold exceeded, SONET LOS, etc.) has been detected in the A equipment. The COA monitors the B side Controller to determine the B side status, and if Ready, selects it as the Active side and reconfigures. If the B side is also Not Ready, then the COA takes no action. The non-redundant Controller (SNC) emulates the functionality of redundant Controllers and has both "A" and "B" sides.

2.1.1 DS1 Interface Switchover

The simplex DS1 Transceiver connects to both A and B SBI links. To provide protection against bit errors, the Transceiver monitors A/B switchover information transported in both links. The information consists of two bits of data as shown below (see Section 4.1 for complete allocation):

| A | B | |
|---|---|---|
| 0 | 0 | - not valid, no change |
| 0 | 1 | - B link selected |
| 1 | 0 | - A link selected |
| 1 | 1 | - not valid, no change |

The Controller originates the information based on the A/B selection by the COA. The Controller forwards the information to the TSM/TSI to be broadcast to all DS1 Transceivers. The DS1 Transceiver selects the A or B link based on the persistency of the A/B data, valid for at least two consecutive frames, and the match of the data in both the A and B links (with both links framed and operating properly). If the data does not persist or the data in the A and B links do not match, a switchover is not performed. The DS1 Transceiver design addresses the possibility that the data may not be synchronous.

If either the A or B SBI link loses frame synchronization, the remaining good link is capable of A/B switchover. The DS1 will observe the loss of frame synchronization on the bad side, and will switch based on the A/B bits in the good link. The status of both SBI Links to the DS1 Transceiver is available to the Controller via the VI control channel. This status includes which link is the currently selected link, the loss of synchronization for each link, the loss of clock for each link, and the status of the transmit direction of both SBI Links at the TSI/TSM.

When a failure occurs that prevents the Controller from driving the A/B switchover channel, a mechanism exists that will force the SBI Links associated with the failed side, A or B, to lose synchronization. This forced loss of frame synchronization allows the switchover strategy described above to function under failure conditions or when the TSI/TSM is physically removed from the Module. The forced loss of synchronization at the peripherals is accomplished by disabling the SBI outputs of the TSI/TSM thus generating an all ones pattern.

The SBI outputs of the TSI/TSM are disabled by a command from the COA. The COA monitors the status of each Controller side to determine when a forced switchover is necessary.

The command from the COA to the TSI/TSM to disable/enable the SBI Links outputs is transported by two signals, Enable and Enable Clock. The Enable Clock signal is common to the TSI/TSM and the STS-1/OC-1 Interfaces on both sides, A and B. The Enable signal is encoded, individual signal to each unit, TSI/TSM and STS-1/OC-1. Each individual Enable signal is totally independent of the other Enable signals and can be placed in either state solely based on command from the COA. The Enable Clock is active when the data on the Enable signal is valid. The Enable Clock may be made inactive when the Enable signal is not valid or during a transition of the Enable signal.

2.1.2 STSX-1 Output Switchover

The A and B STSX-1 outputs are connected to a 2 coil relay located on the module backplane. The A relay coil is controlled from the A STSX-1 Interface and the B coil is controlled from the B STSX-1 Interface.

The STSX-1 Interface control to the relay is enabled/disabled by a command from the COA. This command is carried in the Enable and Enable Clock Signals as described above. No information is transported via an SBI channel. The COA receives configuration information from the Controller to set the state of the output relay. During A/B switching, both sides are disabled, then the active side enabled. The status of each STSX-1 Interface output is provided by a separate status signal to the Controller.

2.1.3 OC-1 Mux Function

The OC-1 Transceivers have both transmit and receive mux functions. The receive mux function is used only for "Ring" configurations. The transmit mux selects the signal, A or B equipment, to be transmitted by both the A and B optic transmitters. Each mux (transmit and receive) has individual status lines to the Controller. The transmit mux function guarantees that outputs, A and B, carry the same information.

2.2 SONET Overhead 2.2.1 Section Overhead 2.2.1.1 Framing (A1,A2)

The STS-1 Framing Bytes contain the binary framing pattern 1111011000101000 and is sourced and terminated in each STS interface. The inability to frame on this pattern produces an out of frame alarm in the respective STS interface which is reported to the Controller in the VI channel through the TSI/TSM.

2.2.1.2 STS-1 ID (C1)

The STS-1 ID is set to 00000001 by the STS interface.

2.2.1.3 BIP-8 (B1)

The BIP-8 code is sourced and terminated in each STS interface. Receive BIP-8 errors are counted in each STS interface and sent to the Controller in the VI channel through the TSI/TSM.

2.2 1.4 DataCom (D1–D3)

The DataCom channel can be sourced and terminated in either the Controller or the Network Manager. This channel is passed transparently through the STS interface, then routed transparently by the TSI/TSM to either the Controller or the Network Manager. The TSI/TSM is provisionable as to the destination of the DataCom channel via the serial interface from the Controller. ADM systems are capable of having both East and West Section DataCom channels simultaneously routed to the Controller or Network Manager. Alternatively in ADM configurations, the DataCom channel can be connected through from the East to West and the West to East STS interfaces.

2.2.1.5 Local Orderwire (E1)

The Local Orderwire is sourced and terminated in an external orderwire panel. This signal interfaces into TM-50 systems through an external interface on the COA unit and is routed transparently through the Controller, TSI/TSM to an STS interface. For ADM systems, the COA unit provides two Local Orderwire interfaces (East and West). The orderwire panel provides for through (East/West) and bridged local orderwire interfaces.

2.2.1.6 User (F1)

The User Channel is sourced and terminated in the Network Manager. It is routed transparently through the TSI/TSM and each STS interface. TM-50 systems have a single User Channel. ADM systems have two user channels, one for the East and one for the West STS interfaces. Alternately in ADM configurations, this channel can be connected through from East to West and West to East interfaces.

2.2.2 Line Overhead

2.2.2.1 Pointer (H1,H2)

The Pointer channels are sourced and terminated in each STS interface. H1 and H2 are also used for STS-Path AIS (see section 2.7.3).

2.2.2.2 BIP-8 (B2)

The BIP-8 code is sourced and terminated in each STS interface. Receive BIP-8 errors are counted in each STS interface and are sent to the Controller in the VI channel through the TSI/TSM. The BIP-8 is used for protection switching.

2.2.2.3 Pointer Action (H3)

The Pointer Action code is sourced and Terminated in each STS interface. H3 is also used for STS-Path AIS (see section 2.7.3).

2.2.2.4 Express Orderwire (E2)

The Express Orderwire in the TM-50 Module is sourced and terminated in an external orderwire panel. This signal interfaces to the TM-50 through an external interface on the COA unit and is routed transparently through the Controller, TSI/TSM, and STS interface. In ADMs, the Express Orderwire is passed untouched between the East and West interfaces.

2.2.2.5 APS (K1,K2)

The APS channel is sourced and terminated in each STS interface. The information content of each APS channel is passed to the Controller in VI channels through the TSI/TSM. Also when an STS interface detects Line FERF (110) or Line AIS (111) code in bit positions 6, 7, and 8 of byte K2, it sets the status bit in the VI status memory. The I bit is set for any valid change of state for the APS channel (any change of state must be received five consecutive times to be declared valid). The transmitted Line AIS or Line FERF indicator bit value is sent by the Controller in a VI channel bit to the STS interface through the TSI/TSM.

2.2.2.6 DataCom (D4-D12)

The DataCom channel is sourced and terminated in the Network Mediator. This channel is routed transparently through the TSI/TSM and the STS interface. Alternatively in ADM configurations this channel can be connected through from East to West and West to East STS interfaces.

2.2.2.7 Growth (Z1-Z2)

The Growth channels from each STS interface are sourced and terminated in the Network Mediator. These channels are routed transparently through the TSI/TSM and the STS interface. Alternatively in ADM configurations this channel can be connected through from the East to West and the West to East STS interfaces.

2.2.3 Path Overhead

2.2.3.1 BIP-8 (B3)

The BIP-8 code is sourced and terminated in each STS interface. Receive BIP-8 errors are counted in each STS interface and are sent to the Controller in the VI channel through the TSI/TSM.

2.2.3.2 Tracer (J1)

The Tracer byte sequence is sourced and terminated in the Controller. This channel is routed transparently through the TSI/TSM and broadcast to each STS interface. ADM systems are provisionable to monitor the Tracer bytes from either the East or West direction, but cannot monitor both at the same time.

2.2.3.3 Signal Label (C2)

The Signal Label is sourced and terminated in each STS interface. The Signal Label is provisionable and reportable to the Controller in the VI channel through the TSI/TSM.

2.2.3.4 Path Status (G1)

Path Status consists of three components. The first is far end B3 errors which are counted in each STS interface. These error counts are sent to the Controller in a VI channel through the TSI/TSM. The second is the STS Path Yellow indicator which is bit 5. The received STS Path Yellow status bit i placed in a VI channel bit and sent through the TSI/TSM to the Controller accompanied by an I bit on any valid change of state. The transmitted STS Path Yellow indicator bit value is sent by the Controller in a VI channel bit to the STS interface through the TSI/TSM. The third is bits 6–8 which are unassigned.

2.2.3.5 User (F2)

The User channel is sourced and terminated in the Network Manager. The signal is routed transparently through the TSI/TSM and the STS interface. Alternatively in ADM configurations this channel can be connected through from the East to West and the West to East STS interfaces.

2.2.3.6 Growth (Z3-Z5)

The Path Growth Channels may be sourced and terminated in the Network Manager. Alternatively in ADM configurations these channels can be connected through from the East to West and the West to East STS interfaces. The signal is routed transparently through the TSI/TSM and the STS interface. TM/ADM-50 systems equipped with TSM units do not have access to the Z3 byte (TSIs have access to all 3). In ADM-50 systems equipped with TSM units the Growth Channel (Z3) is connected through from the East to West and the West to East STS interfaces.

2.2.3.7 VT Multiframe Indicator (H4)

The VT Multiframe Indicator sync byte provides sync information for SF and ESF masterframes.

2.2.8 VT Path Overhead (V5)

The VT Path Overhead is required for Floating VTs and is not currently supported.

2.3 DS1 Overhead

DS1 Overhead is defined for DS1 interfaces operating in the byte synchronous mode with either SF or ESF formats.

2.3.1 SF format

When the DS1 is operating in the SF format, the source of the 193rd bit transmitted by the DS1 is provisionable to either the DS1 internal frame generator or to the 193rd bit (F bit) position of the virtual tributary. When the 193rd bit position of the virtual tributary is selected, this bit is passed transparently through the DS1.

In the DS1 receive direction, the 193rd bit is inserted into the SBI link. The 193rd bit will be placed in the 193rd bit position of the virtual tributary.

2.3.2 ESF format

When the DS1 is operating in the ESF format, the source of the 193rd bits transmitted by the DS1 is provisionable from one of three sources. The first configuration transparently passes all of the bits (framing, CRC and data link) from the 193rd bit position of the SONET virtual tributary. The second configuration has the DS1 substitute its own framing and CRC and insert only the data link bits from the 193rd bit position of the SONET virtual tributary. The third method has the DS1 generate its own framing and CRC and insert the unequipped, idle code, or bit mode data link.

In the DS1 receive direction all of the 193rd bits are inserted into the SBI link. These bits will be placed in the 193rd bit position of the virtual tributary. For systems equipped with TSI Units, the data link may be provisioned to be routed between one DS1 interface through the TSI/TSM to the Controller. Alternately, the data link may be routed through the TSI/TSM to the Network Manager.

2.4 Fault Diagnostics

In most cases, a fault condition can be isolated to a Printed Board Assembly (PBA). Fault diagnostics consist of two methods of isolation. One uses data collected by the alarm sub-system and then infers a faulty unit based on all of the collected alarms. However, in some cases the alarm data itself is not sufficient to narrow the possible faulty units to one or two PBAs. In this second case additional diagnostic routines are manually initiated to narrow the possible number of suspect units.

The following represents a loop/parity test strategy for this purpose. Note that while most tests can be run on active systems, some loop test will be service affecting.

2.4.1 SBI Loop Tests

See Section 2.4.5 for VI Loop codes. The VI bits are active low.

2.4.1.1 Controller Local Loop

Loop testing originates from the Controller. The Controller has the ability to loop its SBI transmit back to its SBI receive via a control register. This test disconnects the Controller from the TSM/TSI.

2.4.1.2 TSI/TSM Far-end Loop

In order to isolate a fault to the TSI/TSM, the VI Control Channels of the TSI/TSM SBI interfaces to DS1/Line Shelf Interface PBA's will be looped at the TSI/TSM. This will be done in a nonservice affecting manner. Each SBI connected to the TSI/TSM has a VI Control Channel which is controlled by the Controller. Channel 31 of the SBI is the VI Control channel and is used to control this loop point. The TSI/TSM SBI LSI will monitor the VI bits of Channel 31 coming from the direction of the Controller. When the VI bits are inactive, the SBI LSI will search for a code in the Offset Bits field. The algorithm for recognition of a code will be to loop after receiving three consecutive codes and remain looped until the code is not received for 3 consecutive frames.

2.4.1.3 DS1 Loop

The last loop point for fault isolation for TM/ADM-50 systems is at the DS1 Transceiver. Two methods are available, one in service, one out of service. For in service test, one byte of the 32 bytes used in the VI Control Channel will be written to periodically by the Controller and read back continuously to the Controller. The second method, the DS1 output will be looped to the input. The Control of the loop is accomplished by the received SBI VI Control Channel.

2.4.2 Parallel Bus (STSX-1/OC-1) Loop Tests

Loop testing of the STSX-1/OC-1 Parallel Bus will be a continuous inservice test. One byte out of the 3 bytes used in the STSX-1/OC-1 VI Control Channels will be written to periodically by the Controller and read back continuously to the Controller.

If a fault condition of the Parallel Bus is recognized via errors detected in the VI byte read back, looping the Parallel Bus TSI output back to the TSI input is not possible. In this scenario, fault isolation would be to the two units, the STSX-1/OC-1 PBA and the TSI PBA.

2.4.3 Parity Testing

The Controller cannot access all channel connections through the system. As an example, the STS-1 East to West connection through the TSI uses Switch Memory circuits and Parallel Buses which are inaccessible by the Controller. A parity bit (bit 15) is transmitted and verified on each DS0 channel. In using the parity bit any channel path through any combination of a Parallel Bus, SBI, Backpanel, Cable, and TSI can be verified.

As an example, the East STS-1 will send one DS0 channel with parity through the TSI/TSM to the West STS-1. In receiving the DS0 channel, the West STS-1 will detect a parity error and sets a register flag which is periodically read and reset by the Controller via the VI Control Channel. The Controller will determine when a provisioned error free seconds threshold has been exceeded, will initiate a switch to the redundant equipment, and provide an error output to the Local Craft and/or OS.

After switching to the redundant equipment, the Controller can systematically set up all connect combinations of suspect channel paths. By using the parity error detection, loop mechanisms, and Connect Memory, the fault can be isolated to one or two PBA's.

Given parity within each channel, parity at an SBI frame level is not required, however the SBI frame parity is used as part of the frame sync process to prevent false framing. The sync channel has even parity and all other channels have odd parity. For reference, odd parity means within the 16 bits of a channel word, including the Parity Bit, there is an odd number of "1"s.

2.4.4 Line Loop Tests

The DS-1, STSX-1, and OC-1 units provide the capability to be looped on the line side of the unit (i.e. span). The DS-1 Transceiver provides looping both the output back to the input, and the incoming signal looped back as the outgoing signal. The STSX-1 and OC-1 only provide a transmit-to receive loop-back. The OC-1 additionally allows for manual optic loop-back via an optic patch cord. The DS-1 Transceiver receives control for looping from the VI channel within the SBI link. The STSX-1 and OC-1 electrical loop-backs are controlled by the VI channel within the parallel interface with the TSI/TSM. The OC-1 optic loop-back is provided manually.

2.4.5 VI Channel Loop codes

00000—Reserved for idle code
11010—loop far end TSI/MUX
11011—Reserved for nested SBI Loops
01001—Line Module Loop

2.5 Synchronization

The TM/ADM systems are expected to be operated in a synchronous network where all elements are tied ultimately to the same frequency source. The frequency of an individual element may deviate instantaneously from the fixed value of the network clock but always returns and on the average operates exactly at the network clock frequency. Therefore all of the clocks for TM/ADM systems may be derived from a single local reference.

To satisfy source, redundancy and fault requirements, the TM/ADM systems are equipped with two clock units (one each for A and B side) with each Clock unit capable of attaining frequency synchronization with one of eight sources. The selection criteria for these frequency synchronization sources is configurable by the Controller and implemented on the Clock unit. Each Clock unit monitors these frequency sources and reports their status to their respective Controller. The frequency sources are the East and West STS1 receive clocks, the primary and secondary external BITS clocks, any four of the DS1 receive clocks (two from each motherboard) and internal local oscillators. All of the frequency sources interfacing the clock unit are at the 8 Khz submultiple of their original frequency.

2.5.1 East and West STSX-1/OC1 51.84 MHz

The East and West STSX-1/OC1 51.84 MHz receive clocks are divided down to 8 Khz and routed directly and individually to their respective Clock unit. When an alarm condition associated with the STSX-1/OC1 is detected, the signal will be set to a logic 1. When an STS/OC1 unit position is not equipped a pull up resistor on the Clock PBA will force the input to a logic 1. Upon receiving and integrating the alarm, the Clock unit may switch references based upon the priority previously provisioned and notify the Controller of its status and any action taken.

2.5.2 Primary and Secondary 1.544 MHz BITS Clock

The primary and secondary 1.544 MHz BITS clocks are interfaced to the ADM/TM systems through two byte synchronous DS1 units located in the sync card positions. The divided down 8 Khz sync outputs of these units are routed directly and individually to the redundant clock units. These DS1 units are DS1 terminations and are not capable of "bridging" an operating DS1 BITS line. Therefore an external DS1 timing source with multiple outputs is required for applications having multiple TM/ADM systems at a single location. SBI links are not available for performance monitoring of the DS1 sync position. Detailed performance monitoring must be provided by the timing source when required. The DSX-1 and Sync function use the same PBA.

When an alarm condition associated with a BITs input is detected such as a loss of framing or loss of signal the output will be set to a logic 1. When a DS1 BITs position is not equipped a pull up resistor on the Clock PBA will force the input to a logic 1. Upon receiving and integrating the alarm, the Clock unit monitors the operation of this source and may switch references based upon the priority previously provisioned and notify the Controller of its status and any action taken.

2.5.3 Primary and Secondary DSX1 Inputs

Two primary and two secondary 8 Khz clocks divided down from the receive 1.544 MHz DS1 signals are interfaced to the Clock Unit via primary and secondary sync buses routed from the DS1 Transceiver units on each DS1 motherboard. Each DS1 Transceiver unit has two outputs which can be provisioned to drive either or both of these buses or to remain inactive. The divided down 8 Khz sync outputs of these units are routed directly and individually to the redundant clock units. These DS1 Transceiver units are DS1 terminations and ar not capable of "bridging" an operating DS1 line. The DSX1 and BITs Sync function use the same PBA.

When an alarm condition associated with a selected DS1 Sync unit is detected, such as a loss of framing or loss of signal, the output will be set to a logic 1. Upon receiving and integrating the alarm, the Clock unit may switch references based upon the priority previously provisioned and notify the Controller of its status and any action taken.

2.5 4 local 20 ppm Oscillator

A local 20 ppm oscillator is located on the Clock unit. The Clock unit monitors the operation of this source and may switch references to this oscillator based upon the priority provisioned and notify the Controller of its status and any action taken.

2.6 UNICODE 2.6.1 STSX-1/OC1

For hardware detected alarms (loss of signal and loss of framing), the STS receive direction is provisionable to either, not substitute, or automatically substitute, (without command of the Controller) the UNICODE pattern into the receive outband signaling bits. The Controller can also direct the STS receive interface, regardless of the receive alarm state, to substitute the UNICODE pattern. The outband signaling bits are transported by the TSI/TSM to the opposite transmit interface (STSX-1/OC1 or DS1). Independently of the provisioning state, the Controller is notified of any receive alarms and will activate the appropriate alarm status.

For other STS alarms that are detected by the Controller (remote alarm, failed receive function, missing unit, error threshold exceeded, etc.) the Controller will provision the TSI/TSM to insert UNICODE into the affected channels, and instruct the associated transmit STS interface to insert the remote alarm signal. Provisionable broadcast channels are allocated to be used as a signal source for the UNICODE pattern. This allows the UNICODE pattern to be generated even if the STS interface cannot perform the substitution. The STSX-1/OC1 does not interpret UNICODE in any way.

2.6.2 DS1

For hardware detected alarms (loss of signal and loss of framing), the DS1 receive direction is provisionable to either, not substitute, or automatically substitute, (without command of the Controller) the UNICODE pattern into the receive outband signaling bits. The Controller can also direct the DS1 receive interface, regardless of the receive alarm state, to substitute the UNICODE pattern. The outband signaling bits are transported by the TSI/TSM to the opposite transmit interface (STSX-1/OC1 or DS1). Independently of the provisioning state, the Controller is notified of any receive alarms and will activate the appropriate alarm status.

For other DS1 alarms that are detected by the Controller (remote alarm, failed receive function, missing unit, error threshold exceeded, etc.) the Controller will provision the TSI/TSM to insert UNICODE into the affected channels, and instruct the associated transmit interface to insert the remote alarm signal.

For ESF formats, the DS1 interface monitors only the bit mapped mode to determine if a remote alarm exists, however the architecture does not preclude the monitoring of the message oriented version for future releases.

The DS1 transmit function is provisionable to be transparent to UNICODE, or process UNICODE on a per DS0 basis. When UNICODE processing is selected, the DS1 interface freezes the signaling when two valid UNICODE patterns are received as described in TR-TSY-000010. Regardless of the transmit provisioning state, the DS1 interface will report the UNICODE status to the Controller. The Controller uses this information along with the provisioning for each DS0 channel to determine correct trunk processing.

2.7 AIS Signals

AIS is defined for SF, ESF and STS1 formats.

2.7.1 DS1 AIS

For SF and ESF formats, AIS is defined as an unframed all 1's signal. The DS1 receive interface will detect the AIS signal and maintain the VI AIS status bit. The status bit is sent to the Controller every 4 ms via the TSI/TSM. The I bit is set for any valid change of state.

To transmit the AIS signal, the Controller (using the VI Control Channel) instructs the DS1 interface to insert the all 1s signal. The VI interrupt is not used.

2.7.1.1 Alternate ESF format AIS

An alternate AIS signal, embedded in the ESF data link, is defined for DS1 interfaces operating in the ESF format. This allows the DS1 link to transmit an AIS condition while maintaining framing. When the ESF data link is operating in the bit mode, the binary bit pattern 010110 represents an active AIS status.

When the DS1 interface detects the bit mode framing pattern, it sets the bit mode status bit to the Controller. The I bit is set for any valid change of state. When the DS1 interface receives a new valid six bit binary code (new code pattern received two consecutive times) it inserts the pattern into the data field of one of the VI bytes, sets the I bit and sends it via the TSI/TSM to the Controller for interpretation. The DS1 interface does not interpret these codes.

In the DS1 transmit direction, the DS1 interface provisions the DS1 interface to transmit the bit mode framing pattern, and send the ESF data link pattern. By setting this pattern to the 010110, it signals the other end that an AIS is active. The bit mode command and the binary bit pattern are transferred from the Controller to the DS1 unit through the SBI link in the VI channels.

2.7.2 STS1 Line overhead AIS

STS1 Line AIS is defined as detecting an all 1's pattern in bits 6, 7, and 8 of the K2 byte for 5 consecutive frames. The K2 byte is sourced and terminated in each STS interface.

When an STS interface detects the Line AIS code, it sets the Line AIS status bit to the Controller via the TSI/TSM. The I bit is set for any valid change of state (for the APS bytes any change of state must be received five consecutive times to be declared valid).

To transmit an STS Line AIS, the Controller sends a VI control bit to the STS interface through the TSI/TSM. When the STS1 line overhead bit is detected, the STS interface generates the Line AIS. The Line AIS signal contains valid section overhead and a scrambled all 1s pattern for the remainder of the signal.

2.7.3 STS1 Path overhead AIS

STS1 Path AIS is defined as detecting an all 1's pattern in bytes H1 and H2 for 3 consecutive frames. The H1 and H2 bytes are terminated in each STS interface. When an STS1 interface detects the Path AIS code, it sets the Path AIS status bit to its active state. The STS interface sends the Path AIS status bit in a VI channel every 4 ms to the Controller via the TSI/TSM. The I bit is set for any valid change of state.

The TD/ADM-50 cannot generate the STS1 Path AIS.

2.7.4 V AIS

The VT AIS is required for floating VTs only and will be a future product offering.

2.8 Power Distribution

Power distribution from the office −48v battery to the Fuse and Alarm Panel (FAP) is either simplex or duplex. In the simplex case, the redundant battery inputs are paralleled to the simplex feed. This facilitates customers that may have either distribution within an office.

The Fuse and Alarm Panel provides a fuse for each power supply. If the distribution to the FAP is simplex, all individual supplies are connected from the same source. If the FAP receives duplex power, then the respective "A" supply will be fused from −48v(A), and the "B" supply will be fused from −48v(B).

In general, redundant power required by more than one simplex function, is diode-ORed at the power supply. However, all equipment using the redundant power is isolated from the supply with a device to protect the redundant supply from shorted equipment.

An on/off switch is provided on all power supplies to reduce the circuitry required to protect against inrush current. The switch will disable the switcher and hence the outputs. All Power supplies also have an alarm monitored by the Controller. The Controller uses this alarm and other indications to determine Power Supply operation.

2.9 Facility Performance Monitoring

In order to monitor the performance of each transmission facility, information is collected from each interface (DS1, STSX-1, OC-1). Since the Controller is running in an operating system environment whose overall performance is degraded by the constant requirements of real time interface monitoring, the performance monitoring scheme was designed such that the accumulation of required data can be done with a minimum of interaction with the Controller.

Performance information is constantly transmitted from the facility interfaces to the Controller and all performance information in the VI registers on the Controller are updated every 4 ms. The Controller may access this information randomly and asynchronously with respect to the facility interfaces.

2.9.1 Performance Parameters

Interface performance information is split into two groups. Events which are completely hardware detectable (Loss of Signal, Yellow Alarms, AIS, etc.) and events which require both hardware detection and real time integration (CRC, BIP, Ft error rates, etc.).

2.9.1.1 Monitored Performance Parameters

Monitored performance parameters are those which are completely detected by the interface hardware. These include Loss of Signal, Loss of Framing, Loss of Clock; Yellow and AIS alarms.

These alarms use the interrupt capability provided in the VI control mechanism. When any of these alarms has a valid change of status, the interface will update the state of its alarm status bit it the VI interface memory. Each of these alarm status bits are assigned a bit location in a VI channel word and are sent to the Controller every 4 ms. Whenever a valid change of state has occurred for any alarm bit, the I bit accompanying the new alarm bit is set. When a VI interrupt is received, the Controller will mask the interrupting channel then decode and process the alarm. The interrupts will remain masked until the interrupt has been cleared.

2.9.1.2 Calculated Performance Parameters

Calculated Performance Parameters are those which require integrating a number of individual events over a period of time to determine a event rate (error rate). This includes CRC, BIP, Ft, Bipolar, B8ZS and B3ZS error rates. The operating system used by the Controller dictates that an a sampling interval of 100 ms be used for accumulating error count data. Since errors can occur at a much higher rate, these error counts are accumulated in counters on the interfaces. Also, characteristics of transporting multiple byte data over SBI links require that these counters be limited to 14 bits. Therefore all of the calculated performance parameters must limit the number of counted events to less than 16,384 every 100 ms (this requires prescaling of DS1 bipolar violations and STS B3ZS errors). The counters in the interfaces count up on each event and upon reaching the maximum count rolls over to zero and continues. The Controller samples the count every 100 ms and roll overs are detected by comparing the prior count to current count. This requires that the range of the counter should be large enough to accumulate the total number of errors possible at the highest error rate in one Controller sampling interval. The Controller accumulates error information by adding to a running total, the difference in values between current and prior samples with the appropriate adjustment for counter roll-over.

2.9.2 STS Performance Monitoring

The system supports the following monitored performance parameters for the STS interface: Loss of Signal, Loss of Framing, Path Yellow Alarm, Line AIS alarm and Path AIS alarm.

The system supports the following calculated performance parameters for the STS interface: B3ZS violations (electrical interface version only) (prescaled), Section BIP-8 errors, Line BIP-8 errors, Path BIP-8 errors and Far End BIP-8 errors.

2.9.3 DS1 Performance Monitoring

The system supports the following monitored performance parameters for the DS1 interface: Loss of Signal, Loss of Framing, Yellow Alarm and AIS alarm.

The system supports the following calculated performance parameters for the DS1 interface: Bipolar violations (prescaled), CRC (ESF) or Ft (SF) errors, Loss of Framing errors and Slips.

The high frequency at which bipolar violations and CRC or Ft errors can occur requires that hardware counters be implemented in the DS1 interface. The DS1 interface counts bipolar violations with one counter and CRC or Ft errors with a second counter. The second counter accumulates Ft errors in the SF and TR-TSY-000008 mode and CRC errors in the ESF mode. When the CRC/Ft counter is disabled in the TR-TSY-000008 and unframed modes, all bits will be set to a zero.

Since the same counter is used to accumulate CRC errors in the ESF mode and Ft errors in the SF mode, the Controller must use its provisioning information to decide if the count it sees in memory is CRC or Ft errors.

The DS1 supplies only the raw error counts, all timing, error integration, and calculation algorithms are under software control on the Controller.

The timebase, integration, storage, alarming and access associated with the processing of performance monitoring data is performed by the Controller.

2.10 Lamp Test

The Lamp Test is initiated by pressing the ACO switch located on the COA for 2 to 3 seconds. All LEDs will illuminate except for the Power Supply operate LED. The LEDs will stay illuminated until the ACU switch is released.

2.11 Remote Inventory

Remote inventory access is limited to plug-in units, and is not available for racks, sub-racks, shelves, and back-planes. Network access will be provided by the forward looking Operations System, or near term, by the remote maintenance feature.

When the equipment inventory status is requested, the Network Element Controller will determine the installed plug-in units and will provide the unit base mnemonic (i.e. COA, STT, not COA-201, STT-101), and unit location (i.e., STT East A, STT East B, DST #1, ect). Alternately, when the plug-in unit is "Installed", the craft person will be prompted and will have the opportunity to enter the complete mnemonic and CLEI code, thus, when the equipment inventory status is requested, the Network Element Controller will verify that a plug-in unit is installed per the NE data base and will provide the complete unit mnemonic, unit location, and CLEI code from the NE database.

2.12 Local Maintenance Features (Indicators and Switches)

The functionality of the front panel indicators and switches are as follows.

| UNIT | INDICATOR/ SWITCH | FUNCTION |
|---|---|---|
| PWR401 | LED, Green | When on, indicates normal operation. |
| | LED, Yellow | When on, indicates power is off or that power has failed but input voltage is still applied. |
| | ON/OFF Switch | Allows power supply to be turned on or off from front panel. |
| COA10X | LED, Red, | When on, indicates severe service affecting critical failure(s) which requires immediate corrective action, regardless of time of day or day of week. |
| | LED, Red, major | When on, indicates serious service affecting failure(s) which requires immediate attention and response of maintenance personnel, but urgency is less than a critical alarm because of a lesser effect on system performance. |
| | LED, Yellow, minor | When on, indicates non-service affecting failure. |
| | LED, Red, Unit | When on, indicates unit is in alarm. |
| | LED, Green, ACO | When on, indicates Alarm cutoff has been activated, but alarm may still exist. |
| | ACO Switch, push button | Allows current CO audible alarm(s) to be silenced. |
| SNC101 | LED, Red | When on, indicates unit is in alarm. |
| | LED, Green (2) | When on, indicates 'A' or 'B' active. |
| STT101 | LED, Red | When on, indicates unit is in alarm. |
| CLK101 | LED, Red | When on, indicates unit is in alarm. |

* All indicators go off when alarm condition is cleared.

3.0 Unit Descriptions 3.1 Power Supply (PWR401)

The Power Supply converts the −48 volt nominal station battery voltage to the +5.0 and −5.2 voltages required by the TM/ADM-50 Units.

The unit is designed such that the redundant 5 V output will operate connected in parallel with the redundant 5 V output of one other unit. Current sharing is not provided The power supply has a front-mounted switch to turn the unit on and off. The off position disables all outputs. The unit has one green front-mounted LED to indicate correct operation and one front-mounted yellow LED to indicate power off or failed, but input voltage applied.

The input will not be damaged if reverse input voltage polarity is applied. A internal shunt diode will blow the input fuse.

The unit also has one alarm output, an NPN transistor collector, emitter grounded. Transistor ON indicates correct operation.

3.2 DS1 Transceiver (DST101)

The DS1 Transceiver provides the interface between the 1.544 Mbit DS1 signal from the DSX-1 cross connect and the 4.096 Mbit SBI Interface. The DST operates in the "Locked VT" mode and can be provisioned to operate in the byte or bit synchronous format. The DSX-1 cross connect is driven from the DST for office cable lengths of 0 to 655 feet in five increments of 133 feet. The DST receives a DS1 signal framed with any of the following framing formats:

1. D4 type 12 frame superframe as defined in PUB 43801.
2. ESF as defined in TA-TSY-000194 September 1985.
3. SLC-96 as defined in TR-TSY-000008 Issue 1 July 1984.

In addition to the above byte synchronous formats, under control from the Controller, the DST may be provisioned for compatibility with DS1 bit synchronous formats.

The received data is translated from the above DS1 formats to a 4096 serial data stream composed of 32 channel allocations of 16 bits each, as defined by the Serial Bus Interface, (see Section 4.1). Twenty four channels are used to carry the DS0 channels from the incoming DS1 data. The robbed bit signaling information is extracted from bit eight of DS0 channels in the signaling frames and placed in the overhead bits of the SBI on a per channel basis. The additional eight bits of overhead not used to carry DS0 data in the 16 bit SBI channel provides the means for transmitting the extracted signaling and other channel associated control information. The remaining eight SBI channels not used for the 24 DS0's are available for synchronization, alarms, and communications.

Clear channel capability is provided by B8ZS line coding as defined in CB 144 Issue 1 April 1981. It should be noted that the ZBTSI encoding technique is not utilized on the DST, however the DST is transparent to ZBTSI in the BIT Synchronous mode.

3.3 Time Slot Multiplexer (TSM101/TSM201)

The TSM provides the ability to crossconnect between any STS-1 virtual tributary and any DS1 add/drop link. The TSM also inserts and removes channel 31 (the VI channel) of SBI links 1 through 28 (DS1 Links) and places them into channels 1 through 28 of SBI link 30. This provides the path for provisioning, status and alarm information from the DS1s to the Controller.

There are two versions of the TSM: the first (TSM101) is for TM-50 applications and has one parallel bus interface and supporting Cross Connect function, the second (TSM201) is for ADM-50 applications and has two parallel bus interfaces and supporting Cross Connect function.

The TSM has three major interfaces, the Parallel Bus, the Controller Interface, and the Serial Bus Interface.

3.3.1 Parallel Bus Interface

The parallel bus interface provides a link between the TSM and the STSX-1 or OC-1 high speed interface. The Parallel Bus operates at rate of 8.192 MHz. The parallel bus input to the TSM consists of 16 data bits and 11 bits of address. The parallel bus output from the TSM consists of 16 data bits.

3.3.2 Controller Interface

The TSM Controller interface is used by the Controller to provision the crossconnect function of the TSM. The Controller Interface is an asynchronous serial interface which operates via stop and start bits. The data rate is 128 kbps. The serial bus protocol is based on the Intel Microcontroller Mode 2 operation. This is an asynchronous protocol which involves a Start Bit, 8 Data Bits, Program Bit, and Stop Bit.

3.3.3 Serial Bus Interface

The Serial Bus Interface (SBI) operates at a rate of 4.096 MHz. The SBI contains 32 channels and each channel contains 16 bits. The first channel contains a sync word. Channel 31 is used as an SBI Maintenance/Control Word. It can provide looping codes for fault isolation and control communications. The contents of the remaining 30 channels are transparent to the TSM.

3.4 STSX-1 Electrical Transceiver (STT101)

The STSX-1 Electrical Transceiver provides the interface between the TSI/TSM Unit and the external STSX-1 line. The unit contains both transmit and receive functions.

The received STSX-1 electrical signal is routed through the input hybrid, located on the module assembly, to the "A" and "B" STS1 Electrical Transceivers. The Transceiver recovers the 51.84 MHz clock, retimes the recovered data, and performs the SONET function. The recovered clock is also divided down to 8 Khz and sent to the Clock Unit as possible source for system synchronization.

The task of multiplexing and demultiplexing data and overhead between the serial, 51.84 Mbps SONET format and the parallel word oriented internal format is performed by the SONET function. The SONET functions are described in Section 2.2.

The transmit direction operates similar to the receive direction except that the output signal is routed to the output switch. The output switch is controlled by the COA. The switch provides the ability for the system to select between the better of two STSX-1 signals for transmitting. Note that the incoming STSX-1 signal is split between system functions "A" and "B" by the input STSX-1 Hybrid, and is processed in parallel throughout the system except for the DS1 Transceiver. At the simplex DS1 Transceiver, selection is done to receive the better of the two signals, based on Controller monitoring. On the transmit side the signals are sent out in parallel from the DS1 through the "A" and "B" common equipment, and selected at the output switch for the signal to be transmitted out to the STSX-1 port.

3.5 Fiber Optic Transceiver (FTM101)

The Fiber Optics Transceiver provides the interface between the TSI/TSM unit and the external fiber optics line. Each unit, A and B, contain both optic transmit and receive functions, i.e., the system has two transmit and two receive fibers.

The Transceiver receive function converts the optic signal to an electrical signal, recovers the 51.84 MHz clock, retimes the recovered data, and performs the SONET function. The recovered clock is also divided down to 8 Khz and sent to the Clock Unit as possible source for system synchronization.

The task of multiplexing and demultiplexing data and overhead between the serial, 51.84 Mbps SONET format and the parallel word oriented internal format is performed by the SONET function (see Section 2.2).

The transmit direction operates similar to the receive direction except that the output signal is routed to the output Mux. The output Mux is controlled by the COA. The output Mux provides the ability for the system to select between the better of two signals for transmitting. Note that the incoming optics signal is processed in parallel throughout the system except for the DS1 Transceiver. At the simplex DS1 Transceiver, selection is done to receive the better of the two signals, based on Controller monitoring. On the transmit side the signals are sent out in parallel from the DS1 through the "A" and "B" common equipment. The output Mux, controlled by the Controller, selects which signal is to be transmitted by both optics transmitters.

3.6 Clock Unit (CLK101)

The system Clock Unit receives timing sources from either a receive STSX-1/OC1, receive DS1, or external BITS source. The unit provides timing references for the remainder of the system. The unit has a 20 ppm stability internal clock for "free-run" mode when all external synchronization sources fail. There are two clock PBAs per system, one for the "A" side, and one for the "B" side.

There are 8 possible external 8 Khz synchronization sources derived from outside the clock PBA. Two are from the East or West STSX-1/OC1 receive paths, four are from the received DS1 derived 8 Khz, and two are from external DS1 synchronization (BITS) ports.

The clock PBA will allow any sequence of selected inputs to be used to synchronize the system. Upon power-up the clock will be given a default selection algorithm to fit with the most common foreseen application. Any sources not present, as alarmed by their respective monitor circuits, will be noted as invalid selections by the clock PBA and status forwarded to the Controller. The selection algorithm will be administrable via either the local craft or OS ports. The switching control itself is under the full control of the clock PBA's reference selection logic based on the down-loaded algorithms from the Controller, and alarms.

The Clock Unit also contains a serial interface to the Controller. This link is used to inform the system's Controller of the status of the Clock PBA (alarm states, etc.) and allows for overriding control from a customer interface. This link is also the mechanism by which the Clock PBA is initialized upon power-up with a default selection algorithm.

The clock unit provides 7 output frequencies, 51.84 MHz, 32.768 MHz, 16.384 MHz, 8.192 MHz, 8 Khz, 6.176 MHz, and a free running 21.618 MHz Clock.

3.7 Craft/Order Wire/Alarm (COA101, COA102)

The COA provides the Craft interface(s), two Order Wire interfaces, Alarm interfaces to the CO alarm collection facility, Parallel E2A Interface, and A/B select control for the system. The primary system non-volatile memory is also located on the COA Unit.

The COA uses a micro-controller to interface with and control the large number of inputs and outputs. Local firmware translates the Controllers' inputs to the required output signals. A watchdog timer keeps check of proper micro-controller operation; and turns on a local "Unit Alarm" LED and forces a Major alarm when the timer expires. The unit contains front panel mounted LEDs for Critical (red), Major (red), Minor (amber), ACO (green), and Unit Alarm(red). It also contains an ACO switch.

3 7.1 Craft Port 1

Craft port #1 is provided on the unit's front panel as a standard RS-232 Local Craft interface via a 9 pin "D" connector. The received input from the craft port is sent to the Controller. The COA is transparent to the signals except for the A/B selection of the transmitted signals.

3.7.2 Craft Port 2/Serial E2A Interface

Craft port #2 is provided at the rear of the unit via wire wrap pins located on the customer I/O Panel. COA101 uses the second interface for remote Craft access. COA102 uses the second interface to provide a Serial E2A interface to the CO E2A sub-system (differential RS-422 Interface). See section 4.3.3 for the Serial E2A Bit Map.

3.7.3 Order Wire Interface

The Order Wire Interface function provides two Order Wire interfaces. They can be used as the Express and Local Order Wire Interfaces, or Local OW East and Local OW West with the Express OW passing through the system. This function provides the analog to PCM conversion and vice versa as well as a four wire interface for each order wire.

3.7.4 Alarm Interface

The COA provides Minor, Major and Critical office alarms to the FAP. The unit also provides a disable strobe to the FAP used to silence the audible alarms for the ACO command. The ACO input can come from the OS (SONET Overhead), the Local or Remote (modem) Craft ports, a discrete remote ACO input, or a push button switch located on the front panel. The ACO function has an associated lamp that activates whenever the ACO is active. The ACO function is released whenever the initiating alarm is cleared.

When a new alarm occurs the Controller will deactivate all of the current alarm outputs and a re-assert the new state of the alarm outputs.

3.8 Time Slot Interchanger (TSI101/TSI301)

The TSI functions similar to the TSM (see section 3.3) except that the TSI provides DS0 grooming and has the capability to provide crossconnect between any two channels (64 Kbs DS0), connection of one channel to multiple channels for broadcast, and loopback connection for diagnostics. The TSI also connects DS1s to DS1s (drop side to drop side) and is required for DTAU operation. TSI301 is used for TM applications and TSI101 is used for ADM applications.

3.9 Single Network Element Controller (SNC101)

The Single Network Element Controller is used in systems not requiring redundant Controllers. The SNC emulates the functionality of the Dual Network Element Controller thus provides system performance monitoring, control, alarm reporting, and provisioning for the network element.

The SNC consists of a microprocessor, program memory, and local memory. The primary system non-volatile memory is located on the COA Unit.

The SNC communicates to the facility interfaces via four SBI interfaces, two for the "A" side and two for the "B" side. These interfaces are used to provision the interfaces and receive status/alarm information. The SNC communicates to the Clock, TSM/TSI, and COA via a serial interface. This interface is used to provision the TSM/TSI connect memory, provision the clock reference priority and obtain clock alarm status, and communicate the system alarm/status to the COA.

The SNC also contains two Serial Communications devices (used for EOC communications) and two local craft ports (the physical interfaces are located on the COA).

3.10 Dual Network Element Controller (DNC101)

The Dual Network Element Controller is used in systems requiring redundant Controllers. The DNC provides system performance monitoring, control, alarm reporting, and provisioning for the network element.

The DNC consists of a microprocessor, program memory, and local memory. The primary system non-volatile memory is located on the COA Unit.

The DNC communicates to the facility interfaces via two SBI interfaces. The "A" Controller communicates to the "A" side and the "B" Controller communicates to the "B" side. These interfaces are used to provision the interfaces and receive status/alarm information.

The DNC communicated to the opposite Controller, Clock, TSM/TSI, and COA via a serial interface. This interface is used to provision the TSM/TSI connect memory, provision the clock reference priority and obtain clock alarm status, and communicate the system alarm/status to the COA.

The DNC contains four Serial Communications devices, two for SONET East/West EOC communications, one for Common Channel Signaling, and one for DLC EOC communications. The DNC also contains two local craft ports (the physical interfaces are located on the COA).

3.11 I/O Panel

The I/O Panels provide the transition from the TM/ADM-50 Module flat cable connections to wire wrap terminals. The I/O Panels provide access to the 28 DSX-1 Interfaces, Line Shelf Interfaces, Network Manager, DTAU, BITS Sync, Orderwire, Craft Port 2/Serial E2A, Parallel E2A, and the FAP. The I/O Panels also provide the power and ground connections to the TM/ADM Modules.

3.12 Fuse and Alarm Panel (FAP101, FAP201)

FAP101 is a 2 rack space assembly and provides distribution and circuit protection for the −48 volt power in the bay. FAP101 also provides the visual alarm lamps (Critical, Major, Minor, Fuse Alarm) and alarm relays for the office visual and audible alarms. The alarms are wire-ored from each module. A fuse alarm output (relay) is also provided.

FAP201 is a 3 rack space assembly and provides mounting space for auxiliary units in addition the functionality of FAP101.

3.14 Alarm Communications Unit (ACU101, ACU102)

The Alarm Communications Unit (ACU) has the capability to monitor input dry contacts and provide output form "C" contacts. ACU102 is located in the FAP-201 and communicates to the controller using a DS1 link. The inputs from the dry contacts are normally used for "site specific" alarms such as open door, high temperature, high water level, ect. The inputs are de-bounced 5 to 20 ms. The control outputs are normally used to control "site specific" functions such as to start a motor generator set, etc. Only one ACU is normally required per site. The first system installed is normally selected as the system to support the ACU function. The Controller can route the information to the Serial E2A port and/or to the OS via the DataCom (D1-D3) Channel. (Both versions operate from −48 Volt.)

3.14.1 ACU102 Alarm Communications Unit

The Alarm Communications Unit (ACU102) has the capability to monitor 12 input dry contacts and provide 12 output form "C" contacts. The ACU102 communicates to the TM/ADM controller using a DS1 Link. The DS1 link is provisioned to use the SF format and B8ZS line code. All communication between the controller and the ACU is transmitted and received over the SBI VI channel, all other DS0 channels are set to all "1"s. The DS1 Transceiver associated with the DS1 Link is provisioned to place the 16 bit VI channel to/from the ACU into DS0 Channels 23 and 24. SBI bits 0-7 are placed in DS0 Channel 23 and SBI Bits 8-15 are placed in DS0 Channel 24. All status information is transmitted from the ACU each VI cycle with the V bit set for the active channels. 32 possible message channels can be addressed. The contents of the VI channel are discarded if the V bit (valid data) is not set or a parity error exists in the VI channel. The VI bits are active low. The "I" bit is not used and is set to "1". The VI Channel uses odd parity.

Information is sent to the ACU only for change in state except for the reflection byte. The controller continuously writes to the ACU reflection byte and periodically monitors the reflection byte to detect ACU failures. The ACU does not loop the SBI link for diagnostics. The ACU102 has the capability monitor the 12 output control points to verify the control state.

At some locations, it is desirable to consolidate the Serial E2A Interfaces. Each APR (Alarm Processor Remote) port has the capability to process 512 scan points. Each NE is normally allocated 64 scan points, thus it is desirable to consolidate up to 8 NE at a location. The electrical interface to the APR is RS422. The consolidation functions require that the NEs electrical interface be RS485, i.e. capable of being tri-stated to share a common interface. The APR sends an address via the RS422/RS485 interface to the NEs. The selected NE recognizes its address, enables its thri-state output, and returns the requested information. The RS422/RS485 function is located on the ACU102. See Section 4.3.3 for the Serial E2A Bit Map.

4.0 Common Interfaces

4.1 Serial Bus Interface

The Serial Bus Interface (SBI) is a serial bit stream (MSB first) consisting of 32 channels (numbered 0-31) with 16 bits per channel (numbered 0-15). Bit 0 is the MSB. See 4.2.2 for the SONET to SBI to DS1 map.

The TM/ADM systems will support 32 equipment side SBI links. The links are assigned as follows:

| | |
|---|---|
| SBI Link # 0 | DS1 # 1 |
| SBI Link # 1 | DS1 # 2 |
| SBI Link # 2 | DS1 # 3 |
| SBI Link # 27 | DS1 # 28 |
| SBI Link # 28 | DTAU |
| SBI Link # 29 | Network Manager |
| SBI Link # 30 | TSI to Controller |
| SBI Link # 31 | TSI to Controller |

Channel 0 for all links contains the parity error bit, sync word, A/B Select code, Composite Clock offset value and a parity bit for Ch0.

All SBI Channels include a parity bit in bit position 15. There is no frame level parity bit. Channel 0, the synchronization channel, has even parity on the 16-bit word. Channels 1-31 have odd parity on their respective 16-bit words. When parity errors are detected in any SBI channel by the SBI receiver, the corresponding SBI transmitter will send an active parity error bit to the source (Error=0). This will indicate to the source that problems may exist with its transmitter. When predetermined parity error thresholds are exceeded, a system switchover will be initiated by the Controller. The Parity bit is associated with the current frame. The Parity Error bit will persist for 1 frame following the error. The Time Slot Interchanger/Time Slot Mux will be transparent to channels 1-30 and will only monitor the Parity bit.

The Composite Clock Offset value is accumulated on a Multiframe basis consisting of two frames. Using the alternating sync pattern to accumulate the CC Offset bits will allow 10 bits to be accumulated.

The A/B select bits are distributed via broadcast from the TSI from Controller Channel 0. When the SBI LSI receives Channel 0 from the TSI Parallel Bus, the A/B bits are overlayed with a new sync pattern, CC offset, and parity bits. With the Mux providing cross-connect, the Mux LSI will store the A/B bits from Controller Channel 0 and perform the same overlay function.

The bit definitions for channel 0 are as follows:

| PE | S | S | S | S | S | S | S | A | B | O | O | O | O | O | P |
|----|---|---|---|---|---|---|---|---|---|---|---|---|---|---|---|
| 0  | 1 | 2 | 3 | 4 | 5 | 6 | 7 | 8 | 9 | 10| 11| 12| 13| 14| 15|

PE—parity error bit
S—sync pattern bit (Barker code)
AB—A/B select status bit
O—composite clock offset bit
P—channel parity bit 4.1.1 DS1 and Line Shelf SBI Assignment-Links 0-27

The channels and bits for the DS1 and Line Shelf are assigned as follows:

Channel 1 contains the VT pointer byte (Required only for the "Floating VT Mode).

Channel 2 is required only for the "Floating VT Mode".

Channel 3 contains the signaling information used by the ADM for through connections. The ADM high speed interfaces will be provisioned to use this information or to reformat and use the signaling information included as part of the DS0 channel being inserted (this is required to minimize the through path signaling delay). Channel 3 is also used to insert/extract the DS1 F bit when terminating an ESF data link. The high speed port will be provisioned to provide a fixed relationship between the F bit sequence and the signaling master frame sync. The DS1 unit will use only the F bit and MFS ignoring the remaining bits.

Channel 3 can also be provisioned (no fixed alignment or added delay) to transport the DS1 193rd bit for bit synchronous applications. Bits 2-5 carry the signaling information in the SONET format, bit 6 contains the F bit (193rd bit), bit 12 contains the MultiFrame sync (high for frames 1-12, low for frames 13-24), bit 13 contains a bit to indicate twice the frame sync frequency (high for frames 1-6 and 13-18 and low for frames 7-12 and 19-24), and bit 14 contains the transmit H4 master frame sync (Positive edge aligned with the 500 us VT Superframe).

Bit 15 is the Parity bit (odd parity on bits 0-14).

Bit 0, 1, 7 have been reserved for future use by the standards committees, bits 8-10 have not been assigned.

Channel 4-27 contains DS0 channels 1-24 (See 4.2.2 for bit map). Bits 0-7 contains the voice/data. Bits 8, 9, 10, and 11 contains the ABCD signaling highway, bit 12 contains the Signaling Frame Sync (high for frames 6-17, low for frames 18-5), and bit 13 contains a bit to indicate twice the frame sync frequency (high for frames 6-11 and 18-23 and low for frames 12-17 and 24-5). (For future applications of the DS1 Unit where the signaling bits are generated in nibbles, bits 12 and 13 must be contained in the nibble). Bit 14 has not been assigned.

Channel 28 is used by the ADMC-50/Line Shelves as a universal broadcast channel. The Line Shelf generates the signal and sends it to the TSI to be broadcast.

Channels 29 and 30 have not been assigned.

Channel 31 is used by the terminating devices (DS1, Line Shelves, etc.) for communications to the System Controller. The data bits=0-7, V bit =8, I bit=9, offset bits=10-14, and Parity bit=15. The VI bits are active low.

4.1.2 Network Mediator Channel Assignments—SBI Link 29

Network Mediator assignments for Channels 1-22 are programmable for TM/ADM Systems equipped with Time Slot Interchangers. Assignments for Channels 1-16 are programmable for systems equipped with Time Slot Muxes. Channels 17-22 are not accessible by the Time Slot Mux. The ADM has two sets of overhead channels, one for the East and one for the West. The TM has one set. The channel assignments are limited as follows.

| SONET Overhead | Systems Equipped with | |
|---|---|---|
| | TSM | TSI |
| Section DataCom (D1-D3) | yes | yes |
| Line DataCom Channel (D4-D12) | yes | yes |
| User Channel (F1) | yes | yes |
| User Channel (F2) | yes | yes |
| Growth Channel (Z1) | yes | yes |
| Growth Channel (Z2) | yes | yes |
| Growth Channel (Z3) | no | yes |
| Growth Channel (Z4) | yes | yes |
| Growth Channel (Z5) | yes | yes |

Channel 23 contains the VI Channel from the TM/ADM/ADMC-50 Controller to the Network Mediator Controller.

Channel 24-30 are not processed by the Network Mediator Interface.

Channel 31 contains the DS1 Transceiver VI Channel.

4.1.3 Controller Channel Allocation—SBI Links 30-31.

The following represents the channel assignment for the two Controller SBI Links.

4.1.3.1 Controller Channel 1 Allocation-SBI Link 30

Channels 1-28 is used for Provisioning/Control of DS1s and/or Line Shelves. DS1s will be assigned beginning with Channel 1, and Line Shelves will be assigned beginning with Channel 28. The number of each are provisionable. The DS1s/Line Shelves use the VI protocol.

| CHANNEL | | ASSIGNMENT |
|---|---|---|
| 1 | DS1 1 | OR LC 7 LINK #4 |
| 2 | DS1 2 | OR LC 7 LINK #3 |
| 3 | DS1 3 | OR LC 7 LINK #2 |
| 4 | DS1 4 | OR LC 7 LINK #1 |
| . | . | |
| . | . | |
| 25 | DS1 25 | OR LC 1 LINK #4 |

-continued

| CHANNEL | ASSIGNMENT | |
|---|---|---|
| 26 | DS1 26 | OR LC 1 LINK #3 |
| 27 | DS1 27 | OR LC 1 LINK #2 |
| 28 | DS1 28 | OR LC 1 LINK #1 |

Channel 29 is used for Provisioning/Control of the DTAU DS-1.

Channel 30 is used for Provisioning/Control of the Network Manager DS-1 port.

Channel 31 contains the VI Channel to the Network Manager. This channel is used for communications between the TM/ADM Controllers to the Network Manager Controller.

4.1.3.2 Controller Channel 2 Allocation—SBI Link 31

Channel 1-2 are used for the two Orderwire Channels in the SONET Overhead. For the TM-50, the channels are the Local and the Express Orderwires. For the ADMs, both channels are the Local Orderwires (East and West).

Channel 3-5 is used for East OS Communications. Three channels are allocated for the 192 kbit/s OS in the SONET Overhead. The extracted data channel uses the HDLC protocol.

Channel 6, 13, 14 is used for West OS Communications. Three channels are allocated for the 192 kbit/s OS in the SONET Overhead. The extracted data channel uses the HDLC protocol.

Channel 7 is used for the 64 kbit/s Common Signaling Channel. This data channel uses the HDLC protocol. This channel is used for ADMC-50 systems only.

Channel 8 is used as a test channel and provides both transmit and receive functions. This channel is not supported by the TSM.

Channel 9-11 are used for Broadcast Channels.

Channel 12 contains the path tracer from the East or West OC1/STS1 Interface.

Channel 15 is used for provisioning and control of the East OC-1/STS-1. This channel operates in a VI protocol.

Channel 16 is used for provisioning and control of the West OC-1/STS-1. This channel operates in a VI protocol.

Channel 17 is used for the 64/4 kbit/s EOC Channel. This data channel uses the HDLC protocol. This channel is not supported by the TSM. The ESF 4 kbit/s SBI Link contains Super Frame Mark and Frame Bit.

Channels 18-31 reserved.

4.1.4 DS1 Transceiver VI Channel

This section describes the DS1 Transceiver SBI interface. All communication between the Controller and the DS1 Transceiver are transmitted and received over the SBI VI channels. The VI bits are active low.

4.1.4.1 Communication From Controller to DS1 Transceiver

Two SBI TX bitstreams (A and B) enter the DS1 Transceiver. Only the active SBI TX input selected by the DS1 Transceiver can access any provisioning or performance monitoring data. The inactive SBI TX input is continuously monitored for its status and reflection byte. The status of the inactive SBI TX is reported to the Controller via the inactive SBI RX output. The refection byte, parity information, sync status, and clock status for the inactive SBI are output on the inactive SBI RX output.

One VI channel occurs each 125 usec SBI frame which allows one of 32 possible message registers to be addressed. The contents of the VI channel are discarded if the V bit (valid data) is not set or a parity error exists in the VI channel (The DS1 Transceiver does not loop the SBI link). See 620054-414 for the Controller to DS1 Transceiver Alarm/Status and provisioning channel bit Map.

4.1.4.2 Communication From DS1 Transceiver to Controller

The DS1 Transceiver has two SBI RX outputs of which one is selected to be active. The active SBI RX contains all DS0 channels, and the active VI communication channel. Each of the 32 VI message registers supported by the DS1 Transceiver are transmitted on the active SBI one per frame. Thus, one pass through the VI channel cycle requires 32 frames (4 msec). All current status and performance information is transmitted each VI cycle with the V bit set active for all assigned channels. See 620054-414 for the DS1 Transceiver to Controller Alarm/Status and provisioning VI channel bit Map.

The inactive RX SBI output contains a sync word, proper parity, a VI channel, with all ones in all other bits. The inactive SBI VI channel cycles through 32 channels of which two are active. The VI channel reflection byte, the inactive side clock activity, SBI sync, and parity error bytes are output on the inactive SBI output. The parity error indicators are held active until a clear command is received on the inactive SBI input. As with the active SBI, the inactive SBI sets the V bit when outputting an assigned VI channel.

VI CHANNEL BIT FORMAT

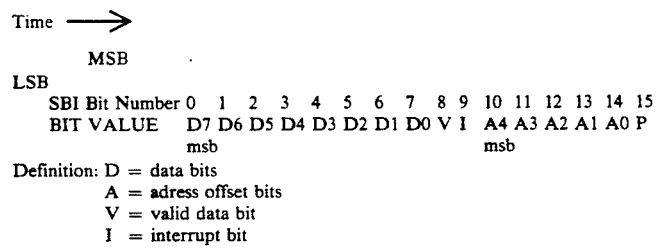

Definition: D = data bits
A = adress offset bits
V = valid data bit
I = interrupt bit 4.1.5 SBI Frame Synchronization The SBI is synchronized by a unique framing pattern in time slot zero. The pattern uses bits 1-7 and is chosen to be 0100111. This code is a recommended U.S. Standard pattern for PCM synchronization for Aerospace applications and is also a 7 bit Barker Code. This code is alternated on even and odd frames with its complement to prevent accidental framing on a repeated steady state pattern.

| Bit Patterns: | | | | | | | | | | | | | | | | |
|---|---|---|---|---|---|---|---|---|---|---|---|---|---|---|---|---|
| Bit # | 0 | 1 | 2 | 3 | 4 | 5 | 6 | 7 | 8 | 9 | 10 | 11 | 12 | 13 | 14 | 15 |
| Even frame PE | 0 | 1 | 0 | 0 | 1 | 1 | 1 | x | x | x | x | x | x | x | x | P |
| Odd frame PE | 1 | 0 | 1 | 1 | 0 | 0 | 0 | x | x | x | x | x | x | x | x | P |

P is the Parity bit (even Parity on the 16 bit word) for the current channel and serves as an additional check of correct synchronization, helps prevent false framing and gives a running measure of possible transmission problems. PE is a parity error bit in position 0. When parity errors are detected at an SBI receiver (any channel), the corresponding SBI transmitter will send an active parity error bit to the source (Error=0). This will indicate to the source that problems may exist with its transmitter. When predetermined parity error thresholds are exceeded, a system switchover can be initiated by the Controller.

x is don't care for synchronization purposes.

The synchronization algorithm is based on the CCITT standard for 32 time slot PCM and can be represented by a 6 state machine as follows:

| Current State | Detector condition | Next State | Next Action |
|---|---|---|---|
| A Out of Sync | Found sync word | B | Start frame counter |
|  | Lost sync word | A | Set alarm flag |
| B Found sync word | Found sync word | C | Reset alarm flag |
|  | Lost sync word | A | Restart search |
| C In sync | Found sync word | C |  |
|  | Lost sync word | D |  |
| D Lost 1st sync | Found sync word | C |  |
|  | Lost sync word | E |  |
| E Lost 2 syncs | Found sync word | C |  |
|  | Lost sync word | F |  |
| F Lost 3 syncs | Found sync word | C |  |
|  | Lost sync word | A | Set alarm flag |

While in state A, transition from state to state is at a 4.096 MHz rate. The frame counter is held in the reset state until a possibly valid sync word is detected. The frame counter is then released and counting begins. When, after 125 microseconds, the counter indicates that the start of a new frame has been reached, the state of the bits in time slot 0 is checked against the expected sync word and the state machine steps to the next state.

4.1.6 SBI VI Channel

The VI Channel is the alarm, provisioning, and communications channel between the various sub-systems. The format is suitable for both message communications between intelligent sub-systems (processors) and register oriented control of non-intelligent devices (DS1 Transceiver). The format utilizes the entire 128 Kbs bandwidth of the SBI Channel. Half of the bandwidth, 64 Kbs is dedicated to the control and synchronization of the receiving device, the remaining 64 Khz bandwidth is used for data transfer. The format of the VI Channel is completely transparent to the SBI Channel.

The data bits=0-7, V bit=8, I bit=9, offset bits=10-14, and Parity bit=15. The VI bits are active low.

The V bit indicates that the data is valid, the I bit is used as an interrupt for high priority data, and the Index is used to specify a specific control register or offset within a message buffer where the DATA is to be delivered.

Some values may require two bytes (or VI channel addresses). Since the Controllers software operates asynchronous to the SBI transfers, it is possible for the software to read a data field which is in an invalid state. This state occurs when one, but not both bytes of the multi-byte field have been transferred, and is referred to as the 'split' state. The problem occurs when software attempts to read the data during the split state.

In order to recover from the split condition, the condition must be detectable. One bit position in each multi-byte counter serves as a split detection flag. The usage of this bit is as follows:

All split detection flags on an individual unit reflects the state of a common (with respect to the unit) indicator which toggles after each complete VI transmission cycle (i.e. transmission of all 32 registers). This allows the software to determine the correlation of adjacent bytes as they are read. A split condition is recognized when the split detection flags in adjacent bytes are different. Software will then take appropriate recovery action. The split detection flag, when used, is placed in the most significant bit of a byte.

The above fulfills the detection requirement; what remains is the recovery mechanism. All counters (or other data) which occupy eight to fourteen bits of information, occupying two bytes for purposes of SBI transfer, are organized such that one of the two bytes be transferred twice, once immediately before and once immediately after the other byte of information as shown below:

| VI Channel Address | VI Channel Data | | | | | | | |
|---|---|---|---|---|---|---|---|---|
| n | SDF | D6 | D5 | D4 | D3 | D2 | D1 | D0 |
| n + 1 | SDF | D13 | D12 | D11 | D10 | D9 | D8 | D7 |
| n + 2 | SDF | D6 | D5 | D4 | D3 | D2 | D1 | D0 | where: 'SDF' represents the split detection flag, and 'D0' through 'D13' represents a data field consisting of up to fourteen bits. As described, SBI addresses 'n' and 'n+2' carry the same information. Using this technique in conjunction with the split detection flags, it is possible to accurately read the value of the data field at any time. At any point in time, the split may exist between any two bytes in the transfer; but it cannot exist in more than one place. Therefore, if the split is detected, by means of the split detection flags, an uncorrupted value can always be obtained by virtue of the duplication of one of the bytes. This technique is used for multi-byte error counters on all facility interface units (OC-1, STSX-1, DS-1).

4.2 Parallel Bus Interface

The Parallel Bus Interface consists of 16 bits of data and 11 bits of address (address is to the TSI/TSM only). The first 10 bits are used to address 1024 channels in the TSI/TSM Switch Memory. The eleventh bit is used to indicate to the TSI/TSM circuitry that the data on the bus is invalid and the associated TSI/TSM cycle which follows can be made available to Controller Connect Memory operations.

The order of the DS0 and overhead channels going between the OC1/STSX-1 and the TSI/TSM interface is defined below. The addressing scheme provides that during 1024 8 MHz clock cycles, 810 valid locations plus some additional provisioning and status locations are addressed. The DS1 data is addressed by DS1 tributary number(0-27) and channel number (0-23).

4.2.1 Parallel Bus Interface Memory Map.

| Column | 0 | 1 ... | 26 | 27 | 28 | 29 | 30 | 31 |
|---|---|---|---|---|---|---|---|---|
| row 0 | #0,ch0 | #1,ch0 | #26,ch0 | #27,ch0 | B2 | K1 | K2 | B3 |
| row 1 | #0,ch1 | #1,ch1 | #26,ch1 | #27,ch1 | | | | |
| row 2 | #0,ch2 | #1,ch2 | #26,ch2 | #27,ch2 | | | | |
| row 3 | #0,ch3 | #1,ch3 | #26,ch3 | #27,ch3 | D4 | D5 | D6 | C2 |
| row 4 | #0,ch4 | #1,ch4 | #26,ch4 | #27,ch4 | | | | |
| row 5 | #0,ch5 | #1,ch5 | #26,ch5 | #27,ch5 | | | | |
| row 6 | #0,ch6 | #1,ch6 | #26,ch6 | #27,ch6 | D7 | D8 | D9 | G1 |
| row 7 | #0,ch7 | #1,ch7 | #26,ch7 | #27,ch7 | VI | | | |
| row 8 | #0,ch8 | #1,ch8 | #26,ch8 | #27,ch8 | | | | |
| row 9 | #0,ch9 | #1,ch9 | #26,ch9 | #27,ch9 | D10 | D11 | D12 | F2 |
| row 10 | #0,ch10 | #1,ch10 | #26,ch10 | #27,ch10 | | | | |
| row 11 | #0,ch11 | #1,ch11 | #26,ch11 | #27,ch11 | | | | |
| row 12 | #0,ch12 | #1,ch12 | #26,ch12 | #27,ch12 | Z1 | Z2 | E2 | H4 |
| row 13 | #0,ch13 | #1,ch13 | #26,ch13 | #27,ch13 | | | | |
| row 14 | #0,ch14 | #1,ch14 | #26,ch14 | #27,ch14 | | | | |
| row 15 | #0,ch15 | #1,ch15 | #26,ch15 | #27,ch15 | A1 | A2 | C1 | Z3 |
| row 16 | #0,ch16 | #1,ch16 | #26,ch16 | #27,ch16 | | | | |
| row 17 | #0,ch17 | #1,ch17 | #26,ch17 | #27,ch17 | | | | |
| row 18 | #0,ch18 | #1,ch18 | #26,ch18 | #27,ch18 | B1 | E1 | F1 | Z4 |
| row 19 | #0,ch19 | #1,ch19 | #26,ch19 | #27,ch19 | | | | |
| row 20 | #0,ch20 | #1,ch20 | #26,ch20 | #27,ch20 | | | | |
| row 21 | #0,ch21 | #1,ch21 | #26,ch21 | #27,ch21 | D1 | D2 | D3 | Z5 |
| row 22 | #0,ch22 | #1,ch22 | #26,ch22 | #27,ch22 | | | | |
| row 23 | #0,ch23 | #1,ch23 | #26,ch23 | #27,ch23 | | | | |
| row 24 | #0,TP | #1,TP | #26,TP | #27,TP | H1 | H2 | H3 | J1 |
| row 25 | #0,POH | #1,POH | #26,POH | #27,POH | | | | |
| row 26 | #0,SIG | #1,SIG | #26,SIG | #27,SIG | | | | |

Columns 0 through 27 contain the 28 virtual DS1 tributaries.

Rows 0 through 23 contain the 24 channels of the associated DS1's.
Row 24 reserved for the VT Pointers.
Row 25 reserved for the VT Path Overhead.
Row 26 contains the signaling data of the associated DS1's.
The overhead is assigned to columns 28, 29 and 30.

4.2.2 SONET to SBI to DS1 Map. (MSB is transmitted first)

from the Controller to the STS-1 (DS1 Payload) devices. The word is formatted as follows:

| SPD0 | 1 | 2 | 3 | 4 | 5 | 6 | 7 | 8 | 9 | 10 | 11 | 12 | 13 | 14 | SPD15 |
|---|---|---|---|---|---|---|---|---|---|---|---|---|---|---|---|
| D7 | D6 | D5 | D4 | D3 | D2 | D1 | D0 | V | I | A4 | A3 | A2 | A1 | A0 | P |

The SPD represents the Signaling Parallel Data input and output buses. The five address bits, A4-A0, are used to identify the status or provisioning register associated with the eight bits of data, D7-D0. The V bit identifies the byte to be carrying valid address and data. The I bit is used as an interrupt bit to flag time critical status data. The P bit is a parity bit.

4.3 Alarm Interfaces

The alarm interfaces consist of the Craft/Order-

```
DS0:
                MSB                       LSB
SONET            1  2  3  4  5  6  7  8
BYTE
                 V  V  V  V  V  V  V  V
                 SD0                                               SD15
SBI/             X7 X6 X5 X4 X3 X2 X1 X0    A B C D MFS MFS2 P
PD BUS
                MSB                       LSB
                     DATA FIELD              SIG FIELD
                 V  V  V  V  V  V  V  V
                MSB                       LSB
DS1              1  2  3  4  5  6  7  8
VI CHANNEL:
                MSB                       LSB
UP BUS           D7 D6 D5 D4 D3 D2 D1 D0
                 V  V  V  V  V  V  V  V
                 SD0                                               SD15
SBI/             D7 D6 D5 D4 D3 D2 D1 D0   V I A4 A3 A2 A1 A0 P
PD BUS
                MSB                      LSB   MSB           LSB
                     DATA FIELD               ADDRESS FIELD
```

4.2.3 OC-1/STSX-1 VI Channel Status/Provisioning Format

The following is the assignment of information within the format for the VI channel status/provisioning word wire/Alarm (COA) PBA interface to the Fuse and Alarm Panel (FAP); the COAs Parallel E2A interface (multipled or non-multipled), the optional Serial E2A interface, and the Controller interface via a DS1 Interface to the Network Manager. All interfaces are via the Customer I/O Panel.

4.3.1 FAP Interfaces

The COA contains the Office Alarm outputs to the FAP (active low) and a strobe (ACO) to disable the audible alarms. This interface is composed of outputs for Major, Minor and Critical alarms. The COA will issue a Critical Alarm for redundant power failure or a major alarm for COA failures.

The FAP receives alarm outputs from all COAs in the bay wire-ORed for each output type, i.e. Critical, Major, Minor, and Strobe. The FAP provides lamps for Major, Minor, and Critical alarms and form C contacts for office visual and audible alarms.

4.3.2 Craft/Serial E2A Interface

The Craft/Orderwire/Alarm PBA normally has two asynchronous format data ports, one set up as a RS-232C port with an RS-232C connector located on the front panel, and another (rear port) set up as a RS-232C port externally accessible via wirewrap pins. The rear port normally provides a hardwired local interface or is available to interface a modem function for a "remote" interface. As an option this rear port can be used for a Serial E2A interface.

The rear port is designed to optionally provide either a general purpose single ended RS-232C port or a Serial E2A differential RS-422 port. The Customer I/O Panel provides a set of wirewrap pins for single-ended or balanced I/O. This method provides a single Point Of Presence (POP) for each TM/ADM-50.

4.3.3 Serial E2A Bit Maps

The Serial E2A Bit Maps are defined as follows.

4.3.3.1 ADM/TM-50 Serial E2A Output Bit Map (to APR)

One 64-Bit Display; List type = L123 (48 alarm, 16 status bits)

| ALARMS | | |
|---|---|---|
| 1 | NSA | Customer Alarm #1 |
| 2 | NSA | Customer Alarm #2 |
| 3 | NSA | Customer Alarm #3 |
| 4 | NSA | Customer Alarm #4 |
| 5 | NSA | Customer Alarm #5 |
| 6 | NSA | Customer Alarm #6 |
| 7 | NSA | Customer Alarm #7 |
| 8 | NSA | Customer Alarm #8 |
| 9 | NSA | Customer Alarm #9 |
| 10 | NSA | Customer Alarm #10 |
| 11 | NSA | Customer Alarm #11 |
| 12 | NSA | Customer Alarm #12 |
| 13 | NSA | N.E. Fuse/Pwr Fail |
| 14 | NSA | Fan Fail |
| 15 | NSA | Sync Eqmt Fail |
| 16 | SA | Sync Eqmt Fail |
| 17 | NSA | Loss Pri·Ref. |
| 18 | NSA | Loss Sec Ref. |
| 19 | SA | Loss Sec Ref. |
| 20 | NSA | Successful Prot Swch |
| 21 | SA | Fail to Prot Swch |
| 22 | NSA | Prot Swch Eqmt Fail |
| 23 | SA | Prot Swch Eqmt Fail |
| 24 | NSA | N.E. Controller Fail |
| 25 | NSA | Non-Volatile Back-up Memory Fail |
| 26 | NSA | Network Mediator Link Fail |
| ALARMS | | * |
| 27 | NSA | STS-1(E) Eqmt Fail |
| 28 | SA | STS-1(E) Eqmt Fail |
| 29 | NSA | STS-1(E) Facility Fail |
| 30 | SA | STS-1(E) Facility Fail |
| 31 | NSA | STS-1(W) Eqmt Fail |
| 32 | SA | STS-1(W) Eqmt Fail |
| 33 | NSA | STS-1(W) Facility Fail |
| 34 | SA | STS-1(W) Facility Fail |
| 35 | NSA | 1-DS1 Eqmt Failure |
| 36 | SA | 1-DS1 Eqmt Failure |
| 37 | NSA | 2-4 -DS1 Eqmt Failure |
| 38 | SA | 2-4 -DS1 Eqmt Failure |
| 39 | NSA | 5-28 -DS1 Eqmt Failure |
| 40 | SA | 5-28 -DS1 Eqmt Failure |
| 41 | NSA | XConn Eqmt Fail |
| 42 | SA | XConn Eqmt Fail |
| 43 | NSA | DTAU Test Link Fail |
| SPARE ALARMS | | |
| 44 | | These bits cannot be used for Status information |
| 45 | | |
| 46 | | |
| 47 | | |
| 48 | | |
| STATUS (common to Family) | | |
| 49 | | Custmr Cntrl #1 Active |
| 50 | | Custmr Cntrl #2 Active |
| 51 | | Custmr Cntrl #3 Active |
| 52 | | Custmr Cntrl #4 Active |
| 53 | | Manual Abnormal Cond. |
| 54 | | ACO Activated |
| 55 | | Pri Ref Sync Disabled |
| 56 | | Sync Swch to Local Osc. |
| STATUS (for ADM/TM 50) | | |
| 57 | | Eqmt "A" active |
| 58 | | Eqmt "B" active |
| 59 | | Auto Eqmt Swch Disabled |
| 60 | | 1-DS1 Faclty Failure |
| 61 | | >1 -DS1 Faclty Failure |
| 62 | | Spare |
| 63 | | Spare |
| 64 | | RESERVED for E2A |

* STS-1 is used to indicate the High Speed SONET equipment set.

4.3.3.2 DLC-RT Serial E2A Output Bit Map (to Serial E2A APR)

One 64-Bit Display; List type = L123 (48 alarm, 16 status bits)

| ALARMS | | |
|---|---|---|
| 1 | NSA | Customer Alarm #1 |
| 2 | NSA | Customer Alarm #2 |
| 3 | NSA | Customer Alarm #3 |
| 4 | NSA | Customer Alarm #4 |
| 5 | NSA | Customer Alarm #5 AC Power Fail |
| 6 | NSA | Customer Alarm #6 Ringing Gen. Fail |
| 7 | SA | Customer Alarm #7 Ringing Gen. Fail |
| 8 | SA | Customer Alarm #8 Low Battery |
| 9 | NSA | Customer Alarm #9 Intrusion Alarm |
| 10 | NSA | Customer Alarm #10 Temperature Alarm |
| 11 | NSA | Customer Alarm #11 RTU Alarm |

*No Customer Alarm 12* in this application

| 12 | NSA | Line Shelf Pwr |
| 13 | NSA | N.E. Fuse/Pwr Fail |
| 14 | NSA | Fan Fail |
| 15 | NSA | Sync Eqmt Fail |
| 16 | SA | Sync Eqmt Fail |
| 17 | NSA | Loss Pri Ref. |
| 18 | NSA | Loss Sec Ref. |
| 19 | SA | Loss Sec Ref. |
| 20 | NSA | Successful Prot Swch |
| 21 | SA | Fail to Prot Swch |
| 22 | NSA | Prot Swch Eqmt Fail |
| 23 | SA | Prot Swch Eqmt Fail |
| 24 | NSA | N.E. Controller Fail |
| 25 | NSA | Non-Volatile Back-up Memory Fail |
| 26 | NSA | Network Mediator Link Failure |
| ALARMS | | * |
| 27 | NSA | STS-1(E) Eqmt Fail |
| 28 | SA | STS-1(E) Eqmt Fail |
| 29 | NSA | STS-1(E) Facility Fail |
| 30 | SA | STS-1(E) Facility Fail |

| | | -continued |
|---|---|---|
| 31 | NSA | STS-1(W) Eqmt Fail |
| 32 | SA | STS-1(W) Eqmt Fail |
| 33 | NSA | STS-1(W) Facility Fail |
| 34 | SA | STS-1(W) Facility Fail |
| 35 | NSA | 1-DS1 Eqmt Failure |
| 36 | SA | 1-DS1 Eqmt Failure |
| 37 | NSA | 2-4 -DS1 Eqmt Failure |
| 38 | SA | 2-4 -DS1 Eqmt Failure |
| 39 | NSA | 5-28 -DS1 Eqmt Failure |
| 40 | SA | 5-28 -DS1 Eqmt Failure |
| 41 | NSA | XConn Eqmt Fail |
| 42 | SA | XConn Eqmt Fail |
| 43 | NSA | DTAU Test Link Fail |
| 44 | NSA | Line Shelf Processor |
| 45 | SA | Line Shelf Fail |
| 46 | SA | Line Shelf Ring Supply |
| 47 | NSA | Line Shelf Eqmt |
| 48 | SA | Line Shelf Talk Batt'y |
| STATUS (common to Family) | | |
| 49 | | Custmr Cntrl #1 Active |
| 50 | | Custmr Cntrl #2 Active |
| 51 | | Custmr Cntrl #3 Active |
| 52 | | Custmr Cntrl #4 Active |
| 53 | | Manual Abnormal Cond. |
| 54 | | ACO Activated |
| 55 | | Pri R Sync Disabled |
| 56 | | Sync Swch to Local Osc. |
| STATUS (for DLC) | | |
| 57 | | Eqmt "A" active |
| 58 | | Eqmt "B" active |
| 59 | | Auto Eqmt Swch Disabled |
| 60 | | 1-DS1 Faclty Failure |
| 61 | | >1 -DS1 Faclty Failure |
| 62 | | Spare |
| 63 | | Spare |
| 64 | | RESERVED for E2A |

* STS-1 is used to indicate the High Speed SONET equipment set.

4.3.3.3 DLC-COT Serial E2A Output Bit Map
(to Serial E2A APR)
One 64-Bit Display: List type = L123 (48 alarm, 16 status bits)

ALARMS
| 1 | NSA | Customer Alarm #1 |
|---|---|---|
| 2 | NSA | Customer Alarm #2 |
| 3 | NSA | Customer Alarm #3 |
| 4 | NSA | Customer Alarm #4 |
| 5 | NSA | Customer Alarm #5 |
| 6 | NSA | Customer Alarm #6 |
| 7 | NSA | Customer Alarm #7 |
| 8 | NSA | Customer Alarm #8 |
| 9 | NSA | Customer Alarm #9 |
| 10 | NSA | Customer Alarm #10 |
| 11 | NSA | Customer Alarm #11 |
| | *No Customer Alarm 12* | |
| | in this application | |
| 12 | NSA | Line Shelf Pwr |
| 13 | NSA | N.E. Fuse/Pwr Fail |
| 14 | NSA | Fan Fail |
| 15 | NSA | Sync Eqmt Fail |
| 16 | SA | Sync Eqmt Fail |
| 17 | NSA | Loss Pri Ref. |
| 18 | NSA | Loss Sec Ref. |
| 19 | SA | Loss Seo Ref. |
| 20 | NSA | Successful Prot Swch |
| 21 | SA | Fail to Prot Swch |
| 22 | NSA | Prot Swch Eqmt Fail |
| 23 | SA | Prot Swch Eqmt Fail |
| 24 | NSA | N.E. Controller Fail |
| 25 | NSA | Non-Volatile Back-up Memory Fail |
| 26 | NSA | Network Mediator Link Failure |

ALARMS
| 27 | NSA | STS-1(E) Eqmt Fail |
|---|---|---|
| 28 | SA | STS-1(E) Eqmt Fail |
| 29 | NSA | STS-1(E) Facility Fail |
| 30 | SA | STS-1(E) Facility Fail |
| 31 | NSA | STS-1(W) Eqmt Fail |
| 32 | SA | STS-1(W) Eqmt Fail |
| 33 | NSA | STS-1(W) Facility Fail |
| 34 | SA | STS-1(W) Facility Fail |
| 35 | NSA | 1-DS1 Eqmt Failure |
| 36 | SA | 1-DS1 Eqmt Failure |
| 37 | NSA | 2-4 -DS1 Eqmt Failure |
| 38 | SA | 2-4 -DS1 Eqmt Failure |
| 39 | NSA | 5-28 -DS1 Eqmt Failure |
| 40 | SA | 5-28 -DS1 Eqmt Failure |
| 41 | NSA | XConn Eqmt Fail |
| 42 | SA | XConn Eqmt Fail |
| 43 | NSA | DTAU Test Link Fail |
| 44 | NSA | Line Shelf Proc. Fail |
| 45 | SA | Line Shelf Fail |
| 46 | SA | Line Shelf Ring Supply |
| 47 | NSA | Line Shelf Eqmt |
| 48 | SA | Line Shelf Talk Batt'y |
| STATUS (common to Family) | | |
| 49 | | Custmr Cntrl #1 Active |
| 50 | | Custmr Cntrl #2 Active |
| 51 | | Custmr Cntrl #3 Active |
| 52 | | Custmr Cntrl #4 Active |
| 53 | | Manual Abnormal Cond. |
| 54 | | ACO Activated |
| 55 | | Pri Ref Sync Disabled |
| 56 | | Sync Swch to Local Osc. |
| STATUS (for DLC) | | |
| 57 | | Eqmt "A" active |
| 58 | | Eqmt "B" active |
| 59 | | Auto Eqmt Swch Disabled |
| 60 | | 1-DS1 Faclty Failure |
| 61 | | >1 -DS1 Faclty Failure |
| 62 | | Spare |
| 63 | | Spare |
| 64 | | RESERVED for E2A |

* STS-1 is used to indicate the High Speed SONET equipment set.

4.3.3.4 Common-Control Serial E2A INPUT Bit Map
(from Serial E2A APR)
One 64-Bit Display

| 1 | ACTIVATE CUSTOMER CONTROL #1 |
|---|---|
| 2 | ACTIVATE CUSTOMER CONTROL #2 |
| 3 | ACTIVATE CUSTOMER CONTROL #3 |
| 4 | ACTIVATE CUSTOMER CONTROL #4 |
| 5 | ACTIVATE CUSTOMER CONTROL #5 * |
| 6 | ACTIVATE CUSTOMER CONTROL #6 * |
| 7 | ACTIVATE CUSTOMER CONTROL #7 * |
| 8 | ACTIVATE CUSTOMER CONTROL #8 * |
| 9 | ACTIVATE CUSTOMER CONTROL #9 * |
| 10 | ACTIVATE CUSTOMER CONTROL #10 * |
| 11 | ACTIVATE CUSTOMER CONTROL #11 * |
| 12 | ACTIVATE CUSTOMER CONTROL #12 * |
| 13 | DE-ACTIVATE CUSTOMER CONTROL #1 |
| 14 | DE-ACTIVATE CUSTOMER CONTROL #2 |
| 15 | DE-ACTIVATE CUSTOMER CONTROL #3 |
| 16 | DE-ACTIVATE CUSTOMER CONTROL #4 |
| 17 | DE-ACTIVATE CUSTOMER CONTROL #5 * |
| 18 | DE-ACTIVATE CUSTOMER CONTROL #6 * |
| 19 | DE-ACTIVATE CUSTOMER CONTROL #7 * |
| 20 | DE-ACTIVATE CUSTOMER CONTROL #8 * |
| 21 | DE-ACTIVATE CUSTOMER CONTROL #9 * |
| 22 | DE-ACTIVATE CUSTOMER CONTROL #10 * |
| 23 | DE-ACTIVATE CUSTOMER CONTROL #11 * |
| 24 | DE-ACTIVATE CUSTOMER CONTROL #12 * |
| 25 | ACO |
| 26 | Disable Auto Eqmt Switching |
| 27 | Switch System to Opposite Side |
| 28 | Restore Automatic Eqmt Switching |
| 29 | System Restart/ Processor Reset |
| 30 | Disable Pri Ref Sync |
| 31 | Switch/Lock Sync to Local Osc. |
| 32 | Restore Sync to Auto |
| CONTROL POINTS (unique to Product) | |
| 33 | Spare |
| . | . |
| . | . |
| . | . |
| 63 | Spare |
| 64 | RESERVED for E2A |

*Note: Customer Control Points #5-#12 do not have E2A readback confirmation. If full compliance with Serial E2A is desired, then these bits should be considered "Reserved for Future Use".

4.3.3.5 Display Bit Descriptions—Output Map
COMMON ALARMS 1-12: NSA Customer Alarms These are customer mapped scan points read from the ACU PBA. In the ADM/TM 50, these alarms are transferred via the "Network Manager DS1" link. In the DLC w/ Core case some of these bits are pre-defined and are mapped from the ACU in the Core, to the NCP (DNC). Bit 12 in DLC mappings is not a customer alarm but designated as "Line Shelf Pwr" failure.

13: NSA N.E. Fuse/Power Failure

Fuse failures are not directly monitored by the NE; however, a power failure (alarm point provided by the power supply and read by the opposite side NCP) can be caused by either a Fuse or Power Supply failure.

Note that a Fuse alarm can be provided, if desired, by connecting the relay output from the FAP to one of the ACU's Customer Alarm inputs (points 1-12).

14: NSA Fan Failure

This is a hardware point directly scanned by the Bay Manager NE NCP (the selected NE in a bay that monitors bay level information, not required by each NE; this is normally the same NE that communicates with the Network Manager DS1).

15: NSA Sync Eqmt Failure

This is caused by the redundant clock failing.

16: SA Sync Eqmt Failure

This is caused by the active clock failing and the system being unable to switch to a backup reference, or switching to the redundant clock PBA cannot be performed.

17: NSA Loss of Primary Reference

This is monitored by the Clock PBA and reported to the system software. In this case Primary translates to the reference defined to the clock as its "Primary" or priority 1 reference. It is not necessarily the BITS reference. This is always a NSA failure (per TA-253) because at least one back-up is always required.

Note that for Serial E2A, only three (3) clock sources are defined: Primary, Secondary, Local Oscillator. The Primary and Secondary references may be BITS, OC-N, DS1, or Composite Clock depending on application and provisioning.

18: NSA Loss of Secondary Reference

See 17 above.

19: SA Loss of Secondary Reference

See 17 above. TA-253 indicates that loss of the secondary, or back-up, reference is always service affecting. The TM/ADM equipment has the capability for back-up sources 2 through 8. Therefore this alarm should be set whenever all eight external references have been lost and the system has switched to the 9th reference, the local oscillator. Note however that the redundant equipment side's clock should also be indicating failure of the respective external sources prior to setting this alarm as SA; otherwise the problem is probably an equipment fault and an equipment switch should be made, with the alarm set as NSA.

20: NSA Successful Protection Switch

Set when an automatic protection switch, due to an equipment failure, is completed. Note that an equipment switch due to a facility failure, or a manually requested switch, DOES NOT set this bit.

21: SA Fail to Protection Switch

This bit is set when an equipment or facility failure requires a protection switch but the system is unable to perform the switch. This can be caused, for instance, by a facility failure on the active system and common equipment failure on the redundant system, such that a switch is not allowed (i.e. "SA Protection Switching Equipment failure" does not set this bit).

22: NSA Protection Switching Equipment Failure

This bit is set when the test protection switch routine returns an invalid response for either the active or standby system, i.e. the test code bit and the returned bit do not match. This mainly tests the control link from the SW/NCP, to COA, to DECODER/CONTROL circuitry on the FTM/STT, etc. This is not intended to alarm SBI failures that are also linked with protection switching, these are covered within the DS1/SBT equipment failures.

23: SA Protection Switching Equipment Failure

For the ADM/TM with electrical interfaces, this bit is set when the active or redundant equipment's "ON/OFF" status does not equal the software selection for that side, AND the situation cannot be corrected with an equipment switch. For Optical interfaces in the ADM/TM, this bit is set when the "SELECT OWN/SELECT OTHER (ADM/TM) status does not equal the software selection for that side, AND the situation cannot be corrected with an equipment switch.

Since a "SA Protection Switching Equipment Failure" is already indicating failure of the protection switching equipment and loss of traffic, a "SA Fail to Protection Switch" alarm would provide no new information and should not be set.

24: NSA N.E. Controller Failure

This bit is set when the NE's controller(s) fails for any reason. Obviously if the controller fails completely then the entire E2A map will not be written. Note that a Controller failure NEVER causes a "SA" failure in the ADM/TM systems. In DLC systems a single failure sets this bit; a dual failure is not covered since it would require second level fault coverage of the same function within the same NE.

25: NSA Non-Volatile Back-up Memory Fail

This bit is set when a failure of the EEPROM on the COA is detected by either a checksum error or read/write error.

26: NSA Network Manager Link Failure.

This bit is set when the DS1 link to the Network Manager or ACU PBA is failed. This includes the DS1 interface itself, the actual DS1 link, and the internal system Connection to the DS1.

UNIQUE ALARMS 27-48: Most of these alarm bits are self explanatory. High speed equipment failures relate to the high speed equipment set, not necessarily just the OC-N interface. High speed facility failures include LOS, LOF, excessive OOFs, AIS, high BER, etc., these will be "SA" or "NSA" based on the ability of the system to switch to a good side. The same general operation is true for the low speed equipment; note that low speed facility failures are not listed as alarms but are listed as status (see below).

XConn Equipment failure is related to cross-connect failures; for example, software related or TSI/TSM related.

COMMON STATUS 49-52: Customer Control Active

This bit is set when the ACU has received a control command from the Serial E2A and has activated the control. This is received via the DS1 Network Manager Link.

53: Manually Caused Abnormal Condition

This bit is set whenever a manual control action disables some of the functionality of the system, normally associated with disabling an automatic function such as automatic Clock or Equipment switching. Note that in some cases other, more direct status points, will also be activated.

54: ACO Activated

Set when the ACO, via the front mounted push-button switch, remote discrete input, craft interface, or OS (including Serial E2A) is activated.

55: Pri Ref Sync Disabled

Set when the provisioned primary reference sync source has been disabled via the craft interface or OS (including Serial E2A). This is equivalent to switching to the secondary reference and locking out the primary reference from the craft.

Automatic mode is indicated when this bit and bit 56 is not active.

56: Sync Swch to Local Osc

This bit is set whenever the internal local oscillator, as the lowest priority (#9), is manually selected via the craft interface, or OS (including Serial E2A).

Automatic mode is indicated when this bit and bit 55 is not active.

57-58: The appropriate bit is set to indicate which system side is currently the active side.

59: Auto Eqmt Swch Disabled

Set when automatic equipment switching has been disabled. Automatic mode is indicated when this bit is not active.

60-62: Set for "Low Speed" facility failures (low speed defined as multiplexed side of the equipment regardless of rate). Note that these are status bits only and do not have the connotations of SA/NSA.

63: Spare

64: This is a reserved bit for specific E2A use.

4.3.3.6 Display Bit Descriptions—Input (Control) Map 1-4: Activate required 4 customer control points. These are provided with positive feedback through the OUTPUT display's status bits. The control request is sent to the ACU PBA in either the FAP (ADM/TM 50,) or CORE (DLC).

5-12: Activate an additional eight customer control points. These are provided without positive Serial E2A status bits available. These are provided for additional functionality to the customer where other means of confirmation, or no need to confirm activation, is desired. * NOTE: ALL 12 CUSTOMER CONTROL POINTS, bits 1-12, are used to activate a control point. The Serial E2A command will be a one time command to activate a control point and the ACU will latch this information.

13-16: De-activate the required 4 customer control points. These points are provided as a disable, or de-activation, of bits 1-12 that enable, or activate, the control points.

Since these bits are simply the releasing of bits 1-4, no storage is required.

17-24: De-activate the additional eight customer control points. See above.

Since these bits are simply the releasing of bits 5-12, no storage is required.

* NOTE: ALL 12 of these control points, bits 13-24, will be a one time Serial E2A command to de-activate a control point. The ACU will latch, or clear the control bit, information.

25: Activate ACO

Remote version of local push-button ACO.

26: Disable Auto Eqmt Switching

Control for disabling automatic equipment switchovers. Note that once disabled, A/B Equipment status would have to be retrieved and an additional command possibly required to switch the system to the desired side.

These bits are stored to survive a cold start.

27: Switch System to Opposite Side

Switches the system to the opposite equipment side. Used in automatic mode, or disabled mode as described above.

28: Restore Automatic Eqmt Switching

Restores automatic equipment switching.

These bits should be stored to survive a cold start.

29: System Restart/Processor Reset

Provides a cold start input request.

30: Disable Pri Ref Sync

This sets a lower level priority source for the synchronization reference and temporarily disables the primary source (priority #1) in the provisioned selection map located in the Clock function. Automatic selection downward (sources 2-8) is still allowed.

31: Switch/Lock Sync to Local Osc

This selects the lowest priority source, the internal local oscillator, as the reference source and disables automatic restoral to a higher reference source. Since it is the lowest source (#9), all other sources are effectively locked out.

Note that the Local Oscillator is always the lowest priority in the map (#9) and is always provisioned.

32: Restore Sync to Auto

Restores automatic synchronization switching based on the Clock function's provisioned map.

33-63: Spare

64: Reserved for Serial E2A use.

4.3.4 Network Manager or Alarm/Communications Unit Interface

Each Module has the capability to communicate (via a DS1 link) to the optional Network Manager or Customer Alarm Communications Unit.

The Network Manager will be a future offering and will provide external access to the ESF data channels, SONET User, Growth, and DataCom Channels.

The Customer Alarm Communications Unit provides the capability for the selected Controller to monitor input dry contacts and provide output form "C" contacts. The Controller can route the information to the Serial E2A port or to the OS via the DataCom (D1-D3) channel.

5.0 TM-50 Module

A Module is a mechanical assembly equipped with PBAs. The following assemblies are available for use with the TM-50 Module. PBA equipping options are indicated by the use of "or" between sets of optional PBAs.

| ITEM | NAME/PART NUMBER | MNEMONIC | DESCRIPTION/USAGE |
|---|---|---|---|
| 1 | Fuse/Alarm Panel 625051-000-001 | FAP101 | 0 or 1 required per bay. 2 rack spaces. |
| or | | | |
| 1 | Fuse/Alarm Panel 625254-000-001 | FAP201 | 0 or 1 required per bay. 3 rack spaces. |

-continued

| ITEM | NAME/PART NUMBER | MNEMONIC | DESCRIPTION/USAGE |
|---|---|---|---|
| 2 | Subframe 625050-000-001 | SUBF101 | (Required when using ACU-102) Mounts in 23" or 26" frame. 8 rack spaces. Holds up to 4 TM50s. |
| 3 | TM50 Module 625201-000-001 | TM50 | 1 required. Mounts in subframe. Holds TM50 PBAs. |
| 4 | Power Supply 600282-393-001 | PWR401 | 2 required. |
| 5 | Clock 625211-000-001 | CLK101 | 2 Required. |
| 6 | Single Network Element Controller 625217-000-001 | SNC101 | 1 required. |
| 7 | Time Slot Mux 625215-000-001 | TSM101 | 2 Required (DS1 Grooming). |
| 8 | COA 625212-000-001 | COA101 | 0 or 1 Required per TM50 module. Local and Remote craft interfaces are supported. |
| or | | | |
| 8 | COA 625212-000-002 | COA102 | 0 or 1 Required per TM50 module. Local craft and Serial E2A interfaces are supported. |
| 9 | STSX-1 Electrical Transceiver 625210-000-001 | STT101 | 0 or 2 Required. Provides Electrical Interface. (STSX-1) |
| or | | | |
| 9 | Fiber Optics Transceiver Medium Power 625214-000-001 | FTM101 | 0 or 2 Required. Used for 40 Km optic spans (OC-1). |
| 10 | DS1 Transceiver 625206-000-001 | DST101 | 1 to 32 required. Locked VT's. |
| 11 | Alarm/Control Unit 625309-000-002 | ACU102 | 0 or 1 required |

6.0 ADM-50 Module

The following assemblies are available for use with the ADM-50 Module. PBA equipping options are indicated by the use of "or" between sets of optional PBAs.

| ITEM | NAME/PART NUMBER | MNEMONIC | DESCRIPTION/USAGE |
|---|---|---|---|
| 1 | Fuse/Alarm Panel 625051-000-001 | FAP101 | 0 or 1 Required per bay. 2 rack spaces. |
| or | | | |
| 1 | Fuse/Alarm Panel 625054-000-001 | FAP201 | 0 or 1 Required per bay. 3 rack spaces. (required for ACU-102) |
| 2 | Subframe 625050-000-001 | SUBF101 | Mounts in 23" or 26" frame. 8 rack spaces. Holds up to 3 ADM50s. |
| 3 | ADM-50 Module 625218-000-001 | ADM-50 | 1 required. Mounts in subframe. Holds ADM-50 PBAs. |
| 4 | Power Supply 600282-393-001 | PWR401 | 2 required. |
| 5 | Clock 625211-000-001 | CLK101 | 2 Required. |
| 6 | Single Network Element Controller 625217-000-001 | SNC101 | 1 required. |
| 7 | Time Slot Mux 625216-000-001 | TSM201 | 2 Required (DS1 Grooming). |
| 8 | COA 625212-000-001 | COA101 | 0 or 1 Required per ADM50 module. Local and Remote craft interfaces are supported. |
| or | | | |
| 8 | COA 625212-000-002 | COA102 | 0 or 1 Required per ADM-50 module. Local craft and Serial E2A interfaces are supported. |
| 9 | STSX-1 Electrical Transceiver 625210-000-001 | STT101 | 0 or 2 Required. Provides Electrical Interface. (STSX-1) |
| or | | | |
| 9 | Fiber Optics Transceiver Medium Power 625214-000-001 | FTM101 | 0 or 2 Required. Used for 40 Km optic spans (OC-1). |
| 10 | DS1 Transceiver 625206-000-001 | DST101 | 1 to 32 required. Locked VT's. |
| 11 | Alarm/Control Unit | ACU102 | 0 or 1 required |

-continued

| ITEM | NAME/PART NUMBER | MNEMONIC | DESCRIPTION/USAGE |
|------|------------------|----------|-------------------|
|      | 625309-000-002   |          |                   |

ACRONYM LIST/GLOSSARY

ALC: Alarm/control
DS3: Digital Signal, Third Level
DSX-3: Digital Signal Crossconnect, Third Level
EOC: Extended Operating Conditions
LSIF: Low Speed Interface
OCM: Optic Carrier Module
PDS: Product Design Specification
PSE: Protection Switch Element
SMI: Synchronization/Maintenance Interface
SOC: Standard Operating Conditions
STSX-1: Synchronous Transmission Signal Crossconnect First Level
STS-1: Synchronous Transmission Signal, First Level
STS-3: Synchronous Transmission Signal, Third Level
TEC: Thermo-electric Cooler
TRS: Technical Requirements Specification
TS: Technical Specification
WTO: Watchdog Time Out

1.0 General Description

1.1 System Overview

The FTS-150 is a FIBER TRANSMISSION SYSTEM operating at the OC-3 SONET rate. Inputs can be DSX-3 or STSX-1, or a combination of these. The system is 1:1 protected with switching at the low speed side.

The FTS-150 equipment is designed as an 8 RU high by ¼ shelf wide module with self-contained protection switch and front access installation. The 1:1 protection is accomplished by providing redundant equipment with protection switching at the low speed side (DS3 or STS1). The high speed side is not switched. Thus there are two complete and independent transmission paths with common control for maintenance, alarm, and administration.

In operation each end of the optic system continuously monitors both receive signals (A and B, where one side is active and the other is hot standby ) and if degradation exceeds a preset level the controller switches to the good side and generates the appropriate alarm. The switching is non-revertive.

Key features of the FTS-150 system are
SONET based System with three Tributaries
  DSX-3 compatible interfaces Proprietary STSX-1 interface OC-3 Line rate and format All auxiliary SONET overhead functions supported (Orderwire, APS commands, Alarm/Status reporting)
Optic Interface
  Transmitter: Laser, no TEC, reduced power output, 1300 nm
  Receiver PIN Photo diode Span length without repeater: 40 km (SOC), 25 km (EOC) Fiber: single mode Connector type is FC/PC (Biconic optional)
Protection
  1:1 Protection, within the module, on low speed side
Power Consumption
  50 W typical, from −48 v source
Physical
  Common equipment Practice with TM/ADM products Module size is 8 RU high by ¼ shelf wide
  Front access for all customer wiring and maintenance

2.0 System Block Diagram

A block diagram of the system is shown in FIG. 4. The following system description is referenced to this figure.

DS-3 inputs are received at the PSE and are routed via the resistive splitter to both LSIF (A and B). The resistive splitter has a 5 dB loss, which is compensated by an amplifier on the LSIF. The 5 dB loss provides 10 dB signal isolation between the two independent LSIF units.

On the LSIF unit the DS3 data is mapped into STS-1 payloads by adding SONET overhead and framing bytes. The three STS-1 payloads are then byte interleaved and scrambled, and Bit Interleave Parity (BIP) is generated and added. The 155.52 Mb STS-3 formatted signal is then passed on to the FTR101.

The FTR101 (FTR(A) and FTR(B)) contains both an optic transmitter and optic receiver module on one plugin PBA. The STS3 signal from the LSIF is converted to the optic OC-3 level by the optic transmitter module and leaves the FTR101 via an FC/PC connector and single mode fiber, at a nominal −10 dBm optic power level.

The identical process occurs via the other output of the resistive splitter on the PSE and the other LSIF and FTR101.

In the other direction, starting at the high speed receive side, the OC-3 level optic signal is received via single mode fiber and an FC/PC connector independently on the A and B FTR101. The optic receiver module converts the signal to the FTS3 electrical level and passes the signal to the LSIF unit. A SAW type clock recovery module on the FTR101 extracts the 155.52 SONET receive clock which is also sent to the LSIF.

The LSIF checks the received BIP code, de-scrambles the STS3 signal and byte de-interleaves and de-multiplexes the signal into its constituent STS frames. Overhead data is extracted at the STS1 level in accordance with SONET specifications and is sent to the ALC101 for processing and routing. The remaining DS3 payload is passed to the PSE via an equivalent 112 ft. cable simulator circuit.

The A and B DS3 signals arrive at the PSE, and depending on a decision made by the ALC processor, the "active" side signal is routed by the switch on the PSE to the Line Build Out network (LBO). The switch action is non-revertive and the switch is of the latching type, requiring no hold power.

It should be noted that the LSIF is available with low speed interfaces at DS3 and STS1, and in combination of these two. However, the two units in a 1:1 configured system must be of the same type for the protection to function properly.

Continuing with FIG. 4, there are two power converters operating from two separate −48V circuits, and supplying A, B, and C power to the system. Each converter feeds its own units (A or B) and, thru an internal diode, the non-redundant ALC101 and COA101 units as well as the two SMI101 units. The power is arranged such that failure of either converter does not affect the other side of the system. A failure of the C power, including a short circuit, does not affect the other power outputs.

System synchronization is provided by the system clock unit (CLK). Each CLK receives external BITS synchronization from both the SMI (A) and (B), and loop synchronization from each FTR. The selection is made on the CLK based on software selectable priority and the status of each equipped source. If no external sources are available the system defaults to the internal reference available on the CLK101. The internal reference has a stability of 20 ppm.

The SMI101 units provide the system interfaces to the BITS sources and the optional maintenance module. When the FTS-150 is installed in a TM/ADM configuration without a maintenance module, the SMI101 units also provide the SONET overhead data path between the FTS-150 and the TM/ADM systems. The SONET overhead data extraction in the FTS-150 is done by the LSIF and is passed to the SMI by the ALC101.

System control, alarm supervision, and SONET overhead processing is performed by the ALC. This unit does not directly affect the transmission payload and is not duplicated in the FTS-150. The ALC monitors all units for alarms and controls the alarm LED on each unit. Remote inventory is also collected by the ALC. The operating system software resides in RAM on the ALC. A non-volatile memory on the COA101 (COA) serves as the system backup.

The COA101 serves as the operating system backup memory and the physical interface for the system alarm outputs, craft port, E2A port, and order wire ports. The data associated with the COA ports is extracted from the SONET frame by the LSIF and is sent to the COA101 via the ALC. The final determination to order a switch of the PSE is also done by the COA101 processor, based on data received from the ALC.

2.1 SONET Overhead

The following is a brief description of the treatment of the overhead bytes in the FTS-150 product.

2.1.1 Path Overhead

Path Overhead is passed transparently between the high speed side and the low speed side for STS interfaces. DS3 interfaces are treated as follows:

BIP-8 (B3): For DS3 interfaces Path BIP-8 is sourced and terminated on the high speed side. Error count is processed by the ALC.

Signal Label (C2): For DS3 interfaces C2 is inserted in the STS in the transmit direction; the received C2 bytes are ignored. The content of C2 is software controlled.

User Channel (F2): For DS3 interfaces F2 is sourced and terminated on the high speed side. Only one of the three F2 channels can be piped to external equipment where the channel is sourced and terminated. The selection of STS1 #1, #2, or #3 is controlled in software.

Path Status (G1): For DS3 interfaces G1 is sourced and terminated o the high speed side. The data is processed by the ALC.

Multiframe (H4): For DS3 interfaces H4 is sourced on the high speed side. The received H4 is ignored.

Trace (J1): For DS3 interfaces J1 is sourced and terminated on the high speed side. The sourced J1 is broadcast to all three STS. The received J1 is processed by the ALC.

Growth (Z3-Z5): Under software control, one of the growth channels can be selected for termination and sourcing on external equipment via the DS1 ports on the SMI101.

2.1.2 Line Overhead

Treatment of the bytes in FTS-150 is as follows.

BIP-8 (B2): Sourced and terminated on the high and low speed side. Error count is monitored and processed by the ALC.

Data Com (D4-D12): Sourced and terminated (for STS1 #1 only) in external equipment via the SMI101 DS1 ports for high speed side only. The low speed side receive Data Com is ignored. The low speed side transmit Data Com is set to all zero.

Orderwire (E2): Sourced and terminated (for STS1 #1 only) in external equipment via the COA101 orderwire port for high speed side only. The low speed side receive E2 is ignored. The low speed side transmit E2 is set to all zero.

Pointer (H1-H2): Sourced and terminated on the high and low speed side. For STS interfaces, Path AIS is detected on the LSIF and reported to the ALC.

Pointer Action (H3): Sourced and terminated on the high and low speed side. For STS interfaces, Path AIS is detected on the LSIF and reported to the ALC.

APS (K1-K2): Sourced and terminated (for STS1 #1 only) on the high and low speed side. These bytes are processed by the ALC101 for end to end protection switching purposes.

Growth (Z1-Z2): Sourced and terminated (STS1 #1 only) in external equipment via the SMI101 DS1 ports on the high speed side. On the low speed side the Z1-Z2 bytes are ignored on the receive side and are set to zero on the transmit side.

2.1.3 Section Overhead

Treatment of the bytes in FTS-150 is as follows.

Framing (A1-A2): Sourced and terminated on the high speed and low speed side. The framing bytes are not scrambled in the optic signal.

BIP-8 (B1): Sourced and terminated on the high and low speed side. Error count is monitored and processed by the ALC. The outgoing B1 is calculated after scrambling and is inserted in the next frame in STS1 #1 only.

STS-1 ID (C1): Sourced and terminated on the high and low speed side. The ID is set by software for each STS1. The ID byte is not scrambled in the optic signal.

Data Com (D1-D3): Sourced and terminated (STS1 #1 only) in the ALC101 or in external equipment via the SMI101 DS1 ports on the high speed side. The selection is software controlled. On the low speed side the received bytes are ignored and the transmitted bytes are set to zero.

Orderwire (E1): Sourced and terminated (STS1 #1 only) in external equipment via the COA101 orderwire port on the high speed side only. The low speed side receive is ignored and the transmit is set to zero.

User (F1): Sourced and terminated STS1 #1 only) in external equipment via the SMI101 DS1 ports on the high speed side only. The low speed side receive is ignored and the transmit is set to zero.

3.0 HARDWARE DESCRIPTION

3.1 FTS-1 MODULE

The FTS-150 product, in a 1:1 configuration, consists of one ¼ wide module equipped with units. A coax panel is used for connecting the DSX-3/STSX-1 cables, and an I/O panel for customer wiring of alarms, access ports, and power.

WARNING: The FTS150 module does not contain input power fusing. An external fuse (3A GMT type) is required in the Fuse and Alarm Panel serving the module.

With the exception of the PSE, all units are plugin type with a latch type handle and front panel. The latch contains a flat conductive spring contact which grounds the front panel to the module for added ESD protection. The PSE has the same panel/latch feature, but in addition, it also has a restraint mechanism to prevent inadvertent removal of this critical plugin.

In the protected terminal the following units are redundant (two per system):
Optic transceiver unit, FTR101, 625115-000-001
STS-1 (or DS-3) interface unit, LSI F101, 625121-000-101 (or LSIF102, 625121-000-002)
Sync/maintenance interface unit, SMI101, 625123-000-001
Power converter, PWR401, 600282-393-001

The common units are:
One Optic Carrier Module, OSM3, 625101-000-001
One I/O panel, IOP301, 602322-536-001
One alarm/processor unit, ALC101, 625120-000-001
One craft/orderwire/alarm unit, COA101, 62xxx-000-001
One protection switch unit, PSE101, 625124-000-001

4.2 I/O PANEL

The I/O panel provides front access wire wrap pins for customer wiring, and is installed in the rear of the subframe prior to installation of the module. A module cable harness supplied with the module connects the I/O panel to the FTS-150 module. (See FIG. 4.1)

4.3 COAX CONNECTOR PANEL

A separate coax connector panel, mounted on the side of the subframe is used to connect the incoming coax cables to the small diameter coax leaving the backplane connector on the rear of the FTS-150 module. The small diameter coax provides the desired mechanical flexibility and takes up little space behind the module in the subframe.

5.0 HARDWARE OPTIONS/(CUSTOMER SELECTABLE)

5.1 LOW SPEED INTERFACE OPTION

The low speed interface can be STSX-1 or DSX-3. The option is made by selecting the LSIF101 (or LSIF102-104) for both the active and the standby side of the 1:1 protected system.

5.2 LINE BUILDOUT OPTION (INSTALLATION)

The PSE101 unit has a switch selectable option for 0–225 ft. and 225–450 ft. of coaxial cable length from the cross-connect to the FTS-150 coax I/O panel. This selection is made during installation and provides the correct pulse shape at the cross-connect for various cable lengths.

5.3 VISUAL INDICATORS/SWITCHES

The red unit alarm indicators are driven by software and in some cases by hardware. They are an aid in diagnosing system problems but do not by themselves indicate a defective plug-in. System alarm/status messages must be used in conjunction with the unit alarm indicators to determine the need to replace a plug-in. Software can perform a lamp test on all units except PWR401. PWR401 has a green indicator during normal operation and a yellow indicator for indication of failure or unit turned OFF.

| UNIT | INDICATOR | FUNCTION (ON) |
|---|---|---|
| PWR401 | GREEN | NORMAL OPERATION |
|  | YELLOW | ALARM CONDITION |
|  | ON/OFF SW | POWER ON SWITCH (DRIVEN BY HW ONLY) |
| SMI101, CLK101, FTR101, LSIF | RED | SW DRIVEN ALARM |
| ALC101 | RED | SW DRIVEN ALARM |
|  | GREEN (A) | (A) ACTIVE |
|  | GREEN (B) | (B) ACTIVE |
| PSE101 | RED | SW DRIVEN ALARM |
|  | GREEN (A) | SIDE (A) ACTIVE |
|  | GREEN (B) | SIDE (B) ACTIVE |
| COA101 | RED (CRITICAL) | CRITICAL SYSTEM ALARM |
|  | RED (MAJOR) | MAJOR SYSTEM ALARM YELLOW |
|  | YELLOW (MINOR) | MINOR SYSTEM ALARM |
|  | RED (UNIT) | UNIT ALARM (WTO) |
|  | ACO SW | AUDIBLE ALARM CUTOFF |
|  | GREEN | ACO ENABLED |

6.0 Unit Descriptions

This section describes the functions of each plug-in unit in the FTS150 module. For detailed technical description of each unit refer to the corresponding 6XXXXX-001-501 document below.

6.1 FTS150 FIBER OPTIC TRANSMITTER/RECEIVER (FTR101)

The FTS150 Fiber Optic Transmitter/Receiver (FTR101) is contained on a single PBA. The FTR101 does not use a thermoelectric cooler and has a nominal $-10$ dBm optic output. The PIN-FET receiver has a nominal $-37$ dBm sensitivity.

The FTR101 contains a phase locked loop to generate a 155.52 MHZ clock from a 51.84 MHz input reference, a laser transmitter to convert the STS-3 input to an OC-3 output, a PIN-FET receiver to convert the OC-3 input to a STS-3 output, and a clock recovery circuit. The FTR101 interfaces with the LSIF PBA. The transmit and receive sections are on the same PBA and independent, each containing separate clock and data I/O pins.

6.2 Alarm/Controller (ALC)

The Alarm/Controller (ALC101) unit includes a microprocessor with memory, communication interfaces, and internal alarm interfaces.

The following subsections describe each functional block.

6.2.1 Processor

The Processor functional block includes an 80C186 microprocessor with sufficient memory (EPROM, RAM) and support hardware to perform the four tasks described below.

First, the Processor initializes any hardware within the unit that is not self-initializing. This includes the 80C186 on-chip peripherals, as well as any external programmable hardware (DMA controller and/or HDLC controller). The Processor also performs a self-test and set its Ready/Active status signals accordingly.

Second, the Processor provisions the system (via the craft port, SBI, or through default values). These parameters include the section ID (C1), signal label (C2), BER thresholds, and routing of certain channels to the Maintenance Module (if so equipped).

Third, alarm collection and performance monitoring are provided by the Processor. This includes performing maintenance testing, BER calculations, and the identification of hardware failures (including BER threshold violations). The SONET Tracer byte (J1) is also supported.

Fourth, the Processor provides local and remote communications paths. The local paths are provided through two local craft interfaces. A remote, or end-to-end, path is provided via the 192 kb/s data/comm. channel in the SONET overhead.

6.2.2 Watchdog Timer

The Watchdog Timer is a 2-stage function. The first stage is the sanity timer. It provides a check upon the microprocessor and its firmware. The second stage is the alarm timer. It is used to declare a PBA failure in the event of an unrecoverable microprocessor or firmware fault.

Expiration of the alarm timer will result in the Processor being isolated from the rest of the system and the PBA LED being activated.

6.2.3 Alarms/Status

This functional block receives and transmits discrete alarm/status signals.

The ALC1 PBA sends 5 alarm/status signals to the COA. There are 3 alarm signals; major, minor, and critical. There are 2 status signals; active and ready.

This function block also contains the alarm LED and the status LED's.

6.2.4 Craft Interfaces

This functional block provides the necessary hardware to implement 2 separate craft ports. The ports are serial, asynchronous, and full duplex.

The mechanical and electrical compliance for the craft ports is accomplished on the COA101 PBA.

6.2.5 SBI Interfaces

Serial Bus Interfaces (SBI) are used to provide serial communication channels between the ALC1, LSIF, and Sync/Maintenance Interface (SMI) PBA's.

6.2.6 Mux Function

The Mux Function routes SBI channels (including SONET channels) to their proper destination. Most of the routing paths are fixed. Some must be provisioned by the Processor, however, such as A/B side-selection of OW & data/comm., routing O.S. channels to the (optional) Maintenance Cluster, and selection of certain SONET path overhead (J1 tracer and F2 user) bytes.

6.2.7 OW & Data/Comm.

This functional block provides the interface for the orderwire channels and the 192 kb/s data/comm. channel (SONET channels D1-D3).

The 2 orderwire channels (local and express) require no processing by the ALC1 PBA. They are terminated at the COA.

The data/comm. channel is terminated at the ALC101 PBA (unless there is a Maintenance Module present to do that function). The channel is HDLC formatted.

6.2.8 Processor Serial Interfaces

This functional block provides for inter-PBA communications. The Processor Serial Interface is an asynchronous 128 kb/s link.

The PBA's connected to the ALC101 PBA via this interface are the COA and Clock.

6.2.9 PSBI Interfaces

This functional block provides a pseudo-SBI (PSBI) interface to the FTR PBA. The PSBI format is a simplified version of the SBI which relieves the FTR PBA of performing the clock-edge selection and channel zero synchronization that is necessary with a true SBI bus.

The PSBI channels are used to transfer alarm/status and control information between the ALC101 and the optic PBA's.

6.2.10 Remote Inventory

The ALC1 receives inventory information from every replaceable unit in the FTS150. A special Inventory Bus is provided by the ALC1 (clock, data, address, and chip select). The address and data lines are serial and are synchronized to the clock signal.

The Inventory Bus is used by all plug-in units except the LSIF, which uses the SBI bus, and the COA and CLK units, which use the Processor Serial Bus for inventory.

6.3 LOW SPEED INTERFACE (LSIF101-LSIF104)

The Low Speed Interface PBA receives three low speed ports (either STS-1 or DS-3), inserts SONET overhead and framing information, and byte interleaves them into an STS-3 format, at 155.52 Mb/s (hereafter referred to as 155 Mb/s). In the reverse direction the signal is byte de-interleaved and overhead information extracted. For STS-1 ports, some of the overhead is overwritten and the signal is output at the low speed port. For DS-3 ports, the payload is de-stuffed, re-timed, and output at the LS port.

The four versions of the card are:
(1) LSIF1—three bidirectional STSX-1 interfaces
(2) LSIF2—three DSX-3 bidirectional interfaces,
(3) LSIF3—one STSX-1 and two DSX-3 bidirectional interfaces,
(4) LSIF4—two STSX-1 and two DSX-3 bidirectional interfaces.

The other two versions use combinations of low speed interfaces of the LSIF1/LSIF2.

6.4 SYNC/MAINTENANCE INTERFACE (SMI101) UNIT

There are two sets of Sync/Maintenance Interface (SMI101) PBAs used in FTS150. Each SMI101 provides an 8 kHz sync, derived from the office BITS source, to both "A" and "B" Clock PBAs. They also provide the SBI to DS-1 interface for the Maintenance Module.

In the FTS150, DS-1 (#1), on SMI101 A and B, provides primary and secondary synchronization sources to the Clock PBAs (both sides). DS-1 (#2), on SMI1 A and B provides an SBI to DS-1 interface between the local ALC101 processor card and the Maintenance Module or a Terminal Multiplexer (TM) or an Add/Drop Multiplexer (ADM). DS-1 (#3), on SMI1 A, only provides an SBI to DS-1 interface between the local ALC1 processor card and a TM or ADM. If a Maintenance Module is used in the system, DS-1 (#3) will not be used. DS-1 (#3) on SMI101 B will not be used in either configuration.

Details on the DS-1 Interface are available in document 625206-001-301 (DS-1) infc. PBA Performance Spec). Each DS-1 interface utilizes two custom LSI devices: the DSX-1 Interface IC (reference 601148-415-801) and the DS1/SBI ASIC (reference 620054-414).

6.5 PROTECTION SWITCH ELEMENT (PSE101)

The Protection Switch Element (PSE101) PBA is used in One for One protected FTS150 systems. It performs the switching function on the three low speed lines between the primary and secondary side of the FTS equipment. The low speed inputs can be either STSX-1 or DSX-3 transmission lines.

The PSE101 consists of the following elements:
1. Received data (low speed input) split into two paths (A & B); 10 dB loss.
2. Switching of Transmit data, Primary or Protection (A or B), (o dB loss).
3. Relay control logic (via EPLD)
4. PSE Status output generation
5. Test Function. Without actually switching traffic, a testing function is provided on the PBA to verify that the Relay Control Logic and Relay Driver circuitry is working properly.

6.6 Clock (CLK101)

The CLK101 is the system clock and provides the timing reference to all other units in the system.

The system clock PBA receives timing sources from either a receive OC3 or external BITS source. The unit has a Stratum 4 internal clock with 20 ppm stability, that is set for "free-run" mode when all external synchronization sources fail. There are two clock PBAs per system.

There are 4 possible external 8 kHz synchronization sources derived from outside the clock PBA. Two are from the two OC3 receive paths and two are from external DS1 synchronization (BITS) ports.

The clock PBA incorporates a microprocessor with RAM and non-volatile memory. It performs the arbitration required between internal and external performance criteria to select an alternate reference synchronization source.

The interface circuitry includes a link by which the ALC sends a control signal to the Clock PBA to activate the alarm LED when the ALC101 senses a CLK101 failure. A local watchdog timeout circuit for the local processor also drives the Alarm LED, autonomously, should a failure of the processor, and hence the serial link, occur.

6.7 Craft/Order Wire/Alarm Unit (COA101)

The COA101 provides for two Craft interfaces, two Order Wire interfaces, Alarm interfaces to the CO alarm collection facility, and the A/B selection.

The COA uses a micro-processor to interface with and control these inputs and outputs. A watchdog timer keeps check of proper micro-processor operation, and turns on a local "Unit Alarm" LED and forces a Major alarm when the timer expires.

The unit contains a front panel with Critical(red), Major(red), Minor(amber), ACO(green), and Unit Alarm(red) LEDs. It also contains an ACO switch.

Craft port 1 is provided on the unit's front panel as a standard RS-232 Local Craft interface via a 9 pin "D" connector.

Craft port 2 is provided at the rear of the unit via its I/O connector. This port is brought to a front-access wire-wrap field for access by the customer. The port can be configured as either an additional Local Craft or "Remote" (via a modem) interface, or, it can provide a serial E2A interface to a CO E2A sub-system.

The Order Wire Interface provides two, four wire, 600 ohm, analog Express and Local Order Wire ports.

The COA101 also serves as the system local alarm collection and display unit. The Alarm outputs from the COA consist of the following:
Visual Critical Alarm
Visual Major Alarm
Visual Minor Alarm
Audible Critical Alarm
Audible Major Alarm
Audible Minor Alarm
Identification
Alarm Common Return (signal return for all alarm outputs) this signal shall be Battery Ground The COA101 also provides the external, customer accessible, System Processor Restart function. The battery level signals appear on the I/O panel on wire wrap pins.

The converter outputs are short circuit proof. Outputs will go into current limiting and shut down, but will not "hunt". A short on the REDUNDANT output will not shut down the unit, and will cause the yellow LED to turn ON and the green LED to also remain ON.

Output overvoltage protection is provided. If the converter is shut down due to an overvoltage condition the input power must be removed and re-applied before the converter will restart.

Hot insertion is not recommended but will not cause an out of specification disturbance on the redundant converter, and will not cause damage to the power connector.

6.8.6 Grounding and Isolation

Frame ground, battery return, and output power ground are isolated from each other. A common connection is provided at the fuse panel, or the office GROUND WINDOW.

6.8.7 Fusing

The converter does not have a fuse. An external 3A fuse is required in the −48V input line at the Fuse and Alarm Panel (FAP).

6.8.8 Performance

The converter is designed for unattended operation and requires no adjustment over its service life.
MTBF is 50,000 hrs.

7.0 FTS150 SYSTEM SOFTWARE

7.1 Software Architecture

The software for the FTS-150 is part of a common software package that is provided for the SONET Family of Products. The products include an ADM, a TM, an FTS-600 and a Basic Access Module. For ease of maintenance and development across several products, the software is structured in a modular architecture.

7.1.1 Administration Subsystem Architecture

The Administration Subsystem is responsible for translation of data between message oriented interfaces and internal formats. The message oriented interfaces include Craft Interfaces, Operations Systems (OS) Interfaces, and Embedded Operations Channels (EOC), all of which are oriented around TL-1 language. The Communications Subsystem handles the details of protocol for OS and EOC Interfaces and provides Administration with messages so that commands may be executed and responses returned. The Craft Interfaces are handled at a hardware level by Kernel Subsystem, and at higher levels within Administration Subsystem by Craft Dialog Task.

In many respects, the Administration Subsystem may be regarded as a message machine. At the top of the machine a bi-directional flow of messages occurs across the boundary between Administration and external interfaces. These are either complete TL-1 messages (OS or EOC interfaces) or lines of text (craft interfaces). Two tasks within Administration handle the flow of these messages, Craft Dialog Task and ADMIN Executive task. These tasks and the modules shared between them provide for translation of data between external (TL-1) formats and internal formats. The goal of this translation is to provide a consistent and simplified means of internal data representation for a majority of the software.

External interfaces are isolated from the rest of the Administration Subsystem by Craft Dialog Task and ADMIN Executive Task. Craft Dialog Task handles the details of interaction with the ASYNC device driver to interact with two local craft interfaces. Craft Dialog Task also provides remote craft access through Communications Subsystem. Other interfaces such as OS interfaces and EOC channels are handled by ADMIN Executive Task. These packet oriented interfaces are addressed by virtual channel number and accessed through Communications Subsystem.

The Command Monitor Task provides control of data flow for all commands and responses. Command data is presented to the Command Monitor Task in internal format from the Craft Dialog or Admin Executive Tasks. The Command Monitor sends the command data to the task responsible for its execution and maintains the status of the command until the command executor returns a command completion response. The Command Monitor also provides a single interface for all command response messages. These message are presented to the Command Monitor in internal format and are subsequently passed on to the ADMIN Executive where they are converted to external (TL-1) format and sent to the appropriate external interface.

To prevent uncontrolled volumes of commands from entering the system, Command Monitor provides a means of blocking commands when a maximum has been reached. There are five independent and identical task for command execution within Administration, collectively called the Command Execution Tasks. When all five of these tasks are busy, Command Monitor rejects all other commands. Blocking of commands discontinues when a Command Execution Task becomes free.

The Maintenance Subsystem generates generic autonomous messages and sends these messages to the Administration Subsystem's Autonomous Message Task This task translates these messages into structures understood by Admin Exect Task and sends the translated structures to that task. These messages are then routed to connected ports.

Administration Subsystem sends requests to other subsystems via MTOS mailbox services to perform functions outside the scope of Administration. Requests are sent to Maintenance Subsystem for maintenance control purposes. The interface to Kernel Subsystem is on a more informal level, instead of mailbox messages, Kernel services are accessed by direct function calls. Administration utilizes these services to perform hardware updates, and to store provisioning data in databases.

The following table summarizes all tasks and modules within the Administration Subsystem. The module names marked with an * indicate that several modules may be defined to fulfill all requirements or that variations between products has necessitated separate modules. All tasks are generic and will not require modification from product to product.

as_craft_tsk Craft Dialog Task
as_admexec_tsk Administration Executive Task
as_monitor_tsk Command Monitor Task
as_cexexxxx_tsk Command Execution Tasks
as_auto_1_tsk Autonomous Message Task
as_provupd_tsk Provisioning Update Task
as_contrlol_tsk Control Task
as_init_modl Initialization Module
as_security_modl Security Module
as_syntax_modl Syntax Module
as_semdrive_modl Semantic Driver Module
as_semxxxx_modl Product Specific Semantic Modules
as_formdrive_modl Message Format Driver Module
as_formxxxx_modl Product Specific Message Format Modules
as_provxxxx_modl Product Specific Provisioning Command Modules
as_maintxxx_modl Product Specific Maintenance Command Modules
as_updxxxxx_modl Product Specific Hardware Update Modules Changes to the Administration Subsystem that are required for different product builds are isolated to specific modules as indicated in the above table. These modules separate the generic software that is common to all products from product specific modules which change from product to product. To obtain a convenient mix of functions between products and reduce the amount of repetition within product specific modules, these modules may be small in size and perform only a few functions each.

For example, the as_formxxxx_modl set of modules contain product specific code relating to translating internal data formats to external (TL-1) message format for subsequent output. There is also a generic module, as_formdrive_modl, which contains code relating to output message formatting that is common to all products. It is intended that as_formxxxx_modl be several modules, each of which satisfies a subset of product specific output messages. For a product build, a choice between the various as_formxxxx_modl's that satisfy the needs of that particular product configuration can be made. A similar design philosophy has been used for as_semxxxx_modl and as_semdrive_modl, except that these modules satisfy requirements for input command translation from external (TL-1) format to internal data format.

The remaining set of modules, as_provxxxx_modl, are intended to satisfy the requirements for the Administration Subsystem to handle provisioning related operations commands. The commands allocated to Administration are functionally grouped into different as_provxxxx_modl's to simplify software design and to provide a sufficient mix of modules for different product builds. Note that some as_provxxxx_modl's are likely to be common to all products.

7.1.2 Kernel Subsystem Architecture

The Kernel Subsystem exists for the purpose of providing a common processing environment for software in all other subsystems. As such, Kernel represents the lowest 'layer' of processing in the layered system architecture and insulates software in higher layers from the complexities of managing the processing resources such as the Central Processing Unit (CPU) and system memory. Kernel also absorbs the details of manipulation and control of hardware interfaces to external devices and presents simplified and uniform device control interfaces to higher levels of software. In general, Kernel is considered a 'service layer' in that it provides a number of services to higher layers which reduce or eliminate their dependence upon the physical hardware environment. As a consequence of this, the impact of changes in configuration, or changes in hardware implementation will typically be restricted to the Kernel software which manages the added or changed interfaces.

Table 2 depicts the logical relationship of the Kernel Subsystem to the other software subsystems. Upper software layers which observe the hierarchical relationships established by the layered architecture should be impervious to the effects of changes in the hardware environment.

TABLE 2

| ADMINISTRATION SUBSYSTEM | MAINTENANCE SUBSYSTEM | TEST SUBSYSTEM |
|---|---|---|
| | KERNEL SUBSYSTEM | |
| | hardware devices | |

Table 3 expands the Kernel layer providing more detail with regard to Kernel services.

TABLE 3

| ADMINISTRATION SUBSYSTEM | MAINTENANCE SUBSYSTEM | TEST SUBSYSTEM |
|---|---|---|
| Kernel | Database Services | |
| | MTOS Operating System | |
| | Device Specific Control | |
| | hardware devices | |

The most significant component of Kernel is the MTOS (trademark of Industrial Programming Inc.) real-time operating system. MTOS establishes and manages the run-time virtual software environment in which software entities, referred to as 'tasks', perform their respective processing in apparent concurrency. MTOS manages the sharing of the CPU among the tasks and provides needed services such as intertask communication and coordination, memory allocation and de-allocation, timing services, etc.

Also provided by MTOS is a mechanism for presenting to all tasks, a device independent interface for hardware devices. This device interface utilizes a device specific 'Device Driver' module which controls the hardware device in its unique fashion to perform standard device functions. These standard functions are then made accessible to tasks via the single MTOS services interface. In this way, standard device functions, such as 'read from device' or 'write to device' may be performed on vastly different devices in a manner which is transparent to the requesting task. This facility provides a mechanism for adapting the software to different product configurations. The craft interface and the generic Operations Systems (OS) interfaces will be interfaced via Device Driver modules. This is significant since the OS interface may be carried on either an external, physical communication link, or on a channel which is embedded in a transmission facility. The changes in transport facility will be accommodated within the Device Driver, thereby requiring no changes to the application task which uses the channel for OS communication.

MTOS itself is configurable and will be adapted from one product configuration to another by means of the various configuration parameters and tables as defined in the MTOS installation documentation. Certain extensions and modifications will be made to MTOS in order to provide a software environment which is tailored to the architecture. Timed mailbox services and mailbox/event flag association are examples of such extensions and modifications (respectively).

The MTOS Device Driver mechanism is quite flexible. This, however, comes at the price of high overhead relative to other MTOS services. Consequently, the Device Driver method of device interface will only be used where the flexibility is deemed desirable and affordable (with respect to real-time). This includes interfaces where it is anticipated that variation will occur among product configurations. As cited earlier, the Craft and OS interfaces vary in their transport method and will therefore utilize Device Driver interfaces.

In order to retain the notion of device independence for other hardware interfaces, and/or to restrict the scope of impact when changes occur, hardware interfaces which are not controlled by means of Device Drivers will be controlled by device specific 'Device Control Modules'. These modules will contain collections of procedures (or functions) which drive the interface in the manner which is appropriate for both the device and the software which uses the device. Note that the primary intent of the Device Control Module is not to define a standard interface in the sense of MTOS Device Drivers, but to establish an efficient interface for which the interface software is confined to a single module. Careful design of Device Control Modules will allow Kernel to be adapted to changing product configurations as well as changes in hardware implementation without significant impact upon other subsystems.

Another component of Kernel is the Database Services layer. This component embodies a number of services provided to higher layers for the purpose of managing access to shared data by multiple tasks. This is necessary in order to avoid corruption of data which could occur due to concurrent access. Database Services will present a standard interface (defined herein) to all higher software layers and will guarantee mutually exclusive access to data stored in databases. Databases are simply defined as collections of fixed-length records. Different databases may, however, have different record sizes. Database Services will be configuration independent, requiring no static configuration specific tables or other structures. Instead, ability will be provided to dynamically create databases as required for specific configurations.

The Kernel Subsystem also provides the mechanism for transparent inter-processor communication among co-operating tasks on different physical processing elements. This service is provided transparently to the tasks as an extension of the MTOS mailbox service. This facility involves two generic tasks on each processing element to implement the interprocessor communication protocol, as well as the required, hardware specific, device control modules needed to provide access to the message transmit/receive hardware. The communication protocol will guarantee error free delivery of messages so long as the communication channel is operational. Application tasks must recognize, however, that interprocessor message delivery will incur longer delays than local message delivery. Application tasks must also recognize the possibility that failure of the message channel may make message delivery impossible. In such cases, it is the responsibility of the application task to ensure that handshaking be provided between cooperating tasks where loss of a message may have dire consequences.

Finally, the Kernel Subsystem is responsible for the system initialization sequence which is performed upon application of power or following a hardware or software detected fault or anomaly. Two methods of initialization, or re-start, are recognized by the Kernel: cold-start and warm-start. Cold start is associated with application of power or other hardware initiated reset. Warm-start will occur under software control following a switchover of the active and standby equipment or following a software detected anomaly. In either case, the system must be brought up in an orderly fashion and with minimum impact upon services which may be already operational (particularly following warm-start).

7.1.3 Maintenance Subsystem Architecture

The Maintenance Subsystem (MS) is responsible for those software functions necessary to keep the system in service. These include performance monitoring, detection and isolation of equipment failures, reporting of those failures and if necessary the switchover to alternate components within the system to maintain functionality.

In order to provide for the several members of the new family of transmission products, the maintenance subsystem is architecturally divided into "core" and "configuration specific" modules, with the core modules being common to the entire family of products. The configuration specific modules may be supplemented or modified to meet the requirements of the various members of this new product family.

The following is a brief introduction to the tasks of the subsystem.

ALARM PROCESSING TASK—A core task. The primary communications node within the maintenance subsystem. Processes alarms and autonomous messages. Makes equipment switchover decisions.

INPUT/OUTPUT MAINTENANCE OPERATIONS TASK—A core task. The primary gateway for messages between this subsystem and the other subsystems.

FAULT ANALYSIS TASK—A core task. Responsible for verification and isolation of faults reported by any software subsystem.

PARITY ANALYSIS TASK—A core task. Verification and isolation of parity errors detected on data paths within the hardware system.

HIGH LEVEL RECOVERY TASK—A configuration specific task. Responsible for performing OC1 receiver switching based on failures detected within the MS.

UNICODE TASK—A configuration specific task. Establishes unicode on any facility with a MS detected facility failure.

E2A TASK—A configuration dependant task. Handles E2A alarm scanning and reporting.

DS1 EQUIPMENT TASK—A configuration specific task. Responsible for the maintenance support of all DS1 equipment and facilities.

STS1 EQUIPMENT TASK—A configuration specific task. Responsible for the maintenance support of OC1/STSX1 equipment and facilities.

COMMON EQUIPMENT TASK—A configuration specific task. Monitors the status of system hardware not monitored by other MS tasks.

BACKGROUND TASK—A core task. Continuously monitors the functionality of the control processor and the integrity of the database files.

7.1.4 Test Subsystem Architecture

The Test Subsystem software architecture is partitioned into 4 task types, the Test Input Parser Task; the Test Executive; the Test Communications Task, and the Individual Test Tasks; and 6 modules, the Allocate Resource Manager Module, the Deallocate Resource Manager Module, the Test Control Module, the Test Configuration Module, the Test Communications Module, and the Test Initialization Module. There are mailboxes for the Test Input Parser Task(ts_request_mbx), the Test Communications Task(ts_commun_mbx), and the Individual Test Tasks(ts_test#n_mbx). There are priority queues which are used to maintain any messages being received by the Test Executive Task. They are ts_first_que, ts_second_que, ts_third_que, ts_alloc_que, ts_deal_que, ts_response_que, and the ts_wait_que. The Test Subsystem will be initiated by an initialization module, ts_init_modl. Upon being initialized the Test Subsystem will wait for a test request. Each of the tasks, modules, mailboxes, and queues will be described later in detail along with their required interfaces.

The Test Subsystem is basically generic except for the test tasks, structures, and data variables(tables used by the tasks and modules). The test tasks, associated test task modules, and tables used in the test subsystem will require changes on a per product basis. The Test Input Parser Task, Test Executive, and Test Communications task will remain generic to all products according to Table 4. However, the number of and type of test tasks will vary and change according to the individual test types needed on a per product basis. Example: DTAU test task is for the ADM/TM product, MTAU is a test task for the DLC product. All defined tasks are generic except for individual test tasks. The product will determine which test tasks and which test modules are required. Tables and Queue sizes will be modified per product to fit its testing requirements. Tables associated with each product may have a downloadable parameter to set up the appropriate tables based on the product being used. Also, hardware interfaces will vary on a per product basis and will be described from each products test task. The test task communicates directly with the hardware via device control modules in the Kernel Subsystem. Table 4 depicts the Test Subsystem architecture. It should be noted that test tasks may be located on any processor for execution. The only restriction is when actual hardware interfaces are required for execution of the test task which limits it to a single processing element. This is because these hardware interfaces are only defined within the Kernel Subsystem on that one processing element. Also when synchronization between processing elements is required, subordinate test tasks may be defined on different processing elements with a single controlling test task located on the SNC/DNC.

TABLE 4
TEST SUBSYSTEM ARCHITECTURE

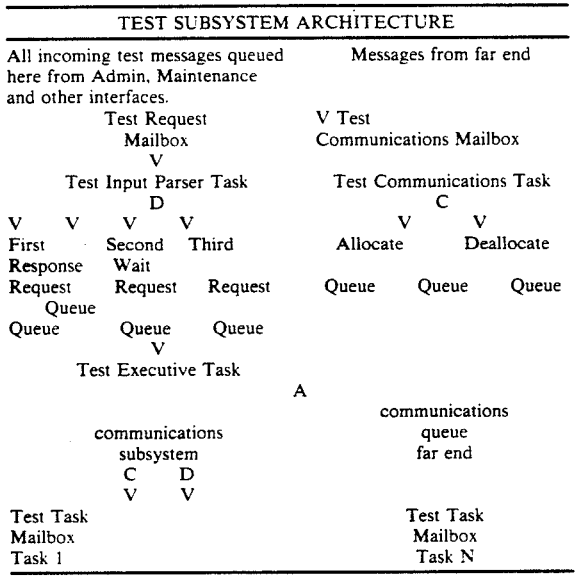

All test tasks respond to the originator of the test request. Then the task places a message on the deallocation queue(B) to deallocate all resources used.

If the test task needs a resource set up on the far end then a message is sent through communications(A).

The following section gives a general description of the mailboxes, queues, and tasks used by the Test Subsystem.

Test Request Mailbox

Each test request is maintained in the system by the test request mailbox. The test requests can be initiated by the Maintenance, Administration, or the Call Handling Subsystem, or other interfaces. The test request mailbox provides a uniform interface to all external subsystems, and is an MTOS mailbox Test Input Parser Task The Test Input Parser Task is responsible for maintaining the test request mailbox and processing the message requests. The test input parser actually receives messages from the test request mailbox and determines which internal priority queue, or mailbox to parse the requests into. (First Request Queue, Second Request Queue, the Third Request Queue, or a particular Test Task Mailbox.) Within this subsystem specification, all internal priority queues are maintained and updated for use by the Test Subsystem whereas mailboxes are implemented via the MTOS operating system.

Internal Priority Queues

All of the following queues are maintained by the Test Executive Task. None of these queues are MTOS mailboxes. The data on the Queues comes from either a Test Task, the Test Input Parser, or the Test Communications Task (a message from the far end.)

Response Queue

This queue contains all responses from the far end to messages sent from the near end to either allocate/deallocate a resource. This queue has the highest priority of all internal priority queues.

Deallocate Request Queue

This queue contains all requests from any in progress test task to deallocate resources which are no longer needed by the test task. This queue also receives requests from the far end via the Test Communications Task to deallocate a resource which the far end was using. This queue has the second priority of all internal priority queues and will be constantly monitored by the Test Executive.

First Request Queue

This queue contains all test requests from external test equipment via the Administration Subsystem. Test requests from the external test equipment have the highest priority of all test requests and are placed on the first request queue. This queue has third priority of all internal priority queue.

Wait Queue

This queue contains all of those test requests which are in the process of being prepared for execution. These are tests which require resources which are unavailable, and have been placed on this queue until the resources become available.

Allocate Request Queue

This queue is an internal priority queue. It contains all requests from any other Test Subsystem (Test Executive far end) via the Test Communications Task requiring a resource to perform a particular test request. This queue has fourth priority of all internal priority queues. This queue handles all levels of priority tasks from the far end.

Second Request Queue

This queue contains test requests having second priority of all test requests This queue has fifth priority of all internal priority queues. It is normally used for craftperson type testing where top priority for execution is not required but the priority should not be at an extremely low priority either, such as background maintenance type tests.

Third Request Queue

This queue contains all test requests having the lowest priority of all test requests including maintenance background (ex: line circuit tests) tests or periodically scheduled tests. This queue has the sixth priority of all internal priority queues.

The Test Executive Task

The Test Executive Task has five software functions.
1. Reading, updating, and maintaining the seven internal priority queues.
2. Allocation and deallocation of resources.
3. Ensuring test requests are processed according to priority.
4. Interface to communications when allocating or deallocating a resource from or to the far end for a particular test request.
5. Sending appropriate test requests to the appropriate task for execution, abortion, or preemption.

The Test Tasks

Test tasks are responsible for performing execution of all test requests. Each task maintains its own local data, its own internal states, as well as any other variables required for performing its test functions. Likewise each test task will check the equipment state of the hardware (equipped, non-equipped, in-service, out-of-service, or standby) and in some cases the state of the hardware being used by the Call Handling Subsystem (busy, idle, etc.). If a test is service affecting, the device being tested must be in an out-of-service state unless otherwise specified. Whenever a test task is executing, the device being tested will be marked by that test task as being in a test state to notify all other external subsystems of the status of the device. This prevents other functions such as background provisioning from reprogramming the device when a test is currently in progress. However, it does place additional requirements on each test task to reprovision a device at test task termination. Reprovisioning will be performed via a request to the administration subsystem.

Each task is required to monitor its messages for task initialization, execution, preemption, or abortion requests from the test executive. If preempted, each test task must be terminated and the test task will be issued again at another time when the resource is available. When an in progress test task requires hardware on the far end, the test task sends a message to the communications subsystem to send a message to the far end for set up. Then the test task waits for the Test Communications Task to place the response message directly into the test task mailbox. At this point, the test task can now execute its test. Upon completing the test, the test task is required to send the appropriate test response or result to the originator. Whenever a processing error is detected within the test task or an invalid sequence of events occur, an appropriate error message will be generated and transmitted to the test requesting subsystem. At termination, the test task is also responsible for termination, the test task is also responsible for placing all resources to deallocated on the deallocation queue. This is done by the test task placing a message on the ts_commun_mbx for the Test Communications Task to place on the deallocation queue. If abort message is received the test task terminates, and places a message on the ts_commun_mbx for the Test Communications Task to place on the deallocation queue.

The Test Tasks have event associated mailboxes. Thus, the test task can receive a message in any state. The test task then can determine what actions need to be taken depending upon the message received in a particular state. The state transitions made in each state are based on every message event received by the task. Every test task will have the same basic states, and all message events for all test tasks will be handled appropriately by all of the test tasks written.

Table 5 is a list of required states and event messages used by all test tasks.

TABLE 5

| States | Message Events | State Descriptions |
| --- | --- | --- |
| Idle | None | Inactive Test Task. |
| Init | Init | Initialize Test Task. |
| Execute | Execute | Test mode, Test inprogress. |
| Complete | Complete | Test finished, clean up. |
| Abort | Abort | Test terminated. |
| Preempt test for | Preempt | Terminated inprogress execution later. |

In Table 5 above, the events are really messages placed on an event associated mailbox. Below is a description of these events.

Execute—The activate event can be made up of several different types of event messages all to execute a particular test.

Init—The init event causes the test task to perform initialization needed in order for the test to run.

Complete—The complete event should only be generated internally by the test task when the test is finished.

Abort—An event which causes whatever the test task is doing to stop, clean up the test and return to an idle state.

Preempt—An event which causes whatever the test task is doing to stop, clean up and the test will be run again later.

Note: Before execution of tests, a test task at initialization must first verify that the device/entity being tested is in an out-of-service state. If not and the test is service affecting, then an appropriate error message will be generated and transmitted back to the test requesting subsystem.

The Test Communications Mailbox

The Telecommunications Mailbox receives messages from the far end Test Subsystem via the Communications Subsystem for deallocation/allocation of resources, or responses to messages sent from the near end to the far end. This mailbox also receives messages to deallocate resources from local test tasks.

The Test Communications Task

The Test Communications Task is responsible for reading the communications mailbox, and parsing the messages to the appropriate queue (Response queue, Deallocate queue, Allocate queue, or the appropriate Test Task mailbox).

7.2 System Commands

The commands used for the FTS-150 are based on the requirements from Bellcore. The details of the commands provided for the FTS-150 may be found in the "Fiber Optic Transmission System 155.52 (FTS=150) Commands and Message Manual" (ALCL 365-920-200).

8.0 OPTIC CARRIER MODULE, FTS150 (OCM3)

The OCM3 (625101) is a ¼ shelf wide module with backplane and houses the plugin units. The OCM3 is connectorized and can be withdrawn from the subframe, in-service, for access to the I/O panel mounted in the rear of the subframe. This arrangement provides front access installation and in-service maintenance.

8.1 Backplane and I/O Signals

The FTS150 backplane is a multi-layer printed circuit board and provides interconnections and power distribution for a 1:1 configuration using the following plug-in units: (See FIG. 8.1).

| UNIT NUMBER | QUANTITY | CONNECTOR TYPE | J |
| --- | --- | --- | --- |
| LSIF101-104 | 2 | 96 DIN | J1,J2, J7,J8 |
| ALC101 | 1 | 128 HDI | J3,J9 |
| FTR101 | 2 | 96 DIN | J4,J5 |
| CLK101 | 2 | 128 HDI | J6,J12 |
| PSE101 | 1 | 96 DIN WW | J10 |
| COA101 | 1 | 128 HDI | J11 |
| PWR401 | 2 | 40 PIN EDGE | J13,J18 |
| SMI101 | 2 | 44 PIN EDGE | J14,J16 |

The backplane is completely connectorized except for power and ground connections which are made via terminal blocks.

Damage to plugin units or the system by inserting a unit in the wrong position is avoided by different connector location, different size connector, mechanical keying, or choice of power pins.

8.1.1 Input/Output

Six terminals blocks are located in the lower section of the backplane. Connections to −48 volts, −48 return, signal ground and frame ground are made via these terminal blocks.

Each −48 volt power supply (PWR401) input is connected to FAP via the I/O Panel. Separate 3A fuses are provided at the FAP for each supply. Signal Ground (SGND) and the −48 volt returns also are connected to the FAP. Frame Ground (FGND) will be connected to the frame.

8.1.2 Headers

External connections from the Craft/Orderwire/Alarm and Sync/Maintenance Interface PBAs (Office Module (MM) connections) are provided via three 34 pin ribbon cable headers (J15, J17, J19) located at the lower section of the backplane. The ribbon cables are routed to a distribution panel that allows the customer front access via a wire wrap field. The following are pin numbers and signal name of each header. All signals are AC differential except FANALM.

| | | CONNECTOR J15 | |
|---|---|---|---|
| PIN NUMBER | SIGNAL NAME | FUNCTION | TO/FROM |
| 1 | XOW2RXT | EXPRESS OW RXTIP | TO I/O PBA |
| 2 | XOW2RXF | EXPRESS OW RXRING | TO I/O PBA |
| 3 | XOW2TXT | EXPRESS OW TXTIP | TO I/O PBA |
| 4 | XOW2TXF | EXPRESS OW TXRING | TO I/O PBA |
| 5 | SGND | SGND | SGND |
| 6 | SGND | SGND | SGND |
| 7 | XOW1RXT | LOCAL OW RXTIP | TO I/O PBA |
| 8 | XOW1RXF | LOCAL OW RXRING | TO I/O PBA |
| 9 | XOW1TXT | LOCAL OW TXTIP | TO I/O PBA |
| 10 | XOW1TXF | LOCAL OW TXRING | TO I/O PBA |
| 11 | SGND | SGND | SGND |
| 12 | SGND | SGND | SGND |
| 13 | NC | | |
| 14 | FANALM | ALARM FOR FAN | TO I/O PBA |
| 15 | NC | | |
| 16 | NC | | |
| 17 | SGND | SGND | SGND |
| 18 | SGND | SGND | SGND |
| 19 | TXDSTIPA3 | DS1 TXTIP NE2 | TO I/O PBA |
| 20 | TXDSRNGA3 | DS1 TXRING NE2 | TO I/O PBA |
| 21 | RXDSTIPA3 | DS1 RXTIP NE2 | TO I/O PBA |
| 22 | RXDSRNGA3 | DS1 RXRING NE2 | TO I/O PBA |
| 23 | SGND | SGND | SGND |
| 24 | SGND | SGND | SGND |
| 25 | TXDSTIPA2 | DS1 TXTIP MAINT/NE1 | TO I/O PBA |
| 26 | TXDSRNGA2 | DS1 TXRING MAINT/NE1 | TO I/O PBA |
| 27 | RXDSTIPA2 | DS1 RXTIP MAINT/NE1 | TO I/O PBA |
| 28 | RXDSRNGA2 | DSQ RXRING MAINT/NE1 | TO I/O PBA |
| 29 | SGND | SGND | SGND |
| 30 | SGND | SGND | SGND |
| 31 | TXDSTIPA1 | SYNCL 1.544Mbs | TO I/O PBA |
| 32 | TXDSRNGA1 | SYNCL 1.544Mbs | TO I/O PBA |
| 33 | RXDSTIPA1 | SYNCL 1.544Mbs | TO I/O PBA |
| 34 | RXDSRNGA1 | SYNCL 1.544Mbs | TO I/O PBA |

Alarms, Orderwire, 1.544 Mbs Bits, and Maintenance

| | | CONNECTOR J17 | |
|---|---|---|---|
| PIN NUMBER | SIGNAL NAME | FUNCTION | TO/FROM |
| 1 | ACOIT | EXTERNAL ACO | TO I/O PBA |
| 2 | ACOIF | EXTERNAL ACO | TO I/O PBA |
| 3 | NCPRSIT | EXTERNAL RESET ALC101 | TO I/O PBA |
| 4 | NCPRSIF | EXTERNAL RESET ALC101 | TO I/O PBA |
| 5 | SGND | SGND | SGND |
| 6 | SGND | SGND | SGND |
| 7-10 | NC | | |
| 11 | SGND | SGND | SGND |
| 12 | SGND | SGND | SGND |
| 13-16 | NC | | |
| 17 | SGND | SGND | SGND |
| 18 | SGND | SGND | SGND |
| 19 | TXDSTIPB3 | DS1 TXTIP NE4 | TO I/O PBA |
| 20 | TXDSRNGB3 | DS1 TXRING NE4 | TO I/O PBA |
| 21 | RXDSTIPB3 | DS1 RXTIP NE4 | TO I/O PBA |
| 22 | RXDSRNGB3 | DS1 RXRING NE4 | TO I/O PBA |
| 23 | SGND | SGND | SGND |
| 24 | SGND | SGND | SGND |
| 25 | TXDSTIPB2 | DS1 TXTIP NE3 | TO I/O PBA |
| 26 | TXDSRNGB2 | DS1 TXRING NE3 | TO I/O PBA |
| 27 | RXDSTIPB2 | DS1 RXTIP NE3 | TO I/O PBA |
| 28 | RXDSRNGB2 | DS1 RXRING NE3 | TO I/O PBA |
| 29 | SGND | SGND | SGND |
| 30 | SGND | SGND | SGND |
| 31 | TXDSTIPB1 | SYNCR 1.544Mbs | TO I/O PBA |
| 32 | TXDSRNGB1 | SYNCR 1.544Mbs | TO I/O PBA |
| 33 | RXDSTIPB1 | SYNCR 1.544Mbs | TO I/O PBA |

-continued

CONNECTOR J17

| PIN NUMBER | SIGNAL NAME | FUNCTION | TO/FROM |
|---|---|---|---|
| 34 | RXDSRNGB1 | SYNCR 1.544Mbs | TO I/O PBA |

The DS1 signals and the SYNCR signals are AC differential.

| | | CONNECTOR J19 | |
|---|---|---|---|
| PIN NUMBER | SIGNAL NAME | FUNCTION | TO/FROM |
| 1 | XCR2DCDF | CRAFT PORT | TO I/O PBA |
| 2 | XCR2DCDT | CRAFT PORT | TO I/O PBA |
| 3 | XCR2DSRF | CRAFT PORT | TO I/O PBA |
| 4 | XCR2DSRT | CRAFT PORT | TO I/O PBA |
| 5 | XCR2CTSF | CRAFT PORT | TO I/O PBA |
| 6 | XCR2CTST | CRAFT PORT | TO I/O PBA |
| 7 | XCR2RXDF | CRAFT PORT | TO I/O PBA |
| 8 | XCR2RXDT | CRAFT PORT | TO I/O PBA |
| 9 | XCR2DTRF | CRAFT PORT | TO I/O PBA |
| 10 | XCR2DTRF | CRAFT PORT | TO I/O PBA |
| 11 | XCR2RTSF | CRAFT PORT | TO I/O PBA |
| 12 | XCR2RTST | CRAFT PORT | TO I/O PBA |
| 13 | XCR2TXDF | CRAFT PORT | TO I/O PBA |
| 14 | XCR2TXDT | CRAFT PORT | TO I/O PBA |
| 15 | XCR2OPTF | CRAFT PORT | TO I/O PBA |
| 16 | XCR2OPTT | CRAFT PORT | TO I/O PBA |
| 17 | MINAUALM | MINOR AUDIBLE ALARM | TO I/O PBA |
| 18 | MINVIALM | MINOR VISUAL ALARM | TO I/O PBA |
| 19 | MAJAUALM | MAJOR AUDIBLE ALARM | TO I/O PBA |
| 20 | MAJVIALM | MAJOR VISUAL ALARM | TO I/O PBA |
| 21 | CRIAUALM | CRITICAL AUDIBLE ALARM | TO I/O PBA |
| 22 | CRIVIALM | CRITICAL VISUAL ALARM | TO I/O PBA |
| 23 | ALARMID | ALM ID MULTIPLED E2A | TO I/O PBA |
| 24 | SGND | SIGNAL GROUND    SGND | |
| 25 | SGND | SIGNAL GROUND    SGND | |
| 26 | SET1RET | OFFICE ALM GND RETURN | TO I/O PBA |
| 27 | SET2RET | E2A GND RETURN | TO I/O PBA |
| 28 | ALMID2 | ACO DISBLE AUD ALMS | TO I/O PBA |
| 29-34 | SGND | SIGNAL GROUND | TO I/O PBA |

The Craft Port Signals are RS-232 compatible. The Craft Port may be configured as a second craft port or configured to provide a serial E2A interface (Refer to 625212-000-001).

The critical alarms (audible and visual) are from relay contacts. All other alarm signal interfaces are opto-coupler (MOSFET).

The orderwire signals are four wire analog 600 ohm balanced signals.

8.1.3 OC3 Optic Interface

Each FTS150 Transceiver (FTR101) PBA will have an optic transmitter output and a optic receiver input both operating at the OC-3 rate. These interfaces carry 3 multiplexed STS-1 signals.

The optic interface is on the front of the FTR101 plugin unit and consists of an FC/PC connector into single mode fiber. A biconic connector interface is optional via an adapter cable.

8.1.4 DS3/STS-1 Inputs and Outputs

The DS3 and STS-1 transmission interfaces are provided via a coax connector panel on each side of the subframe. Special small diameter coax cables connect the backplane signals to the coax connector panels. FTS150 will accommodate up to three DSX-3 inputs and outputs (44.736 Mb/s) or up to three STSX-1 inputs and outputs (51.84 Mb/s). Combinations of DS3 and STS-1 are provided by the use of the LSIF3 and LSIF4 units.

8.2 OCM3 INFRASTRUCTURE AND PHYSICAL EQUIPMENT

The OCM3 is ¼ shelf wide by 13 inch (8 RU) high. The layout is as shown in FIG. 8.2. The rack may be equipped with baffles and/or fans as required for thermal control. A subframe is required to mount the OCM3 and its associated I/O panel.

Four OCM3 may be mounted in one subframe.

Each OCM3 requires one I/O panel.

One set of coax connector panels serves one subframe (four OCM3).

9.0 Environmental

The FTS150 system is designed to operate over the temperature range of −40 to +65 deg. C. However, because of limitations of the transmitter laser, some output power degradation may occur at temperatures below −20 deg. C. A reduced span length of 25 km is recommended for applications at low temperatures.

TECHNICAL DESCRIPTION FTM1 PBA;
625214-000

1. Scope

This document details the Technical Description of the FTM1 PBA which provides the medium power optical interface for the Terminal Multiplexer (TM) and Add-Drop Multiplexer (ADM) systems.

2. Overview

Figure 10B:
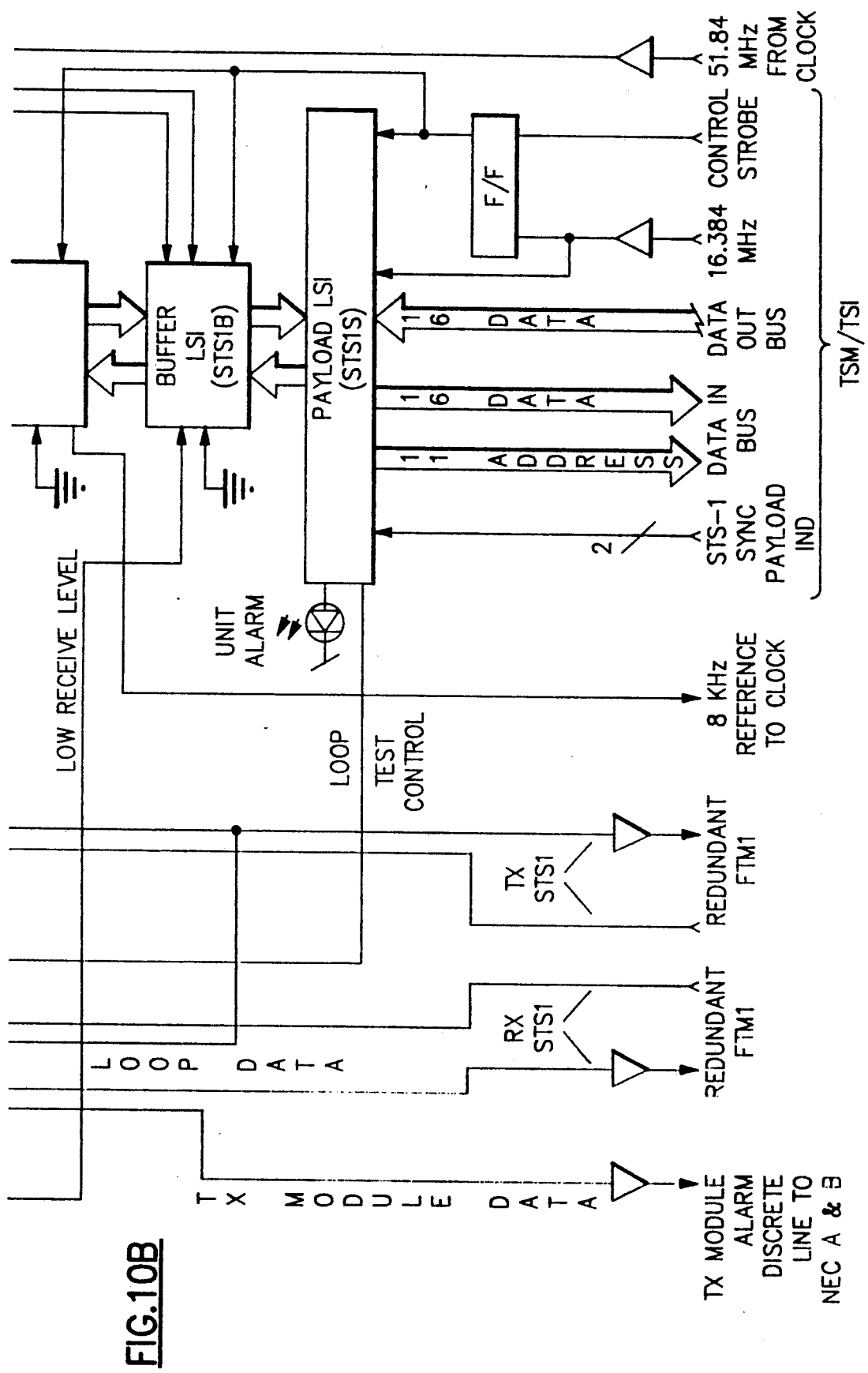

FIG. 10 shows a block diagram of the FTM1 PBA. It represents a conceptual implementation of the required functions. This unit interfaces an encoded 51.84 MHz, scrambled, optic signal. The unit recovers clock and retimes the data. The data are decoded in the unit and are fed to the TSM/TSI PBA along with an address. The output portion accepts data from the TSM/TSI PBA and develops an optical compatible signal. Provision is made for looping the transmit data to the input of the clock recovery and data retimer.

Figure 11:
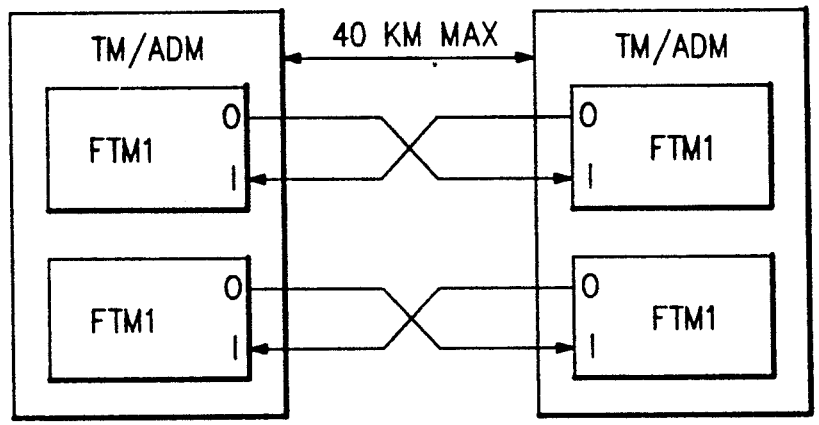
FIG. 11 is a diagrammatic representation showing use of the fiber optics transceiver in a TM/ADM application.

FIG. 11 shows a diagram of the TM/ADM application of this PBA.

2. TABLE OF ABBREVIATIONS

ADM: Add-Drop Multiplexer
CMOS: Complimentary Metal Oxide Semiconductor
DS0: Digital Signal, level 0
DS1: Digital Signal, level 1
FWHM: Full Width, Half Maximum
HDI: High Density Input
MUX: Multiplexer
NCP: Network Control Processor
PBA: Printed Board Assembly
RX: Receive
SONET: Synchronous Optical Network
STS-1: Synchronous Transmission Signal - 1
TSI: Time Slot Interchanger
TSM: Time Slot MUX
TM: Terminal Multiplexer
TX: Transmit
VT: Virtual Tributary

5. Detailed Description

5.1 Input Data Path

In this direction, the receive clock is recovered, the serial data is processed, converted to a parallel bus, and sent to the TSM/TSI PBA.

5 1.1 Optic Receiver

The Optic Receiver module (600019-422-001) provides the function of converting the light energy from the fiber into a digital ECL signal.

The receiver provides an status signal which is low if the power of the incoming signal is less than a preset value. The STS1B ASIC monitors this signal. The STS1B ASIC reports the status of this signal to the NCP via the STS1S ASIC and the VI channel.

5.1.2 ECL-CMOS Translation Circuit

The ECL output of the Optic Receiver must be translated to CMOS logic levels. The differential outputs of the Optic Receiver are wired to a 10H125 ECL-TTL IC. The output of this gate is converted to CMOS levels by using a 74ACT244 gate.

5.1.3 INPUT MUX

Figure 12:
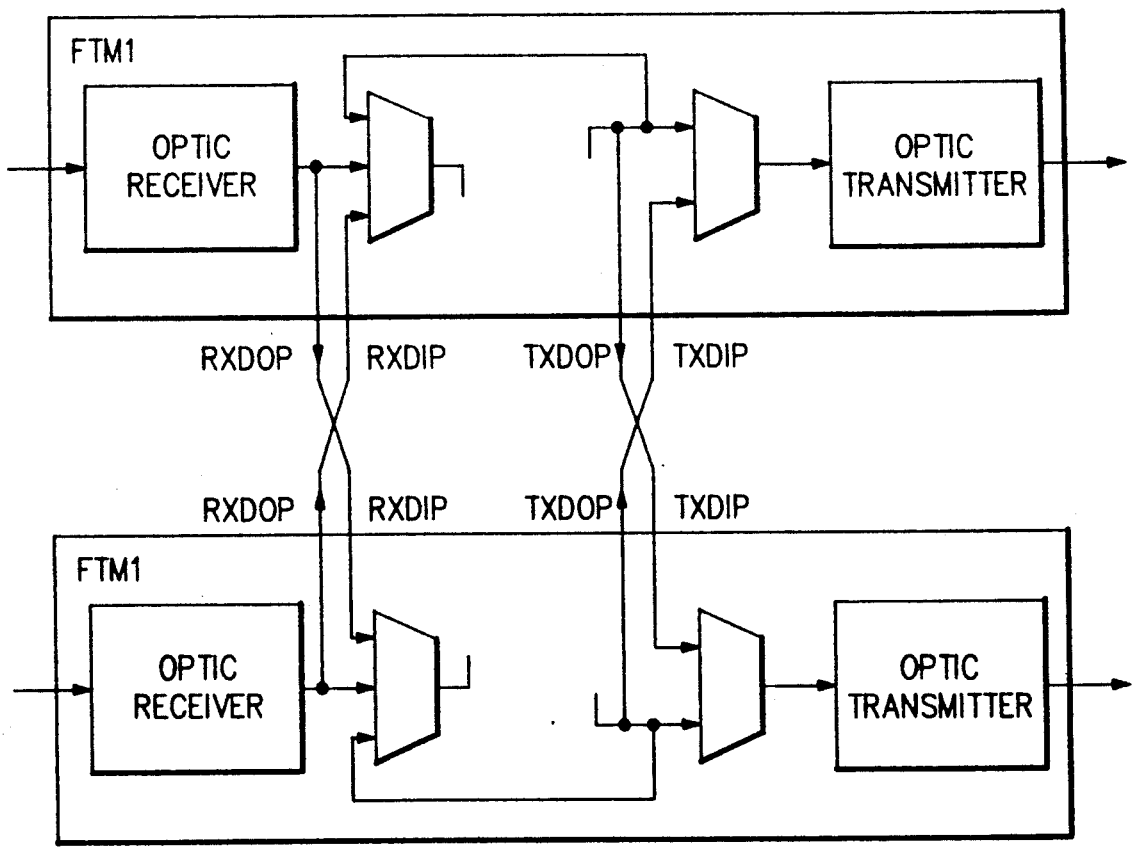
FIG. 12 is a diagrammatic representation of a multiplexer interconnection of the fiber optics transceiver in a redundant interconnection.

The data sent to the PLL and the STS1I ASIC is determined by a MUX. The MUX, U2, is controlled by the MUX Control circuit. It has three inputs from which to choose: the translated output of the Optic Receiver, the translated output of the receiver on the redundant FTM1, and the data being sent to the Optic Transmitter. FIG. 12 shows how two redundant FTM1 PBAs are interconnected. For normal operation, the output of the Optic Receiver is selected. In redundant operation, the output of the receiver on the redundant PBA is chosen. For in-system testing, the data normally sent to the Optic Transmitter is looped back to the STS1I ASIC. The output of the RX MUX is converted to an ECL signal by a 10H124 gate.

5.1.4 PLL Phase Detector

The phase detector senses the alignment of the incoming data to the recovered clock. The data from the input MUX is delayed 10 ns by DL1. The input and output of DL1 are ANDed using a 10H104 gate. The output of the gate will be a nominal 10 ns pulse for each positive transition of the data.

This pulse is gated with the recovered clock using the gates of U24. In a locked state, the pulse widths of the two outputs of the phase detector are equal.

5.1.5 PLL Filter

The filter integrates the two output pulses from the phase detector. If the two pulses are of equal width, the PLL is in lock and the output of the filter does not change. If the two pulses are not the same width, the filter will integrate the difference over time and change its output in such a way that causes the VCO to readjust its output to cause the two pulses to be equal width.

5.1.6 PLL VCO

The VCO is based around a MC1648 VCO IC which has an ECL output.

The oscillator output is used to retime the data using the flip-flop of U26, provide the reference to the phase detector, and clock the STS1I ASIC.

5.1.7 Sweep Circuit

In order to assist the PLL to acquire frequency and phase lock on the incoming data, a Sweep circuit is used. The bandwidth of the PLL is to narrow to acquire lock on its own. Two comparators detect when the VCO modulation voltage is out of range. When the output of one of the comparators goes high, it removes the reset signal to a 555 timer wired a an astable multivibrator. The timer output is the input to an integrator which produces a ramp when the timer changes state. This ramp is combined with the VCO modulation voltage to bring the input to the VCO back into a range where lock can be achieved. When enabled, the 555 timers oscillate at approximately 3 Hz.

5.1.8 STS1I ASIC

The retimed data and the recovered clock are fed to the STS1I ASIC. In this application the ASIC is optioned as follows:

1. No B3ZS Encoding/Decoding
2. Scrambling/Descrambling
3. B1 & B2 Processing
4. Frame Sync (RX side)
5. Payload Pointer Processing (RX side)
6. No RX Elastic Store (6 MHZ Output Data)
7. Rob Overhead Bytes for Status (RX side)

Input B3ZSON is held at a low logic level which disables B3ZS decoding of the incoming data and enables the scrambler and descrambler circuits in the ASIC. The STSPDI input represents the positive pulse data from the fiber link.

Input SCRON is held at a logic high level which enables the scrambler/descrambler. After descrambling, the data is converted from a serial bit stream to an 8-bit parallel set of signals.

The data is byte aligned and frame synchronized. The BIP-8 errors for B1 and B2 are accumulated. These counts are regularly reported to the system controller. The H1/H2 payload pointer is processed to locate the floating payload.

After overhead processing is completed, the parallel data with payload indicator, overhead indicator, and composite sync are sent to the STS1B ASIC.

5.1.9 STS1B ASIC

The STS1B ASIC is the buffer between the STS1I ASIC and the STS1S ASIC.

Data from the STS1I ASIC go into an elastic store which is used to remove wander and jitter, and to speed change the data coming in at 6.48 mHz to the 8.192 mHz bus to the STS1S ASIC.

The BIP-8 errors for B3 are accumulated in this ASIC. The count value is regularly sent to the system controller. It also monitors the incoming G1 byte and accumulates an error count which is regularly reported to the system controller.

The RX counter generates the addressing for the received data and inserts gaps at certain locations to convert from 810 bytes per frame to 1024 bytes per frame. See Table 6.

The received data and the status bytes are MUXed onto the eight-bit wide bus to the STS1S ASIC.

TABLE 6

| | | | | FIVE BIT COLUMN ADDRESS | | | |
|---|---|---|---|---|---|---|---|
| | | 28 | 29 | 30 | 0 | 1 | 2 | ...27 |
| FIVE | 24 | O | O | O | to0 | TP1 | TP2 | ---TP27 |
| BIT | 25 | V | V | V | POH0 | POH1 | POH2 | ---POH27 |
| ROW | 26 | E | E | E | SG0 | SG1 | SG2 | ---SG27 |
| AD- | 0 | R | R | R | B0,0 | B1,0 | B2,0 | ---B27,0 |
| DRESS | 1 | H | H | H | B0,1 | B1,1 | B2,1 | ---B27,1 |
| | . | E | E | E | . | . | . | . |
| | . | A | A | A | . | . | . | . |
| | . | D | D | D | . | . | . | . |
| | 23 | | | | B0,23 | B1,23 | B2,23 | ---B27,23 |

EACH COLUMN WITH A VTX CORRESPONDS TO A DS1. EACH BYTE CORRESPONDS TO A DS0 IN THE DS1. FTM1 TO TSM/TSI ADDRESSING

5.1.10 STS1S ASIC

The STS1S ASIC is the interface of the STT1 PBA to the TSM/TSI PBA. The major functions of this ASIC in the receive direction are as follows:
1. Address generation for the parallel TSM/TSI data.
2. Storage of the status information and sending it to the system controller in the VI channel format.
3. Reformatting the SONET formatted signaling data into the TSM/TSI parallel signaling format.
4. UNICODE signaling pattern generation.
5. Parity bit generation for receive parallel data to the TSM/TSI.

5.2 Output Data Path

In this direction, the parallel data from the TSM/TSI PBA is reformatted, converted to a serial, scrambled, optic bit stream, and transmitted via the Optic Transmitter.

5.2.1 STS1S ASIC

The major functions of the STS1S ASIC for output data are as follows:
1. Decoding of a received VI channel for provisioning information and storage.
2. Parity bit check for transmit parallel data coming from the TSM/TSI PBA.
3. Reformatting the TSM/TSI parallel signaling data format to the SONET signaling format.
4. Bit or byte synchronized tributary indicator bit generation to indicate the frame bits which will be delayed.

5.2.2 STS1B ASIC

The STS1B ASIC provides the following major functions on the data received from the STS1S ASIC.
1. Generate the B3 byte for the transmitted data and MUX it in its proper location.
2. Align the Frame bit for the transmitted data and MUX it in its proper location.

The data from the STS1S ASIC is retimed with the overhead and payload sync pulses.

The value for the B3 byte is calculated and placed in its proper location to the STS1I ASIC.

5.2.3 STS1I ASIC

The STS1I ASIC accepts the data from the STS1B ASIC and reformats it to be accepted by the Optic Transmitter. It performs the following major functions.

1. TX Elastic store 8 mHz gapped (8 words)
2. Payload pointer processing

The eight-bit parallel data is received from the STS1B ASIC with the appropriate sync signals. The data is placed in an elastic store for speed change buffering from 8.192 mHz to 6.48 mHz.

The parallel data and sync information is processed. The overhead sync is determined. A new H1/H2 payload pointer is derived. Then the BIP-8 calculations for B1 and B2 are performed. The data is then scrambled and output two bits at a time.

5.2.4 Output Shift Register

The data from the STS1I ASIC is loaded into a shift register, which is used as a two-bit shift register. The PDO1 and PDO2 signals represent the bits to be encoded into serial data. The serialized data is buffered and sent to the Input MUX and the Output MUX.

5.2.5 Output MUX

The data sent to the Optic Transmitter is selected by a MUX, U19 (see sheet 5 of the schematic). The selection is controlled by the MUX Control circuit. The MUX has two inputs from which to choose: the serial output from the STS1I ASIC, and the serial output from the redundant FTM1 PBA. FIG. 12 shows how two redundant FTM1 PBAs are interconnected. For normal operation, the output from the STS1I is selected. In redundant operation, the output from the redundant PBA is selected.

5.2.6 Transmit ECL Translation

The TX MUX output is converted to an ECL signal using a 10H124 gate.

5.2.7 Optic Transmitter

The Optic Transmitter converts the logic signal for the data to an optic signal. For details of its operation, see the specification for 600018-422.

When DI is low and DREF is high, the laser is turned ON. When DI is high and DREF is low, the laser is turned OFF.

The transmitter provides different alarm signals, depending on the vendor being used. One vendor provides High Bias Current and Low Output alarms. Another vendor only provides a Loss of Output Modulation alarm. HBICUR* is low if the internal bias current exceeds a preset value. LOWOUT* is low if the power of the optic output is less than a preset value. The Loss of Modulation alarm is low if the laser is ON or OFF for a period exceeding the preset limit. OPTALM* is low if any one of the other three alarms is low.

The three alarms from the optic transmitter module are monitored by the STS1B ASIC which reports their status to the NCP via the STS1S ASIC and the VI channel. OPTALM* is reported directly to the NCP.

For test purposes and short spans, there is a resistor network and a DIP switch to control the optic output power. When used with short loops, the output power may exceed the input overload power of the receiver. Putting the switch in the ON position lowers the output power to allow proper operation with short loops of fiber. It also indicates to the system software via the VI channel that the transmitter is in a low power mode of operation.

5.3 Power-ON Reset

A power-on reset circuit assures that the STS1B and the MUX control circuits are properly initialized following the application of power. When power is applied, capacitor C58 is charged through resistor R32. While the voltage on C12 is below the threshold of the U14 Schmitt-trigger gate, the reset signal, RS*, is low.

When the voltage on C12 exceeds the gate threshold, RS* becomes high. The result is that RS* remains low for approximately 500 ms after the application of power.

Resistor R28 provides a discharge path for C12 when power is removed. Diode CR5 provides a low impedance discharge path if the power bus becomes ground.

Resistor R46 is provided for PBA testing. Grounding pin P1B 15 on the backplane connector will cause RS* to go low.

5.4 MUX Control

The Input MUX and the Output MUX controls are provided by an EP610 EPLD. This EPLD is configured as four state machines. Each has four flip-flops for a total of sixteen states. The FTM1 PBA uses one of these state machines to control the Input MUX and another to control the Output MUX. The two remaining state machines are used for test purposes.

Figure 13:
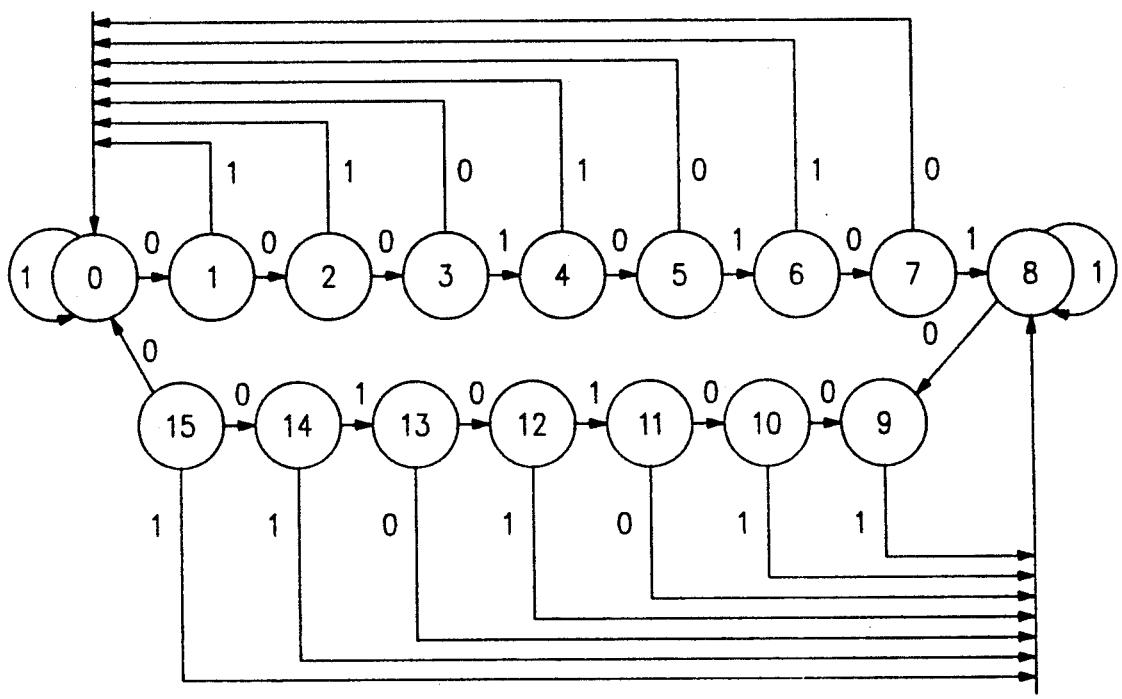
FIG. 13 illustrates the control state machine for the fiber optics transceiver in conjunction with MUX control.

The state machine recognizes the reception of a sequence of bits from the COA PBA which also provides the clock. A representation of the MUX control state machine is shown in FIG. 13. The test state machine is similar.

The standard bit sequence is ten bits long, accompanied by a clock for each data bit. The first two bits are an initializing prefix of 11. The remaining eight bits indicate whether the MUX control or the test state machine is being addressed, and whether the state machine output is being made high or low.

```
1100010101→Control output high

1100010100→Control output low

1100100101→Test output high

1100100100→Test output low
```

When the control output for the Input MUX is high, the data from the optic receiver is selected. When it is low, the data from the redundant FTM1 PBA is selected.

When the control output for the Output MUX is high, the data from the STS1I ASIC is selected. When it is low, the data from the redundant FTM1 PBA is selected.

The control outputs are exclusive-ORed with their corresponding Test outputs to form two status signals. These status signals indicate to the NCP the state of the MUX control logic. In the normal case, the Test outputs are low. When a control output is high, the status output is low. When a test output is set high, the status indication is inverted.

The state machine outputs are low for States 0 through 7, and are high for States 8 through 15. A reset input is provided to insure that the state machine starts in State 0 following the application of power to the PBA. A test input is provided which will cause all the flip-flops to be set (State 15) when it is high in the presence of a clock.

5.5 8 KHZ Reference

The STS1I ASIC derives an 8 Khz reference clock from the 51.84 Mhz recovered clock. This reference clock is buffered to a pin on the backplane connector. In a TM/ADM system this clock is used as a reference to develop the system clocks.

5.6 Parallel Bus Interface

The interface to the TSM/TSI PBA is via a parallel bus. The FTM1 PBA provides sixteen data signals and eleven address signals. The TSM/TSI PBA provides sixteen data signals, two timing strobes, and a clock. The timing for the bus is shown in FIG. 14.

The sixteen data signals and the eleven address signals output to the TSM/TSI PBA are provided directly by the STS1S ASIC. The data bus has the formats shown in FIG. 15 depending on the time slot on the bus. The address signals are capable of providing 1024 addresses. The eleventh address bit is actually an indicator which is high when the address on the bus is invalid.

The inputs from the TSM/TSI PBA have pullup resistors to terminate the signals when the TSM/TSI is not present, and series resistors to protect the CMOS STS1S ASIC from potential latch-up currents. These currents can exist when the TSM/TSI PBA is powered and connected to the FTM1 PBA via the ribbon cable, while the FTM1 PBA is not powered.

Because of tight timing constraints that the STS1S ASIC cannot meet, the CSTB signal is clocked by a 74AC74 flip-flop. The result is used as an indicator to the STS1S ASIC when data is valid on the bus, and is used by the STS1B and STS1I ASICs as an 8 mHz clock.

The 16.384 mHZ clock from the TSM/TSI PBA is terminated and buffered before being used by the FTM1 PBA.

5.7 LED

An LED is provided for system determined indications. The intent is for this LED to be on during failure conditions to assist the craftsperson in locating a failed PBA. The state of the LED is controlled by provisioning of the STS1S ASIC from the system controller. A test pin is provided to allow the LED to be turned ON by grounding the pin.

5.8 Power Supply Load Sense

Two pins on the HDI connector are shorted in order to provide an indication to the system power supply that the PBA is inserted.

5.9 HDI Backplane Connector

The FTM1 PBA uses a 128 pin High Density Interface (HDI) connector to plug into the TM/ADM backplane (see sheets 2, 5, 6 and 9 of the schematic). Table 7 shows the signal assignment to the pins of the connector.

5.10 Ribbon Cable Connector

A ribbon cable is used to connect the FTM1 PBA to the TSM/TSI PBA. Table 8 shows the signal assignment to the pins of the ribbon cable connector.

6 Hardware/Software Interface

The following is a summary of the hardware/software interface for the FTM1 PBA. Only the STS1S ASIC is provisionable by software. The STS1I, STS1B, and STS1S ASICs provide status information. This information is taken from the specification for the STS1S ASIC.

Provisioning and status reporting is provided by using the VI control channel. Information from the NCP via the TSM/TSI is accepted when the V bit is set and the parity bit in the word is valid. The VI channel has a five-bit address which provides for 32 directly addressable registers.

6.1 Provisioning

6.1.1 Reflection Byte (Address 0)

The NCP sends this byte as a communications test. The byte is returned as a status byte.

6.1.2 Transmit Signal Level C2 (Address 1)

The value to be transmitted is provisionable via this register. This byte is used to indicate the construction of the STS payload.

6.1.3 APS Control K1 and K2 (Addresses 2 and 3)

The values to be transmitted are provisionable via these registers. These two bytes control Automatic Protection Switching between Line level entities.

6.1.4 Test and Alarm Control (Address 4)

D7 controls the Looptest. If this bit is set to a one, the looptest function is enabled.

D6 controls the Unit Alarm LED. The LED is on when this bit is a one.

D4 resets the parity error flag. If a VI word is received with a parity error, the parity error flag is set in the status. It stays set until this control bit resets it. Following a reset, the control bit must be returned to a zero value to enable detection of subsequent parity errors.

D3 controls the generation of the H4 byte for transmission. It is a one for TM applications to enable local generation, and is zero for ADM applications.

D2 is the transmit path yellow indicator. It is placed in the bit 5 location of the transmitted G1 byte.

D1 disables automatic UNICODE generation by the hardware if an alarm condition is detected by the hardware. It is a one to disable and a zero to enable.

D0 is not used at the writing of this document.

6.1.5 Unused Addresses (Addresses 5-15)

At the writing of this document, these addresses are not used.

6.1.6 Channel Map Memory (Add/Drop Map) (Addresses 16-27)

These twelve registers are used to address, 4 bits at a time, a 672 bit RAM that provisions ABCD signaling for each DS0 to be through path (signaling left intact) or add path (signaling is overwritten by signaling from the previous DS0 data).

Each byte of control consists of four bits of data (D4-D7) and four bits of extended address (D0-D3). Along with the VI address, this provides an addressing scheme for 16×12 (192) 4-bit nibbles. The VI address selects one of the 12, and the extended address selects one of the 16. The encoding of the address to the channel number is shown in Table 9. In the table, channel number corresponds to a DS0 number (0-23) in a VT.

Three bits of the VI address (A1-A3) indicate six groups of four channels (DS0s).

| VI ADDR BITS | | | VI DATA BITS | | | |
|---|---|---|---|---|---|---|
| A3 | A2 | A1 | D7 | D6 | D5 | D4 |
| 0 | 0 | 0 | 3 | 2 | 1 | 0 |
| 0 | 0 | 1 | 7 | 6 | 5 | 4 |
| 0 | 1 | 0 | 11 | 10 | 9 | 8 |
| 0 | 1 | 1 | 15 | 14 | 13 | 12 |
| 1 | 0 | 0 | 19 | 18 | 17 | 16 |
| 1 | 0 | 1 | 23 | 22 | 21 | 20 |

VTs are identified from 0-27 by a five-bit address composed of one bit from the VI address and four bits from the VI data.

| A0 MSB | D3 | D2 | D1 | D0 LSB |
|---|---|---|---|---|

6.1.7 DS1 Bit/Byte Mode (Addresses 28-31)

Four seven-bit registers are used to provision the twenty-eight VTs for bit mode or byte mode operation. A VT is in bit mode if its corresponding control bit is a one.

| Address | D6 | D5 | D4 | D3 | D2 | D1 | D0 |
|---|---|---|---|---|---|---|---|
| 28 | 6 | 5 | 4 | 3 | 2 | 1 | 0 |
| 29 | 13 | 12 | 11 | 10 | 9 | 8 | 7 |
| 30 | 20 | 19 | 18 | 17 | 16 | 15 | 14 |
| 31 | 27 | 26 | 25 | 24 | 23 | 22 | 21 |

6.2 FTM1 Status

6.3 Reflection Byte (Address 0)

This byte has the same value as the provisioned reflection byte. It is used to test the communication path between the NCP and the STT1.

6.2.2 Received Signal Label, C2 (Address 1)

This byte contains the path overhead byte C2 received by the optic interface.

6.2.3 APS Control, K1 and K2 (Addresses 2 and 3)

These two bytes contain the section overhead bytes K1 and K2 received from the STS-1 interface. Both of these bytes are filtered by the FTM1 PBA by requiring any change to persist for three successive frames before the change is considered valid. A detected valid change for either K1 or K2 will result in the I bit being set the next time they are transmitted on the VI channel. The I bit will be set for only the VI frame following the change. Until the next change, the I bit will be cleared, and K1 and K2 will contain the last valid data detected.

6.2.4 Error Counters (Address 4-18)

Performance monitoring is done with five 13-bit counters. Each counter value is transmitted to the NCP using three addresses. A flag bit is inserted in the most significant bit location of each byte. The value of the flag bit is constant during the transmission of a byte and toggles every VI frame, identifying a new value. The transmission order of the counter bits is shown below.

| ADDR | SPD00 | SPD01 | SPD02 | SPD03 | SPD04 | SPD05 | SPD06 | SPD07 |
|---|---|---|---|---|---|---|---|---|
| N | FLAG | 0 | BIT 12 | BIT 11 | BIT 10 | BIT 9 | BIT 8 | BIT 7 |
| N + 1 | FLAG | BIT 6 | BIT 5 | BIT 4 | BIT 3 | BIT 2 | BIT 1 | BIT 0 |
| N + 2 | FLAG | 0 | BIT 12 | BIT 11 | BIT 10 | BIT 9 | BIT 8 | BIT 7 |

6.2.4.1 B3ZS Error Count (Addresses 4-6)

This counter has no meaning for a FTM1 PBA.

6.2.4.1 Section BIP-8 Count (Addresses 7-9)

B1 errors are accumulated in a 13-bit counter. The most significant 6 bits are transmitted in addresses 7 and 9. The least significant 7 bits are transmitted in address 8.

6.2.4.3 Line BIP-8 Count (Addresses 10-12)

B2 errors are accumulated in a 13-bit counter. The most significant 6 bits are transmitted in addresses 10 and 12. The least significant 7 bits are transmitted in address 11.

6 2.4.4 Path BIP-8 Count (Addresses 13-15)

B3 errors are accumulated in a 13-bit counter. The most significant 6 bits are transmitted in addresses 13 and 15. The least significant 7 bits are transmitted in address 14.

6.2.4.5 G1 Count (Addresses 16-18)

G1 errors are accumulated in a 13-bit counter. The most significant 6 bits are transmitted in addresses 16 and 18. The least significant 7 bits are transmitted in address 17.

6.2.5 Alarms (Address 19)

This is a composite byte consisting of single bit alarms.

D7—Not used at the writing of this document.
D6—Jitter and wander buffer overflow or underflow.
D5—Not presently used (always 0).
D4—Not presently used (always 0).
D3—Received Path yellow alarm indicator (G1 byte, bit 5).
D2—STS Path AIS (received C2 equal to all ones).
D1—Loss of SONET received frame reference.
D0—Loss of received Payload sync.

6.2.6 Miscellaneous Status (Address 20)

This byte contains miscellaneous status information.

D7—not used
D6—Parity error on VI channel
D5—UNICODE generation status (one for active)
D4—B3ZS enabled (zero for FTM1 PBAs)
D3—Stat4, TX Low Power Mode (zero for low power operation, one for normal operation)
D2—Stat3, High Bias Current (one for alarm condition)
D1—Stat2, Low optic output or Loss of Modulation (one for alarm condition)
D0—Stat1, Low Receive Level (one for alarm condition)

6.2.7 Provisioning Echo (Address 21)

Some of the bits of provisioning register 4 are returned in this byte.

D7—Looptest control
D6—Unit Alarm LED control
D5—Software UNICODE generation
D4—not used
D3—H4 generation flag
D2—Transmit yellow alarm indicator
D1—not used
D0—not used

TABLE 7

HDI CONNECTOR PIN ASSIGNMENT

| PIN # | A | B | C | D |
|---|---|---|---|---|
| 1 | GND | GND | +5V | +5V |
| 2 | GND | | | −5V |
| 3 | GND | GND | GND | |
| 4 | GND | TXDIP | GND | |
| 5 | GND | GND | GND | |
| 6 | GND | | GND | |
| 7 | GND | GND | GND | |
| 8 | GND | TXDOP | GND | |
| 9 | GND | GND | GND | |
| 10 | GND | | GND | |
| 11 | GND | GND | GND | |
| 12 | GND | ENTX | | |
| 13 | GND | ENCLK | | |
| 14 | GND | ENRX | | |
| 15 | | TSTRS* | | |
| 16 | | TSTEPLD | | +5V |
| 17 | | TSTLED | | +5V |
| 18 | | OPTALM* | | |
| 19 | GND | GND | GND | |
| 20 | GND | 52MCLK | GND | |
| 21 | GND | GND | GND | |
| 22 | GND | RXDIP | GND | |
| 23 | GND | GND | GND | |

TABLE 7-continued

HDI CONNECTOR PIN ASSIGNMENT

| PIN # | A | B | C | D |
|---|---|---|---|---|
| 24 | GND | RXDOP | GND | |
| 25 | GND | GND | GND | |
| 26 | GND | 8KSYNC | | |
| 27 | GND | GND | | |
| 28 | GND | TXMUXS* | | |
| 29 | GND | RXMUXS* | | |
| 30 | GND | GND | GND | |
| 31 | GND | | GND | −5V |
| 32 | GND | GND | +5V | +5V |

TABLE 8

RIBBON CABLE CONNECTOR PIN ASSIGNMENT

| | | | |
|---|---|---|---|
| 60 | PDI14 | PDI15 | 59 |
| 58 | PDI12 | PDI13 | 57 |
| 56 | GND | PDI11 | 55 |
| 54 | PDI9 | PDI10 | 53 |
| 52 | GND | PDI8 | 51 |
| 50 | PDO14 | PDO15 | 49 |
| 48 | PDO12 | PDO13 | 47 |
| 46 | GND | PDO11 | 45 |
| 44 | PDO9 | PDO10 | 43 |
| 42 | GND | PDO8 | 41 |
| 40 | ADDR10 | ADDR9 | 39 |
| 38 | ADDR8 | ADDR7 | 37 |
| 36 | GND | ADDR6 | 35 |
| 34 | ADDR5 | ADDR4 | 33 |
| 32 | ADDR3 | ADDR2 | 31 |
| 30 | GND | ADDR1 | 29 |
| 28 | ADDR0 | | 27 |
| 26 | SYNC | | 25 |
| 24 | PYLD | PDI7 | 23 |
| 22 | PDI6 | PDI5 | 21 |
| 20 | GND | PDI4 | 19 |
| 18 | PDI3 | PDI2 | 17 |
| 16 | PDI1 | PDI0 | 15 |
| 14 | GND | PDO7 | 13 |
| 12 | PDO6 | PDO5 | 11 |
| 10 | GND | PDO4 | 9 |
| 8 | PDO3 | PDO2 | 7 |
| 6 | PDO1 | PDO0 | 5 |
| 4 | CSTB | GND | 3 |
| 2 | 16MCLK | GND | 1 |

TABLE 9

CHANNEL MAP MEMORY ADDRESSING

| VI CHN. ADDR | D3-D0 | D7 | D6 | D5 | D4 | VT NO. |
|---|---|---|---|---|---|---|
| 16 | 0000 | CH3 | CH2 | CH1 | CH0 | 0 |
| 16 | 0001 | CH3 | CH2 | CH1 | CH0 | 1 |
| 16 | 0010 | CH3 | CH2 | CH1 | CH0 | 2 |
| 16 | 0011 | CH3 | CH2 | CH1 | CH0 | 3 |
| 16 | 0100 | CH3 | CH2 | CH1 | CH0 | 4 |
| 16 | 0101 | CH3 | CH2 | CH1 | CH0 | 5 |
| 16 | 0110 | CH3 | CH2 | CH1 | CH0 | 6 |
| 16 | 0111 | CH3 | CH2 | CH1 | CH0 | 7 |
| 16 | 1000 | CH3 | CH2 | CH1 | CH0 | 8 |
| 16 | 1001 | CH3 | CH2 | CH1 | CH0 | 9 |
| 16 | 1010 | CH3 | CH2 | CH1 | CH0 | 10 |
| 16 | 1011 | CH3 | CH2 | CH1 | CH0 | 11 |
| 16 | 1100 | CH3 | CH2 | CH1 | CH0 | 12 |
| 16 | 1101 | CH3 | CH2 | CH1 | CH0 | 13 |
| 16 | 1110 | CH3 | CH2 | CH1 | CH0 | 14 |
| 16 | 1111 | CH3 | CH2 | CH1 | CH0 | 15 |
| 17 | 0000 | CH3 | CH2 | CH1 | CH0 | 16 |
| 17 | 0001 | CH3 | CH2 | CH1 | CH0 | 17 |
| 17 | 0010 | CH3 | CH2 | CH1 | CH0 | 18 |
| 17 | 0011 | CH3 | CH2 | CH1 | CH0 | 19 |
| 17 | 0100 | CH3 | CH2 | CH1 | CH0 | 20 |
| 17 | 0101 | CH3 | CH2 | CH1 | CH0 | 21 |
| 17 | 0110 | CH3 | CH2 | CH1 | CH0 | 22 |
| 17 | 0111 | CH3 | CH2 | CH1 | CH0 | 23 |
| 17 | 1000 | CH3 | CH2 | CH1 | CH0 | 24 |
| 17 | 1001 | CH3 | CH2 | CH1 | CH0 | 25 |
| 17 | 1010 | CH3 | CH2 | CH1 | CH0 | 26 |

TABLE 9-continued

| CHANNEL MAP MEMORY ADDRESSING | | | | | | |
|---|---|---|---|---|---|---|
| VI CHN. ADDR | D3-D0 | D7 | D6 | D5 | D4 | VT NO. |
| 17 | 1011 | CH3 | CH2 | CH1 | CH0 | 27 |
| 17 | 1100 | | NOT USED | | | |
| 17 | 1101 | | NOT USED | | | |
| 17 | 1110 | | NOT USED | | | |
| 17 | 1111 | | NOT USED | | | |
| 18 | 0000-1111 | CH7 | CH6 | CH5 | CH4 | 0-15 |
| 19 | 0000-1111 | CH7 | CH6 | CH5 | CH4 | 16-27 |
| 20 | 0000-1111 | CH11 | CH10 | CH9 | CH8 | 0-15 |
| 21 | 0000-1111 | CH11 | CH10 | CH9 | CH8 | 16-27 |
| 22 | 0000-1111 | CH15 | CH14 | CH13 | CH12 | 0-15 |
| 23 | 0000-1111 | CH15 | CH14 | CH13 | CH12 | 16-27 |
| 24 | 0000-1111 | CH19 | CH18 | CH17 | CH16 | 0-15 |
| 25 | 0000-1111 | CH19 | CH18 | CH17 | CH16 | 16-27 |
| 26 | 0000-1111 | CH23 | CH22 | CH21 | CH20 | 0-15 |
| 27 | 0000-1111 | CH23 | CH22 | CH21 | CH20 | 16-2 |

TECHNICAL DESCRIPTION STT1 PBA; 625210-000

1. Scope

This document details the Technical Description of the STT1 PBA which provides the STSX-1 interface for the Terminal Multiplexer (TM) and Add-Drop Multiplexer (ADM) systems.

2. Overview

Figures 16, 16A:
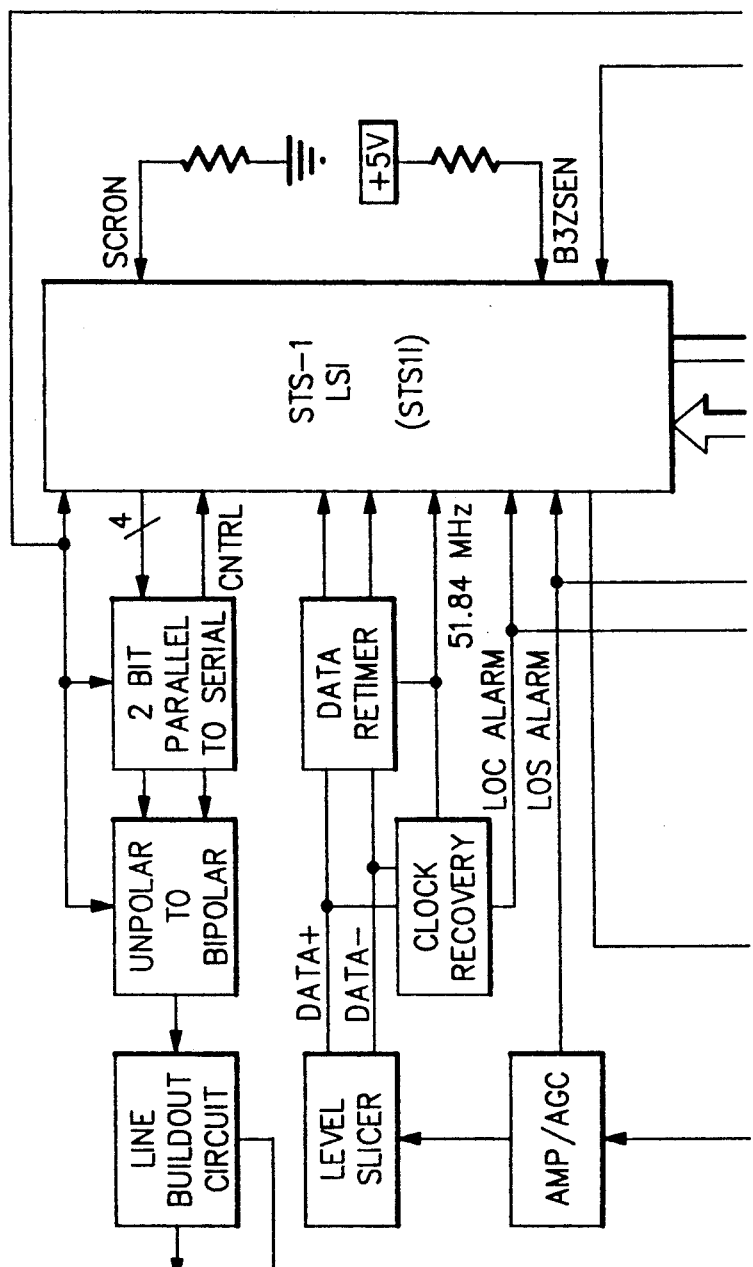
FIG. 16, comprising
FIGS. 16A and 16B, is a block diagram of the electrical transceiver (STT1).
Figure 16B:
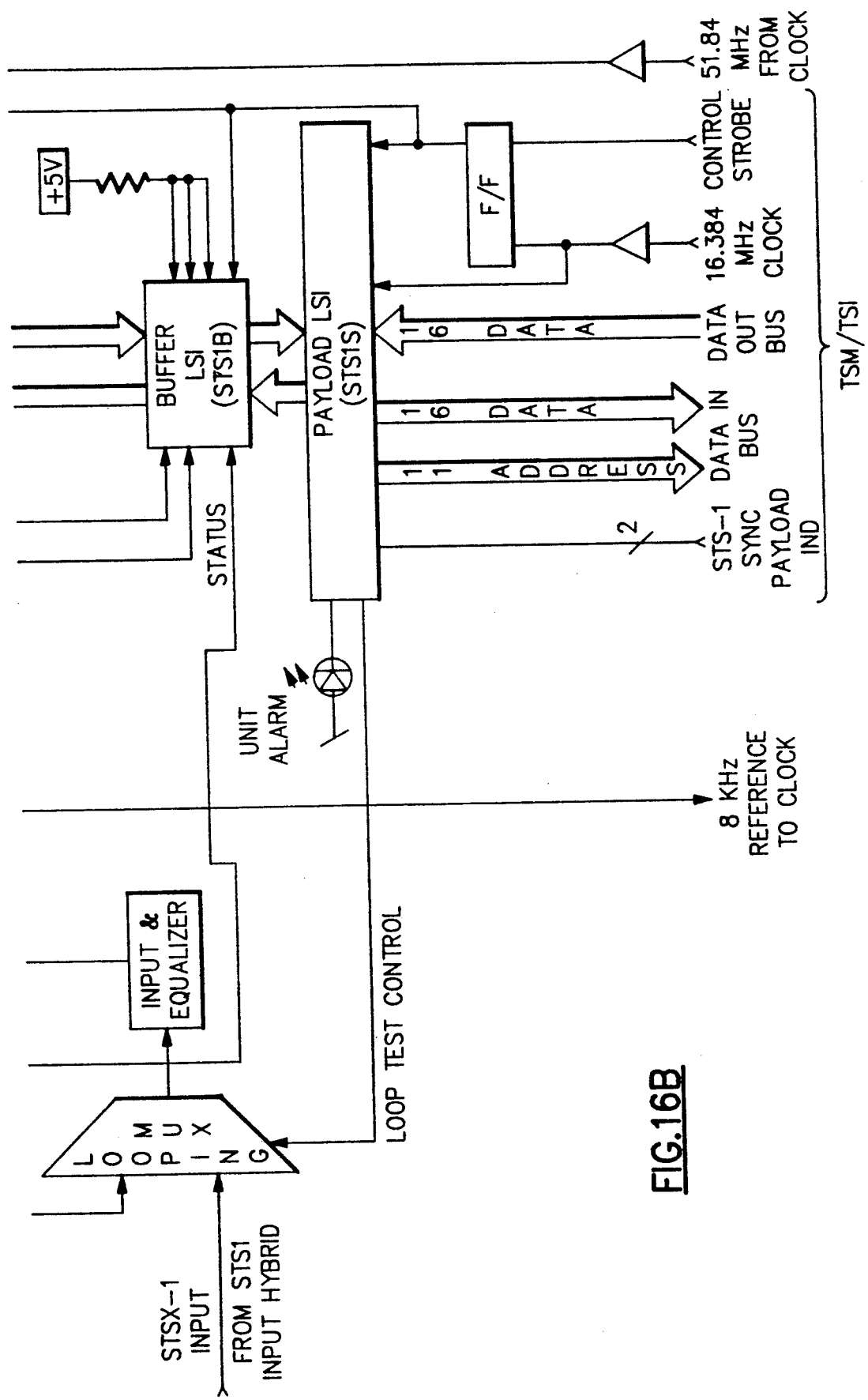

FIG. 16 shows a block diagram of the STT101 PBA. It represents a conceptual implementation of the required functions. This unit interfaces a 51.84 Mhz, B3ZS encoded, AMI signal. The unit is equipped with automatic equalization and an AGC circuit which will accommodate the required range of input cable loss (0-450 feet), and also allow a power splitting hybrid to be placed in the path. The unit recovers clock and retimes the data. The data are decoded in the unit and are fed to the TSM/TSI PBA along with an address. Alarms are provided for loss of signal and some types of B3ZS code violations. The output portion accepts data from the TSM/TSI PBA and develops a STSX-1 compatible signal. Provision is made on the unit for squelching the output and looping the B3ZS encoded output to the input. The output can accommodate from 0 to 450 feet of coaxial cable to the STSSX-1 cross-connect point by using the LBO circuit.

Figure 17:
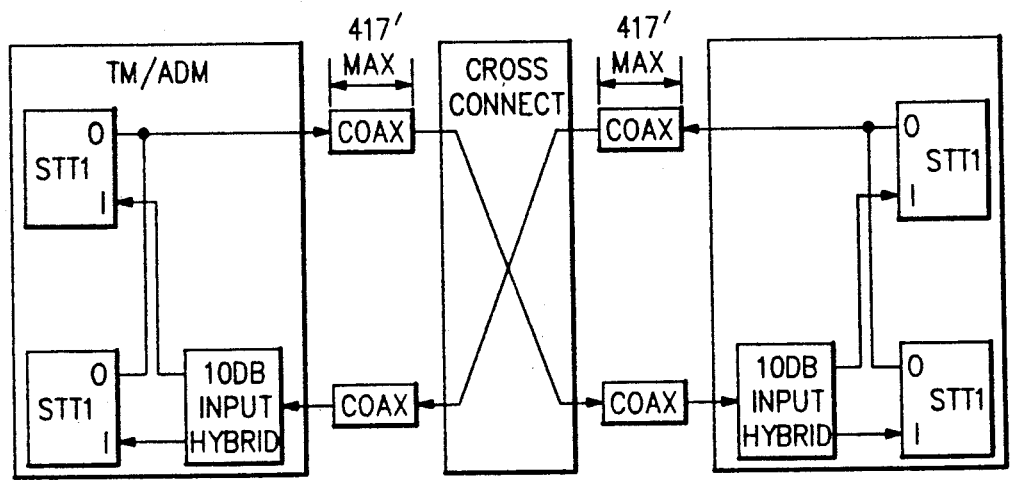
FIG. 17 is a diagrammatic representation of the TM/ADM application of the STT1.

FIG. 17 shows a diagram of the TM/ADM application of this PBA.

4. Table of Abbreviations

ADM: Add-Drop Multiplexer
ASIC: Application Specific Integrated Circuit
B3ZS: Bipolar three zero substitution
CMOS: Complimentary Metal Oxide Semiconductor
COA: Craft, Orderwire, and Alarm
EPLD: Eraseable, Programmable Logic Device
LBO: Line Build Out
MUX: Multiplexer
PBA: Printed Board Assembly
SONET, Synchronous Optical Network
STS-1: Synchronous Transmission Signal - 1
STSX-1: STS-1 Cross-connect Signal
TSI: Time Slot Interchanger PBA
TSM: Time Slot MUX PBA
TM: Terminal Multiplexer
VT: Virtual Tributary (corresponds to a DS1)

5. Detailed Description

5.1 Input Data Path

In this direction, the serial data from the STSX-1 link is B3ZS decoded, converted to a parallel bus, and sent to the TSM/TSI PBA.

5.1.1 STSX-1 Interface

This signal is the STSX-1 compatible input to operate with coax cable (WECO 728B, Beldon 8281, Beldon 9231) up to 450 feet to the cross-connect point. Equalization/attenuation is adjustable automatically for 0-450 feet. The AGC provides range to accommodate additional hybrid loss (flat attenuation) when required. A MUX is provided to select between the STSX-1 input and looped data from the output (see section 5.4 for more detail on the input MUX)

The input signal is capacitively coupled by C43 into the input MUX. Following the input MUX, there is a 3 dB pad with a characteristic impedance of 75 Ohms. This is made up by R124, R115, and R105.

Following the 3 dB pad is a bandpass equalizer with a characteristic impedance of approximately 75 Ohms. The termination resistor for the equalizer is bridged by a low pass filter. The cutoff frequency of the filter is modified by adjusting the bias current. As the bias current increases, the AC impedance of the diode decreases. Thus, the diode provides the function of a variable resistor.

5.1.2 AGC

The AGC is implemented using a LM592 video operational amplifier. The gain is adjusted by varying the bias current of the PIN diode. The differential output of the Op Amp is buffered by transistors, AC coupled, and diode-ORed to charge a capacitor. The charge on this capacitor is proportional to the incoming signal level.

5.1.3 Loss Of Signal Detector

The voltage on a capacitor which is used by the AGC loop is also compared to a set threshold by one of the op amps in the LM2902 IC.

5.1.4 Ringing Tank

The signals from the AGC which are diode-ORed, also drive a pair of transistors which in turn drive a ringing tank. The nominal frequency is 51.84 mHz.

5.1.5 Data Retiming

The output of the ringing tank circuit is fed to a 74AC00 gate which converts the signal to logic levels. This is the recovered clock signal used to retime the incoming data. Two 74AC74 D flip-flops are used to retime the data.

5.1.6 Loss Of Clock Detector

When the voltage goes below the preset threshold, the output of an Op Amp will go high. This output is buffered by a 74AC00 gate which will go low for loss of clock. The STS1I ASIC senses this alarm and inhibits its 8 kHz reference output. The STS1B ASIC also senses this alarm and reports the condition to the system controller.

5.1.7 STS1I ASIC

The retimed data and the recovered clock are fed to the STS1I ASIC. In this application the ASIC is optioned as follows:
1. B3ZS Encoding/Decoding
2. Scrambling/Descrambling Enabled
3. B1 & B2 Processing
4. Frame Sync (RX side)
5. Payload Pointer Processing (RX side)
6. No RX Elastic Store (6.48 MHZ Output Data)
7. Rob Overhead Bytes for Status (RX side)

Input B3ZSON is held at a high logic level which enables B3ZS decoding of the incoming data. Input SCRON is held at a high logic level which enables descrambling. Table 1 shows a brief example of B3ZS encoding. The STSPI input represents the positive pulse data from the STSX-1 link, and the STSNI input represents the negative pulses. Any bipolar violations, which are not a part of the normal encoding, are detected as errors and counted. This count is sent regularly to the system controller.

After B3ZS decoding, the data is converted from a serial bit stream to an 8-bit parallel set of signals.

The data are byte aligned and frame synchronized. The BIP-8 errors for B1 and B2 are accumulated. These counts are regularly reported to the system controller. The H1/H2 payload pointer is processed to locate the floating payload.

After overhead processing is completed the parallel data with payload indicator, overhead indicator, and composite sync are sent to the STS1B ASIC.

5.1.8 STS1B ASIC

The STS1B ASIC is the buffer between the STS1I ASIC and the STS1S ASIC.

Data from the STS1I ASIC go into an elastic store which is used to remove wander and jitter, and to speed change the data coming in at 6.48 mHz to the 8.192 mHz bus to the STS1S ASIC.

The BIP-8 errors for B3 are accumulated in this ASIC. The count value is regularly sent to the system controller. It also monitors the incoming G1 byte and accumulates an error count which is regularly reported to the system controller.

The RX counter generates the addressing for the received data and inserts gaps at certain locations to convert from 810 bytes per frame to 1024 bytes per frame. See Table 11.

The received data and the status bytes are MUXed onto the eight-bit wide bus to the STS1S ASIC.

5.1.9 STS1S ASIC

The STS1S ASIC is the interface of the STT101 PBA to the TSM/TSI PBA. The major functions of this ASIC in the receive direction are as follows:
1. Address generation for the parallel TSM/TSI data.
2. Storage of the status information and sending it to the system controller in the VI channel format.
3. Reformatting the SONET formatted signaling data into the TSM/TSI parallel signaling format.
4. UNICODE signaling pattern generation.
5. Parity bit generation for receive parallel data to the TSM/TSI.

5.2 Output Data Path

In this direction, the parallel data from the TSM/TSI PBA is reformatted, converted to a serial B3ZS encoded bit stream, and transmitted via the STSX-1 interface.

5.2.1 STS1S ASIC

The major functions of the STS1S ASIC for output data are as follows:
1. Decoding of a received VI channel for provisioning information and storage.
2. Parity bit check for transmit parallel data coming from the TSM/TSI PBA.
3. Reformatting the TSM/TSI parallel signaling data format to the SONET signaling format.
4. Bit or byte synchronized tributary indicator bit generation to indicate the frame bits which will be delayed.

5.2.2 STS1B ASIC

The STS1B ASIC provides the following major functions on the data received from the STS1S ASIC.
1. Generate the B3 byte for the transmitted data and MUX it in its proper location.
2. Align the Frame bit for the transmitted data and MUX it in its proper location.

The data from the STS1S ASIC is retimed with the overhead and payload sync pulses.

The value for the B3 byte is calculated and placed in its proper location to the STS1I ASIC.

5.2.3 STS1I ASIC

The STS1I ASIC accepts the data from the STS1B ASIC and reformats it to be accepted by the STSX-1 interface circuit. It performs the following major functions.
1. TX Elastic store 8.192 Mhz gapped (8 words)
2. Payload pointer processing The eight-bit parallel data is received from the STS1B ASIC with the appropriate sync signals. The data is placed in an elastic store for speed change buffering from 8.192 mHz to 6.48 mHz.

The parallel data and sync information is processed. The overhead sync is determined. A new H1/H2 payload pointer is derived. Then the BIP-8 calculations for B1 and B2 are performed. The data is scrambled and then B3ZS encoded and output two bits at a time.

5.2.4 Output Shift Register

The data from the STS1I ASIC is loaded into a four-bit shift register, which is used as two two-bit shift registers. The PDO1 and PDO2 signals represent the bits to be encoded as positive pulses. The NDO1 and NDO2 signals represent the bits to be encoded as negative pulses. A pair of 74ACT74 flip-flops are used to reclock the data and to convert to CMOS levels.

5.2.5 AMI Circuit

The outputs of the flip-flops are gated with the transmit clock using 74AC02 gates. These gates drive a pair of transistors which in turn drive the output transformer. The resulting signal is a series of positive and negative pulses of amplitude 0.85 Volts and a pulse width nominally 9 nanoseconds.

5.2.6 LBO

The transformer output is fed to a pulse shaper and a Line Build Out circuit which compensates for the cable length.

5.2.7 Output Switch

The output of the LBO is connected to the PIN diodes of the output switch. See Section 5.5 for details of the switch control.

5.3 Power-on Reset

One of the op amps of the LM2902 IC is used as a comparator with hysterisis to provide a reset signal when power is applied to the PBA.

The reset is used by the STS1B ASIC and the output switch controller to initialize properly after power is applied.

5.4 Input MUX

The input MUX is used to select data from the cable input or the data that is being transmitted. Two PIN diodes are used to do the selection. When a PIN diode has a DC bias current, it appears as a low impedance. When there is no DC bias current, it is a high impedance. Three transistors are used to determine the bias currents. They are controlled by the MUXSEL signal from the STS1S ASIC.

5.5 Output Switch Control

The output switch control is provided by an EP610 EPLD. This EPLD is configured as four state machines. The STT101 PBA uses two of the state machines. Each state machine has four flip-flops for a total of sixteen states. The STT101 PBA uses one state machine to control the output switch, and the other to provide a test function.

Figure 18:
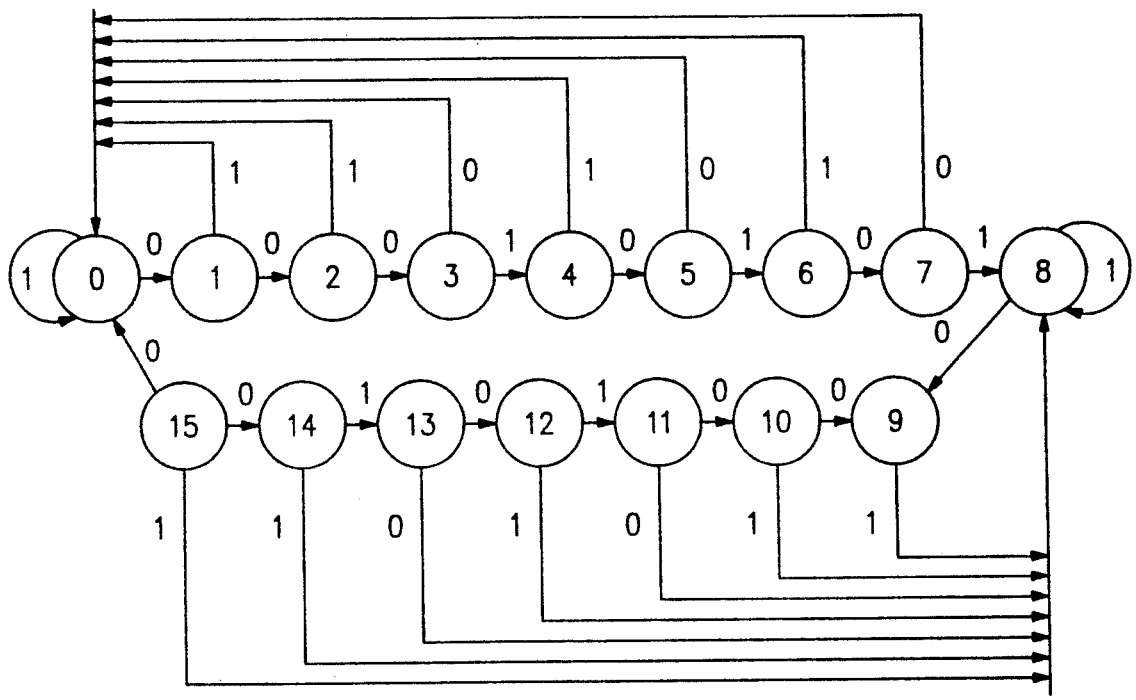
FIG. 18 is an illustration of the output switch control state machine for the STT1.

The state machine recognizes the reception of a sequence of bits from the COA PBA which also provides the clock. A representation of the Output Switch control state machine is shown in FIG. 18.

The standard bit sequence is ten bits long accompanied by a clock for each data bit. The first two bits are an initializing prefix of 11. The remaining eight bits are the same except for the last bit which determines whether the switch is being turned ON or OFF.

1100010101→Turn On Switch

1100010100→Turn Off Switch

Whenever the output switch is on, a relay driver is also on.

The switch is off for States 0 through 7, and is on for States 8 through 15 A reset input is provided to insure that the state machine starts in State 0 following the application of power to the PBA. A test input is provided which will cause all the flip-flops to be set (State 15) when it is high in the presence of a clock.

For system test purposes, the other state machine provides a means to determine if the EPLD is functioning without effecting the Output Switch. A different 10-bit code is used to turn the test output ON and OFF.

1100100101→Test Output High

1100100100→Test Output Low

The test output is connected to the STS1B ASIC. Its state is reported to the NCP via the VI channel.

5.6 8 KHZ Reference

The STS1I ASIC derives an 8 kHz reference clock from the 51.84 mHz recovered clock. This reference clock is buffered to a pin on the backplane connector. If the STS1I ASIC detects that the loss-of-signal or the loss-of-clock signals are low, it will inhibit the reference clock. In a TM/ADM system this clock may be used as a reference to develop the system clocks.

5.7 Parallel Bus Interface

Figure 19:
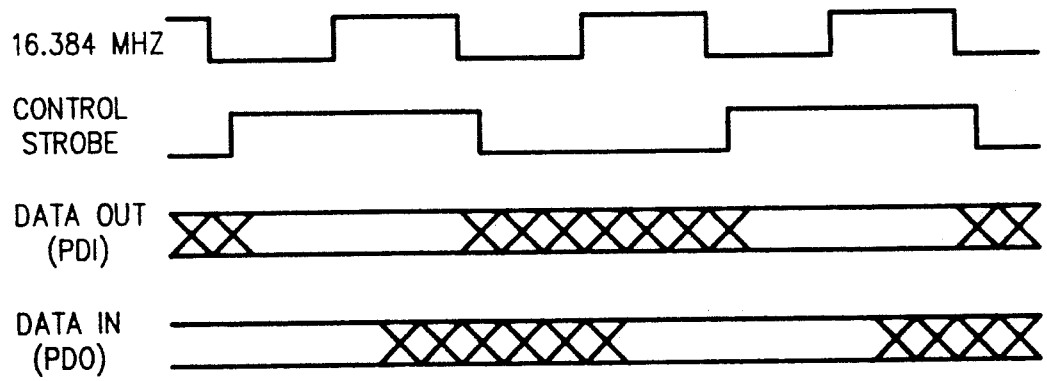
FIG. 19 is a block diagram of the STT1 to TSM/TSI.

The interface to the TSM/TSI PBA is via a parallel bus. The STT101 PBA provides sixteen data signals and eleven address signals. The TSM/TSI PBA provides sixteen data signals, two timing strobes, and a clock. The timing for the bus is shown in FIG. 19.

The sixteen data signals and the eleven address signals output to the TSM/TSI PBA are provided directly by the STS1S ASIC. The data bus has the formats shown in FIG. 15 depending on the time slot on the bus. The address signals are capable of providing 1024 addresses. The eleventh address bit is actually an indicator which is high when the address on the bus is invalid.

The inputs from the TSM/TSI PBA have pullup resistors to terminate the signals when the TSM/TSI is not present, and series resistors to protect the CMOS STS1S ASIC from potential latch-up currents. These currents can exist when the TSM/TSI PBA is powered and connected to the STT101 PBA via the ribbon cable, while the STT101 PBA is not powered.

Because of tight timing constraints that the STS1S ASIC cannot meet, the CSTB signal is clocked by a 74AC74 flip-flop. The result is used as an indicator to the STS1S ASIC which shows when data is valid on the bus, and is used by the STS1B and STS1I ASICs as an 8.192 mHz clock.

The 16.384 mHz clock from the TSM/TSI PBA is buffered before being used by the STT101 PBA.

5.8 LED

An LED is provided for system determined indications. The intent is for this LED to be ON during failure conditions to assist the craftsperson in locating a failed PBA. The state of the LED is controlled by provisioning of the STS1S ASIC from the system controller.

5.9 HDI Backplane Connector

The STT101 PBA uses a 128 pin High Density Interface (HDI) connector to plug into the TM/ADM backplane. Table 12 shows the signal assignment to the pins of the connector.

5.10 Ribbon Cable Connector

A ribbon cable is used to connect the STT101 PBA to the TSM/TSI PBA. Table 13 shows the signal assignment to the pins of the ribbon cable connector.

6. HARDWARE/SOFTWARE INTERFACE

The following is a summary of the hardware/software interface for the STT101 PBA. Only the STS1S ASIC is provisionable by software. The STS1I, STS1B, and STS1S ASICs provide status information. This information is taken from the specification for the STS1S ASIC.

Provisioning and status reporting is provided by using the VI control channel. Information from the NCP via the TSM/TSI is accepted when the V bit is low and the parity bit in the word is valid. The VI channel has a five-bit address which provides for 32 directly addressable registers.

See ANSI T1.105-1988 for details on how particular bytes are used in a SONET system.

6.1 Provisioning

6.1.1 Reflection Byte (Address 0)

The NCP sends this byte as a communications test. The byte is returned as a status byte.

6.1.2 Transmit Signal Level C2 (Address 1)

The value to be transmitted is provisionable via this register. This byte is used to indicate the construction of the STS-1 payload.

6.1.3 APS Control K1 and K2 (Addresses 2 and 3)

The values to be transmitted are provisionable via these registers. These two bytes control Automatic Protection Switching between Line level entities

6.1.4 Test and Alarm Control (Address 4)

D7 controls the Looptest. If this bit is set to a one, the looptest function is enabled.

D6 controls the Unit Alarm LED. The LED is ON when this bit is a one.

D5 is a one when software wants to send UNICODE.

D4 resets the parity error flag. If a VI word is received with a parity error, the parity error flag is set in the status. It stays set until this control bit resets it. Following a reset, the control bit must be returned to a zero value to enable detection of subsequent parity errors.

D3 controls the generation of the H4 byte for transmission. It is a one for TM applications to enable local generation, and is zero for ADM applications.

D2 is the transmit path yellow indicator. It is placed in the bit 5 location of the transmitted G1 byte.

D1 disables automatic UNICODE generation by the hardware if an alarm condition is detected by the hardware It is a one to disable and a zero to enable.

D0 is not used at the writing of this document.

6.1.5 Unused Addresses (Addresses 5-15)

At the writing of this document, these addresses are not used.

6.1.6 Channel Map Memory (Add/Drop Map) (Addresses 16-27)

These twelve registers are used to address, 4 bits at a time, a 672 bit RAM that provisions ABCD signaling for each DS0 to be through path (signaling left intact) or add path (signaling is overwritten by signaling from the previous DS0 data).

Each byte of control consists of four bits of data (D4-D7) and four bits of extended address (D0-D3). Along with the VI address, this provides an addressing scheme for 16×12 (192) 4-bit nibbles. The VI address selects one of the 12, and the extended address selects one of the 16. The encoding of the address to the channel number is shown in Table 13-1. In the table, channel number corresponds to a DS0 number (0-23) in a VT.

Three bits of the VI address (A1-A3) indicate six groups of four channels (DS0s).

| VI ADDR BITS | | | VI DATA BITS | | | |
|---|---|---|---|---|---|---|
| A3 | A2 | A1 | D7 | D6 | D5 | D4 |
| 0 | 0 | 0 | 3 | 2 | 1 | 0 |
| 0 | 0 | 1 | 7 | 6 | 5 | 4 |
| 0 | 1 | 0 | 11 | 10 | 9 | 8 |
| 0 | 1 | 1 | 15 | 14 | 13 | 12 |
| 1 | 0 | 0 | 19 | 18 | 17 | 16 |
| 1 | 0 | 1 | 23 | 22 | 21 | 20 |

VTs are identified from 0-27 by a five-bit address composed of one bit from the VI address and four bits from the VI data.

| A0 | D3 | D2 | D1 | D0 |
|---|---|---|---|---|
| MSB | | | | LSB |

6.1.7 Bit/Byte Mode (Addresses 28-31)

Four seven-bit registers are used to provision the twenty-eight VTs for bit mode or byte mode operation. A VT is in bit mode if its corresponding control bit is a one.

| Address | D6 | D5 | D4 | D3 | D2 | D1 | D0 |
|---|---|---|---|---|---|---|---|
| 28 | 6 | 5 | 4 | 3 | 2 | 1 | 0 |
| 29 | 13 | 12 | 11 | 10 | 9 | 8 | 7 |
| 30 | 20 | 19 | 18 | 17 | 16 | 15 | 14 |
| 31 | 27 | 26 | 25 | 24 | 23 | 22 | 21 |

6.2 STT101 Status

6.2.1 Reflection Byte (Address 0)

This byte has the same value as the provisioned reflection byte. It is used to test the communication path between the NCP and the STT1.

6.2.2 Received Signal Label, C2 (Address 1)

This byte contains the path overhead byte C2 received by the STSX-1 interface.

6.2.3 APS Control, K1 and K2 (Addresses 2 and 3)

These two bytes contain the section overhead bytes K1 and K2 received from the STSX-1 interface. Both of these bytes are filtered by the STT101 PBA by requiring any change to persist for three successive frames before the change is considered valid. A detected valid change for either K1 or K2 will result in the I bit being set the next time they are transmitted on the VI channel. The I bit will be set for only the VI frame following the change. Until the next change, the I bit will be cleared, and K1 and K2 will contain the last valid data detected.

6.2.4 Error Counters (Address 4-18)

Performance monitoring is done with five 13-bit counters. Each counter value is transmitted to the NCP using three addresses. A flag bit is inserted in the most significant bit location of each byte. The value of the flag bit is constant during the transmission of a byte and toggles every VI frame, identifying a new value. The transmission order of the counter bits is shown below.

| ADDR | SPD00 | SPD01 | SPD02 | SPD03 | SPD04 | SPD05 | SPD06 | SPD07 |
|---|---|---|---|---|---|---|---|---|
| N | FLAG | 0 | BIT 12 | BIT 11 | BIT 10 | BIT 9 | BIT 8 | BIT 7 |
| N+1 | FLAG | BIT 6 | BIT 5 | BIT 4 | BIT 3 | BIT 2 | BIT 1 | BIT 0 |
| N+2 | FLAG | 0 | BIT 12 | BIT 11 | BIT 10 | BIT 9 | BIT 8 | BIT 7 |

6.2.4.1 B3ZS Error Count (Addresses 4-6)

B3ZS encoding errors are accumulated in a 13-bit counter. The most significant 6 bits are transmitted in addresses 4 and 6. The least significant 7 bits are transmitted in address 5.

6.2.4.2 Section BIP-8 Count (Addresses 7-9)

B1 errors are accumulated in a 13-bit counter. The most significant 6 bits are transmitted in addresses 7 and 9. The least significant 7 bits are transmitted in address 8.

6.2.4.3 Line BIP-8 Count (Addresses 10-12)

B2 errors are accumulated in a 13-bit counter. The most significant 6 bits are transmitted in addresses 10 and 12. The least significant 7 bits are transmitted in address 11.

6.2.4.4 Path BIP-8 Count (Addresses 13-15)

B3 errors are accumulated in a 13-bit counter. The most significant 6 bits are transmitted in addresses 13 and 15. The least significant 7 bits are transmitted in address 14.

6.2.4.5 G1 Count (Addresses 16-18)

G1 errors are accumulated in a 13-bit counter. The most significant 6 bits are transmitted in addresses 16 and 18. The least significant 7 bits are transmitted in address 17.

6.2.5 Alarms (Address 19)

This is a composite byte consisting of single bit alarms.

D7—Not used at the writing of this document.
D6—Jitter and wander buffer overflow or underflow.
D5—Loss of received clock.
D4—Loss of received input signal.
D3—Received Path yellow alarm indicator (G1 byte, bit 5).
D2—STS Path AIS (received C2 equal to all ones).
D1—Loss of SONET received frame reference.
D0—Loss of received Payload sync.

6.2.6 Miscellaneous Status (Address 20)

This byte contains miscellaneous status information.

D7—not used
D6—Parity error on VI channel
D5—UNICODE generation status (one for active)
D4—B3ZS enabled (one for STT101 PBAs)

D3—Stat4, LBO setting (one for 225-450 feet of cable)
D2—Stat3, zero for STT101 PBAs
D1—Stat2, zero for STT101 PBAs
D0—Stat1, EPLD Test bit 6.2.7 Provisioning Echo (Address 21)

Some of the bits of provisioning register 4 are returned in this byte.

D7—Looptest control
D6—Unit Alarm LED control
D5—Software UNICODE generation
D4—not used
D3—H4 generation flag
D2—Transmit yellow alarm indicator
D1—not used
D0—not used

TABLE 10
B3ZS Coding

In the B3ZS format, each block of three consecutive zeros is removed and replaced by B0V or 00V where B represents a pulse conforming with the bipolar rule and V represents a pulse violating the bipolar rule. The choice of B0V or 00V is made so that the number of B pulses between consecutive V pulses is odd.

| | Example: |
|---|---|
| Binary Signal: | 101 000 11 000 000 001 000 1 . . . |
| B3ZS Signal | |
| Case 1 (odd): | +0− 00− +− +0+ −0− 00+ 00+ − . . . |
| |       00V      B0V B0V    00V |
| Case 2 (even): | +0− +0+ −+ −0− +0+ 00− 00− + . . . |
| |       B0V       B0V B0V    00V |

This example of B3ZS coding assumes the polarity of the last pulse of the previous sequence transmitted was −. If the last pulse transmitted had been +, then the resulting bipolar signals would be the inverse of the example shown here. Case 1 assumes that an odd number of pulses have been transmitted since the last bipolar violation. Case 2 assumes that an even number of pulses have been transmitted since the last bipolar violation.

TABLE 12
HDI CONNECTOR PIN ASSIGNMENT

| PIN # | A | B | C | D |
|---|---|---|---|---|
| 1 | GND | GND | +5V | +5V |
| 2 | GND | STS1OP | GND | −5V |
| 3 | GND | GND | GND | |
| 4 | | | | |
| 5 | GND | | | |
| 6 | RLY | | | |
| 7 | GND | | | |
| 8 | | | | |
| 9 | GND | | | |
| 10 | | | | |
| 11 | | GND | | |
| 12 | | ENTX | | |
| 13 | | ENCLK | | |
| 14 | | | | |
| 15 | | TSTRS* | | |
| 16 | LENSI | TSTEPLD | | +5V |
| 17 | LENS | TSTLED | | +5V |
| 18 | | | | |
| 19 | GND | GND | GND | |
| 20 | GND | 52MCLK | GND | |
| 21 | GND | GND | GND | |
| 22 | | | | |
| 23 | | GND | | |
| 24 | | | | |
| 25 | | | | |
| 26 | | 8KSYNC | | |

TABLE 12-continued
HDI CONNECTOR PIN ASSIGNMENT

| PIN # | A | B | C | D |
|---|---|---|---|---|
| 27 | | | | |
| 28 | | TXMUXS* | | |
| 29 | | | | |
| 30 | GND | GND | GND | |
| 31 | GND | STS1IP | GND | −5V |
| 32 | GND | GND | +5V | +5V |

TABLE 13
RIBBON CABLE CONNECTOR PIN ASSIGNMENT

| 60 | PDI14 | PDI15 | 59 |
|---|---|---|---|
| 58 | PDI12 | PDI13 | 57 |
| 56 | GND | PDI11 | 55 |
| 54 | PDI9 | PDI10 | 53 |
| 52 | GND | PDI8 | 51 |
| 50 | PDO14 | PDO15 | 49 |
| 48 | PDO12 | PDO13 | 47 |
| 46 | GND | PDO11 | 45 |
| 44 | PDO9 | PDO10 | 43 |
| 42 | GND | PDO8 | 41 |
| 40 | ADDR10 | ADDR9 | 39 |
| 38 | ADDR8 | ADDR7 | 37 |
| 36 | GND | ADDR6 | 35 |
| 34 | ADDR5 | ADDR4 | 33 |
| 32 | ADDR3 | ADDR2 | 311 |
| 30 | GND | ADDR1 | 29 |
| 28 | ADDR0 | | 27 |
| 26 | SYNC | | 25 |
| 24 | PYLD | PDI7 | 23 |
| 22 | PDI6 | PDI5 | 21 |
| 20 | GND | PDI4 | 19 |
| 18 | PDI3 | PDI2 | 17 |
| 16 | PDI1 | PDI0 | 15 |
| 14 | GND | PDO7 | 13 |
| 12 | PDO6 | PDO5 | 11 |
| 10 | GND | PDO4 | 9 |
| 8 | PDO3 | PDO2 | 7 |
| 6 | PDO1 | PDO0 | 5 |
| 4 | CSTB | GND | 3 |
| 2 | 16MCLK | GND | 1 |

TABLE 13-1
CHANNEL MAP MEMORY ADDRESSING

| VI CHN. ADDR | D3-D0 | D7 | D6 | D5 | D4 | VT NO. |
|---|---|---|---|---|---|---|
| 16 | 0000 | CH3 | CH2 | CH1 | CH0 | 0 |
| 16 | 0001 | CH3 | CH2 | CH1 | CH0 | 1 |
| 16 | 0010 | CH3 | CH2 | CH1 | CH0 | 2 |
| 16 | 0011 | CH3 | CH2 | CH1 | CH0 | 3 |
| 16 | 0100 | CH3 | CH2 | CH1 | CH0 | 4 |
| 16 | 0101 | CH3 | CH2 | CH1 | CH0 | 5 |
| 16 | 0110 | CH3 | CH2 | CH1 | CH0 | 6 |
| 16 | 0111 | CH3 | CH2 | CH1 | CH0 | 7 |
| 16 | 1000 | CH3 | CH2 | CH1 | CH0 | 8 |
| 16 | 1001 | CH3 | CH2 | CH1 | CH0 | 9 |
| 16 | 1010 | CH3 | CH2 | CH1 | CH0 | 10 |
| 16 | 1011 | CH3 | CH2 | CH1 | CH0 | 11 |
| 16 | 1100 | CH3 | CH2 | CH1 | CH0 | 12 |
| 16 | 1101 | CH3 | CH2 | CH1 | CH0 | 13 |
| 16 | 1110 | CH3 | CH2 | CH1 | CH0 | 14 |
| 16 | 1111 | CH3 | CH2 | CH1 | CH0 | 15 |
| 17 | 0000 | CH3 | CH2 | CH1 | CH0 | 16 |
| 17 | 0001 | CH3 | CH2 | CH1 | CH0 | 17 |
| 17 | 0010 | CH3 | CH2 | CH1 | CH0 | 18 |
| 17 | 0011 | CH3 | CH2 | CH1 | CH0 | 19 |
| 17 | 0100 | CH3 | CH2 | CH1 | CH0 | 20 |
| 17 | 0101 | CH3 | CH2 | CH1 | CH0 | 21 |
| 17 | 0110 | CH3 | CH2 | CH1 | CH0 | 22 |
| 17 | 0111 | CH3 | CH2 | CH1 | CH0 | 23 |
| 17 | 1000 | CH3 | CH2 | CH1 | CH0 | 24 |
| 17 | 1001 | CH3 | CH2 | CH1 | CH0 | 25 |
| 17 | 1010 | CH3 | CH2 | CH1 | CH0 | 26 |
| 17 | 1011 | CH3 | CH2 | CH1 | CH0 | 27 |
| 17 | 1100 | | NOT USED | | | |
| 17 | 1101 | | NOT USED | | | |

TABLE 13-1-continued

| VI CHN. ADDR | D3-D0 | D7 | D6 | D5 | D4 | VT NO. |
|---|---|---|---|---|---|---|
| 17 | 1110 | | NOT | USED | | |
| 17 | 1111 | | NOT | USED | | |
| 18 | 0000-1111 | CH7 | CH6 | CH5 | CH4 | 0-15 |
| 19 | 0000-1111 | CH7 | CH6 | CH5 | CH4 | 16-27 |
| 20 | 0000-1111 | CH11 | CH10 | CH9 | CH8 | 0-15 |
| 21 | 0000-1111 | CH11 | CH10 | CH9 | CH8 | 16-27 |
| 22 | 0000-1111 | CH15 | CH14 | CH13 | CH12 | 0-15 |
| 23 | 0000-1111 | CH15 | CH14 | CH13 | CH12 | 16-27 |
| 24 | 0000-1111 | CH19 | CH18 | CH17 | CH16 | 0-15 |
| 25 | 0000-1111 | CH19 | CH18 | CH17 | CH16 | 16-27 |
| 26 | 0000-1111 | CH23 | CH22 | CH21 | CH20 | 0-15 |
| 27 | 0000-1111 | CH23 | CH22 | CH21 | CH20 | 16-27 |

TABLE 11

FIVE BIT COLUMN ADDRESS

| | | 28 | 29 | 30 | 0 | 1 | 2 | - - - 27 |
|---|---|---|---|---|---|---|---|---|
| FIVE | 24 | O | O | O | TP0 | TP1 | TP2 | - - - TP27 |
| BIT | 25 | V | V | V | POH0 | POH1 | POH2 | - - - POH27 |
| ROW | 26 | E | E | E | SG0 | SG1 | SG2 | - - - SG27 |
| AD- | 0 | R | R | R | B0,0 | B1,0 | B2,0 | - - - B27,0 |
| DRESS | 1 | H | H | H | B0,1 | B1,1 | B2,1 | - - - B27,1 |
| | . | E | E | E | . | . | . | . |
| | . | A | A | A | . | . | . | . |
| | . | D | D | D | . | . | . | . |
| | 23 | | | | B0,23 | B1,23 | B2,23 | - - - B27,23 |

EACH COLUMN WITH A VTX CORRESPONDS TO A DS1.
EACH BX,Y BYTE CORRESPONDS TO A DS0 IN THE DS1.
STT101 TO MUX/TSI ADDRESSING

TECHNICAL DESCRIPTION DS1 INTERFACE UNIT DST-1; 625206-000-001

1. Scope

This document is a detailed description of the DS1 Transceiver unit DST-1. It describes the hardware in detail and gives an overview of the functions supported.

2. Overview

The DST-1, DS1 Line Interface Card is a complete byte or bit synchronous DS1 interface, interfacing one DS1 signal to the serial bus interface (SBI). It performs DSX-1 to SBI in the receive direction and SBI to DSX-1 in the transmit direction. The DST-1 card is provisionable to support D4 standard superframe (SF), D4 extended superframe (ESF), or SLC-96/TR8 framing algorithms with either AMI or B8ZS line coding. It pre-equalizes the DSX-1 output in the transmit direction for 0 to 655 feet of office cabling. The DST-1 card also responds to UNICODE and looping codes. Test and maintenance of the unit is accomplished by a combination of either local and remote control and is automatically controlled by software and/or manually through external operational interfaces (OS interface, craft interface and remote interfaces). The DST-1 interface card is intended to be used in the Terminal Multiplexer(TM), Add/Drop Multiplexer(ADM), and Digital Loop Carrier (DLC) family of products.

4. General Descriptions

The DS1 transceiver (DST-1) is a plug in unit. The unit interfaces one 1.544 Mb/s DS1 to the Time Slot Multiplexer (TSM1) or the time Slot Interchanger (TSI1) via the 4.096 Mb/s Serial Bus Interface (SBI) and visa versa. The SBI is composed of 32 channels of 16 bits of overhead each. Of the 32 channels, 24 channels are used to carry the DS0 channels and signalling information from the incoming DS1 data, 4 channels are used for synchronization, alarms and communications. The remaining 4 channels are unused by the DST-1 at this point.

The DST-1 monitors the DS1's line performance (receive data) for bipolar violations, all ones, and loss of signal The DST-1 also monitors its own internal performance. Appropriate alarms and status from the DST-1 are forwarded to the network controller over the SBI link.

The DST-1 can be looped for testing purposes. Three looping modes are supported.
1) DS1 RX to DS1 TX loop (out of service loop)
2) SBI TX to SBI RX loop (out of service loop)
3) SBI TX to SBI RX reflection byte (in service loop)

5. Detailed Description

The following is a detailed circuit description of the DST-1 Interface Card. The Input/Output pins of the unit are described in detail and a brief description of blocks affecting the I/O's is also provided.

5.1 Receive Direction

Figure 20:
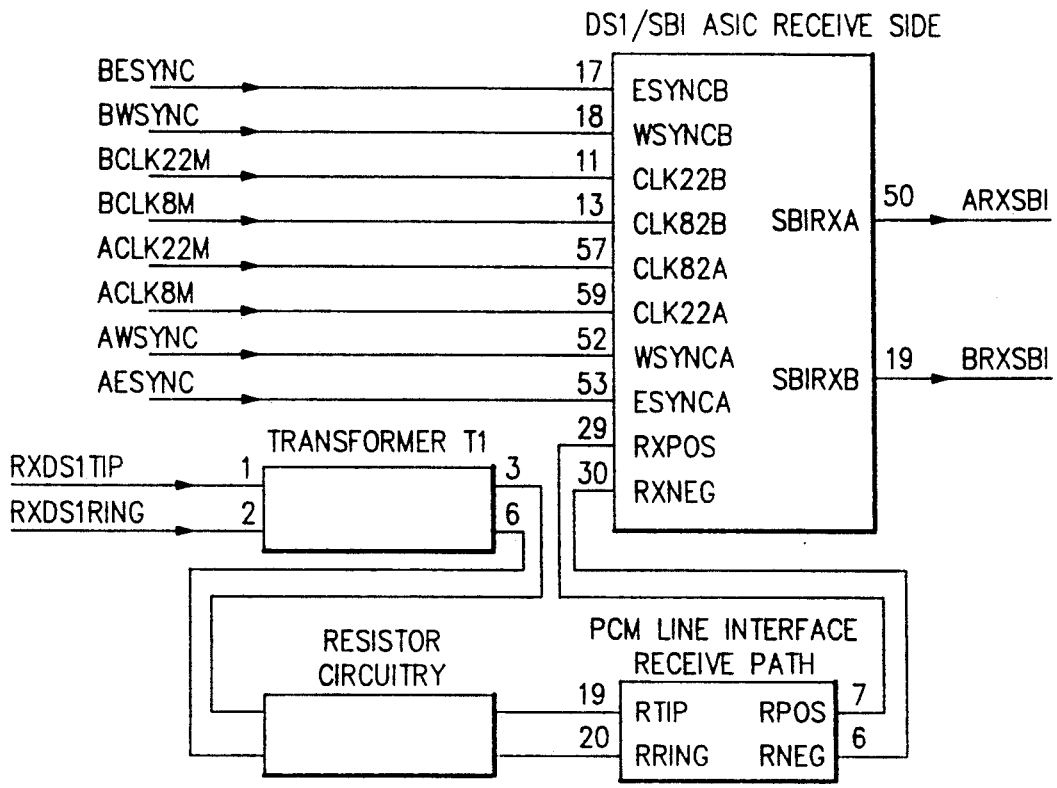
FIG. 20 is a block diagram of the DS1 interface unit receive path block diagram.

FIG. 20 depicts the block diagram of the receive side. The detailed description of each block is given in the subsequent sections.

5.1.1 Line Transformer Receive Path

The balanced DSX-1 data enters the DST-1 via I/O pins P1-19 (for tip) and P1-20 (for ring). The signal is received on both ends of the primary side of the center-tapped, center-grounded transformer T1, pins 1 and 2. Transformer T1 and the associated circuitry R1, R2 and R3 provide the unipolar signals RTIP and RRING for the PCM line interface IC, U2.

5.1.2 PCM Line Interface Receive Path

RTIP and RRING pulses enter the DSX-1 Interface IC U2, via pins 19 and 20 respectively, and detected by the comparators internal to U2. The DSX-1 interface IC provides pulse stretching for the RZ outputs on RXPOS and RXNEG to aid in digital clock extraction in DS1 ASIC, U1. The comparator outputs (U2, pins 7 and 6) provide the RPOS and RNEG signals for the DS1 Interface ASIC U1, RXPOS and RXNEG respectively.

5.1.3 DS1 ASIC Receive Path

Figure 21:
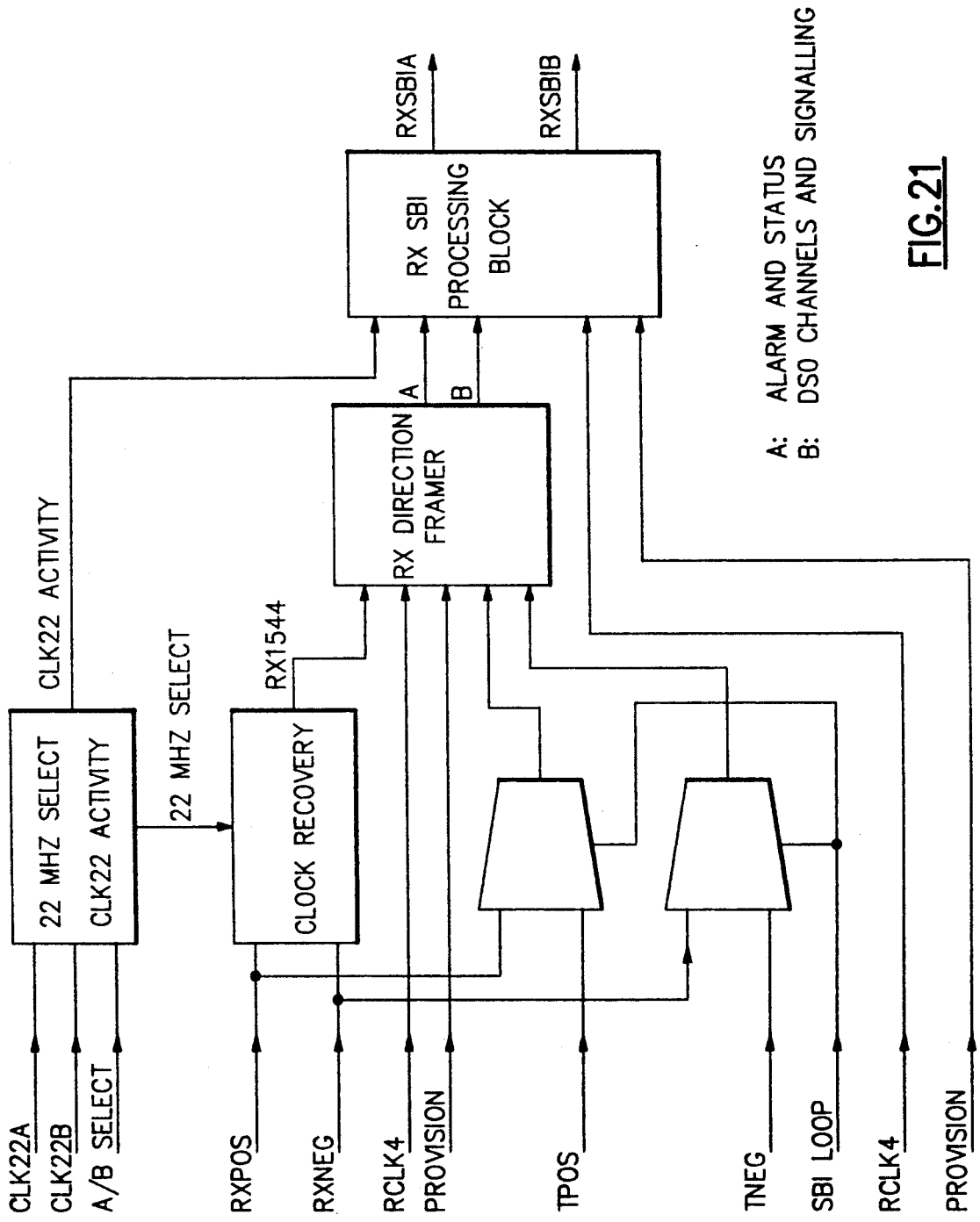
FIG. 21 is a block diagram of the DS1/SBI receive portion of the DS1 interface unit.

FIG. 21 depicts the block diagram of U1's receive side. The data enters U1 as either RZ or NRZ via pins 29 and 30 of the IC (positive and negative rail, respectively). The data is retimed by the selected 21.616 MHZ clock and fed to a phase detector circuit. Two 21.616MHZ clocks enter DST-1 via I/O pins P1-1 and P2-1 and connect to U1 pins 59 and 11 through R16 and R6 series terminating resistors, respectively. Internal to the IC one of the clocks are selected and used to recover the 1.544 MHZ receive clock, using a digital over sampling technique from the RX DS1 bitstream. The selected 21 616 MHZ clock is divided by 14 to generate the DS1 recovered clock. The circuitry divides by 13 or 15 when phase jitter causes a change in the clock/data alignment. The RX data is then retimed by RXCLKIN, the 1.544 MHZ clock input (U1, pin 1). The actual clock is the extracted 1.544 MHZ clock output on pin 68 of the same IC. This clock is output and re-enters U1 for testing purposes.

A DS1 loop control circuitry outputs the two rail DS RX bit stream to the outgoing two rail TX DS1 bit stream (pins 33 for pos. and 32 for neg. rail). This is only a test feature and will not effect the functionality of the rest of the ASIC.

The two rail received DS1 data is monitored for AMI or B8ZS line coding error. The substituted code is detected and removed in the case of B8ZS coding and Bipolar violations are counted. The BPV counter is reported via a VI communication channel and not cleared. The counter can be cleared only for testing purposes under the control of software. The received data at this stage is used to perform frame synchronization to the embedded DS1 framing patterns. The framing algorithm used is provisionable via the information received in a communication channel from the incoming TX SBI. The RX DS1 serial bit stream is monitored for the presence of loop and restore code. The value of the loop and restore codes are also provisionable from the incoming TX SBI bit stream. The loop and restore codes along with the indication of successful detection are also communicated via an outgoing VI channel in the SBI RX direction. The RX DS1 bitstream is also monitored for CRC error in the case of ESF, and FT error in the case of SF framing algorithms. This error count is also reported via the outgoing SBIRX and the count can only be cleared under software control.

The robbed bit signalling for each DS0 channel can be enabled or disabled. In the case of robbed bit signalling the signalling bits from the ABCD signaling highways in the DS0 data are extracted and replaced with a one.

The data in every Fbit position (every 193 bit) is extracted from the DS1 RX and output via outgoing active RX SBI bit stream.

The DS1 bit stream is also monitored for frame alignment. An indication is sent out via VI communication channel when DS1 bitstream is out of frame alignment.

The ASIC can be put in SYNC mode (for different applications) by pulling U1 pin 37 high. In SYNC mode, outputs 8KPRIM and 8KSEC (U1 pins 21 and 23, respectively) are both enabled to output 8 khz sync pulses derived from the recovered 1.544 MHZ. This input is connected to P1-13 through the series termination resistor R19. This input will be connected to LOGIC GND by the system for non-sync mode application. The 8K sync pulses output the card via pins P2 8 (primary) and P2-11 (secondary). The sync pulses are active low and when enabled, 648 ns pulses would occur every 125 us.

U1 pins 61 through 64 are ASIC's identification inputs, pulled low representing a unique identification code. This code is reported by the active RXSBI output over a VI communication channel.

The RX DS1 bit stream at this point is converted to parallel data, rate converted (from 1.544 to 4.096 MHZ), and stored for further processing. The processing from this point on, is done under the control of the 4.096 MHZ receive clock.

Two outgoing RXSBI links leave the ASIC, U1 via pins 50(A side) and 19(B side). Each RXSBI bitstream can be frame aligned to the 8K East, West or internal 8K sync pulses on a command received via a VI communication channel in the transmit side. The A side East and West Sync pulses enter the DST-1 card via P1-4 and P1-5 and through the series terminating resistors R8 and R10 connect to the DS1/SBI ASIC pins 53 and 52, respectively. The B side East and West Sync pulses enter the DST-1 card via P2-4 and P2-5 and through the series terminating resistors R12 and R9 connect to the DS1/SBI ASIC pins 17 and 18, respectively. The outgoing RXSBI bitstream report the activity on the selected sync pulse via a VI communication channel.

The A side RXSBI leaves DST-1 unit via I/O pin P1-6 through series termination R13, and the B side RXSBI via I/O pin P2-7 through series termination R11. The A/B select indicator determines which link carry the active and which one the inactive SBI. The active SBI carry 32 channels of overhead (16 bits each) on a 4 ms boundary. Of the 32 Channels, channel 0 contains an alternating 7 bit sync word (also known as barker code). Channel 3 contains the F bit (193rd bit), MFS1 (Master Frame Sync 1) and MFS0 (Master Frame Sync 0), extracted from the RX DS1 bitstream. Channels 4 through 27 contain the DS0 data and signalling information, channel 28 contains the information used in maintenance cluster mode, and channel 31 is the VI communication channel. The active RXSBI bitstream will also carry UNICODE upon command received in a VI communication channel or in the of case detected unicode.

Except for bit 15 of each channel which carries the parity error, the remaining channels along with channel 28 in non-maintenance cluster mode are unused at this point and set to ONE at all times.

The inactive SBI carries one overhead channel, channel 0 containing sync word, and one VI communication channel. The remaining channels are all set to ONE, except for bit 15 of each channel that carries the parity error.

5.2 TX Direction

Figure 22:
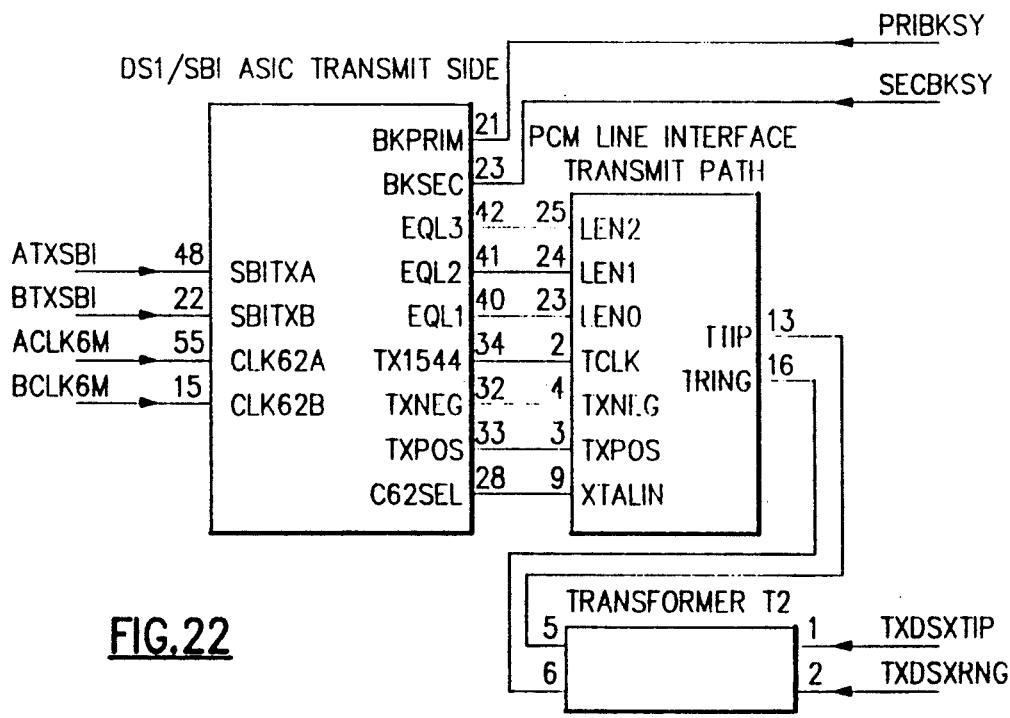
FIG. 22 is a block diagram of the DST-1 unit transmit path.

FIG. 22 depicts the block diagram of the transmit side. The detailed description of each block is given in the subsequent sections.

5.2 DS1 ASIC Transmit Direction Path

Figure 23:
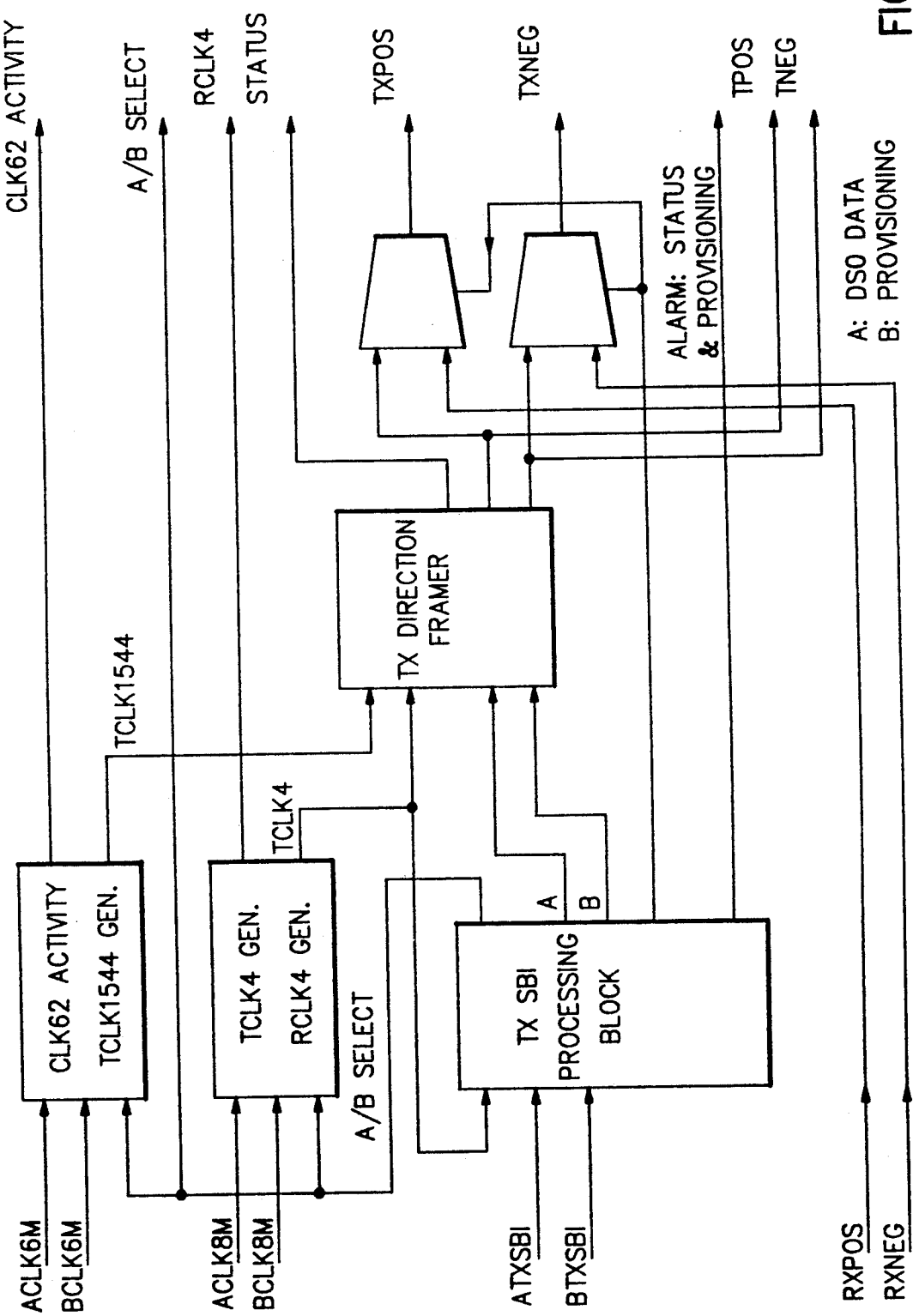
FIG. 23 is a block diagram of the DS1/SBI transmit path.

FIG. 23 depicts the block diagram of U1's transmit side. Two SBI bit streams ATXSBI and BTXSBI enter the DST-1 via I/O pins P1-9 and P2-10 respectively. Through series terminating resistors R5 and R7 the links connect to U1 pins 48 and 22 respectively. Two identical circuits receive the active and inactive TX SBI inputs. The ATXSBI bit stream is clocked by the 8.192 MHZ clock for A side (U1, pin 57) entering DST1 on I/O pin P1-2 and through the terminating series resistors R15. The BTXSBI bit stream is clocked by the 8.192 MHZ clock for B side (U1, pin 13) entering DST1 on I/O pin P2-2 and through the series termination R4. Each SBI bit stream is monitored for the presence of the sync word to indicate the beginning of the SBI frame.

An A/B select circuitry examines the A/B select data received from both TXSBI inputs and derives an A/B select indicator. The A/B select indicator is used to switch all redundant inputs and outputs simultaneously in both receive and transmit directions, including the active TXSBI link.

Two 4.096 MHZ clocks are derived, of which one clocks the receive side and the other clocks the Transmit side. The 4.096 MHZ clock for the transmit side outputs and re-enters the IC via pin 66 and 67 respectively.

The DS0 channels, ABCD signalling bits, Fbits, and provisioning for both sides are extracted from the active SBI bitstream and stored for further processing. When no Sync Word is detected, all ones are substituted for the DS0 data, signalling bits, and Fbits. The TX DS1 data, framing bits, data bits, CRC bits, and signalling bits are used to form the two rail serial TX DS1 bitstream.

An SBI loop control circuitry routs the two rail DS1 TX bitstream rail to the RX SBI processing section. The DS1 TX bit stream will then be processed as if it were DS1 RX bit stream. This is only a test feature and will not effect the functionality of the rest of the ASIC. The DS1 TX bit stream leaves the DS1 ASIC, U1 via pins 33 and 32 (pos. and neg., respectively) regardless of an SBI loop condition.

Two 6.176 MHZ clocks enter the DST-1 card via I/O pins P1-2 and P2-3. Through series terminations R14 and R17 the two clocks enter the ASIC via pins 55 and 15 (A & B side respectively). The clocks are used to derive the 1.544 MHZ transmit clock. This clock is also output and re-enters the ASIC for testing purposes (U1 pins 35 and 34).

U1 pins 40, 41 and 42 are the transmit DS1 equalizer selection code output. These outputs are programmable via a VI communication channel and select one of five line length settings by the DSX-1 IC U2.

5.2.2 PCM Line Interface TX Path

In the transmit path the DSX-1 Interface IC, U1 receives the transmit binary data via pins 3(pos) and 4(neg). The 1.544 MHZ transmit clock enters U2 via pin 2. The transmit clock and the transmit data are supplied synchronous by the DS1 ASIC U1, such that the data is sampled on the falling edge of the input clock.

The U2 produces alternate bipolar pulses of appropriate shape with the line lengths ranging from 0 to 655 feet on pins 13 (transmit tip) and pin 16 (transmit ring) as shown in TABLE 14. U2 pins 23,24 and 25 (LEN0, LEN1, LEN2) are connected directly to U1 pins 42,41 and 40 respectively, providing length selection capability via a communication channel in the transmit direction.

TABLE 14

| LINE LENGTH SELECTION | | | |
|---|---|---|---|
| LEN2 | LEN1 | LEN0 | LINE LENGTH SELECTED (FEET) |
| 0 | 1 | 1 | 0–133 |
| 1 | 0 | 0 | 133–266 |
| 1 | 0 | 1 | 266–399 |
| 1 | 1 | 0 | 399–533 |
| 1 | 1 | 1 | 533–655 |

5.2.3 Line Transformer Transmit Path

The transmit tip and ring are received on both ends of the primary side of the center-tapped, center-grounded transformer T2, pins 5 and 6. Transformer T2 provide the bipolar DSX-1 signal on pins 1 and 2. Transmit TIP and RING output the DST-1 card via I/O pins P2-19 and P2-20 respectively.

TECHNICAL SPECIFICATION TIME SLOT MULTIPLEXER/TM; TSM101/T

1. General Description

This document provides a technical description of the TSM101 (Time Slot Multiplexer) unit (625215-000-001).

This unit is intended to be used in the TM (Terminal Multiplexer) project

This document includes the detailed description of the TSM101 unit including the timing relationship between the specific devices within the unit, and the timing relationship between the unit and the surrounding units.

2. Unit Description

The 625215-000 Time Slot Multiplexer (TSM101) unit provides cross-connection between the Serial Bus Interface Links (SBI) and a Parallel Bus Interface Link (PBI).

The functions of the TSM101 pba are:
1) To provide the cross-connection of DS-1's, Orderwire, Data/Comm, VI, Path Tracer and User channels between the SBI links and the Parallel Bus Interface.
2) To provide VI channel cross-connection between the channels of the SBI link '30' and the '31st' channel of the links '0–30'.
3) To provide timing signals to the other units for synchronization of data and address.

A serial microprocessor interface allows a control processor to configure the cross-connect function of the MUX.

Figure 24:
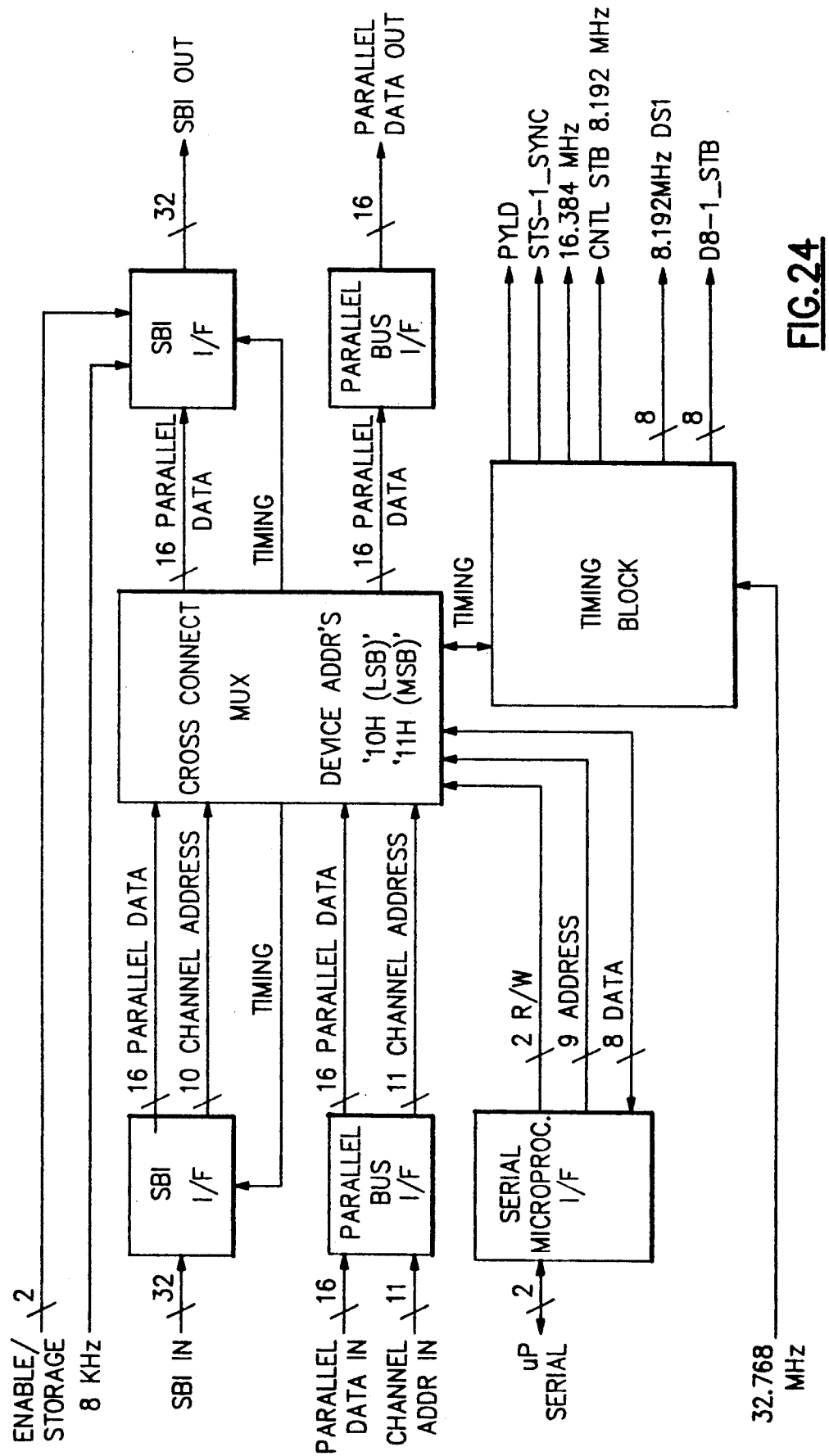
FIG. 24 is a block diagram of the time slot multiplexer for a terminal multiplexer (TM) device.

Block diagram of the unit is given in FIG. 24.

3. Detailed Description

The description of the board will be made by defining three separate interfaces and the specific devices related with these interfaces These interfaces are:
1) Serial Bus Interface,
2) Parallel Bus Interface
3) Internal Parallel Bus

3.1 Serial Bus Interface

The 32 SBI links are shared by 4 identical SBI ASIC (Application Specific Integrated Circuit) devices each device handling 8 of the links. Reference designator for these devices are U6, U7, U8, and U9. Each SBI ASIC has configuration inputs hardwired to 0v's or 5v's through pull-up and pull-down resistors to identify the links they are handling. For the identification purpose, SBI ASIC's use pin #49 and 37. For this unit's specific application U6 is handling links 0–7, U7 is handling links 8–15, U8 is handling links 16–23, and U9 is handling links 24–31.

3.1.1 SBI Inputs

The SBI links consists of 32 serial links. The rate of each of the serial links is 4.096 Mbits/sec. Each of the serial links transport 32 sixteen bit channels in a 125 microsecond period. 1024 SBI channels contained in a 125 microsecond period is called an SBI frame.

After receiving 4.096 Mbits/sec rate of data through the SBI links, each SBI ASIC recovers 4.096 MHZ clock by using a 16.384 MHZ clock signal provided by the timing circuitry on the unit. During the recovery process, SBI ASIC assumes no phase relationship between the 16.384 MHZ clock and the other strobes it is receiving. The SBI data transmitter and the SBI ASIC should use the same clock source to prevent slips occurring at the data and clock edges during the clock recovery process.

The TSM101 board transmits 2 signals to synchronize its SBI inputs with the unit(s) generating the SBI signal(s).

1) DS1 Strobe: The TSM101 board generates the DS1 Strobe signal to identify the time slot that it expects to see the channel 0 of every SBI link on its SBI inputs. When the TSM101 board sends the DS1 Strobe, it expects to receive the channel 0 of every link between 4 to 132 16.384 MHZ clock cycles. The restriction comes from the limited memory source of the MUX ASIC.

Figure 25:
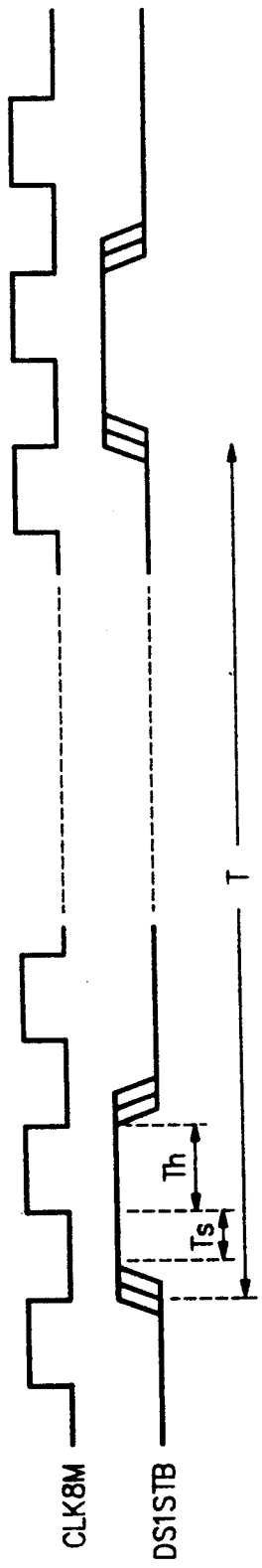
FIG. 25 is a timing diagram showing the inter-relationship between set-up time and hold time associated with the operation of the timeslot multiplexer shown in FIG. 24.

2) The TSM101 board sends a 8.192 MHz clock signal to the units transmitting the SBI links. The phase relationship between the 8.192 MHz clock and the DS1 Strobe is shown in FIG. 25.

3.1.2 SBI Outputs

The format of the SBI Outputs is the same as the format of the SBI Inputs.

The SBI ASIC's receive two signal patterns that will enable or disable the outputs of the SBI ASIC's. When disabled, SBI outputs will transmit all ones. When enabled, SBI outputs will resume their normal operation.

The control signal is received from pin #74 of the SBI ASIC's U6, U7, U8, and U9. The control signal is clocked in using the 64 KHZ clock input to the pin #75 of the same ASIC's.

The signal pattern to disable the SBI outputs is:

---
1 1 0 0 0 1 0 1 0 0
first bit received
---

The signal pattern to enable the SBI outputs is:

---
1 1 0 0 0 1 0 1 0 1
first bit received
---

Following a power on reset, the SBI outputs are enabled.

3.2 Parallel Bus Interface

The TSM101 board interfaces 16 bit data input, 11 bit address input, and 16 bit data output words on its Parallel Bus Interface. The parallel bus operates at 8.192 Mwords/sec rate.

The Parallel Bus Interface is shared by 2 MUX ASIC devices U10 and U11. Each device could handle 2 different sets of parallel buses with 8 bits of data input, 8 bits of data output, and 11 bits of address. For the identification purposes, the MUX ASIC's use pin #9 and pin #25. For the TSM101 application of the MUX ASIC, first set is used to communicate with the SBI ASIC for data transfer internal to the board and the second set is used to communicate with the Parallel Bus Interface external to the board. Following table shows the corresponding voltage level assignments at the identification pins:

TABLE 15

|  | Pin #9 | Pin #25 |
| --- | --- | --- |
| Lower order 8 bits of data | 0v | 0v |
| Higher order 8 bits of data | 5v | 0v |

The parallel data and address transfer between the TSM101 board and the other units is synchronized by the timing circuitry on the board.

3.2.1 Parallel Bus Interface Data Inputs

On the Parallel Bus Interface Data Inputs TSM10 pba expects 1024 words ( 16 bits ) of data repeated every 125 microseconds. The most significant bit of the 11 bit address input will indicate whether the current data on the Parallel Bus Interface Data Inputs is valid or invalid.

The contents of the Parallel Bus Interface Data Inputs are transparent to the TSM101 pba.

3.2.2 Parallel Bus Interface Address Inputs

The Parallel Bus Interface Address Inputs consist of 11 bit parallel addresses.

Address Format:

Bit 10: when it is high, bit indicates that the parallel data on the Parallel Bus Interface Data Inputs is invalid.

Bits 9-5: column number of the current data on the East Parallel Bus Interface Data Inputs.

Bits 4-0: row number of the current data on the East Parallel Bus Interface Data Inputs.

Bit 9 and 4 are the MSB's.

MUX ASIC's decode column 23 row 2 of the incoming Parallel Addresses to synchronize their respective SBI counters. The TSM101 requires to see the address of column 23 row 2 at least once on its Parallel Address Inputs to be able to perform any of the crossconnect functions properly.

3.2.3 Parallel Bus Interface Data Outputs

The Parallel Bus Interface Data Outputs consist of 16 bit parallel words.

Parallel data will consist of 16 bit words running at 8.192 MHZ. When the sync enable is on (section 4.9), the word on the Parallel Bus Interface Output will occupy the same column and row with the word that was on the Parallel Bus Interface Input 5+178 clock periods earlier, (wrt 8.192 MHz clock).

The TSM101 pba will insert invalid data at specific intervals to the Parallel Bus Interface Data Outputs. The invalid data locations are shown in the appendix B of the Performance Specification (301) document.

The TSM101 pba will transmit 2 synchronization signals to show the status of the data on the Parallel Bus Interface Data Outputs.

1) Payload: The Payload signal will be high when the data on the Parallel Bus Interface Data Outputs correspond to column 0-27 and 31 for rows 0-26, and will be low for the remaining words.

2) STS-1 Sync: STS-1 Sync is issued twice per frame, once when the data on the Parallel Bus Interface Data Outputs corresponds to column '28' row '15' (A1 byte in the SONET frame), and once for column '31' row '24' (J1 byte in the SONET Frame). The STS-1 Sync signal will be a pulse of width approximately 122 ns.

Figure 26:
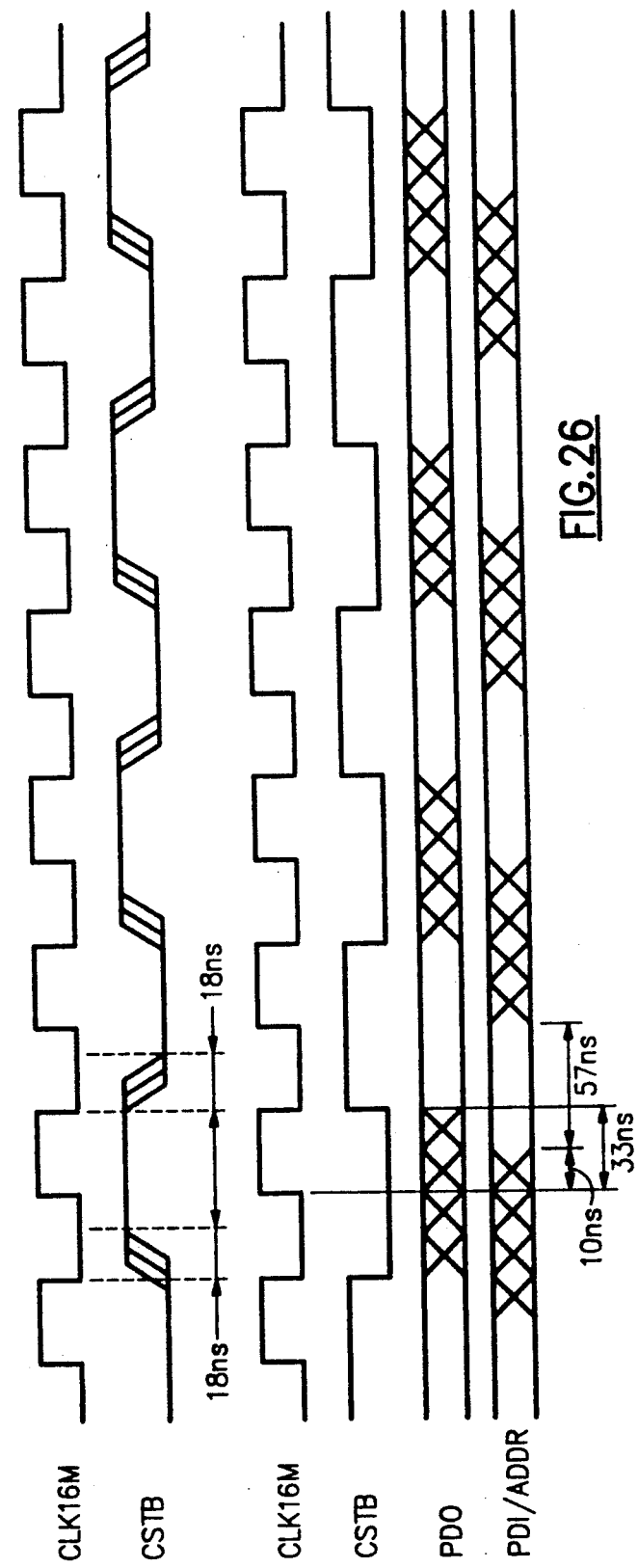
FIG. 26 is a timing diagram of various clock signals and related signals associated with the timeslot multiplexer shown in FIG. 24.

The TSM101 pba generates an 8.192 MHZ (CSTB) and 16.384 MHZ (CLK16M) clock signals to synchronize the address and the data on the Parallel Bus Interface. The relationship between the clocks and the Parallel Bus Interface data inputs, Parallel Bus Interface address inputs, and data outputs is shown in FIG. 26. The timing relationship between the clocks and the STS-1 Sync is the same as the timing relationship between the clocks and the Parallel Data Outputs.

3.3 Internal Parallel Bus

The Internal Parallel Bus is the bus shared by the SBI ASIC's and the MUX ASIC's. It consists of two separate 16 bit data buses and one 10 bit address bus. The buses will be named as SBIO, SBII, and SBIADDR. The descriptions of the buses are:

3.3.1 SBIO Bus

The SBIO Bus is a 16 bit parallel data bus running at 8.192 Mwords/sec, transmitted from SBI ASIC's and received by the MUX ASIC's. The 16 bit parallel data outputs of the SBI ASIC's are connected together. The lower order 8 bits of the data are received by the MUX ASIC U10 and the higher order 8 bits of the data are received by the MUX ASIC U11.

After power on reset Parallel Data Outputs of all the SBI ASIC chips will be tri-stated. After receiving 256 KHZ (122 ns pulse) signal from the MUX ASIC the parallel data and address outputs will be time shared by the SBI ASIC's depending upon their configuration address inputs. 256 KHZ will provide each BI ASIC chip 976 ns to transmit 1 channel of each of the 8 consecutive links.

Figure 27:
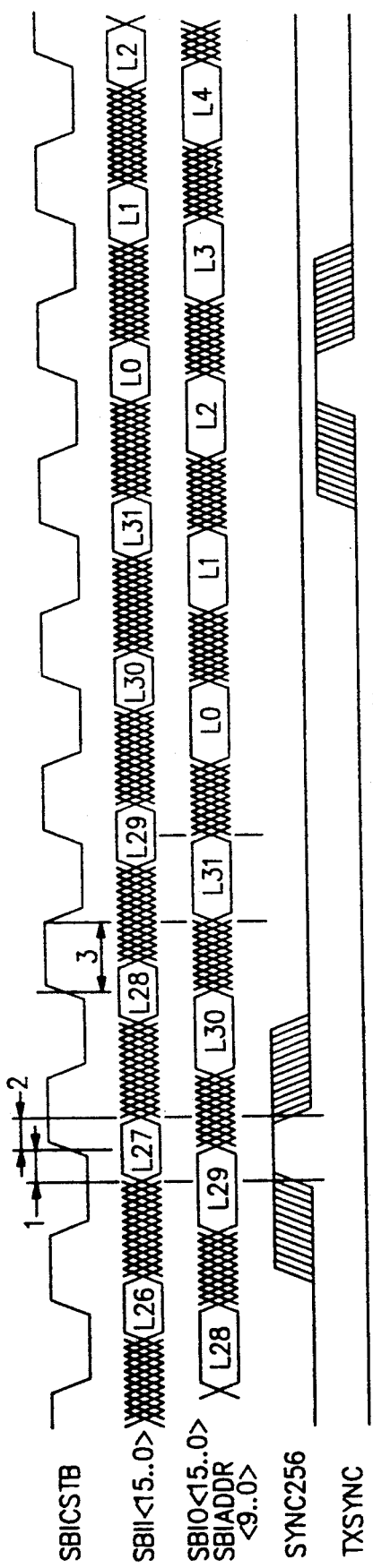
FIG. 27 is a timing diagram of various synchronization and SBI signals associated with the timeslot multiplexer shown in FIG. 24.

The 256 KHZ strobe signal is generated by MUX ASIC U10 pin #49 and received by all SBI ASIC's pin #20. The timing relationship between the 256 KHZ strobe signal and the transmitted parallel data is shown in FIG. 27.

The SBI ASIC's will search for the sync code in channel 0 of every link. Two consecutive frames having the correct sync pattern will generate an in-sync condition. After the in-sync condition is established, four consecutive frames of sync pattern errors will establish an out-of-sync condition. When in-sync condition is not established for a link, the SBI ASIC will insert 1's for every bit in that particular link during transmission on the Parallel Data Outputs.

3.3.2 SBII Bus

The SBI ASIC's receive 16 bit parallel data words on their Parallel Data Inputs. The SBI ASIC's also receive 3 signals which identify the location of the current data on the Parallel Data Inputs, (TXSYNC, TXCH0,TXCH31). The functions of these signals are, 3.3.2.1 TXSYNC indicates that the current data on the Parallel Data Inputs belong to SBI link 0. It occurs once every 3.9 us.

The TXSYNC signal is generated by MUX ASIC U10 pin #37 and received by all SBI ASIC's pin #9. The timing relationship between the TXSYNC signal and the Parallel Data Inputs is shown in FIG. 27.

3.3.2.2 TXCH0 indicates that the current data on the Parallel Data Inputs belong to channel 0 of any link. It will occur 32 times every 125 us.

Figure 28:
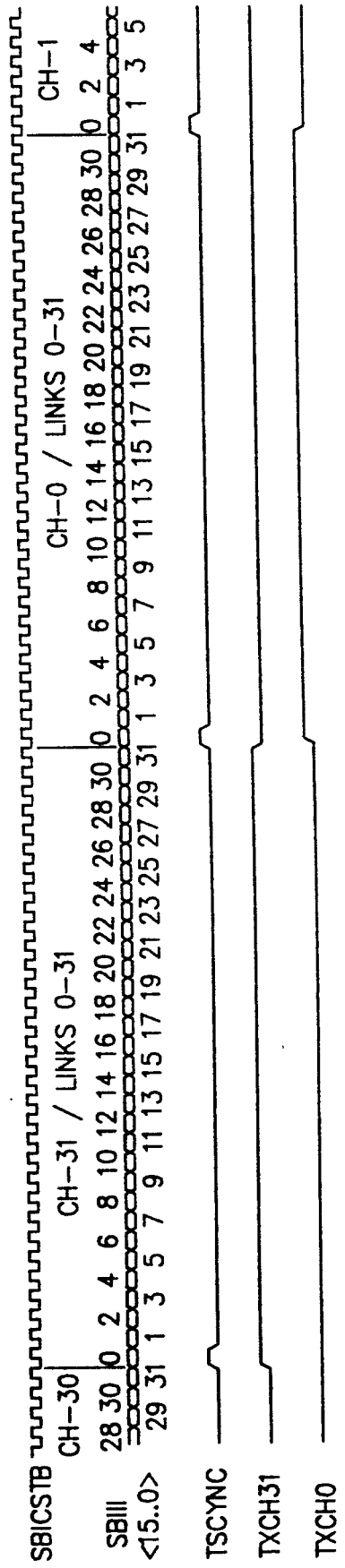
FIG. 28 is a timing diagram of various transmit signals associated with the SBI used in the timeslot multiplexer for use with a terminal multiplexer.

The TXCH0 signal is generated by the MUX ASIC U10 pin #36 and received by all SBI ASIC's pin #63. The timing relationship between the TXCH0 signal and the Parallel Data Inputs is shown in FIG. 28.

3.3.2.3 TXCH31 indicates that the current data on the Parallel Data Inputs belong to SBI channel 31 of any link.

The TXCH31 signal is generated by the MUX ASIC U10 pin #48 and received by all the SBI ASIC's pin #64. The timing relationship between the TXCH31 signal and the Parallel Data Inputs is shown in FIG. 28.

3.3.3 SBIADDR Bus

SBI ASIC's generate 10 address bits. The most significant 5 bits identify the link number and the least significant 5 bits identify the channel number of the current data on the Parallel Data Outputs.

4. Options

TSM101 uses a serial microprocessor link in order to provide the functions 1 and 2 described in the Unit Description section. The microprocessor serial bus is shared by the two MUX ASIC's on the board. The format of the Serial Link is defined as follows:

| Protocol : | Asynchronous |
|---|---|
| Word Format : | 11 bits total |
|  | 1 start bit |
|  | 8 data bits |
|  | 1 frame start |
|  | 1 stop bit |
| Parity : | None |
| First Bit Received : | LSB |
| Frame : | 6 words total |
| word 1 '11DDDDDDDD0' | |
| word 2 '10aaaaaaaa0' | |
| word 3 '10oooaaaaa0' | |
| word 4 '10dddddddd0' | |
| word 5 '10dddddddd0' | |
| word 6 '10ccccccccc0' | |
| msb    lsb | |
| where D = device address field | |
| o = operations field | |
| a = operation address field | |
| d = data field | |
| c = 8 bit frame checksum | |

The first bit of each 11-bit word is a start bit. The next 8 bits represent the data field where the least significant bit is first. The TSM101 responds to the Microprocessor Bus Input if the bit after the msb of the device address field is '1'.

The TSM101 recognizes two different device addresses; 10H (00010000), 11H (00010001). The mapping of the devices to the cross-connect function is as follows;

| Name | Device Addr | Cross-connect Function | |
|---|---|---|---|
|  | msb      lsb | PBI---->SBI | SBI---->PBI, |
| A | 10H (00010000) | SBI VI channels <----> SBI VI channels. | |
|  |  | Least Significant 8 bits of the channel. | |
|  |  | PBI---->SBI | SBI---->West PBI, |
| B | 11H (00010001) | SBI VI channels <----> SBI VI channels | |
|  |  | Most Significant 8 Bits of the channel. | |

If the device addresses of the TSM101 board are not selected, the Microprocessor Serial Link Output of the board is tri-stated.

The format of the operations field is described as follows:

| 123 | |
|---|---|
| 10oooaaaaa0 | |
| 01 bit | 0 = read |
|  | 1 = write |
| 02 bit | ignored on input |
|  | 1 on output |
|  | ignored on input |
| 03 bit | 0 = no checksum error (on output) |
|  | 1 = checksum error (on output) |

Five address bits of word 3 constitutes the most significant bits of the operation address. Eight address bits of word 2 constitutes the least significant bits of the operation address. The lsb of the operation address field corresponds the lsb of the address location inside the TSM101.

The data received on the Microprocessor Bus Input in word 4 is written to the location addressed by the operation address field if the lsb of operations field is '1'. Otherwise the data is not used by the TSM101. The 8 bit frame checksum is calculated as the sum of the 8 bit data fields of the first 5 words of the received frame with carries out of the msb discarded.

The checksum field received in word 6 is compared to the checksum that is calculated. If an error exists, the checksum error bit in the operations field is set during transmission on the Microprocessor Bus Output.

The functions performed by the TSM101 board related to the Serial Microprocessor Interface data are:

4.1 Parallel Bus Interface to SBI Grooming

The bit pattern in the address field defining this function is : a12=0, a7 a6 a5=0 0 0

Bits 4-0 of the address field 00H-1BH will define the link number of the SBI. The definitions of the data field bits are:

Bits 15-8: Unused
Bit 7: SBI Link Enable
Bits 6-5: Broadcast Code
00—No Broadcast
01—Broadcast SBI link '31' channel '9'
10—Broadcast SBI link '31' channel '10'
11—Broadcast SBI link '31' channel '11'
Bits 4-0: column address for SBI link mapping
Broadcast SBI link '31' channels '9-11, is inserted into channels 4-27 of the connected SBI.

One memory word is assigned to each of the SBI link addresses '0' through '27'. A particular column of data on the PBI Data inputs is output to the SBI Link specified in this part of the memory if the SBI outputs are enabled and the Broadcast Select bits are '00' in the cross-connect word.

The SBI outputs are enabled (driven from tri-state condition) when the SBI enable bit is set. If the SBI enable bit is cleared, the SBI data outputs are disabled, (allowed to float to a tri-state high impedance condition).

If the Broadcast word select bits are not '00', then the data that was received from the SBI data inputs from SBI Link address '31', channels '9', '10', '11' will be transferred to the SBI data outputs for all words where the SBI channel address is '4' through '27'. The SBI data outputs for SBI channel addresses '1-3' will continue to be the PBI input data, and the SBI data outputs for the SBI channel addresses '0', and '28' through '31' will remain unchanged.

4.2 VI Channel to Channel 31 Crossconnection

The bit pattern in the address field defining this function is : a12=0, a7 a6 a5=0 0 1

Bits 4-0 of the address field '20H' through '3BH' will define the link number of the channel 31 for SBI links 0-27. The definition of the data field bits is:

Bits 15-8: Unused
Bit 7: SBI Enable
Bits 6-5: Input Select Code
00=Select SBI channel 31 of the links 0-31, selected link defined by the bits 4-0.
01=Select SBI channels 0-30 of the link 29, selected channel defined by the bits 4.0
10=Select SBI channels 0-30 of the link 30, selected channel defined by the bits 4-0
11=Select SBI channels 0-30 of the link 31, selected channels defined by the bits 4-0
Bits 4-0: SBI link or channel numbers The data on a particular channel defined by the data field bits 7-0 will be output to the SBI channel defined by the address field. This only occurs when the SBI Enable bit is set. If the SBI Enable bit is cleared, the Parallel SBI Data Outputs from the MUX ASIC'S are tri-stated.

4.3 SBI to Parallel Bus Interface Grooming

The bit pattern in the address field defining this function is: a12=0, a7 a6 a5=0 1 0

Bits 4-0 of the address field '40H' through '5BH' will define the link number of the PBI. The definition of the data field bits is:

Bits 15-8: Unused
Bit 7: PBI Enable
Bits 6-5: Broadcast Code
00—No Broadcast
01—Broadcast SBI link '31' channel '9'
10—Broadcast SBI link '31' channel '10'
11—Broadcast SBI link '31' channel '11'
Bits 4-0: SBI link number for column mapping
Broadcast SBI link '31' channels
'9-11' is inserted into rows 0-26 of the addressed PBI.

The data on a particular link on the SBI data inputs are output to the PBI column specified in this portion of the memory. This only occurs when the PBI Enable bit is set and the Broadcast Select bits are '00' in the assigned cross-connect word.

If the PBI enable bit is cleared, the data on the PBI data outputs will either be the data received on the PBI data inputs or the idle code (see section 4.9). If the Broadcast select bits are not '00', than the data that was received from the SBI data inputs for SBI Link address '31', channel '9', '10' or '11' will be transferred to the PBI data outputs for all words where the PBI row address is '0' through '26'.

4.4 SBI to Parallel Bus Interface Overhead Crossconnection

The bit pattern in the address field defining this function is : a12=0, a7 a6 a5=0 1 1

Bits 1-0 will define the column number and bits 4-2 will define the row number of the address field '60H' through '7F'. The definition of the address field bits is shown below,

| | |
|---|---|
| Bits 1-0: | 00=PBI Column 28 |
| : | 01=PBI Column 29 |
| : | 10=PBI Column 30 |
| : | 11=PBI Column 31 |
| Bits 4-2: | 000=PBI Row 24 |
| : | 001=PBI Row 9 |
| : | 010=PBI Row 18 |
| : | 011=PBI Row 3 |
| : | 100=PBI Row 12 |
| : | 101=PBI Row 21 |
| : | 110=PBI Row 6 |
| : | 111=PBI Row 7 |

The definition of the data field bits is as follows:
Bits 15-8: Unused
Bit 7: PBI Output Enable
Bits 6-5: Unused
Bit 4: 0 selects SBI link 29, 1 selects SBI link 31
Bits 3-0: SBI channel number 1-15 0 selects SBI Channel 16

If the PBI enable bit is 1, the data on a particular SBI link and channel defined by the data field bits are output to the PBI columns and rows specified in the address field. If the PBI Enable bit is zero, the data on the Parallel Bus Interface Data Outputs will either contain the PBI input data thru or an idle code with all 1's except the most significant bit, (section 4.9). The most significant bit of the idle code will be 0.

4.5 VI Channel to SBI Link 28 Crossconnection

The bit pattern in the address field defining this function is: a12=0, a7 a6 a5=1 0 0

Bits 4-0 of the address field '80' through '9F' will define the channel number of the SBI link 28. The definition of the data field bits is:

Bits 15-8: Unused
Bit 7: SBI Enable Bit
Bits 6-5: Input Select Code
00=Select SBI channel 31 of the links 0-31, selected link defined by the bits 4-0.
01=Select SBI channels 0-30 of the link 29, selected channel defined by the bits 4-0
10=Select SBI channels 0-30 of the link 30, selected channel defined by the bits 4-0
11=Select SBI channels 0-30 of the link 31, selected channels defined by the bits 4-0
Bits 4-0: SBI link or channel numbers The data on a particular channel defined by the data field bits 7-0 will be output to the SBI channel defined by the address field. This only occurs when the SBI Enable bit is set. If the SBI Enable bit is cleared, the Parallel SBI Data Outputs from the MUX ASIC'S are tri-stated.

4.6 Parallel Bus Interface to SBI Link 29 & 31 Crossconnection

The bit pattern in the address field defining this function is: a12=0, a7 a6 a5=1 0 1, Link 29 a12=0, a7 a6 a5=1 1 1, Link 31

Bits 4-0 of the address field defines the channel number of the SBI link 29 and 31.

The bits of the data word for memory addresses 'A1' through 'B0' and 'E1' through 'F0' will be allocated as follows:

Bits 15-8: Unused
Bit 7: PBI Enable Bit

The function of the remaining bits will depend on the value of the address field bits 4-0 as follows:

| Address Bits<br>4-0 | Data Bits<br>6-5 | Data Bits<br>4-2 | Data Bits<br>1-0 |
|---|---|---|---|
| 00H | XX | XX | XX |
| 01H-10H | XX | Row | Column | where, Row=
- 000: PBI row 24
- 001: PBI row 9
- 010: PBI row 13
- 011: PBI row 3
- 100: PBI row 12
- 101: PBI row 21
- 110: PBI row 6
- 111: PBI row 7

Column=
- 00: PBI column 28
- 01: PBI column 29
- 10: PBI column 30
- 11: PBI column 31

If the PBI enable bit is 1, the data on a particular row and column defined by the data field is output to the channel specified in the address field. If the SBI enable bit is 0, the Parallel SBI Data Outputs are tri-stated.

4.7 SBI to SBI Link 29 & 31 Crossconnection

The bit pattern in the address field defining this function is: a12=0, a7 a6 a5=1 0 1, Link 29 a12=0, a7 a6 a5=1 1 1, Link 31

Bits 4-0 of the address field defines the channel number of the SBI link 29 and 31.

The bits of the data word for memory addresses 'B1' through 'BF' and 'F1' through 'FF' will be allocated as follows:

Bits 15-8: Unused
Bit 7: PBI Enable Bit

The function of the remaining bits will depend on the value of the address field bits 4-0 as follows:

| Address Bits<br>4-0 | Data Bits<br>6-5 | Data Bits<br>4-0 |
|---|---|---|
| 11H-1FH | 00 | Channel 31 SBI link 0-31 |
| | 01 | SBI link 29 Channel 0-30 |
| | 10 | SBI link 30 Channel 0-30 |
| | 11 | SBI link 31 Channel 0-30 |

If the PBI enable bit is 1, the data on a particular channel defined by the data field is output to the channel specified in the address field. If the SBI enable bit is 0, the Parallel SBI Data Outputs are tri-stated.

4.8 VI Channel to SBI Link 30 Crossconnection

The bit pattern in the address field defining this function is: a12=0, a7 a6 a5=1 1 0

Bits 4-0 of the address field 'C0' through 'DF' will define the channel number of the link 30. The definition of the data field bits is:

Bits 15-8: Unused
Bit 7: SBI Enable
Bits 6-5: Input Select Code

00 = Select SBI channel 31 of the links 0-31, selected link defined by the bits 4-0.
01 = Select SBI channels 0-30 of the link 29, selected channel defined by the bits 4-0
10 = Select SBI channels 0-30 of the link 30, selected channel defined by the bits 4-0
11 = Select SBI channels 0-30 of the link 31, selected channels defined by the bits 4-0

Bits 4-0: SBI link or channel numbers

If the SBI Enable Bit is 1, the data on a particular channel defined by the data field is output to the SBI channel defined by the address field. If the SBI Enable Bit is 0, the Parallel SBI Data Outputs from the MUX ASIC are tri-stated.

4.9 Control Register Operation

The SBII (Parallel data transmitted from MUX ASIC and received by the SBI ASIC) outputs of the MUX ASIC are tri-stated during power on reset. The SBII outputs will stay tri-stated independent of the Enable Bits mentioned in sections 4.1 through 4.8 until microprocessor sets a control bit. This function is performed through the Microprocessor Serial Interface. Each MUX ASIC has its own control register.

The MUX ASIC uses another control bit to choose between two different address generation schemes. In one case the MUX ASIC uses the address bits received from Parallel Bus Interface Address Inputs to synchronize its address counters (sync mode). In the other case the MUX ASIC will generate its addresses independent of the address bits received from the Parallel Bus Interface Address Inputs (free running mode). The function is performed through the Microprocessor Serial Interface.

The control register of the MUX ASIC is not readable through the microprocessor interface. Any read operation performed on the control registers will effectively write the data specified on the data field of the Microprocessor Serial Interface and after reading the control register back for verification, will send the data back in the data field of the Microprocessor Serial Interface. Different from a write operation, only the addressed MUX ASIC will respond to a control register read operation.

The bit pattern in the address field defining these functions are: a12=1. All other address field bits are don't cares.

The definition of the data field bits is:
Bits 15-3: Unused
Bit 2: LED Bit (see section 5)
Bits 1-0: See Below

| Bit 1<br>MODE | Bit 0<br>SYNC | Connect Memory<br>Bit 7 | Function |
|---|---|---|---|
| 0 | 0 | X | a |
| 0 | 1 | X | b |
| 1 | 0 | 0 | c |
| 1 | 0 | 1 | d |
| 1 | 1 | 0 | e |
| 1 | 1 | 1 | f | a) Parallel Data Outputs from the MUX ASIC's to the SBI ASIC's are tri-stated. Parallel Bus Interface Data Outputs contain idle code. Parallel Data Interface of the TSM101 is in free running mode, (TSM101 Parallel Sync. Outputs are not synchronized with the incoming Parallel Addresses).

b) Parallel Data Outputs from the MUX ASIC's to the SBI ASIC's are tri-stated. Parallel Bus Interface Data Outputs contain idle code. Parallel Data Interface of the TSM101 is in sync mode, (TSM101 Parallel Sync. Outputs are synchronized with the incoming Parallel Addresses).

c) Parallel Data Outputs from the MUX ASIC's to the SBI ASIC's are tri-stated. Parallel Bus Interface Data Outputs contain idle code. Parallel Data Interface of the TSM101 is in free running mode, (TSM101 Data and Sync. Outputs are not synchronized with the incoming Parallel Addresses).

d) Parallel Data Outputs from the MUX ASIC's to the SBI ASIC's are connected to the provisioned SBI. Parallel Bus Interface Data Outputs are connected to the provisioned SBI. Parallel Data Interface of the TSM101 is in free running mode, (TSM101 Parallel Data Outputs are not synchronized with the incoming Parallel Addresses).

e) Parallel Data Outputs from the MUX ASIC's to the SBI ASIC's are tri-stated. Parallel Bus Interface Data Outputs transmit the data that was on the Parallel Bus Interface Data Inputs $5+\frac{1}{2}$ 8.192 MHZ Clocks earlier, (through case). Parallel Data Interface of the TSM101 is running in sync mode, (TSM101 Parallel Data Outputs are synchronized with the incoming Parallel Addresses).

f) Parallel Data Outputs from the MUX ASIC's to the SBI ASIC's are connected to the provisioned SBI. Parallel Bus Interface Data Outputs are connected to the provisioned SBI. Parallel Data Interface of the TSM is running in sync mode, (TSM Parallel Data Outputs are synchronized with the incoming Parallel Addresses).

Following the power on reset, the default values of the data bits are: d2 d1 d0=0 0 0.

In the sync mode, transfer of the data from the Parallel Bus Interface Data Inputs to the Parallel Bus Interface Data Outputs will take eleven 16.384 MHZ clock cycles.

5 Unit Alarms

The TSM101 board has a visible unit alarm to indicate the failure of the board. It consists of an LED located at the front panel. It can only be turned ON or OFF by the microprocessor through the Microprocessor Serial Interface. For the detailed discussion of the Microprocessor Serial Interface, refer to the section describing Options (Section 4).

The bit pattern in the address field defining this function is: a12=1. All other address field bits are don't cares.

The definition of the data field bits is:
Bits 15-3: Unused
Bit 2: 0 will turn LED of : 1 will turn LED on
Bits 1-0: Synchronization and Enable bits (See section 4.9)

On power on reset the default values of the data bits are: d2 d1 d0 =0 0 0.

6 Test and Maintenance

A test point is provided for every node of the circuit. They are provided either by the pins of the through hole components or by the test access points. The test access points are shown in the Schematic Drawings (625215-002) of the board.

The TSM101 board provides SBI loopback feature for non-service effecting diagnostics. Loopback diagnostics is initiated by inserting the loopback code and data to the VI channel of the desired SBI link through NCP SBI link 30. For the details of loopback initiation, refer to TSM101/301 (Performance Specification). Due to hardware restrictions of the SBI ASIC only one of the SBI links should be looped back at one time.

TECHNICAL DESCRIPTION TIME SLOT MULTIPLEXER/ADM; TSM201/A

1. General Description

This document provides a technical description of the TSM201 (Time Slot Multiplexer) unit (625216-000-001).

This unit is intended to be used in the ADM (Add Drop Multiplexer) project.

This document includes the detailed description of the TSM201 unit including the timing relationship between the specific devices within the unit, and the timing relationship between the unit and the surrounding units.

2. Unit Description

The 625216-000 Time Slot Multiplexer (TSM201) unit provides cross-connection between the Serial Bus Interface Links (SBI) and two Parallel Bus Interface Links (PBI).

One of the Parallel Bus Interfaces will be referred as the East Parallel Bus Interface, and the other one will be referred as the West Parallel Bus Interface. The functions of the TSM201 pba are:

1) To provide the cross-connection of DS-1's, Orderwire, Data/Comm, VI, Path Tracer and User channels between the SBI links and the Parallel Bus Interfaces.
2) To provide VI channel cross-connection between the channels of the SBI link '30' and the '31st' channel of the links '0-30'.
3) To provide data transfer between the East and the West Parallel Bus Interfaces.
4) To provide timing signals to the other units for synchronization of data and address.

A serial microprocessor interface allows a control processor to configure the cross-connect function of the TSM201.

Figure 29A:
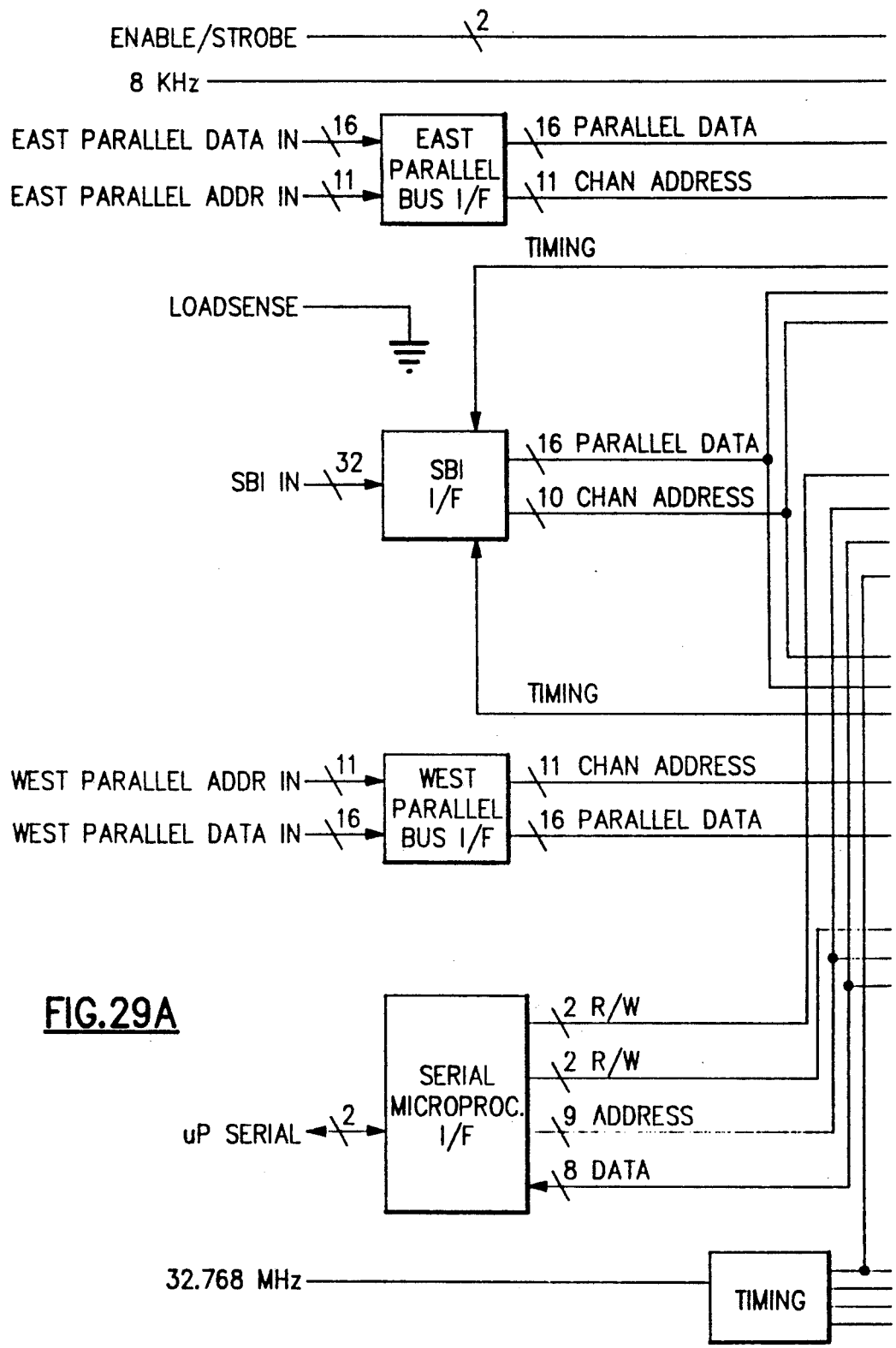
FIGS. 29A and 29B, is an overall block diagram of the timeslot multiplexer used in an add/drop multiplexer (ADM) device.
Figures 29, 29B:
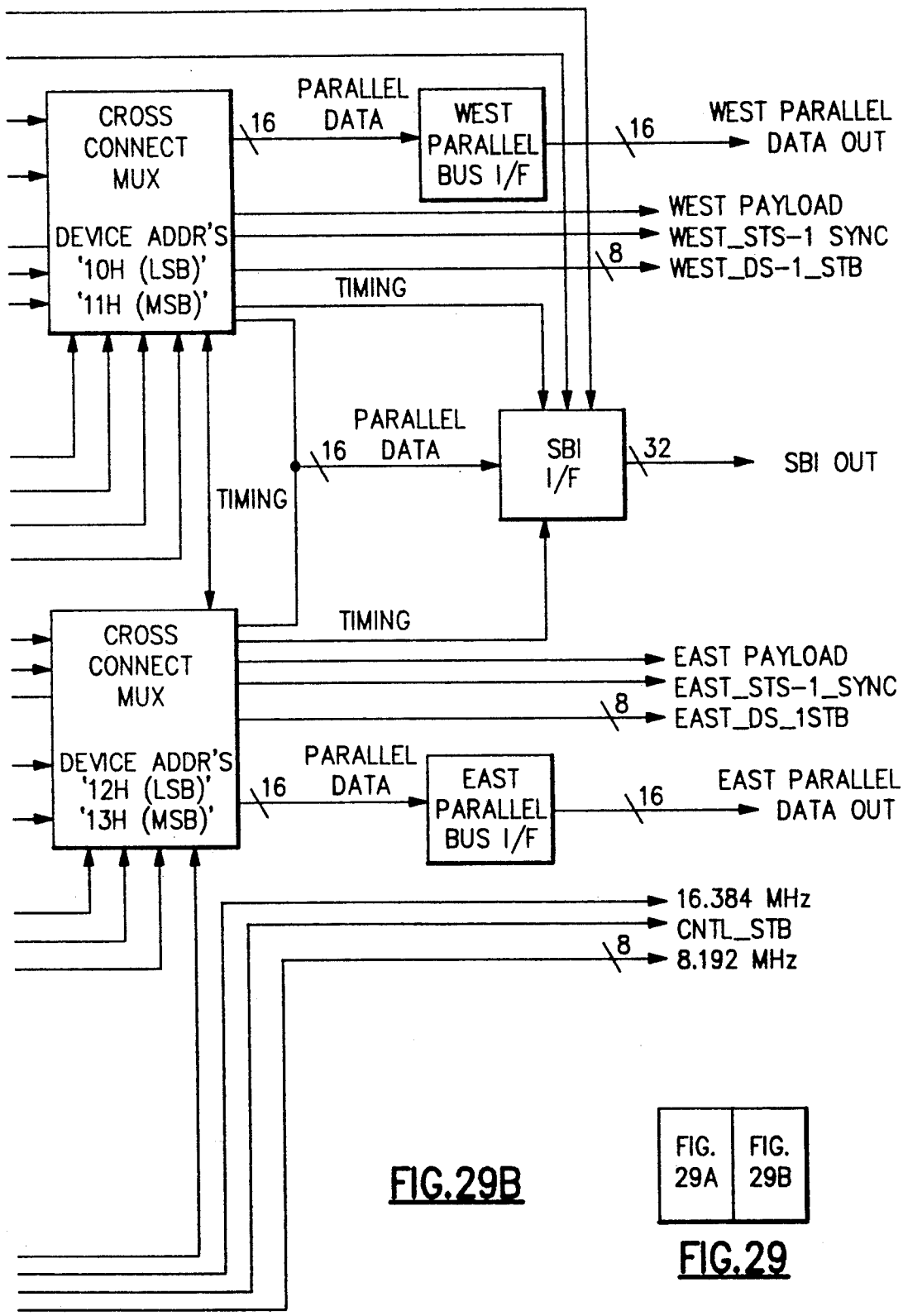
FIG. 29, comprising

Block diagram of the unit is given in FIG. 29.

3. Detailed Description

The description of the board will be made by defining four separate interfaces and the specific devices related with these interfaces. These interfaces are:

1) Serial Bus Interface,
2) East Parallel Bus Interface,
3) West Parallel Bus Interface,
4) Internal Parallel Bus.

3.1 Serial Bus Interface

The 32 SBI links are shared by 4 identical SBI ASIC (Application Specific Integrated Circuit) devices each device handling 8 of the links. Reference designator for these devices are U8, U9, U10, and U11. Each SBI ASIC has configuration inputs hardwired to 0v's or 5v's through pull-up and pull-down resistors to identify the links they are handling. For the identification purpose, SBI ASIC's use pin #49 and 37. For this unit's specific application U8 is handling links 0-7, U9 is handling links 8-15, U10 is handling links 16-23, and U11 is handling links 24-31.

3.1.1 SBI Inputs

The SBI links consist of 32 serial links. The rate of each of the serial links is 4.096 Mbits/sec. Each of the serial links transports 32 sixteen bit channels in a 125 microsecond period. 1024 SBI channels contained in a 125 microsecond period is called an SBI frame.

After receiving 4.096 Mbits/sec rate of data through the SBI links, each SBI ASIC recovers 4.096 MHZ clock by using a 16 384 MHZ clock signal provided by the timing circuitry on the unit. During the recovery process, SBI ASIC assumes no phase relationship between the 16.384 MHZ clock and the other strobes it is receiving. The SBI data transmitter and the SBI ASIC should use the same clock source to prevent slips occurring at the data and clock edges during the clock recovery process.

The TSM201 board transmits two signals to synchronize its SBI inputs with the unit(s) generating the SBI signal(s).

1) DS1 Strobe: The TSM201 board generates the DS1 Strobe signal to identify the time slot that it expects to see the channel 0 of every SBI link on its SBI inputs. When the TSM201 board sends the DS1 Strobe, it expects to receive the channel 0 of every link between 4 to 132 16 384 MHZ clock cycles. The restriction comes from the limited memory source of the MUX ASIC.

2) The TSM201 board sends a 8.192 MHz clock signal to the units transmitting the SBI links.

Figure 30:
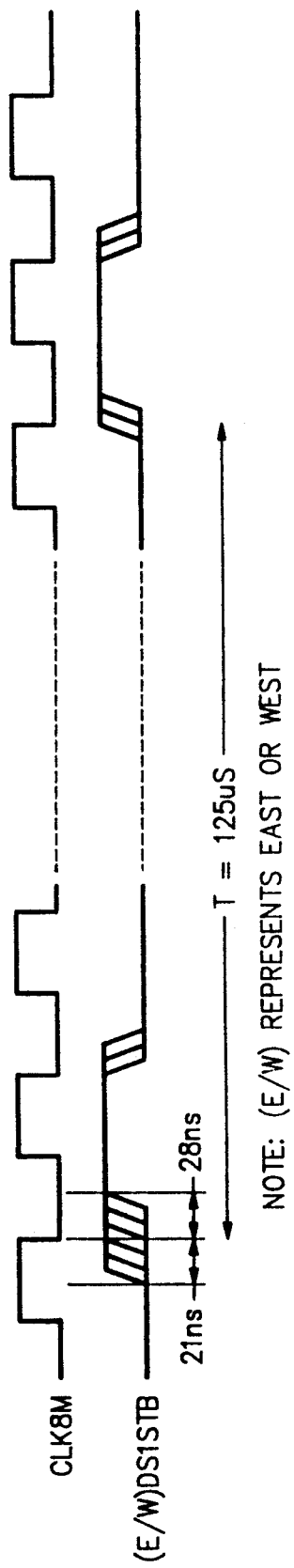
FIG. 30 is a timing diagram associated with the timeslot multiplexer for use in an add/drop multiplexer.

The phase relationship between the 8.192 MHz clock and the DS1 Strobe is shown in FIG. 30.

3.1.2 SBI Outputs

The format of the SBI Outputs is the same as the format of the SBI Inputs.

The SBI ASIC's receive two signal patterns that will enable or disable the outputs of the SBI ASIC's. When disabled, SBI outputs will transmit all ones. When enabled, SBI outputs will resume their normal operation.

The control signal is received from pin #74 of the SBI ASIC's U8, U9, U10, and U11. The control signal is clocked in using the 64 KHZ clock input to the pin #75 of the same ASIC's.

The signal pattern to disable the SBI outputs is:

| 1 | 1 | 0 | 0 | 0 | 1 | 0 | 1 | 0 | 0 |
|---|---|---|---|---|---|---|---|---|---|
| first bit received | | | | | | | | | |

The signal pattern to enable the SBI outputs is:

| 1 | 1 | 0 | 0 | 0 | 1 | 0 | 1 | 0 | 1 |
|---|---|---|---|---|---|---|---|---|---|
| first bit received | | | | | | | | | |

Following a power on reset, the SBI outputs are enabled.

3.2 East Parallel Bus Interface

The TSM201 board interfaces 16 bit data input, 11 bit address input, and 16 bit data output words on its East Parallel Bus Interface. The parallel bus operates at 8.192 Mwords/sec rate.

The East Parallel Bus Interface is shared by 4 MUX ASIC devices U12, U13, U14 and U15.

3.2.1 East Parallel Bus Interface Data Inputs

On the East Parallel Bus Interface Data Inputs TSM201 pba expects 1024 words (a word consists of 16 bits) of data repeated every 125 microseconds. The most significant bit of the 11 bit address input will indicate whether the current data on the East Parallel Bus Interface Data Inputs is valid or invalid.

16 bit data inputs of the East Parallel Bus Interface are received by the MUX ASIC's U12 and U13. MUX ASIC U12 receives the lower order 8 bits of the data and the MUX ASIC U13 receives the higher order 8 bits of the data.

The contents of the East Parallel Bus Interface Data Inputs are transparent to the TSM201 pba.

3.2.2 East Parallel Bus Interface Address Inputs

The East Parallel Bus Interface Address Inputs consist of 11 bit parallel addresses.

Address Format:

Bit 10: when it is high, bit indicates that the parallel data on the Parallel Bus Interface Data Inputs is invalid.

Bits 9-5: column number of the current data on the East Parallel Bus Interface Data Inputs.

Bits 4-0: row number of the current data on the East Parallel Bus Interface Data Inputs.

Bit 9 and 4 are the MSB's.

The address inputs of the East Parallel Bus Interface are received by the MUX ASIC's U12 and U13.

3.2.3 East Parallel Bus Interface Data Outputs

The East Parallel Bus Interface Data Outputs consist of 16 bit parallel words running at 8.192 Mwords/sec rate.

16 bit data output of the East Parallel Bus Interface is transmitted by the MUX ASIC's U14 and U15. MUX ASIC U14 transmits the lower order 8 bits of the data and MUX ASIC U15 transmits the higher order 8 bits of the data.

Parallel data consists of 16 bit words running at 8.192 MHZ. When the sync enable is on (section 4.9), the word on the East Parallel Bus Interface Data Output will occupy the same column and row with the word that was on the West Parallel Bus Interface Inputs $5+\frac{1}{2}$ clock periods earlier, (wrt 8.192 MHz clock).

The TSM201 pba will insert invalid data at specific intervals to the East Parallel Bus Interface Data Outputs.

The TSM201 pba will transmit 2 synchronization signals to show the status of the data on the East Parallel Bus Interface Data Outputs.

1) EPYLD (East Payload): The EPYLD signal will be high when valid data on the East Parallel Bus Interface Data Outputs correspond to column 0-27 and 31 for rows 0-26, and will be low for the remaining words.

2) ESTS1SYNC (East STS-1 Sync): The ESTS1SYNC signal is issued twice per frame, once when the data on the East Parallel Bus Interface Data Outputs corresponds to column '28' row '15' (A1 byte in the SONET frame), and once for column '31' row '24' (J1 byte in the SONET Frame). The ESTS1SYNC signal will be a pulse of width approximately 122 ns.

The TSM201 pba generates 8.192 MHZ (ECSTB) and 16.384 MHZ (ECLK16M) clock signals to synchronize the address and the data on the East Parallel Bus Interface. The relationship between the clocks and the East Parallel Bus Interface data inputs, East Parallel Bus Interface address inputs, and data outputs is shown in FIG. 26. The timing relationship between the clocks and the ESTS1SYNC is the same as the timing relationship between the clocks and the East Parallel Bus Interface Data Outputs.

3.3 West Parallel Bus Interface

The TSM201 board interfaces 16 bit data input, 11 bit address input, and 16 bit data output words on its West Parallel Bus Interface. The parallel bus operates at 8.192 Mwords/sec rate.

The West Parallel Bus Interface is shared by 4 MUX ASIC devices U12, U13, U14 and U15.

3.3.1 West Parallel Bus Interface Data Inputs

On the West Parallel Bus Interface Data Inputs TSM201 pba expects 1024 words (16 bits) of data repeated every 125 microseconds. The most significant bit of the 11 bit address input will indicate whether the current data on the West Parallel Bus Interface Data Inputs is valid or invalid.

16 bit data inputs of the West Parallel Bus Interface are received by the MUX ASIC's U14 and U15. MUX ASIC U14 receives the lower order 8 bits of the data and the MUX ASIC U15 receives the higher order 8 bits of the data.

The contents of the West Parallel Bus Interface Data Inputs are transparent to the TSM201 pba.

3.3.2 West Parallel Bus Interface Address Inputs

The West Parallel Bus Interface Address Inputs consist of 11 bit parallel addresses.

Address Format:

Bit 10: when it is high, bit indicates that the parallel data on the Parallel Bus Interface Data Inputs is invalid.

Bits 9-5: column number of the current data on the East Parallel Bus Interface Data Inputs.

Bits 4-0: row number of the current data on the East Parallel Bus Interface Data Inputs.

Bit 9 and 4 are the MSB's.

The address inputs of the West Parallel Bus Interface are received by the MUX ASIC's U14 and U15.

3.3.3 West Parallel Bus Interface Data Outputs

The West Parallel Bus Interface Data Outputs consist of 16 bit parallel words running at 8.192 Mwords/sec rate.

16 bit data output of the West Parallel Bus Interface is transmitted by the MUX ASIC's U12 and U13. MUX ASIC U14 transmits the lower order 8 bits of the data and MUX ASIC U15 transmits the higher order 8 bits of the data.

Parallel data consists of 16 bit words running at 8.192 MHZ. When the sync enable is on (section 4.9), the word on the West Parallel Bus Interface Data Outputs will occupy the same column and row with the word that was on the East Parallel Bus Interface Inputs $5+\frac{1}{2}$ clock periods earlier, (wrt 8.192 MHz clock).

The TSM201 pba will insert invalid data at specific intervals to the West Parallel Bus Interface Data Outputs.

The TSM201 pba will transmit 2 synchronization signals to show the status of the data on the West Parallel Bus Interface Data Outputs.

1) WPYLD (West Payload) The WPYLD signal will be high when valid data on the West Parallel Bus Interface Data Outputs correspond to column 0-27 and 31 for rows 0-26, and will be low for the remaining words.

2) WSTS1SYNC (West STS-1 Sync): The WSTS1SYNC signal is issued twice per frame, once when the data on the West Parallel Bus Interface Data Outputs corresponds to column '28' row '15' (A1 byte in the SONET frame), and once for column '31' row '24' (J1 byte in the SONET Frame). The WSTS1SYNC signal will be a pulse of width approximately 122 ns.

The TSM201 pba generates an 8.192 MHZ (WCSTB) and 16.384 MHZ (WCLK16M) clock signals to synchronize the address and the data on the West Parallel Bus Interface. The relationship between the clocks and the West Parallel Bus Interface data inputs, West Parallel Bus Interface address inputs, and data outputs is shown in FIG. 26. The timing relationship between the clocks and the WSTS1SYNC is the same as the timing relationship between the clocks and the West Parallel Bus Interface Data Outputs.

3.4 Internal Parallel Bus

The Internal Parallel Bus is the bus shared by the SBI ASIC's and the MUX ASIC's. It consists of two separate 16 bit data buses and one 10 bit address bus. The buses will be named as SBIO, SBII, and SBIADDR. The descriptions of the buses are:

3.4.1 SBIO Bus

The SBIO Bus is a 16 bit parallel data bus running at 8.192 Mwords/sec, transmitted from SBI ASIC's and received by the MUX ASIC's. The 16 bit parallel data outputs of the SBI ASIC's are connected together. The lower order 8 bits of the data are received by the MUX ASIC's U12, and U14. The higher order 8 bits of the data are received by the MUX ASIC's U13, U15.

After power on reset Parallel Data Outputs of all the SBI ASIC chips will be tri-stated. After receiving 256 KHZ (122 ns pulse) signal from the MUX ASIC's the parallel data and address outputs will be time shared by the SBI ASIC's depending upon their configuration address inputs. 256 KHZ will provide each SBI ASIC chip 976 ns to transmit 1 channel of each of the 8 consecutive links.

The 256 KHZ strobe signal is generated by MUX ASIC U10 pin #49 and received by all SBI ASIC's pin #20. The timing relationship between the 256 KHZ strobe signal and the transmitted parallel data is shown in FIG. 27.

The SBI ASIC's will search for the sync code in channel 0 of every link. Two consecutive frames having the correct sync pattern will generate an in-sync condition. After the in-sync condition is established, four consecutive frames of sync pattern errors will establish an out-of-sync condition. When in-sync condition is not established for a link, the SBI ASIC will insert 1's for every bit in that particular link during transmission on the Parallel Data Outputs.

3.4.2 SBII Bus

The SBI ASIC's receive 16 bit parallel data words on their Parallel Data Inputs. The parallel data is transmitted by the MUX ASIC's. After power on reset the parallel data outputs of the MUX ASIC's are tri-stated. The SBI ASIC's also receive three signals which identify the location of the current data on the Parallel Data Inputs, (TXSYNC, TXCH0,TXCH31). The functions of these signals are:

3.4.2.1 TXSYNC indicates that the current data on the Parallel Data Inputs belong to SBI link 0. It occurs once every 3.9 us.

The TXSYNC signal is generated by MUX ASIC U12 pin #37 and received by all SBI ASIC's pin #9 and the MUX ASIC's U13, U14, U15. The timing relationship between the TXSYNC signal and the Parallel Data Inputs is shown in FIG. 27.

3.4.3.2 TXCH0 indicates that the current data on the Parallel Data Inputs belong to channel 0 of any link. It will occur 32 times every 125 us.

The TXCH0 signal is generated by the MUX ASIC's U12 and U14 pin #36, and received by all the SBI ASIC's pin #63. The TXCH0 outputs of the MUX ASIC's U12 and U14 are synchronized by the East and the West Parallel Bus Interface Address Inputs respectively. TXCH0 Outputs of the MUX ASIC's U12 and U14 are ORed before they interface the SBI ASIC's. The timing relationship between the TXCH0 signal and the Parallel Data Inputs is shown in FIG. 28.

3.4.2.3 TXCH31 indicates that the current data on the Parallel Data Inputs belong to SBI channel 31 of any link.

The TXCH31 signal is generated by the MUX 's ASIC U12 and U14 pin #48, and received by all the SBI ASIC's pin #64. The TXCH31 outputs of the MUX ASIC's U12 and U14 are synchronized by the East and the West Parallel Bus Interface Address Inputs respectively. TXCH31 Outputs of the MUX ASIC's U12 and U14 are ORed before they interface the SBI ASIC's. The timing relationship between the TXCH31 signal and the Parallel Data Inputs is shown in FIG. 28.

3.4.3 SBIADDR Bus

SBI ASIC's generate 10 address bits. The most significant 5 bits identify the link number and the least significant 5 bits identify the channel number of the current data on the Parallel Data Outputs. The address bus is received by the MUX ASIC's U12, U13, U14 and U15.

4 Options

TSM201 uses a serial microprocessor link in order to provide the functions 1,2 and 3 described in the Unit Description section. The microprocessor serial bus is shared by the four MUX ASIC's on the board. The format of the Serial Link is defined as follows:

| | |
|---|---|
| Protocol: | Asynchronous |
| Word Format: | 11 bits total |
| | 1 start bit |
| | 8 data bits |
| | 1 frame start |
| | 1 stop bit |
| Parity: | None |
| First Bit Received: | LSB |
| Frame: | 6 words total |
| | word 1 '11DDDDDDDD0' |
| | word 2 '10aaaaaaaa0' |
| | word 3 '10oooaaaaa0' |
| | word 4 '10dddddddd0' |
| | word 5 '10dddddddd0' |
| | word 6 '10cccccccc0' |
| | msb          lsb | where
D = device address field
o = operations field
a = operation address field
d = data field
c = 8 frame checksum The first bit of each 11-bit word is a start bit. The next 8 bits represent the data field where the least significant bit is first. The TSM201 responds to the Microprocessor Bus Input if the bit after the msb of the device address field is '1'.

The MUX recognizes four different device addresses; 10H (00010000), 11H (00010001), 12H (00010010), 13H(00010011). The mapping of the devices to the cross-connect function will be as follows;

| Name msb | Device Addr lsb | Cross-connect Function |
|---|---|---|
| | | East PBI——>West PBI, East PBI——> SBI——>West PBI, |
| U12 | 10H (00010000) | SBI VI channels <———> SBI VI channels. Least Significant 8 bits of the channel. |
| | | East PBI——>West PBI, East PBI——>SBI, SBI——>West PBI, |
| U13 | 11H (00010001) | SBI VI channels <———> SBI VI channels Most Significant 8 Bits of the channel. |
| | | West PBI——>East PBI, West PBI——>SBI, SBI——>East PBI, |
| U14 | 12H (00010010) | SBI VI channels <———> SBI VI channels. Least Significant 8 bits of the channel. |
| | | West PBI——>East PBI, West PBI——>SBI, SBI——>East PBI |
| U15 | 13H (00010011) | SBI VI channels <———> SBI VI channels. Most Significant 8 bits of the channel. |

If the device addresses of the TSM201 board are not selected, the Microprocessor Serial Link Output of the board is tri-stated.

The format of the operations field is described as follows:

| | 123 |
|---|---|
| | 10000aaaaa0 |
| bit 01 | 0 = read |
| | 1 = write |
| bit 02 | ignored on input |
| | 1 on output |
| bit 03 | ignored on input |
| | 0 = no checksum error (on output) |
| | 1 = checksum error (on output) |

Five address bits of word 3 will constitute the most significant bits of the operation address. Eight address bits of word 2 will constitute the least significant bits of the operation address. The lsb of the operation address field corresponds the lsb of the address location inside the TSM201.

The data received on the Microprocessor Bus Input in word 4 is written to the location addressed by the operation address field if the lsb of operations field is '1'. Otherwise the data is not used by the TSM201. The 8 bit frame checksum is calculated as the sum of the 8 bit data fields of the first five words of the received frame with carries out of the msb discarded.

The checksum field received in word 6 is compared to the checksum that is calculated. If an error exists, the checksum error bit in the operations field is set during transmission on the Microprocessor Bus Output.

The functions described in sections 4.1 through 4.9 can be performed by either of the devices depending upon the choice of the device addresses.

The devices U12 and U14, (U13 and U15) share the same SBII bus during transmission of the data from the MUX ASIC's to the SBI ASIC's. When using the following options, SBII outputs of both of the devices should not be enabled at the same time.

The functions performed by the TSM201 board related to the Serial Microprocessor Interface data are:

4.1 Parallel Bus Interface to SBI Grooming

The bit pattern in the address field defining this function is: a12=0, a7 a6 a5=0 0 0

Bits 4–0 of the address field 00H-1BH will define the link number of the SBI. The definitions of the data field bits are:

Bits 15–8: Unused
Bit 7: SBI Link Enable
Bits 6–5: Broadcast Code
00—No Broadcast
01—Broadcast SBI link '31' channel '9'
10—Broadcast SBI link '31' channel '10'
11-Broadcast SBI link '31' channel '11'
Bits 4–0: column address for SBI link mapping Broadcast SBI link '31' channels '9-11' is inserted into channels 4-27 of the connected SBI.

One memory word is assigned to each of the SBI link addresses '0' through '27'. A particular column of data on the PBI Data inputs is output to the SBI Link specified in this part of the memory if the SBI outputs are enabled and the Broadcast Select bits are '00' in the cross-connect word.

The SBI outputs are enabled (driven from tri-state condition) when the SBI enable bit is set. If the SBI enable bit is cleared, the parallel SBI data outputs from the MUX ASIC's are disabled, (allowed to float to a tri-state high impedance condition).

If the Broadcast word select bits are not '00', then the data that was received from the SBI data inputs from SBI Link address '31', channels '9', '1', '11' will be transferred to the SBI data outputs for all words where the SBI channel address is '4' through '27'. The SBI data outputs for SBI channel addresses '1-3' will continue to be the PBI input data, and the SBI data outputs for the SBI channel addresses '0', and '28' through '31' will remain unchanged.

4.2 VI Channel to Channel 31 Crossconnection

The bit pattern in the address field defining this function is: a12=0, a7 a6 a5=0 0 1

Bits 4–0 of the address field '20H' through '3BH' will define the link number of the channel 31 for SBI links 0-27. The definition of the data field bits is:

Bits 15-8: Unused
Bit 7: SBI Enable
Bits 6-5: Input Select Code
00=Select SBI channel 31 of the links 0-31, selected link defined by the bits 4-0.
01=Select SBI channels 0-30 of the link 29, selected channel defined by the bits 4-0
10=Select SBI channels 0-30 of the link 30, selected channel defined by the bits 4-0
11=Select SBI channels 0-30 of the link 31, selected channels defined by the bits 4-0
Bits 4-0: SBI link or channel numbers The data on a particular channel defined by the data field bits 7-0 will be output to the SBI channel defined by the address field. This only occurs when the SBI Enable bit is set. If the SBI Enable bit is cleared, the parallel SBI data outputs from the MUX ASIC'S are tri-stated.

4.3 SBI to Parallel Bus Interface Grooming

The bit pattern in the address field defining this function is: a12=0, a7 a6 a5=0 1 0

Bits 4-0 of the address field '40H' through '5BH' will define the link number of the PBI. The definition of the data field bits is:

Bits 15-8: Unused
Bit 7: PBI Enable
Bits 6-5: Broadcast Code
00—No Broadcast
01—Broadcast SBI link '31' channel '9'
10—Broadcast SBI link '31' channel '10'
11—Broadcast SBI link '31' channel '11'
Bits 4-0: SBI link number for column mapping Broadcast SBI link '31' channels '9-11' is inserted into rows 0-26 of the addressed PBI.

The data on a particular link on the SBI data inputs are output to the PBI column specified in this portion of the memory. This only occurs when the PBI Enable bit is set and the Broadcast Select bits are '00' in the assigned cross-connect word.

If the PBI enable bit is cleared, the data on the PBI data outputs will either be the data received on the PBI data inputs or the idle code (see section 4.9 ). If the Broadcast select bits are not '00', then the data that was received from the SBI data inputs for SBI Link address '31', channel '9', '10' or '11' will be transferred to the PBI data outputs for all words where the PBI row address is '0' through '23'. The PBI data outputs for PBI row addresses '24-26' will continue to be either the SBI or PBI input data, depending on the state of the PBI enable bit.

4.4 SBI to Parallel Bus Interface Overhead Crossconnection

The bit pattern in the address field defining this function is: a12=0, a7 a6 a5=0 1 1

Bits 1-0 will define the column number and bits 4-2 will define the row number of the address field '60H' through '7F'. The definition of the address field bits is shown below,

| Bits 1-0 | : | 00=PBI  | Column 28 |
|          | : | 01=PBI  | Column 29 |
|          | : | 10=PBI  | Column 30 |
|          | : | 11=PBI  | Column 31 |
| Bits 4-2 | : | 000=PBI | Row 24 |
|          | : | 001=PBI | Row 9 |
|          | : | 010=PBI | Row 18 |
|          | : | 011=PBI | Row 3 |
|          | : | 100=PBI | Row 12 |
|          | : | 101=PBI | Row 21 |
|          | : | 110=PBI | Row 6 |
|          | : | 111=PBI | Row 7 |

The definition of the data field bits is as follows:
Bits 15-8: Unused
Bit 7: PBI Output Enable
Bits 6-5: Unused
Bit 4: 0 selects SBI link 29, 1 selects SBI link 31
Bits 3-0:SBI channel number 1-15, 0 selects SBI Channel 16.

If the PBI enable bit is 1, the data on a particular SBI link and channel defined by the data field bits are output to the PBI columns and rows specified in the address field. If the PBI Enable bit is zero, the data on the Parallel Bus Interface Data Outputs will either contain the PBI input data thru or an idle code with all 1's except the most significant bit, (section 4.9 ). The most significant bit of the idle code will be 0.

4.5 VI Channel to SBI Link 28 Crossconnection

The bit pattern in the address field defining this function is: a12=0, a7 a6 a5=1 0 0

Bits 4-0 of the address field '80' through '9F' will define the channel number of the SBI link 28. The definition of the data field bits is:

Bits 15-8: Unused
Bit 7: SBI Enable Bit
Bits 6-5: Input Select Code
00=Select SBI channel 31 of the links 0-31, selected link defined by the bits 4-0.
01=Select SBI channels 0-30 of the link 29, selected channel defined by the bits 4-0
10=Select SBI channels 0-30 of the link 30, selected channel defined by the bits 4-0
11=Select SBI channels 0-30 of the link 31 , selected channels defined by the bits 4-0
Bits 4-0: SBI link or channel numbers The data on a particular channel defined by the data field bits 7-0 will be output to the SBI channel defined by the address field. This only occurs when the SBI Enable bit is set. If the SBI Enable bit is cleared, the parallel SBI data outputs from the MUX ASIC'S are tri-stated.

4.6 Parallel Bus Interface to SBI Link 29 & 31 Crossconnection

The bit pattern in the address field defining this function is: a12=0, a7 a6 a5=1 0 1, Link 29 a12=0, a7 a6 a5=1 1 1, Link 31

Bits 4-0 of the address field defines the channel number of the SBI link 29 and 31.

The bits of the data word for memory addresses 'A1' through 'B0' and 'E1' through 'F0' will be allocated as follows:

Bits 15-8: Unused
Bit 7: PBI Enable Bit
The function of the remaining bits will depend on the value of the address field bits 4-0 as follows:

| Address Bits 4-0 | Data Bits 6-5 | Data Bits 4-2 | Data Bits 1-0 |
|---|---|---|---|
| 00H | XX | XX | XX |
| 01H-10H | XX | Row | Column | where, Row=
  000: PBI row 24
  001: PBI row 9
  010: PBI row 13
  011: PBI row 3
  100: PBI row 12
  101: PBI row 21
  110: PBI row 6
  111: PBI row 7
Column=
  00: PBI column 28
  01: PBI column 29
  10: PBI column 30
  11: PBI column 31

If the PBI enable bit is 1, the data on a particular row and column defined by the data field is output to the channel specified in the address field. If the SBI enable bit is o, the parallel SBI data outputs from the MUX ASIC's are tri-stated.

4.7 SBI to SBI Link 29 & 31 Crossconnection

The bit pattern in the address field defining this function is: a12=0, a7 a6 a5=1 0 1, Link 29 a12=0, a7 a6 a5=1 1 1, Link 31

Bits 4-0 of the address field defines the channel number of the SBI link 29 and 31.

The bits of the data word for memory addresses 'B1' through 'BF' and 'F1' through 'FF' will be allocated as follows:
  Bits 15-8: Unused
  Bit 7: SBI Enable Bit
The function of the remaining bits will depend on the value of the address field bits 4-0 as follows:

| Address Bits 4-0 | Data Bits 6-5 | Data Bits 4-0 |
|---|---|---|
| 11H-1FH | 00 | Channel 31 SBI link 0-31 |
|  | 01 | SBI link 29 Channel 0-30 |
|  | 10 | SBI link 30 Channel 0-30 |
|  | 11 | SBI link 31 Channel 0-30 |

If the PBI enable bit is 1, the data on a particular channel defined by the data field is output to the channel specified in the address field. If the SBI enable bit is 0, the parallel SBI data outputs are tri-stated.

4.8 VI Channel to SBI Link 30 Crossconnection

The bit pattern in the address field defining this function is: a12=0, a7 a6 a5=1 1 0

Bits 4-0 of the address field 'C0' through 'DF' will define the channel number of the link 30. The definition of the data field bits is:
  Bits 15-8: Unused
  Bit 7: SBI Enable
  Bits 6-5: Input Select Code
    00=Select SBI channel 31 of the links 0-31, selected link defined by the bits 4-0.
    01=Select SBI channels 0-30 of the link 29, selected channel defined by the bits 4-0
    10=Select SBI channels 0-30 of the link 30, selected channel defined by the bits 4-0
    11=Select SBI channels 0-30 of the link 31, selected channels defined by the bits 4-0
  Bits 4-0: SBI link or channel numbers If the SBI Enable Bit is 1, the data on a particular channel defined by the data field is output to the SBI channel defined by the address field. If the SBI Enable Bit is 0, the parallel SBI data outputs from the MUX ASIC's are tri-stated.

4.9 Control Register Operation

The SBII (Parallel data transmitted from MUX ASIC's and received by the SBI ASIC's) outputs of the MUX ASIC are tri-stated during power on reset. The SBII outputs will stay tri-stated independent of the Enable Bits mentioned in sections 4.1 through 4.8 until microprocessor sets a control bit. This function is performed through the Microprocessor Serial Interface.

The MUX ASIC's use another control bit to choose between two different address generation schemes. In one case the MUX ASIC's use the address bits received from Parallel Bus Interface Address Inputs to synchronize its address counters (sync mode). In the other case the MUX ASIC's will generate its addresses independent of the address bits received from the Parallel Bus Interface Address Inputs (free running mode). The modes of operation described applies to East and West Parallel Bus Interfaces independently. The function is performed through the Microprocessor Serial Interface.

The bit pattern in the address field defining these functions are : a12=1. All other address field bits are don't cares.

The definition of the data field bits is:
  Bits 15-3: Unused
  Bit 2: LED Bit (see section 5)
  Bits 1-0: See Below

|  |  | Connect Memory |  |
|---|---|---|---|
| Bit 1 | Bit 0 | Bit 7 | Function |
| 0 | 0 | X | a |
| 0 | 1 | X | b |
| 1 | 0 | 0 | c |
| 1 | 0 | 1 | d |
| 1 | 1 | 0 | e |
| 1 | 1 | 1 | f | a) Parallel Data Outputs from the MUX ASIC's to the SBI ASIC's are tri-stated. Parallel Bus Interface Data Outputs contain idle code. Parallel Data Interface of the TSM201 is in free running mode, (TSM201 Parallel Data Outputs are not synchronized with the incoming Parallel Addresses).

b) Parallel Data Outputs from the MUX ASIC's to the SBI ASIC's are tri-stated. Parallel Bus Interface Data Outputs contain idle code. Parallel Data Interface of the TSM201 is in sync mode, (TSM201 Parallel Data Outputs are synchronized with the incoming Parallel Addresses).

c) Parallel Data Outputs from the MUX ASIC's to the SBI ASIC's are tri-stated. Parallel Bus Interface Data Outputs contain idle code. Parallel Data Interface of the TSM201 is in free running mode, (TSM201 Data Outputs are not synchronized with the incoming Parallel Addresses).

d) Parallel Data Outputs from the MUX ASIC's to the SBI ASIC's are connected to the provisioned SBI. Parallel Bus Interface Data Outputs are connected to the provisioned SBI. Parallel Data Interface of the TSM201 is in free running mode, (TSM201 Parallel Data Outputs are not synchronized with the incoming Parallel Addresses).

e) Parallel Data Outputs from the MUX ASIC's to the SBI ASIC's are tri-stated. Parallel Bus Interface Data Outputs transmit the data that was on the Parallel Bus Interface Data Inputs 5+¼ 8.192 MHZ Clocks earlier, (through case). Parallel Data Interface of the TSM201 is running in sync mode, (TSM201 Parallel Data Outputs are synchronized with the incoming Parallel Addresses).

f) Parallel Data Outputs from the MUX ASIC's to the SBI ASIC's are connected to the provisioned SBI. Parallel Bus Interface Data Outputs are connected to the provisioned SBI. Parallel Data Interface of the TSM201 is running in sync mode, (TSM201 Parallel Data Outputs are synchronized with the incoming Parallel Addresses).

Following the power on reset, the default values of the data bits are: d2 d1 d0=0 0 0.

In the sync mode, transfer of the data from the Parallel Bus Interface Data Inputs to the Parallel Bus Interface Data Outputs will take eleven 16.384 MHZ clock cycles.

5 Unit Alarms

The TSM201 board has a visible unit alarm to indicate the failure of the board. It consists of an LED located at the front panel. It can only be turned ON or OFF through the Microprocessor Serial Interface. For the detailed discussion of the Microprocessor Serial Interface, refer to the section describing Options (Section 4 ).

The bit pattern in the address field defining this function is: a12=1. All other address field bits are don't cares.

The definition of the data field bits is:
Bits 15-3: Unused
Bit 2: 0 will turn LED of : 1 will turn LED on
Bits 1-0: Synchronization and Enable bits (See section 4.9)

Only writing to device addresses 10H or 11H changes the status of the LED bit.

On power on reset the default values of the data bits are: d2 d1 d0=0 0 0.

6 Test and Maintenance

A test point is provided for every node of the circuit. They are provided either by the pins of the through hole components or by the test access points.

TSM201 board is designed to stay operational if it is installed when the power on the backplane is ON.

TECHNICAL DESCRIPTION SINGLE NETWORK ELEMENT CONTROLLER

1. General Description

The Single Network Element Controller (SNC1) provides for a general purpose non-redundant control element. It is primarily intended for use in the TM/ADM project. The microprocessor used is the Intel 80C186. The SNC101 contains 192K bytes of random access memory, and up to 640K bytes of program memory using the EPROM Expansion Board (602323-536). It also provides two asynchronous RS232 interface ports, two synchronous HDLC ports, two asynchronous full duplex serial microprocessor communications ports, and four Serial Bus Interface (SBI) links. Dedicated direct memory access (DMA) is supported with the HDLC ports to enhance processing speed. An external interrupt controller handles the interrupts from the peripherals mentioned above. A watch-dog timer provides a means of sanity checking.

The SNC101 is capable of operation in the TM/ADM products in place of two Dual Network Element Controller (DNC1) PBA's. It provides the same signals to the system as redundant DNC1's Since the SNC101 will be the only master controller in the system, the unit is designed to operate off of redundant power. The unit is fused so that in the event of a short on the PBA, the unit will disconnect itself from the system's power converters. This prevents a single failure condition from bringing down the entire system.

In the TM/ADM, the SNC101 acts as the master controller for all of the PBA's in the system. Together with the Craft/Orderwire/Alarm PBA, it also serves as the interface to the outside world for the control and provisioning of the system. There are two internal interfaces that are used by the SNC101 to control the other PBA's in the system. One is the microprocessor serial interface (MSI), and the other is the SBI. Some of the PBA's control and status signals are provided by parallel direct connection to other PBA's in the system. This is done is some cases for reliability, and in some cases for simpicity.

2. Unit Description

Figure 31B:
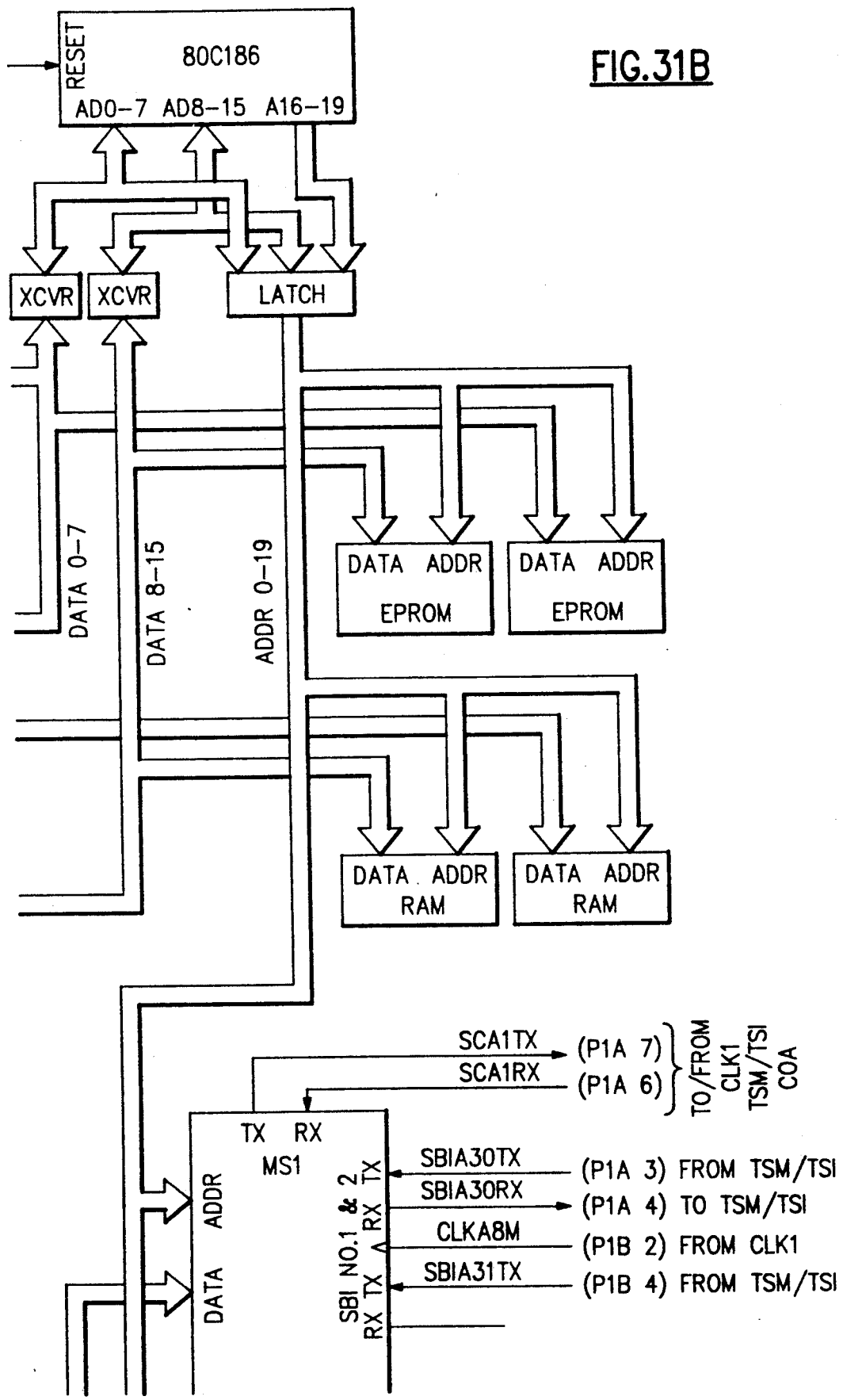
Figure 31C:
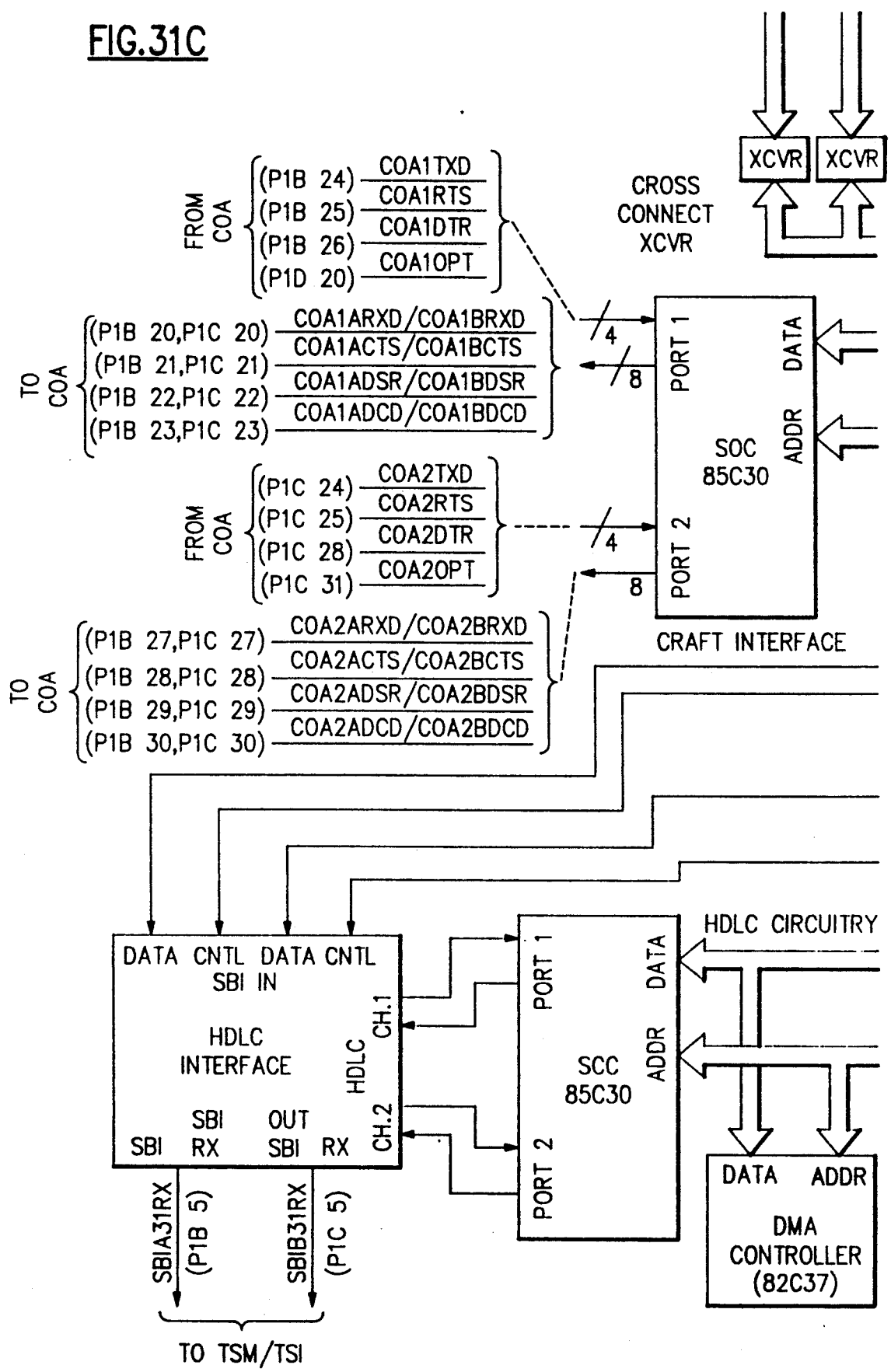
Figures 31, 31D:
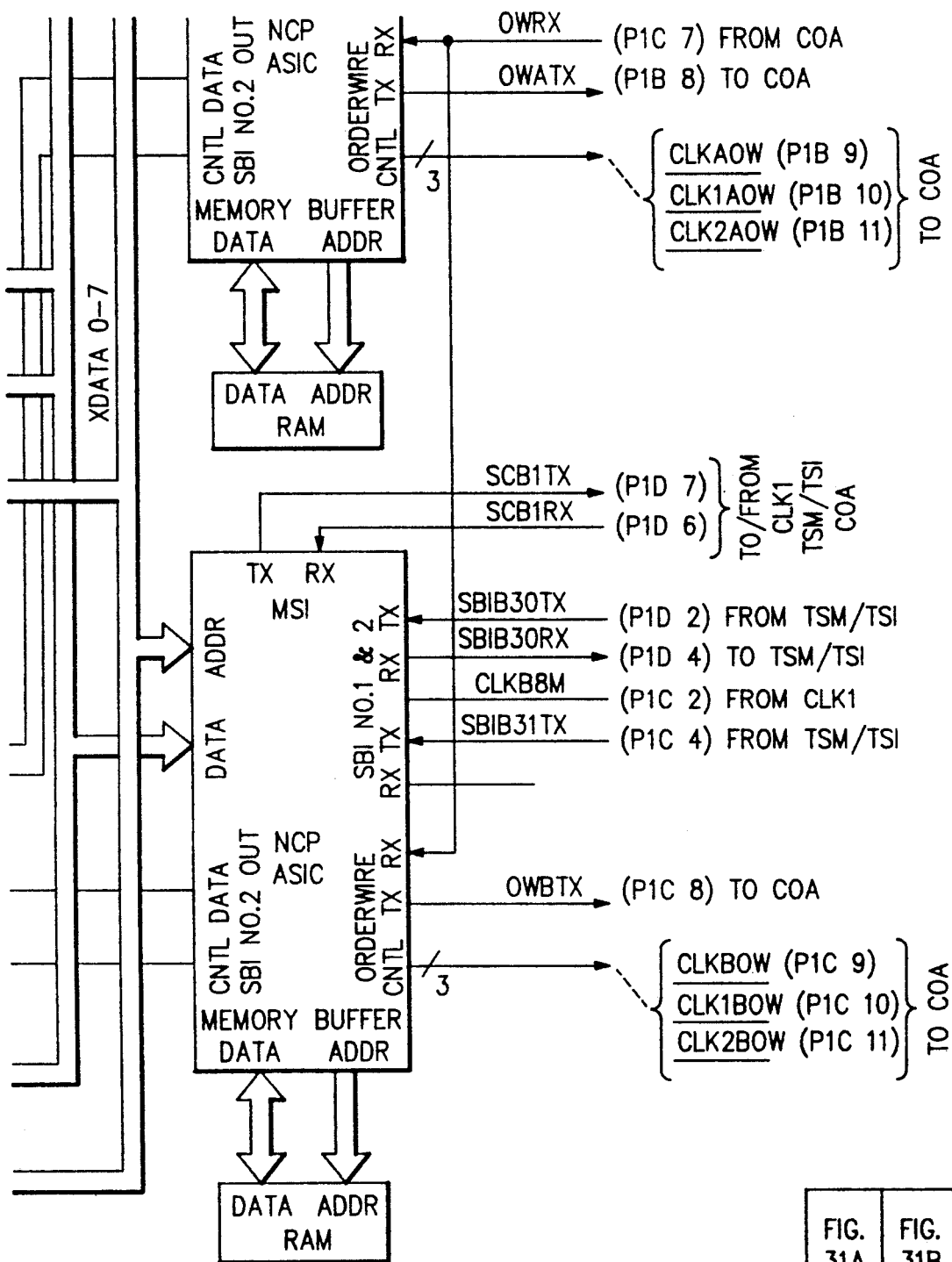

The top level block diagram of the SNC101 is shown in FIG. 31. For the following description of the PBA please refer to this diagram.

The SNC101 is driven by an 80C186 microprocessor. The microprocessor's multiplexed address/data bus is externally decoded into separate address and data buses. The RAM and EPROM in the system are accessed directly from these decoded buses. The processor control and status register and the T/R Mux Status and TX Optics Status registers are also accessed directly from the lower byte of the data bus.

The processor control register is primarily used to indicate to the COA the health of the redundant equipment on both sides of the system. It is also used to turn on the LED's on the COA and Power Converters during the system lamp test. The lamp test signal used to turn on the COA's LED's is also used internally to turn on the "Select A" and "Select B" LED's on the SNC101's front panel during a lamp test. The on "Unit Alarm" LED on the SNC101 front panel is also controlled from this register.

The processor status register contains signals from various PBA's in the system. From the COA, there are two signals that indicate which side of redundant equipment is to be the selected side. These signals also drive the "Select A" and "Select B" LED's on the SNC101 front panel. There is also a signal that tells whether the COA is installed or not. From the power converters, there are signals which indicate that they are operational. Finally, this register contains status from the SNC101's programmable gate array device which indicates when it is initialized.

The T/R Mux Status register provides a means of monitoring current configuration of the transmit/receive multiplexers on the STT1 and FTL1 PBA's. The TX Optics Status register provides a means for the processor to determine the health of the optic modules on the optical high speed interface PBA's. This register also contains the system fan alarm status for monitoring the health of the cooling fan.

A cross-connect transceiver is used to allow the 80C186 to access the 8-bit peripherals in the system from either the upper or lower data bus. The cross-connect transceiver allows access to two NCP ASIC's, the Serial Communications Controllers (85C30), and the programmable DMA controller. The cross-connect transceiver is not functional until the programmable gate array device (XC3090) has been initialized.

The craft interface (RS232/RS422 depending on COA interface) is provided by the 85C30 Serial Communications Controller (SCC). The COA PBA provides the actual electrical interface (RS232/RS422 drivers). The signals between the COA and the SNC101 are TTL level signals.

The two NCP ASIC's provide the microprocessor serial interface and the SBI links for communication with the rest of the system. One ASIC is used for each side of the redundant equipment. There is one MSI per ASIC. It is used to send commands for control and provisioning of other PBA's in the sytem. In the TM/ADM, the PBA's using the MSI are the COA, CLK, TSM, and TSI.

There are two SBI links per NCP ASIC. The two links are physically routed to the TSM or TSI PBA. The channels in these two links are allocated for various purposes. Among these are control/provisioning of the DS1's over the "VI" control channels. The incoming data received from these VI control channels of the SBI links is stored in a memory buffer by the NCP ASIC until it can be accessed by the microprocessor.

Another function of the NCP ASIC is to strip the 64K bit/sec PCM orderwire from the appropriate channels in the SBI link and tranmit it to the COA to be converted to an analog voice signal. Likewise, it also takes the 64K bit/sec PCM data from the COA and inserts it into the SBI link.

Synchronous (HDLC) data is received and transmitted over one of the SBI links. This data is passed through the NCP ASIC and is handled in a programmable gate array device (XC3090). An SCC (85C30) is provided to handle the HDLC protocol and DMA is provided by an 82C37 programmable DMA controller.

The operation of the microprocessor is monitored by a watch dog timer which must be periodically pulsed by the software. If the timer expires, the processor is reset. If the timer is allowed to expire a second time without being pulsed in the interim, the SNC101 will be disabled. The only ways to recover are to cycle power, or to provide an external reset pulse via the connector. In a system, the external reset is received by the COA and sent to the SNC101 via the backplane.

3 Detailed Description 3.1 Microprocessor

The 80C186 (U33) is a 16-bit microprocessor providing a central processing unit, clock generator, two independent direct memory access (DMA) channels, and a programmable interrupt controller. The 80C186 also contains three programmable timers, programmable chip select logic, programmable wait state generator, and local bus controller.

The 80C186 is operated at 10 Mhz. This requires a 20.0 Mhz clock oscillator (Y1, U2). The 80C186 clock generator divides the clock by two and outputs it to the rest of the system. The 80C186 is the only device which gets the 20 Mhz clock.

3.2 Interrupt Controller

In order to process the large number of peripheral interrupts produced on the SNC101 PBA, a programmable interrupt controller (82C59) is provided. The device supports eight levels of interrupts, and the priority can be dynamically reconfigured based on total system needs. The interrupt controller can be accessed using even addresses only. This is because it is connected only to the lower byte of the data bus.

A single interrupt line INT0 is used to interrupt the microprocessor. The microprocessor is configured to operate in cascade mode so that the INT2 pin of the microprocessor acts as interrupt acknowledge (INTA*) for the 82C59. The 82C59A uses the PCS5* chip select line for access. Only accesses using even addresses (lower half of data bus) may be made). One wait state should be used when accessing this device. It is required that the intialization sequence configure the internal wait state generator of the 80C186 to insert this wait state.

The interrupts supported by the interrupt controllers are shown below in Table 16. The external interrupt controller (82C59A) should be configured for level sensing mode to guarantee detection of interrupts from the NCP ASIC. The internal interrupt controller should be configured for edge-trigger mode for the INT1/INT3 section.

TABLE 16

| | From Device | Signal Name | Function |
|---|---|---|---|
| Input (82C59) | | | |
| IR0 | 85C30 | HDLC_INT | HDLC Interrupt |
| IR1 | Not Used | | |
| IR2 | NCPIC | ASICA_INT | NCP ASIC Int. |
| IR3 | NCPIC | ASICB_INT | NCP ASIC Int. |
| IR4 | Not Used | | |
| IR5 | 85C30 | CRAFT_INT | Craft Interrupt |
| IR6 | XC3090 (1) | PGA_BUSY | Ready for byte |
| IR7 | XC3090 (1) | PGA_RDY_INT | PGA Ready |
| Input (80C186) | | | |
| INT0 | 82C59A | INT0 | Ext. PIC Int. |
| INT1 | 82C37A | DMA_INT | DMA Xfer Done |
| INT3 | Not Used | | |

Note 1: These functions are used during configuration of the programmable gate array following power up or reset. See Section 3.9 for more details.

3.3 Bus Structure

The microprocessor bus is time multiplexed between address and data. This provides 16 bits of data on the data bus, and up to 20 bits of address. This bus is labeled AD0–AD15 with four additional lines (A16–A19) dedicated to address only. The address is obtained by latching AD0–AD15 into address latches (U9, U47) at the proper time in the 80C186 bus cycle. The address bits A16–A19 are latched by a programmable logic device (U37).

The data bits are buffered by bi-directional data bus transceivers (U45,U46). The 20 bit address is stable and available to the system for the entire microprocessor bus cycle. A cross-connect transceiver (U10,U12) is provided to allow the microprocessor to access peripherals using byte transfers from both odd and even addresses.

A microprocessor byte access to an odd memory location will result in the use of the upper byte of the data bus. The 8 bit peripherals are tied to the lower 8 bits of the data bus only. Thus, the data would never be seen by the peripheral. The cross-connect transceiver eliminates this problem by connecting either the upper (DATA15-DATA8) or lower (DATA7-DATA0) byte of the microprocessor data bus to the 8 bit peripheral data bus (XDATA7-XDATA0) at the appropriate time. The XC3090 programmable gate array (U40) contains the control logic for this transceiver.

3.4 Watch Dog Timer

The watchdog timer circuit provides a means of sanity check for the microprocessor and its firmware. The watchdog timer consists of a retriggerable monostable multivibrator (U21) configured as a retriggerable one shot and a D-Type Flip-Flop (U7).

The retriggerable one shot must be strobed by the processor's software on a periodic basis to ensure that the processor is executng code correctly. The processor's PCS6* line is used for this purpose. If the processor does not restart the timer within its timeout period, the one shot will timeout. The timeout period is determined by the resistor (R41), capacitor (C59) combination according to the equation:

Timeout = 0.15 uF * 1M ohm * 0.7 = 105 msec

When a timeout occurs, it will cause the second timer to be started which will reset the PBA. The reset pulse duration is again determined by a resistor (R37) and capacitor (C60). The pulse width is:

Pulsewidth = 0.15 uF * 10K ohm * 0.7 = 1.05 msec

The timeout of the retriggerable one shot also results in the timeout latch (U7) stage one becoming set. This causes a DISABLE pulse which disables the microprocessor's access to the critical peripherals on the PBA. This is so that in the event that a failure occurs and the microprocessor continues to run, it cannot affect the system.

When the reset pulse goes inactive, the microprocessor will fetch its first instruction from memory location FFFF0h. This is the same as if the power on reset had occured. From this point the microprocessor has just 100 msec to strobe the retriggerable one shot again. If it succeeds, the stage one latch is cleared, and the microprocessor is given access to the entire system once again. Operation resumes normally from this point.

If the microprocessor fails to strobe the one shot within approximately 100 msec, it will again timeout. This time, the second stage of the timeout latch is set. The PBA is reset and remains reset until the power to the PBA is cycled or an external reset is received from the COA. The KILL signal becomes set and the "UNIT ALARM" (RED) LED is activated. The outputs of the Processor Control Register are reset to the inactive state.

It is not recommended that the external reset line from the COA be used to revive a processor whose watch dog timer has expired.

3.5 Reset Circuitry

The power on reset circuitry is produced by a resistor and capacitor pair. The values are selected to provide a low on the SYS_RESET* line which will last approximately 218 msec after power is applied to the PBA. The system reset SYS_RESET* is routed to the 80C186 RES* pin. If a low is detected on this pin for more than four clock cycles, the RESET pin issues an active high reset pulse to the system. The RESET output will remain active for at least five clock cycles. The RESET output may be delayed from RES* for up to 2.5 clocks.

3.6 System Memory Map

Figure 32:
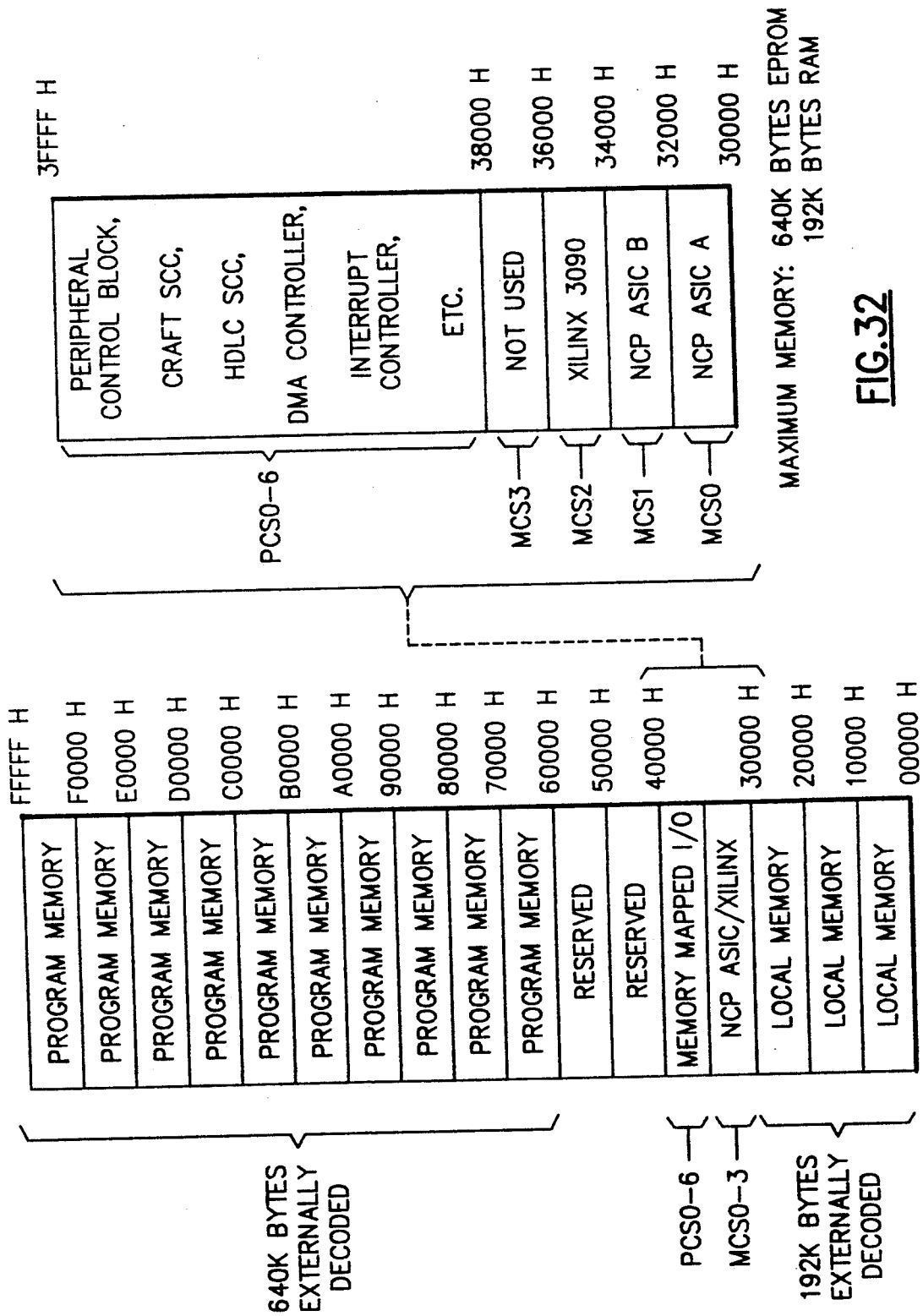
FIG. 32 is a diagrammatic representation of the single network controller memory map.

The SNC101 system memory map is shown in FIG. 32. The LCS* and UCS* signals on the 80C186 are not used. The RAM and EPROM space are externally decoded. The RAM is decoded by a pair of 3 to 8 decoders (U14,U15). The EPROM space is decoded by the same programmable logic device that is used to latch AD16-AD19 address lines (37). The 80C186 also has 4 mid-range memory chip selects (MCS0*-MCS3*), and 7 peripheral chip selects (PCS0-PCS6*). These chip selects have been dedicated to the system's peripheral devices. All are addressed as memory mapped I/O.

The allocation of the peripheral device chip selects are as follows:

| Chip Select | Device | Address Range |
|---|---|---|
| MCS0* | NCP ASIC A Memory Buffer | 30000h to 308BFh |
| MCS0* | NCP ASIC A Registers | 31000h to 31039h |
| MCS1* | NCP ASIC B Memory Buffer | 32000h to 328BFh |
| MCS1* | NCP ASIC B Registers | 33000h to 33039h |
| MCS2* | XC3090 | 34000h |
| PCS0* | SCC for Craft Interface | 38000h to 38003h |
| PCS1* | SCC for HDLC | 38080h to 38083h |
| PCS1* | DMA for HDLC | 38090h to 3809Fh |
| PCS2* | Not Used | |
| PCS3* | T/R Mux Status Register | 38180h |
| PCS3* | TX Optic Alarm Latch | 38182h |
| PCS4* | uP Control/Status Register | 38200h |
| PCS5* | Interrupt Controller | 38280h to 38282h |
| PCS6* | Watch Dog Timer | 38300h |
| | Internal Control Block | 38400h to 384FFh |

3.7 Program Memory

The program memory area consists of two 32 pin Theockets (U38,U39), and a pair of 25 pin socket strips (J1 and J2) designed to accept a memory expansion board. The initial release of the SNC101 is intended to use six 1 megabit EPROM's (27C1001) to provide the required 640K bytes. Two to the EPROM's will be installed directly in the pair of 32 pin sockets on the PBA. The remaining four EPROM will be mounted on an EPROM Expansion Board (602323-536). The EPROM Expansion Board will install into J1 and J2.

The EPROM Expansion Board has one pin assigned as INSTALL*. This signal is monitored by the EPROM decode logic in the PLD (U37). When the INSTALL* signal is low, meaning that the EPROM Expansion Board is plugged in, the decoder divides the address space into three 128K×16 sections. One section selects the pair of EPROM's mounted directly on the SNC101 PBA. The other two sections select the two pair of EPROM's mounted on the EPROM Expansion Board. When the EPROM Expansion Board is not installed; meaning that the INSTALLED* signal is seen as high by the decoder, all memory space is mapped to the pair of sockets on the SNC101 PBA.

The EPROM chip select decoding is performed as follows:

| EPROM Location | INSTALL* | Address Range |
|---|---|---|
| SOCKETS (U38, U39) | High | 40000h to FFFFFh |
| SOCKETS (U38, U38) | Low | C0000h to FFFFFh |
| Exp. Bd. (Pair 1) | Low | 80000h to BFFFFh |
| Exp. Bd. (Pair 2) | Low | 40000h to 7FFFFh |

The SNC101 is designed to be enhanced as more dense memory devices become available. Three strap resistors have been added to allow the use of two megabit EPROMs, four megabit EPROMs, and one megabit EEPROMs in the future. Strap resistor W1 should be added when two megabit (27C2001) EPROM's are used in U38 and U39. Strap resistors W1 and W2 should be added when four (27C4001) EPROM's are used in U38 and U39. Use of one megabit (28C010) EEPROM's requires that only W3 be installed. W1 and W2 should not be installed for this application. Another upgrade option allows for the program download capability using a RAM Expansion Board instead of the EPROM Expansion Board. J1 and J2 provide all of the signals necessary to support such a board.

Program memory accesses are designed to be zero wait state so long as devices with access times less than 200 nsec are used.

3.8 Random Access Memory

The local memory consists of 192K bytes of 32Kx8 CMOS static RAM (U27, U28, U29, U30, U31, U32). The RAM is externally decoded by a pair of 3 to 8 line decoders (U14,U15). The RAM is addressable starting at location 00000h and extends upward through 2FFFFh.

The memory is byte or word addressable. The signals BHE* and ADDR0 are fed into the decoders to determine whether the upper byte, lower byte, or both should be accessed. One decoder handles accesses to the upper byte of the data bus, and the other handles accesses to the lower byte. In the event that a word access takes place, both devices are active at the same time. Memory accessses to this region of memory can use zero wait states.

3.9 Programmable Gate Array

The Xilinx XC3090 is a 9000 gate user programmable gate array. It is used to provide assorted interface and support circuitry for the system. Its primary function is to provide for the future enhancement to support the HDLC extraction and insertion via the SBI Link with no hardware modification. The interface and support circuitry implemented within the XC3090 device includes the cross-connect transceiver interface, and the SCC interface. These functions will be discussed in more detail in their respective sections.

The XC3090 must be programmed each time power is applied to the PBA. The configuration data is stored in EPROM, and the initialization of the gate array is performed by the microprocessor. The configuration data requires 8026 bytes of the available 640K byte EPROM memory space.

In order to configure the programmable gate array, the microprocessor must wait until the PGA_RDY_INT line (IR7 on the 82C59) goes high. It then begins to program the device by writing one byte at a time to address 34000h. Between each byte, the microprocessor must poll the IR6 input on the 82C59 to determine when the device is ready to accept another byte. The device uses the MCS2* chip select line for this purpose.

In order to provide the proper write timing during configuration, a wait-state generator circuit is provided. It is implemented using a Hex D-type Flip-Flop (U19). It is designed to insert six wait cycles during each write to the device. Each time the MCS2* chip select line goes low, the ARDY line goes low and stays low for 6 clock cycles.

3.10 Processor Control Register

The processor control register is implemented using an octal D-type Flip-Flop with reset (U23). The signals are buffered before going off card by an inverting octal line driver (U8). The bit assignment is as follows:

| PROCESSOR CONTROL REGISTER (WRITE ONLY) ADDRESS: 38200H |
|---|
| 7 6 5 4 3 2 1 0 |
| 0                             LED_ON |
| 1                             RDYB |
| 2                             ACTB |
| 3                             LMPATST / LMPBTST |
| 4                             PSALTST / PSBLTST |
| 5                             SBIAENBL/SBIBENBL |
| 6                             RDYA |
| 7                             ACTA |

Bit Descriptions:

ACTA: Writing a "one" to this bit causes the Active signal for the A side equipment to be asserted to the COA PBA.

ACTB: Writing a "one" to this bit causes the Active signal for the B side equipment to be asserted to the COA PBA.

LED ON: Writing a one to this register causes the UNIT ALARM LED (DS1) to be activated under software control. It is also activated when the watchdog stage two timeout latch becomes set.

PSALTST/PSBLTST: A one written into this register location turns on the LED's on the power converters.

LMPATST/LMPBTST: A one written into this register location turns on the LED's on the COA as well as the SEL A and SEL B LED's on the SNC101 front panel. (See Note 1.)

RDYA: Writing a "one" to this bit causes the Ready signal for the A side equipment to be asserted to the COA PBA.

RDYB: Writing a "one" to this bit causes the Ready signal for the B side equipment to be asserted to the COA PBA.

SBIAENBL/SBIBENBL: A one written into this register location indicates to the COA that it should not attempt to disable the SBI outputs on the inactive side following a switchover. (See Note 1.) Note 1: The side A and side B lamp test signals are combined into one since the COA doesn't differentiate between the two. Two signal paths are physically provided on the backplane however. This is so that the SNC101 will appear to the COA exactly as if two DNC1's were installed.

3.11 Processor Status Register

The processor status register is implemented using an octal D-type Transparent Latch (U17). The signals are received directly from the card edge an all are pulled-up using 10K ohm resistors. The bit assignment is as follows:

| PROCESSOR STATUS REGISTER (READ ONLY) ADDRESS: 38200H |
|---|
| 7 6 5 4 3 2 1 0 |
| 0                             REPROG* |
| 1                             COAINST* |
| 2                             SELA* |
| 3                             SELB* |
| 4                             PSBACT* |
| 5                             PSAACT* |
| 6                             SPARE |
| 7                             SPARE |

Bit Descriptions:

COAINST*: A low in this bit indicates that the COA is installed in the system, and the SELA*, and SELB* bits are valid.

PSAACT\*: A low in this bit position indicates that the power converter on the A side equipment is operational.

PSBACT\*: A low in this bit position indicates that the power converter on the B side equipment is operational.

REPROG\*: A low in this bit position indicates that the Xilinx programmable gate array is in the process of being reprogrammed. A high in this position is required for normal operation.

SELA\*: A low indicates that the COA expects the A side equipment to operate as the primary side. The ACTA signal should be asserted as acknowledgement.

SELB\*: A low indicates that the COA expects the B side equipment to operate as the primary side. The ACTB signal should be asserted as acknowledgement.

3.12 STT1/FTL1 T/R Mux Status Register

The mux status register is implemented using an octal D-type Transparent Latch (U16). The signals are received directly from the card edge an all are pulled-up using 10K ohm resistors. The bit assignment is as follows:

```
STT1/FTL1 T/R MUX STATUS REGISTER (READ ONLY)
ADDRESS: 38180H
   7  6  5  4  3  2  1  0
   0                       WBRXMUXS
   1                       WBTXMUXS
   2                       WARXMUXS
   3                       WATXMUXS
   4                       EBRXMUXS
   5                       EBTXMUXS
   6                       EARXMUXS
   7                       EATXMUXS
```

Bit Descriptions:

EARXMUXS: A low on this bit indicates that the optical input on the A side EAST FTL1 is selected to receive data. In the case of the STT1, the signal is not used and is always high.

EATXMUXS: A low on this bit indicates that the A side EAST FTL1 or STT1 output switch is enabled.

EBRXMUXS: A low on this bit indicates that the optical input on the B side EAST FTL1 is selected to receive data. In the case of the STT1, the signal is not used and is always high.

EBTXMUXS: A low on this bit indicates that the B side EAST FTL1 or STT1 output switch is enabled.

WARXMUXS: A low on this bit indicates that the optical input on the A side WEST FTL1 is selected to receive data. In the case of the STT1, the signal is not used and is always high.

WATXMUXS: A low on this bit indicates that the A side WEST FTL1 or STT1 output switch is enabled.

WBRXMUXS: A low on this bit indicates that the optical input on the B side WEST FTL1 is selected to receive data. In the case of the STT1, the signal is not used and is always high.

WBTXMUXS: A low on this bit indicates that the B side WEST FTL1 or STT1 output switch is enabled.

3.13 Transmit Optics Status Register

The transmit optics status register is implemented using an octal D-type Transparent Latch (U18). The signals are received directly from the card edge an all are pulled-up using 10K ohm resistors. The bit assignment is as follows:

```
TRANSMIT OPTICS STATUS REGISTER (READ ONLY)
ADDRESS: 38182H
   7  6  5  4  3  2  1  0
   0                       WBOPTXALM
   1                       WAOPTXALM
   2                       EBOPTXALM
   3                       EAOPTXALM
   4                       FANALM*
   5                       SPARE
   6                       SPARE
   7                       SPARE
```

Bit Descriptions:

EAOPTXALM: A low on this bit indicates that the optics for the A side EAST FTL1 has a trasmit module fault.

EBOPTXALM: A low on this bit indicates that the optics for the B side EAST FTL1 has a trasmit module fault.

FANALM\*: A low on this bit indicates that the cooling fan for the system has failed.

WAOPTXALM: A low on this bit indicates that the optics for the A side WEST FTL1 has a trasmit module fault.

WBOPTXALM: A low on this bit indicates that the optics for the B side WEST FTL1 has a trasmit module fault.

3.14 Craft Interface

Figure 33:
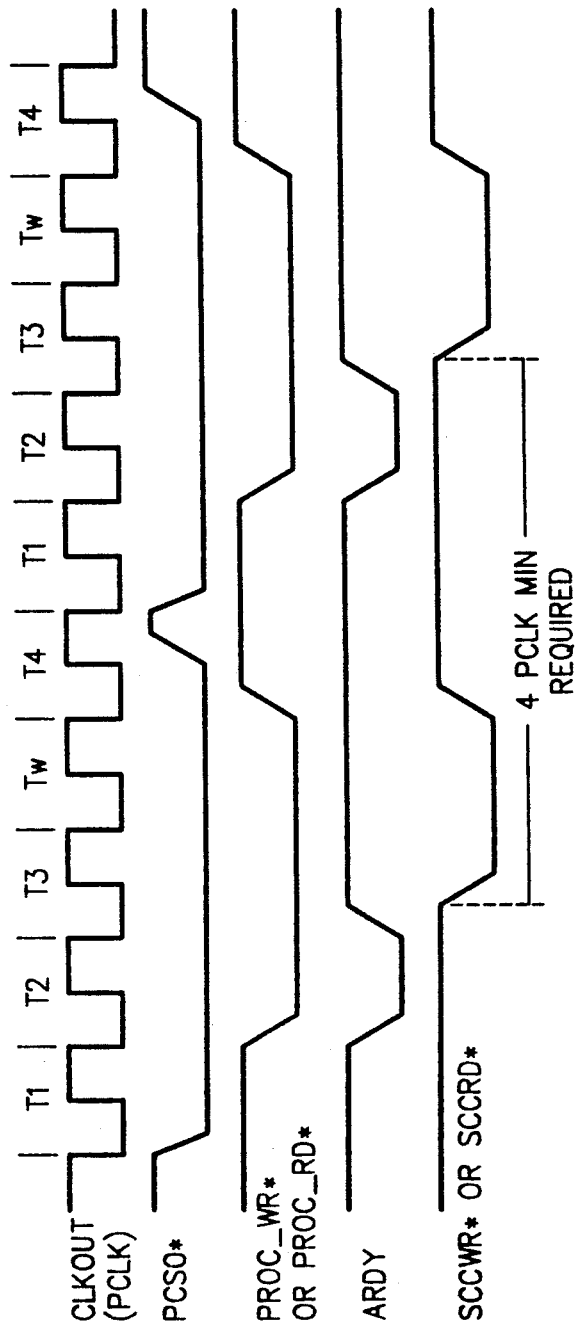
FIG. 33 is a timing diagram of the SCC interface associated with the single network element controller.

The craft interface is implemented using an 85C30 (U26) Serial Communications Contoller (SCC). The SCC features two indendent full duplex channels. Each channel has a built in baud rate generator, and a digital phase-locked loop for clock recovery. It supports both asynchronous and synchronous operation. The design is intended to be operated in asynchronous, interrupt driven mode only in the SNC1. Signals coming in from the connector, and those going out to the connector are buffered using octal drivers. The input signals are pulled up using 10k ohm resistors. The SCC provides two channels of asynchronous communications for interfacing to the outside world. The signals associated with these two channels are TTL logic levels between the SNC101 and COA. The COA provides the drivers and receivers for electrical compatibility with RS-232 or RS-422. Since the SCC has a requirement that successive reads or writes to the device cannot be made in less than four PCLKS, (CLKOUT) external interface logic is required. The logic has be implemented in the XC3090 programmable gate array. It is designed to insert one wait state into an SCC access. At the same time, it prevents the SCCWR* or SCCRD* pulse from going active for one (CLKOUT) clock cycle. This guarantees that the four PCLK timing requirement is met. The timing is shown in FIG. 33.

The SCC is selected by the PCS0* chip select line. Whenever the XC3090 sees this signal go active. The CRAFT_CE* signal is made active on the next rising edge of CLKOUT. The address lines ADDR0 and ADDR1 are used to decode the four memory locations required to access the SCC. The locations are defined as follows:

| ADDRESS | CHANNEL / MODE |
|---|---|
| 38000h | Channel B / Control |
| 38001h | Channel A / Control |
| 38002h | Channel B / Data |
| 38003h | Channel A / Data |

The SCC channel A is referred to as Craft Port 1, and channel B is referred to a Craft Port 2. Each channel of the SCC has a pair of data registers and several control registers. The data registers are used for the actual transfer of data and they can be addressed directly. The control registers are used for initialization, and control of the SCC's operation. There are many control registers within the SCC, but only one memory location is used to access them. There are both read registers for status and write registers for control. Programming the write registers requires two write operations and reading the read registers requires both a write and a read operation. The first write is to WR0 and contains three bits that point to the selected register. The second write is the actual control word for the selected register. If the second operation is a read, the selected read register is accessed. The pointer bits in WR0 are automatically cleared after the read or write operation so that WR0 is addressed again.

The SCC's data bus is connected to the XDATA0-XDATA7 lines. This is the cross-connect transceiver data bus. SCC accesses can be byte accesses to both even and odd byte addresses. The 80C186 wait state generator may be programmed for zero wait states although one wait is actually inserted by the interface logic. Before initialization, a software reset of the SCC is required. This is because the hardware is not capable of performing a reset on the device due to the nature of the XC3090.

The craft interface is designed to support the RS-232 Type D and E signals as specified in RS-232C. Data Terminal Ready (COAxDTR) is not required, but it is supported due to its common use in communications equipment. The SCC can be configured to ignore any or all of the control signals if desired.

Figure 34:
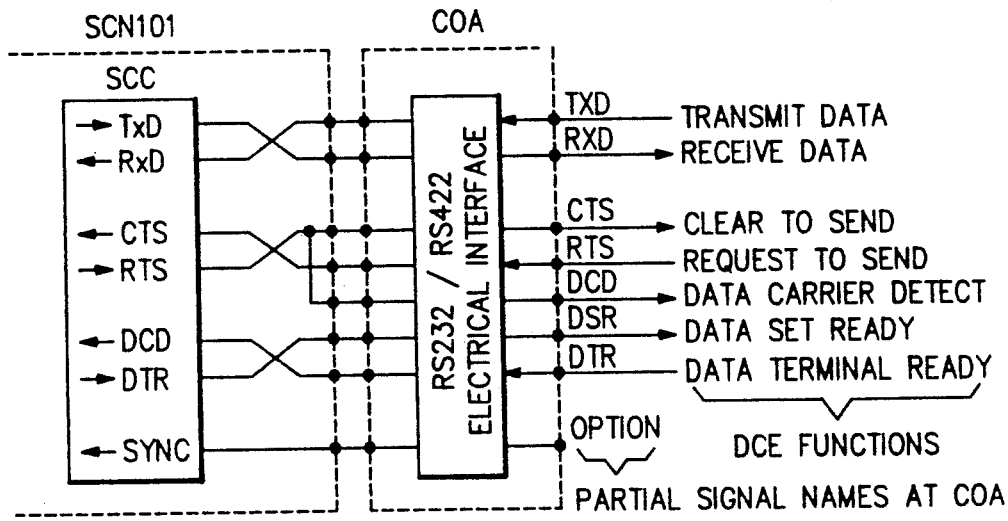
FIG. 34 is a block diagram of the craft interface wiring associated with the single network element controller.

The signals associated with the craft interface are configured as DCE (Data Communciations Equipment). The orientation of the signals at the COA connectors with respect to the SCC is shown in FIG. 34. Note that in this configuration, the Request to Send (RTS) pin on the SCC is connected to the Clear to Send (CTS) output and the Data Carrier Detect (DCD) output on the connector. This is becuase Clear to Send is functionally similar to the Data Carrier Detect signal, and board space prohibits adding additional hardware to handle the DCD line separately.

Figure 35:
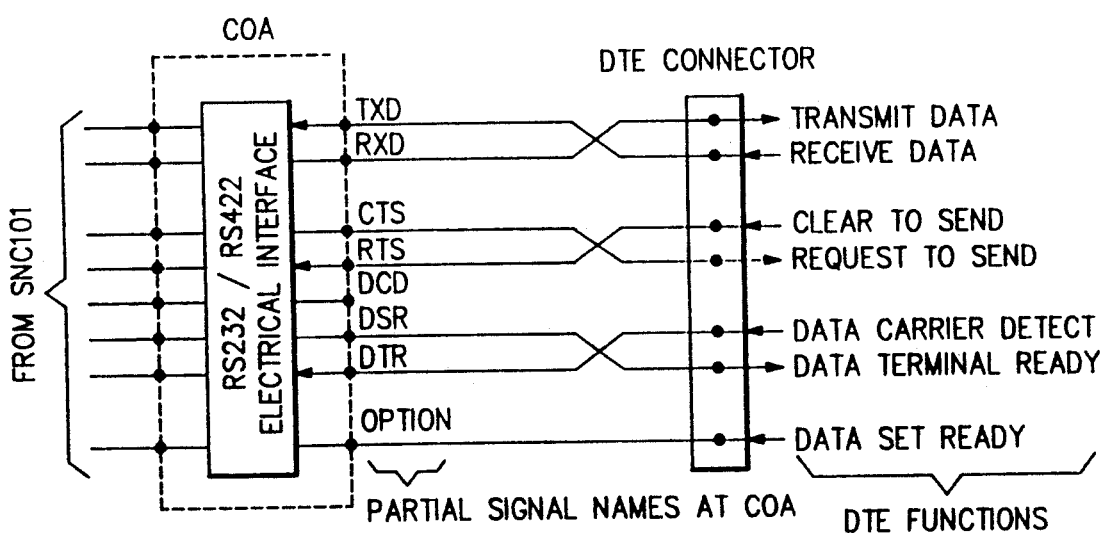
FIG. 35 is a block diagram of the DTE configuration adapter wiring associated with the single network element controller.

It is also possible to configure either craft port for DTE (Data Terminal Equipment) operation. This can be done by interconnection of the appropriate signals with an adapter cable. The wiring diagram for the adapter cable with respect to the COA connector is shown in FIG. 35. In order for this configuration to be used, the SCC must be initialized by software to allow the SYNCA/SYNCB pins to be used as general purpose inputs for the DSR (Data Set Ready) signal.

The flow of data in both transmit and receive directions is controlled by the microprocessor. The SCC is capable of interrupting the microprocessor when it needs servicing. Upon an interrupt, the interrupt service routine must read the interrupt status register in the SCC to determine the source of the interrupt. The interrupt routine must then clear the condition causing the interrupt. The SCC cannot be operated in the "Interrupt with Acknowledge" mode which provides for automatic vectoring. This is due to limitations in the hardware interrupt controller on the 80C186.

3.15 NCP ASIC's

There are two identical custom LSI chips on the SNC1. They are approximately 8000-9000 gates each. The chips are called the NCPIC (U41,U42) on the schematic, but they are refered to as NCP ASIC's in the documentation. Each ASIC contains 2 SBI links, one microprocessor serial interface (MSI), and orderwire routing circuitry. NCP ASIC A designated as U41 handles the A side, while NCP ASIC B designated as U42 handles the redundant B side. The I/O signals are all buffered using octal buffers. They are labeled identically with the exception of the "A" or "B" in the name referring to the side. Signals that do not specify "A" or "B" are shared between both.

The NCP ASIC's are addressed using MCS0* (U41) and MCS1* (U42)) chip select lines. If a watchdog timeout occurs, the XC3090 programmable gate array will become disabled thus preventing the microprocessor from accessing the registers within the NCP ASIC's. This is done by routing the chip select signals through the XC3090. The signal names for the chip select lines coming out of the XC3090 and into the ASIC's are ASICA_CE* and ASICB_CE* for NCP ASIC A and NCP ASIC B respectively.

The base address for NCP ASIC A is 30000h. The base address for NCP ASIC B is 32000h. The NCP ASIC's data buses are connected to the XDATA0-XDATA7 lines. This is the cross-connect transceiver data bus. NCP ASIC accesses can be byte accesses to both even and odd byte addresses. The 80C186 wait state generator may be programmed for zero wait states although a number of waits are actually inserted by the NCP ASIC.

A clock detection circuit within the NCP ASIC monitors the SBI clock by using the 10 Mhz processor clock to sample it. If the SBI clock should fail, the NCP ASIC will go into a mode where any accesses to it by the microprocessor will be transparent. Without this clock detection feature, the microprocessor may become "locked up" forever by the NCP ASIC if an access is attempted.

The NCP ASIC interrupts the microprocessor when it needs servicing. An interrupt an occur from one of two general sources. They are the MSI control logic, or the SBI control logic. The source of the interrupt is provided in the Master Interrupt Register. Its bit allocation is shown below:

| MASTER INTERRUPT REGISTER (READ ONLY) ADDRESS: 31018H (NCP ASIC A) 33018H (NCP ASIC B) | | | | | | | | |
|---|---|---|---|---|---|---|---|---|
| 7 | 6 | 5 | 4 | 3 | 2 | 1 | 0 | |
|   |   |   |   |   |   |   | 0 | MSI RX INT |
|   |   |   |   |   |   | 1 |   | MSI TX INT |
|   |   |   |   |   | 2 |   |   | SBI30 RX INT |
|   |   |   |   | 3 |   |   |   | SBI31 RX INT |
|   |   |   | 4 |   |   |   |   | SBI TX INT |
|   |   | 5 |   |   |   |   |   | SPARE |
|   | 6 |   |   |   |   |   |   | SPARE |
| 7 |   |   |   |   |   |   |   | SPARE |

Bit Descriptions:

MSI RX INT: A high on this bit indicates that a message has been received from the MSI.

MSI TX INT: A high on this bit indicates that the MSI transmit buffer is empty and ready to accept another message.

SBI30 RX INT: A high on this bit indicates that a VI control word has been received on SBI Link 30 which had the "I" bit set. Read the SBI Interrupt Register to determine the specific channel.

SBI31 RX INT: A high on this bit indicates that a VI control word has been received on SBI Link 31 which had the "I" bit set. Read the SBI Interrupt Register to determine the specific channel.

SBI TX INT: A high on this bit indicates that the SBI transmitter has sent its message, and is ready for another.

In order to avoid missing interrupts, the microprocessor's internal interrupt controller should be configured in "level" sensing interrupt mode and not "edge triggered". This is because the interrupt line is not guaranteed to go low after reading the master interrupt register. Another interrupt may occur during the read, thus keeping the INT line high.

3.15.1 Microprocessor Serial Interface

The NCP ASIC supports an asynchronous, full duplex serial channel called the microprocessor serial interface (MSI). The interface uses the Intel 8051 multiprocessor communications mode (Mode 2) protocol. It is used to communicate with three of the system's units. They are the COA, the CLK, and TSM/TSI PBA's. NCP ASIC A supports the MSI for the PBA's on side A of the redundant equipment, and NCP ASIC B supports the MSI for side B. The COA receives separate MSI's from both sides, and only uses the active side's data. The multiprocessor communications protocol requires 11 bis per byte of data transmitted. Of these, one is a start bit, one is a stop bit, 8 of course are data bits, and one is a control bit. The data rate is 128K bits/sec. The data is sent LSB first. This is a master/slave protocol and it is used in the following manner. When the master processor (SNC1) wants to transmit a block of data to one of several slaves, it first sends out an address byte which identifies the target slave's address. An address byte is indicated by the control bit (referred to as 9th bit due to its position in the bit stream) having been set to a one. The detection of this 9th bit having been set interrupts all slaves that the byte received was an address byte. The slaves each check to see if the address was their own. If it was, they proceed receive the following data bytes.

In the NCP ASIC, the blocks of data are 4 bytes long. There are a total of 6 bytes transmitted in a message however. One address byte, 4 data bytes, and one checksum byte.

All of these bytes must be written by the microprocessor into registers in the NCP ASIC. The checksum must be calculated by software. It is not caluculated automatically by the NCP ASIC. In order to transmit a block of data, the MSI Transmit Registers must be written. Writing to MSI Transmit Byte 6 will cause the transmission to begin. When done, an interrupt will be detected. The register's addresses are given below:

| Address (Hex) | Word |
|---|---|
| MSI TRANSMIT REGISTERS (NCP ASIC A): (WRITE ONLY) | |
| 31006 | 1 |
| 31007 | 2 |
| 31008 | 3 |
| 31009 | 4 |
| 3100A | 5 |
| 3100B | 6 |
| | (starts transmission) |
| MSI TRANSMIT REGISTERS (NCP ASIC B): | |

| Address (Hex) | Word |
|---|---|
| (WRITE ONLY) | |
| 33006 | 1 |
| 33007 | 2 |
| 33008 | 3 |
| 33009 | 4 |
| 3300A | 5 |
| 3300B | 6 |
| | (starts transmission) |

The NCP ASIC will recieve incoming bytes and place them in the MSI Receive Registers. An interrupt is generated when the 6th byte is received. The addresses of these registers are as follows:

| Address (Hex) | Word |
|---|---|
| MSI RECEIVE REGISTERS (NCP ASIC A): (READ ONLY) | |
| 31000 | 1 |
| 31001 | 2 |
| 31002 | 3 |
| 31003 | 4 |
| 31004 | 5 |
| 31005 | 6 |
| MSI RECEIVE REGISTERS (NCP ASIC B): (READ ONLY) | |
| 33000 | 1 |
| 33001 | 2 |
| 33002 | 3 |
| 33003 | 4 |
| 33004 | 5 |
| 33005 | 6 |

The 4 bytes of data have been further broken down into a specific command protocol used to issue commands to and receive status from the slave units. This protocol is described in the Master Slave Serial Link Interface Protocol Specification (600143-562).

One of the functions of the MSI is configuration of connect memory in the TSM/TSI PBA. In one senario, it is required that the Datacom channels (192K bit/sec HDLC) be allowed to pass through a module whose processor unit has failed. Normally, these channels are interactively relayed to downstream Network Elements by the system processor unit. When this unit fails, the connect memory must be updated to route the channels directly through the module to the next Network Element downstream. In the SNC101, when the watch dog timer expires, the KILL signal is used to tri-state the MSI transmitter. This is done so that the COA may become bus master and reconfigure the connect memory to route the Datacom channels through the system.

3.15.2 SBI Links

As mentioned above, each NCP ASIC contains two SBI links. These SBI links are Link 30 and Link 31 from the TSM/TSI perspective. These are 4.096 Mbit data links. Each link contains 32 channels or time slots. The channel allocation for SBI Links 30 and 31 are as shown below:

| Link | Channel | Allocation |
|---|---|---|
| 30 | 0 | Synchronization Channel |
| 30 | 1–28 | VI Control Channels, DS-1 Interface |
| 30 | 29 | DTAU DS1 provisioning/control |
| 30 | 30 | Maintenance Cluster DS1 VI Channel |
| 30 | 31 | Maintenance Cluster VI Channel |
| 31 | 0 | Synchronization Channel |
| 31 | 1–2 | Orderwire Channels (fixed rate) |

-continued

| Link | Channel | Allocation |
|---|---|---|
| 31 | 3, 4, 5 | HDLC Channel 192 Kbps East Datacom |
| 31 | 6, 13, 14 | HDLC Channel 192 Kbps West Datacom |
| 31 | 7 | HDLC Channel 64 Kbps Common Signaling |
| 31 | 8 | Test Channel |
| 31 | 9-11 | Broadcast Channels |
| 31 | 12 | Path Tracer |
| 31 | 15 | East STT1/FTL1 provisioning VI channel |
| 31 | 16 | West STT1/FTL1 provisioning VI channel |
| 31 | 17 | HDLC Channel, 64/4 Kbps EOC Channel |
| 31 | 18-31 | VI Channels for future products |

There are several different data formats used on the SBI channels. These include the sync channel format, the VI control channel format, the path tracer format, the HDLC channel format, and the orderwire channel format.

Sync Channel Format:
| PE | 0 | 1 | 0 | 0 | 1 | 1 | 1 | AB | AB | CC | CC | CC | CC | CC | P |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

PE = parity error bit (error = 0)
AB = A/B select status bits
CC = Composite clock offset bits (unused by NCP)
P = Channel parity bit (even parity)
The Barker Code (bits 1-7) will be inverted on alternating frames.

VI Control Channel Format:
| D7 | D6 | D5 | D4 | D3 | D2 | D1 | D0 | V | I | O4 | O3 | O2 | O1 | O0 | P |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

D = control data bits
V = valid data indicator (active low)
I = channel interrupt bit (active low)
O = offset bits for channel data buffer
P = channel parity bit (odd parity)

HDLC Channel Format:
| D7 | D6 | D5 | D4 | D3 | D2 | D1 | D0 | UNUSED | | | | | | | P |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

DATA = HDLC formatted data (bit 3 will carry the data for the 4 Kbps case)
P = channel parity (odd parity)

Path Tracer Channel Format:
| D7 | D6 | D5 | D4 | D3 | D2 | D1 | D0 | UNUSED | | | | | | | P |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

DATA = ASCII path tracer data
P = channel parity (odd parity)

Orderwire Channel Format:
| D7 | D6 | D5 | D4 | D3 | D2 | D1 | D0 | UNUSED | | | | | | | P |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

DATA = PCM coded orderwire data
P = channel parity (odd parity)

The NCP ASIC's are designed to handle each of the formats shown above with the exception of the HDLC channels. The serial data is passed through the ASIC to the XC3090 which extracts the HDLC information. The details of this operation will be explained in more detail in a later section. The overall status of the SBI links can be examined by reading the SBI STATUS REGISTER within the NCP ASIC. The bit assignment for this register is as follows:

SBI STATUS REGISTER (READ ONLY)
ADDRESS: 3102AH (NCP ASIC A)
3302AH (NCP ASIC B)

| 7 | 6 | 5 | 4 | 3 | 2 | 1 | 0 | |
|---|---|---|---|---|---|---|---|---|
| | | | | | | | 0 | PER1 |
| | | | | | | 1 | | PET1 |
| | | | | | 2 | | | LOS1 |
| | | | | 3 | | | | PER2 |
| | | | 4 | | | | | PET2 |
| | | 5 | | | | | | LOS2 |
| | 6 | | | | | | | SPARE |
| 7 | | | | | | | | SPARE |

Bit Descriptions:

LOS1: A low on this bit indicates that link 30 is in sync. A high indicates loss of sync. The bit always reflects the current status of synchronization at the time it is read.

LOS2: A low on this bit indicates that link 31 is in sync.

A high indicates loss of sync. The bit always reflects the current status of synchronization at the time it is read.

PER1: A high on this bit indicates that a receive parity error was encountered on one of the channels in the incoming serial SBI stream on link 30. Once set, this bit remains set until the register is read at which time it is cleared.

PER2: A high on this bit indicates that a receive parity error was encountered on one of the channels in the incoming serial SBI stream on link 31. Once set, this bit remains set until the register is read at which time it is cleared.

PET1: A high on this bit indicates that a parity error was detected by the device on the far end of link 30. This is indicated to the NCP ASIC by the assertion of the PE bit in channel 0 of that link. Once set, this bit remains set until the register is read at which time it is cleared.

PET2: A high on this bit indicates that a parity error was detected by the device on the far end of link 31. This is indicated to the NCP ASIC by the assertion of the PE bit in channel 0 of that link. Once set, this bit remains set until the register is read at which time it is cleared.

3.15.2.1 Synchronization Channel

The NCP ASIC handles internally the majority of functions associated with this channel. The exception is the A/B Mux Status. The A/B Mux Select Broadcast Register bits assignments are as follows:

```
A/B MUX SELECT BROADCAST REGISTER
(WRITE ONLY)
ADDRESS:   3102EH (NCP ASIC A)
           3302EH (NCP ASIC B)
    7  6  5  4  3  2  1  0
    0                          A BIT
    1                          B BIT
    2                          SPARE
    3                          SPARE
    4                          SPARE
    5                          SPARE
    6                          SPARE
    7                          SPARE
```

Bit Descriptions:

A BIT: A high on this bit and a low on B_BIT causes the DS1's to select the A SBI link for its input source and output destination.

B BIT: A high on this bit and a low on B_BIT causes the DS1's to select the B SBI link for its input source and output destination.

3.15.2.2 VI Control Channels

The VI control channel format of the SBI link is used for communication between units within the system. The format, shown above, consists of 2 bytes of data. The first byte is the control byte. The second is the data byte. The "V" bit is set whenever there is a valid data byte in the message. When this field is not set all off the other fields will be ignored. The "I" bit is used to interrupt the microprocessor to indicate the need for service. The "P" is odd parity on the entire word.

Each of the NCP ASIC's have a dedicated static RAM buffer (U43, U44). The microprocessor can address 4k bytes of each memory buffer. When the NCP ASIC receives valid data on one of its VI Control channels, it looks at the Offset field in the control to determine where to store the data byte in the memory buffer. The channel that the valid data is received on also determines where to store the data in the memory buffer. Each channel is mapped into a dedicated 32 byte portion of the buffer. The channel number determines the base address of the received data. The offset field in the received control byte points to the exact address where the data byte will be stored. In other words, the offset is added to the base address to determine the address in the memory buffer to store the data byte.

The memory map of the receive buffer for the NCP ASIC A is shown below:

| Address Range (Hex) | Link | Channel |
|---|---|---|
| 30000-3001F | 30 | Channel 31 |
| 30020-3003F | 30 | Reserved |
| 30040-3005F | 30 | Channel 1 |
| 30060-3007F | 30 | Channel 2 |
| 30080-3009F | 30 | Channel 3 |
| 300A0-300BF | 30 | Channel 4 |
| 300C0-300DF | 30 | Channel 5 |
| 300E0-300FF | 30 | Channel 6 |
| 30100-3011F | 30 | Channel 7 |
| 30120-3013F | 30 | Channel 8 |
| 30140-3015F | 30 | Channel 9 |
| 30160-3017F | 30 | Channel 10 |
| 30180-3019F | 30 | Channel 11 |
| 301A0-301BF | 30 | Channel 12 |
| 301C0-301DF | 30 | Channel 13 |
| 301E0-301FF | 30 | Channel 14 |
| 30200-3021F | 30 | Channel 15 |
| 30220-3023F | 30 | Channel 16 |
| 30240-3025F | 30 | Channel 17 |
| 30260-3027F | 30 | Channel 18 |
| 30280-3029F | 30 | Channel 19 |
| 302A0-302BF | 30 | Channel 20 |
| 302C0-302DF | 30 | Channel 21 |
| 302E0-302FF | 30 | Channel 22 |
| 30300-3031F | 30 | Channel 23 |
| 30320-3033F | 30 | Channel 24 |
| 30340-3035F | 30 | Channel 25 |
| 30360-3037F | 30 | Channel 26 |
| 30380-3039F | 30 | Channel 27 |
| 303A0-303BF | 30 | Channel 28 |
| 303C0-303DF | 30 | Channel 29 |
| 303E0-303FF | 30 | Channel 30 |
| 30400-3041F | 31 | Channel 31 |
| 30420-305BF | 31 | Reserved |
| 305C0-305DF | 31 | Channel 13 |
| 305E0-305FF | 31 | Channel 14 |
| 30600-3061F | 31 | Channel 15 |
| 30620-3063F | 31 | Channel 16 |
| 30640-3065F | 31 | Channel 17 |
| 30660-3067F | 31 | Channel 18 |
| 30680-3069F | 31 | Channel 19 |
| 306A0-306BF | 31 | Channel 20 |
| 306C0-306DF | 31 | Channel 21 |
| 306E0-306FF | 31 | Channel 22 |
| 30700-3071F | 31 | Channel 23 |
| 30720-3073F | 31 | Channel 24 |
| 30740-3075F | 31 | Channel 25 |
| 30760-3077F | 31 | Channel 26 |
| 30780-3079F | 31 | Channel 27 |
| 307A0-307BF | 31 | Channel 28 |
| 307C0-307DF | 31 | Channel 29 |
| 307E0-307FF | 31 | Channel 30 |

The memory map of the receive buffer for the NCP ASIC B is shown below:

| Address Range (Hex) | Link | Channel |
|---|---|---|
| 32000-3201F | 30 | Channel 31 |
| 32020-3203F | 30 | Reserved |
| 32040-3205F | 30 | Channel 1 |
| 32060-3207F | 30 | Channel 2 |
| 32088-3209F | 30 | Channel 3 |
| 320A0-320BF | 30 | Channel 4 |
| 320C0-320DF | 30 | Channel 5 |
| 320E0-320FF | 30 | Channel 6 |
| 32100-3211F | 30 | Channel 7 |
| 32120-3213F | 30 | Channel 8 |
| 32140-3215F | 30 | Channel 9 |
| 32160-3217F | 30 | Channel 10 |
| 32180-3219F | 30 | Channel 11 |
| 321A0-321BF | 30 | Channel 12 |
| 321C0-321DF | 30 | Channel 13 |
| 321E0-321FF | 30 | Channel 14 |
| 32200-3221F | 30 | Channel 15 |
| 32220-3223F | 30 | Channel 16 |
| 32240-3225F | 30 | Channel 17 |
| 32260-3227F | 30 | Channel 18 |
| 32280-3229F | 30 | Channel 19 |
| 322A0-322BF | 30 | Channel 20 |
| 322C0-322DF | 30 | Channel 21 |
| 322E0-322FF | 30 | Channel 22 |
| 32300-3231F | 30 | Channel 23 |
| 32320-3233F | 30 | Channel 24 |
| 32340-3235F | 30 | Channel 25 |
| 32360-3237F | 30 | Channel 26 |
| 32380-3239F | 30 | Channel 27 |
| 323A0-323BF | 30 | Channel 28 |
| 323C0-323DF | 30 | Channel 29 |
| 323E0-323FF | 30 | Channel 30 |
| 32400-3241F | 31 | Channel 31 |
| 32420-325BF | 31 | Reserved |
| 325C0-325DF | 31 | Channel 13 |
| 325E0-325FF | 31 | Channel 14 |
| 32600-3261F | 31 | Channel 15 |
| 32620-3263F | 31 | Channel 16 |
| 32640-3265F | 31 | Channel 17 |
| 32660-3267F | 31 | Channel 18 |
| 32680-3269F | 31 | Channel 19 |
| 326A0-326BF | 31 | Channel 20 |

-continued

| Address Range (Hex) | Link | Channel |
|---|---|---|
| 326C0-326DF | 31 | Channel 21 |
| 326E0-326FF | 31 | Channel 22 |
| 32700-3271F | 31 | Channel 23 |
| 32720-3273F | 31 | Channel 24 |
| 32740-3275F | 31 | Channel 25 |
| 32760-3277F | 31 | Channel 26 |
| 32780-3279F | 31 | Channel 27 |
| 327A0-327BF | 31 | Channel 28 |
| 327C0-327DF | 31 | Channel 29 |
| 327E0-327FF | 31 | Channel 30 |

The data bytes only will be stored in these memory buffers. The VI control byte is stripped off and only used by the NCP ASIC internally.

As mentioned earlier, the Master Interrupt Register reports whether the "I" bit was set on an incoming VI control word. If the bit was set, and an interrupt occurred, the Master Interrupt Register will only reveal which link it was on. The exact channel that the interrupting data was received on is determined by the SBI Interrupt Registers. There are a total of 8 of these registers. The addresses and the link and channels associated with each is given below:

| Address NCP ASIC A/ NCP ASIC B | Link | MSB D7 | D6 | D5 | D4 | D3 | D2 | D1 | LSB D0 |
|---|---|---|---|---|---|---|---|---|---|
| 31019/33019 | 30 | CH7 | CH6 | CH5 | CH4 | CH3 | CH2 | CH1 | 0 |
| 3101A/3301A | 30 | CH15 | CH14 | CH13 | CH12 | CH11 | CH10 | CH9 | CH8 |
| 3101B/3301B | 30 | CH23 | CH22 | CH21 | CH20 | CH19 | CH18 | CH17 | CH16 |
| 3101C/3301C | 30 | CH31 | CH30 | CH29 | CH28 | CH27 | CH26 | CH25 | CH24 |
| 31021/33021 | 31 | 0 | 0 | 0 | 0 | 0 | 0 | 0 | 0 |
| 31022/33022 | 31 | CH15 | CH14 | CH13 | 0 | 0 | 0 | 0 | 0 |
| 31023/33023 | 31 | CH23 | CH22 | CH21 | CH20 | CH19 | CH18 | CH17 | CH16 |
| 31024/33024 | 31 | CH31 | CH30 | CH29 | CH28 | CH27 | CH26 | CH25 | CH24 |

A high on the corresponding CHx indicates which channel received the interrupting data. These registers are cleared when read. The interrupts can be masked from the microprocessor on a channel by channel basis. The individual channels can be prevented from producing interrupts by setting the the appropriate bit to a low in the SBI Interrupt Mask Registers. The configuration of these registers is given below:

| Address NCP ASIC A/ NCP ASIC B | Link | MSB D7 | D6 | D5 | D4 | D3 | D2 | D1 | LSB D0 |
|---|---|---|---|---|---|---|---|---|---|
| 3101D/3301D | 30 | CH7 | CH6 | CH5 | CH4 | CH3 | CH2 | CH1 | 0 |
| 3101E/3301E | 30 | CH15 | CH14 | CH13 | CH12 | CH11 | CH10 | CH9 | CH8 |
| 3101F/3301F | 30 | CH23 | CH22 | CH21 | CH20 | CH19 | CH18 | CH17 | CH16 |
| 31020/33020 | 30 | CH31 | CH30 | CH29 | CH28 | CH27 | CH26 | CH25 | CH24 |
| 31025/33025 | 31 | X | X | X | X | X | X | X | X |
| 31026/33026 | 31 | CH15 | CH14 | CH13 | X | X | X | X | X |
| 31027/33027 | 31 | CH23 | CH22 | CH21 | CH20 | CH19 | CH18 | CH17 | CH16 |
| 31028/33028 | 31 | CH31 | CH30 | CH29 | CH28 | CH27 | CH26 | CH25 | CH24 |

Even though the interrupts are masked, the interrupt bit is still set in the SBI interrupt register. It just doesn't cause the INT pin to go high.

The NCP ASIC is capable of transmitting one VI Control channel at a time onto any of the VI channels in Link 30 or 31. In order to transmit data, a 64 byte buffer in the external static RAM is loaded with the VI formated control/data word. The address range of the memory buffer is:

| SBI TRANSMIT BUFFER: | NCP ASIC A | 30800-3083F (hex) |
|---|---|---|
| | NCP ASIC B | 32200-3283F (hex) |

The data should be loaded into the memory buffer area control byte first, followed by the corresponding data byte. The example below indicates the format for filling the SBI Transmit Buffer.

| Address | D7 | D6 | D5 | D4 | D3 | D2 | D1 | D0 |
|---|---|---|---|---|---|---|---|---|
| 30800 | V | I | a4 | a3 | a2 | a1 | a0 | XX |
| 30801 | d7 | d6 | d5 | d4 | d3 | d2 | d1 | d0 |
| 30802 | V | I | a4 | a3 | a2 | a1 | a0 | XX |
| 30803 | d7 | d6 | d5 | d4 | d3 | d2 | d1 | d0 |

Refer to the VI Control Channel Format diagram shown previously for the bit descriptions above.

The SBI control register must be written to in order to start the transmission. The bit assignments for this register are as follows:

SBI CONTROL REGISTER (WRITE ONLY)
ADDRESS:    31029H (NCP ASIC A)
            33029H (NCP ASIC B)

```
7 6 5 4 3 2 1 0
              0   CH0 (LSB)
              1   CH1
              2   CH2
              3   CH3
              4   CH4 (MSB)
              5   LINK
              6   TXEN
              7   SPARE
```

Bit Descriptions:

CH0-3: These bits designate the VI control channel number to transmit on. In writing the channel field, it is necessary to write a value which is one less than the channel number on which transmission should occur. For example, to transmit on channel 7 the channel field should contain binary 6.

LINK: This bit designates the Link which the transmission will occur on. (0=Link 30; 1=Link 31)

TXEN: Writing a one to this bit will begin the transmission. The bit is cleared upon an SBI Transmit Interrupt occuring.

3.15.2.3 Path Tracer Channels

The path tracer transmit buffer consists of 64 bytes of RAM allocated for transmitting a path tracing message on a single channel of the SBI link. The contained in this buffer will be continuously transmitted in a circular pattern, thus repeating every 64 SBI frames. The buffer is programmed by microprocessor access to the static RAM memory area. The address is as follows:

| PATH TRACER TRANS- | NCP ASIC A | 30840-3087F (hex) |
|---|---|---|
| MIT BUFFER: | NCP ASIC B | 32840-3287F (hex) |

The path tracer receive buffer consists of 64 bytes of RAM allocated for the storage of a path tracing message recieved on a single channel of the SBI Link. This buffer is written by the ASIC one byte per frame in circular manner, thus being completely rewritten every 64 SBI frames. The address on this buffer is as follows:

| PATH TRACER | NCP ASIC A | 30880-308BF (hex) |
|---|---|---|
| TRANSMIT BUFFER: | NCP ASIC B | 32880-328BF (hex) |

3.15.2.4 Broadcast Channels

There are four broadcast channels allocated in SBI link 31. The contents of the Broadcast Data registers are continuously transmitted on channels 8, 9, 10, and 11. There is a separate pair of Broadcast Data register for each of the three channels. The addresses of these registers are as follows:

| Address (hex) | Channel | Description |
|---|---|---|
| BROADCAST DATA REGISTERS (NCP ASIC A): | | |
| 31030 | 8 | Bits 8-15 |
| 31031 | 8 | Bits 0-7 |
| 31032 | 9 | Bits 8-15 |
| 31033 | 9 | Bits 0-7 |
| 31034 | 10 | Bits 8-15 |
| 31035 | 10 | Bits 0-7 |
| 31036 | 11 | Bits 8-15 |
| 31037 | 11 | Bits 0-7 |
| BROADCAST DATA REGISTERS (NCP ASIC B): | | |
| 33030 | 8 | Bits 8-15 |
| 33031 | 8 | Bits 0-7 |
| 33032 | 9 | Bits 8-15 |
| 33033 | 9 | Bits 0-7 |
| 33034 | 10 | Bits 8-15 |
| 33035 | 10 | Bits 0-7 |
| 33036 | 11 | Bits 8-15 |
| 33037 | 11 | Bits 0-7 |

The bit 15 in each of the channels is reserved for parity, and is thus a "don't care" when written to the registers. The parity is caluculted by the NCP ASIC. These registers are not protected from write attempts by the microprocessor.

Only channel 8 of the broadcast channels is received by the NCP ASIC. The data received over this channel is stored in the Broadcast Capture Registers. There are two registers, one contains the upper byte, and the other contains the lower byte. The addresses of these registers are as follows:

| Address (hex) | Channel | Description |
|---|---|---|
| 33038 | 8 | Bits 8-15 |
| 33039 | 8 | Bits 0-7 |

The bit 15 will always be reported as a low, and thus will not reflect the true parity received from the SBI serial data stream. These registers are read only.

3.15.2.5 SBI Loopback

For diagnostic and test purposes, an internal loopback feature is included in the NCP ASIC. Under microprocessor command, the SBI transmitter can be made to loop back onto the SBI receiver of the same link. This will be referred to as Local Loopback. The register associated with this feature is the SBI Loopback Code register.

Another type of loopback is also supported. This one involves looping back a single channel of data from a device at the far end of the SBI link. There are three registers associated with this feature. They are the SBI Loopback Control Register, the SBI Lookback Data Register, and the SBI Loopback Code Register. Only the VI Channels can be loop in this manner. The following senario describes remote loopback.

The far end device will see a VI control byte with the V and I bits inactive, and a special loopback control code in the offset. The local device will store the data byte associated with that VI channel and transmit the data back to the NCP ASIC. This will occur on the same channel during the next frame.

It should be noted, that the SBI Loopback Code Register is dual function. It is used for both local and remote loopback. The bit assignments of these registers are as follows:

SBI LOOPBACK CODE REGISTER (WRITE ONLY)
ADDRESS: 3102CH (NCP ASIC A)
3302CH (NCP ASIC B)

| 7 | 6 | 5 | 4 | 3 | 2 | 1 | 0 | |
|---|---|---|---|---|---|---|---|---|
| | | | | | | | 0 | SPARE |
| | | | | | | 1 | | LC0 (SBI BIT 14) |
| | | | | | 2 | | | LC1 |
| | | | | 3 | | | | LC2 |
| | | | 4 | | | | | LC3 |
| | | 5 | | | | | | LC4 (SBI BIT 10) |
| | 6 | | | | | | | LLB1 |
| 7 | | | | | | | | LLB2 |

Bit Descriptions:

LC0-4: These bits are associated with the remote loopback. They are the special code that is to be inserted in the offset field of the VI control byte in order to tell the remote device to loop a channel. The V and I bits are held inactive automatically.

LLB1: This bit, when set high will initiate local loopback of SBI link 30. It must be low during remote loopback.

LLB2: This bit, when set high will initiate local loopback of SBI link 31. It must be low during remote loopback.

SBI LOOPBACK CONTROL REGISTER (WRITE ONLY)
ADDRESS: 3102BH (NCP ASIC A)
3302BH (NCP ASIC B)

| 7 | 6 | 5 | 4 | 3 | 2 | 1 | 0 | |
|---|---|---|---|---|---|---|---|---|
| | | | | | | | 0 | CH0 (MSB) |
| | | | | | | 1 | | CH1 |
| | | | | | 2 | | | CH2 |

-continued

| | |
|---|---|
| 3 | CH3 |
| 4 | CH4 |
| 5 | LINK |
| 6 | LBEN |
| 7 | SPARE |

Bit Descriptions:
CH0-3: These bits designate the VI control channel number to remotely loopback data on. In writing the channel field, it is necessary to write a value which is one less than the channel number on which transmission should occur. For example, to transmit on channel 7 the channel field should contain binary 6.

LINK: This bit designates the Link which the tranmission will occur on. (0=Link 30; 1=Link 31)

LBEN: Writing a one to this bit will causes the loopback data and loopback code information to be transmitted on the channel indicated in bits 0-4 of this register. The V and I bits are held inactive automatically.

The SBI Loopback Data register contains the data to be transmitted in the remote loopback transmission. The lsb of this register will be transmitted in SBI bit 8 in the loopback channel. The addresses for this register are given below:

| | | |
|---|---|---|
| SBI LOOPBACK DATA REGISTER: | (NCP ASIC A) | 3102D (hex) |
| | (NCP ASIC B) | 3302D (hex) |

3.16 HDLC Circuitry

An SCC (85C30) (U36) is responsible for handling the HDLC protocol. The SCC is a multi-protocol data communications peripheral. For this application, it should be intialized for operation in synchronous bit-oriented mode. The SCC provides two full duplex channels.

The SCC is selected by the PCS1* chip select line. Whenever the XC3090 sees this signal go active, the HDLC_CE* signal is made active on the next rising edge of CLKOUT. The address lines ADDR0 and ADDR1 are used by the XC3090 to decode the four memory locations required to access the SCC. In addition, the address line ADDR4 must be seen low by the XC3090 since the PCS1* chip select is shared with the DMA controller. The locations are defined as follows:

| ADDRESS | CHANNEL / MODE |
|---|---|
| 38080h | Channel B / Control |
| 38081h | Channel A / Control |
| 38082h | Channel B / Data |
| 38083h | Channel A / Data |

The SCC's data bus is connected to the XDATA0-XDATA7 lines. This is the cross-connect transceiver data bus. SCC accesses can be byte accesses to both even and odd byte addresses. The 80C186 wait state generator may be programmed for zero wait states although one wait is actually inserted by the interface logic. Before initialization, a software reset of the SCC is required. This is because the hardware is not capable of performing a reset on the device due to the nature of the XC3090.

As mentioned earlier, the NCP ASIC does not handle the insertion and extraction of HDLC data into and out of the SBI link. This function is performed within the XC3090. For insertion onto the SBI link, the data is received from an SCC (85C30) by the XC3090. For extraction from the SBI link, the XC3090 passes it to the SCC.

The hardware is provided for the future enhancement of the XC3090 circuitry to support two 192K bit/sec Datacom channels. These channels will be present on the SBI link 31 channels 3, 4, and 5, and on SBI Link 31 channels 6, 13, and 14. The 64K bit/sec Embedded Operations Channel, and the 4/64K bit/sec Common Signaling Channel are not supported in the SNC101 hardware.

The following discussion pertains to the XC3090 internal circuitry. The circuitry description provides the necessary information to implement the HDLC function at a later date.

Figure 36:
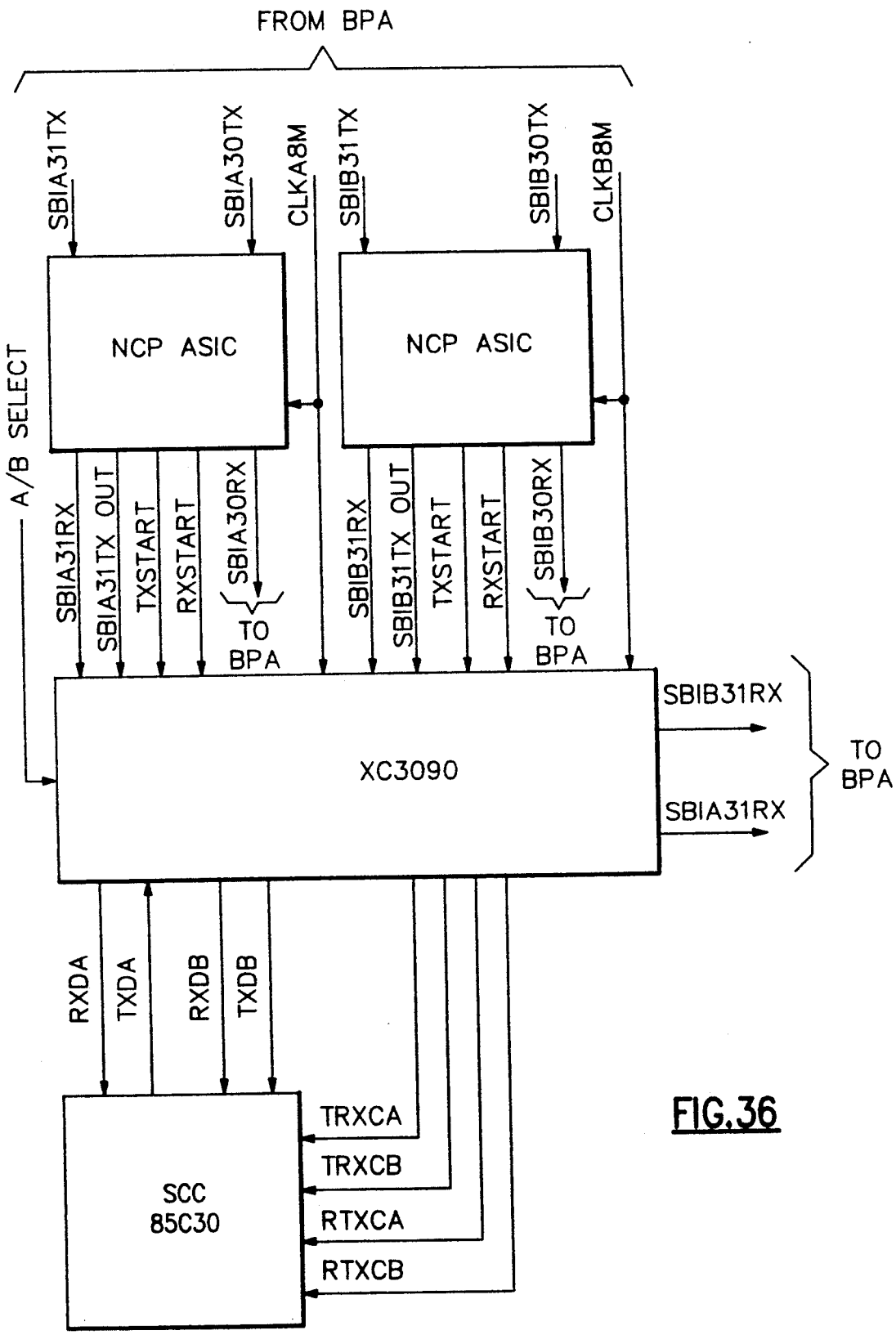
FIG. 36 is a block diagram of the HDLC control associated with the XC3090 forming part of the single network element controller.
Figure 37:
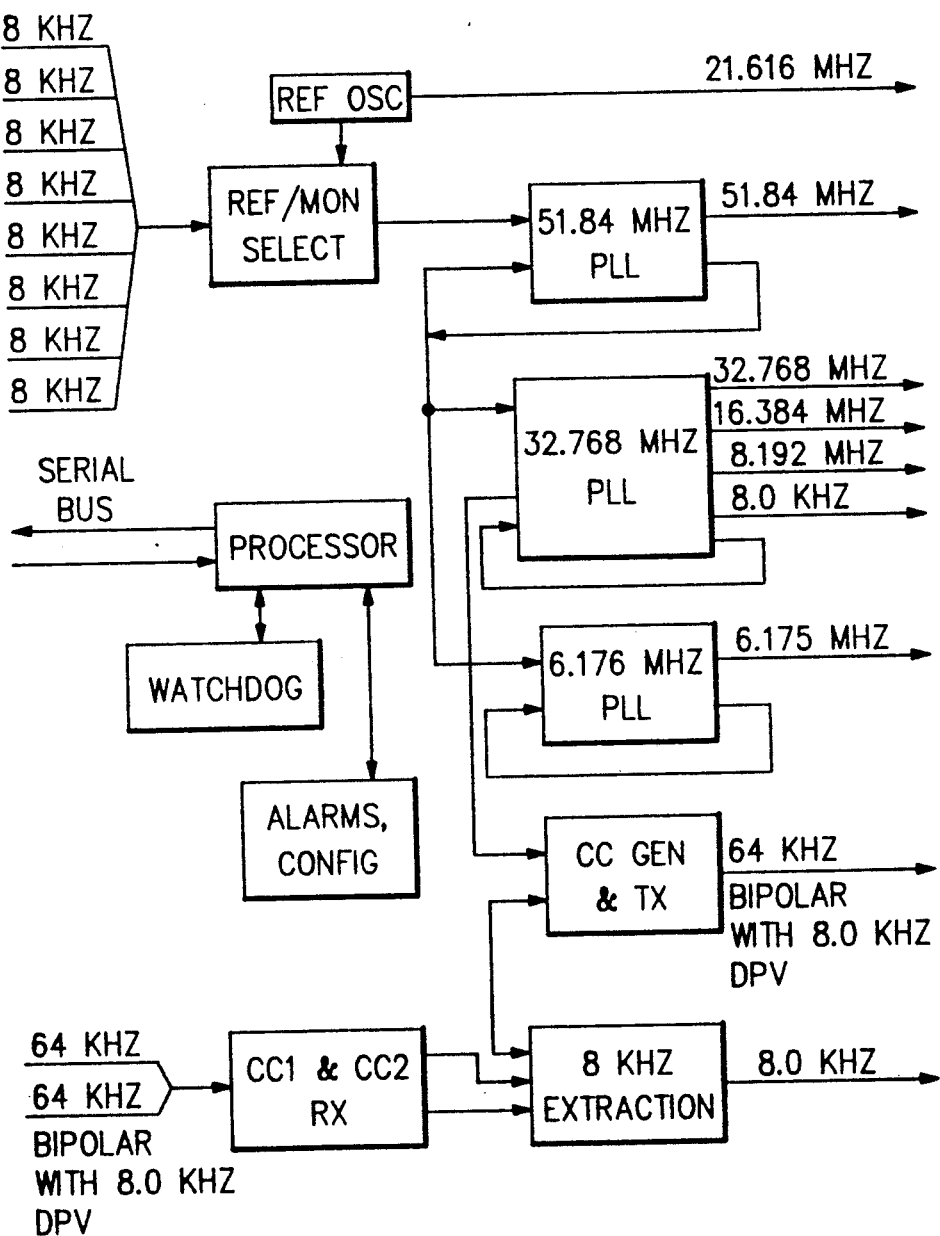
FIG. 37 is a block diagram of the clock module.

The NCP ASIC provides the serial SBI data stream as an output along with frame synchronization signals to the XC3090. The frame synchronization signals provide a known starting location within the serial data frame. This allows the XC3090 circuitry to extract or insert data into or out of the proper channels in the serial stream. The relationship between the NCP ASIC, XC3090, and SCC is shown in FIG. 36. Only the pertinent signals are shown for clarity.

In order to extract HDLC data, the XC3090 must first receive the synchronization pulse from the NCP ASIC. This pulse starts the receive counter. The count output provides information about the current channel and current bit within the channels. This output is decoded, and the extraction of the HDLC data occurs when the proper channel is detected.

The data is passed through a series of serial to parallel, parallel to parallel, and then parallel to serial registers. These registers act as a rate buffer between the SBI data rate, and the 85C30 inputs. Clock signals are supplied to the SCC in order to control the flow of data between the XC3090, and the SCC.

The reverse operation occurs for the insertion of data into the SBI links. Once each frame, the XC3090 receives the data from the SCC. This is done is serial fashion by performing serial to parallel conversions, parallel to parallel transfers, and parallel to serial conversions. The XC3090 again controls the clock signals to the SCC for this operation. A frame synchronization from the NCP ASIC is detected, and the transmit frame counter is started.

The SBI link output from the NCP ASIC is routed into the XC3090 before going the the backplane. This allows the HDLC data to be inserted into the serial bit stream at the proper channel within an SBI frame. The serial data is shifted out of the parallel to serial shift register mentioned above, and provided as input to a multiplexer. The SBI Link data from the NCP ASIC also goes into this multiplexer. The selection of the data source at the multiplexer output is based on the frame counter output. When HDLC data is to be inserted, the multiplexer selects the HDLC data source. All other times, the NCP ASIC's SBI data source is selected.

Some addition circuitry is involved which calculates parity on the HDLC portion of the data. The output of the multiplexer goes out of the XC3090 and is routed to the backplane.

The transfer of data between the SCC and local memory can be accomplished in two ways. The first is direct access of the SCC using the microprocessor to move the data. The other is by DMA. A programmable DMA controller (82C37) (35) performs this task. The controller should be configured for single byte transfer mode only because of timing restrictions imposed by the SCC. This also provides the microprocessor with a chance to obtain the bus for its own use in between DMA byte transfers.

The DMA controller is accessed using the PSC1* chip select line. The XC3090 decodes this signal with the ADDR4 address line high to produce the DMA_CE* signals which selects the 82C37. The address range for this device is as follows:

82C37 DMA CONTROLLER: 38090h to 3809Fh

The DMA controller's data bus is connected to the XDATA0-XDATA7 lines. This is the cross-connect transceiver data bus. DMA device programming by the processor can be byte accesses to both even and odd byte addresses. The 80C186 wait state generator may be programmed for zero wait states although one wait is actually inserted by the interface logic.

The DMA controller is dedicated to the servicing of DMA requests from the SCC. The SCC controls all data transfers between itself and memory using the DMA request lines. The channel assignments are as follows:

| DMA Channel | SCC Assignment |
| --- | --- |
| 0 | Channel A Receive |
| 1 | Channel A Transmit |
| 2 | Channel B Receive |
| 3 | Channel B Transmit |

During a DMA cycle, the octal transparent latch (U20) holds the address lines ADDR8-ADDR15 stable. The ADDR0-ADDR7 lines are asserted directly from the 82C37 address lines, and they are also stable for the entire cycle. The transfer of data occurs between the 85C30 and a memory location through the use of two sets of read/write lines.

In addition, the upper address bits ADDR19-ADDR16 are asserted onto the address bus by the XC3090. The "page" address latch in the XC3090 must have been written prior to the start of the DMA cycle. The "page" address indicates the desired segment of RAM that the DMA transfer is to take place in. The AEN signal is used to activate the drivers on the XC3090 to assert these signals.

```
DMA "PAGE" ADDRESS REGISTER (WRITE ONLY)
ADDRESS: 34000H
    7  6  5  4  3  2  1  0
    0                       ADDR16
    1                       ADDR17
    2                       ADDR18
    3                       ADDR19
    4                       SPARE
    5                       SPARE
    6                       SPARE
    7                       SPARE
```

Bit Descriptions:
ADDR16-19: These bits indicate the segment of RAM to be used during a DMA transfer.

During a receive operation (data from the SCC), the DMA_RD* line is asserted by the DMA controller. The XC3090 detects this line, and in turn generates the SCC_RD* and HDLC_CE* in order to read from the SCC. At the same time, the PROC_WR* signal is asserted along with the appropriate memory chip select. The data to be transfered is asserted onto the data bus by the SCC, and gets written into the memory device.

The reverse is true for a transmit operation. The DMA_WR* line is asserted by the DMA controller. The XC3090 detects this line, and in turn generates the SCC_WR* and HDLC_CE* in order to write to the SCC. At the same time, the PROC_RD* signal is asserted along with the appropriate memory chip select. The data to be transfered is asserted onto the data bus by the memory, and gets written into the SCC.

The DACK0-DACK3 (DMA acknowledge) lines are used by the XC3090 during a DMA cycle to determine the proper configuration that the cross-connect transceiver should be in.

4. OPTIONS

The only option provided on the SNC101 PBA is the choice of EPROM's to be used. The SNC101 is designed to accept either 27C1001, 27C2001, or 27C4001 EPROMs. The sockets U38, U39 can accept any of the part numbers listed. The strap resistor W1 must be present when 27C2001's are used. W1 and W2 must be present when 27C4001's are used. EEPROM's (28C010) may be used if resistor W3 only is present.

5. UNIT ALARMS

The SNC101 has one alarm lamp. This lamp is referred as the UNIT ALARM. If a problem occurs with either the hardware, or its firmware, a watchdog timeout may result. Following two successive timeouts of the watchdog timer, the UNIT ALARM LED is activated. This indicates that the SNC101 has been disabled. The only means of clearing this alarm condition is to cycle power to the PBA or pull the external reset low. Use of external reset is not recommend if the watchdog timer has caused the unit to be disabled. This indicates a serious hardware error.

The SNC101 also provides critical, major and minor alarm outputs to the COA. These are commicated over the MSI. They indicate the overall health of the equipment on the active side. Refer to the COA Technical Description for more details (625212-000-501).

6. ACRONYMS

ADM—Add/Drop Multiplexer
ASIC—Application Specific Integrated Circuit
CLK—Clock PBA
CMOS—Complimentary Metal Oxide Silicon
COA—Craft/Orderwire Alarm PBA
CPU—Central Processing Unit
CTS—Clear to Send
DCD—Data Carrier Detect
DCE—Data Circuit-Terminating Equipment
DMA—Direct Memory Access
DNC101—Dual Network Element Controller PBA
DSR—Data Set Ready
DTE—Data Terminal Ready
EPROM—Electrically Programmable Read Only Memory
EEPROM—Electrically Erasable Programable Read Only Memory
FITS—Failures in 10 9 Hours
FTM—Fiber Optics Transceiver, OC1
HC—High Speed CMOS
HCT—High Speed CMOS (TTL Compatible Inputs)
HDI—High Density Interconnect
HDLC—High Level Data Link Control Standard
JEDEC—Joint Electron Device Engineering Council
LED—Light Emitting Diode
LSB—Least Significant Bit MSB—Most Significant Bit
MSI—Microprocessor Serial Interface
NCP—Network Control Processor (Generic Term)
PBA—Printed Board Assembly (Also called "Unit")
PCM—Pulse Code Modulation
RTS—Request to Send
SBI—Serial Bus Interface
SCC—Serial Communications Controller SNC-Single Network Element Controller PBA
STT—STS-1 Electrical Transceiver
TM—Terminal Multiplexer
TSI—Time Slot Interchanger
TSM—Time Slot Multiplexer
TTL—Transistor-Transistor Logic

TECHNICAL DESCRIPTION COA101 PBA;
625212-001

1. General Description

The COA1 provides Craft person interfaces, Order Wire interfaces, Alarm interfaces to the CO alarm collection facility, and an A/B or ON/OFF Enable interface to the equipment.

The COA1 is primarily responsible for providing:

(a) The RS-232 and/or RS-422 interface required by the craft and serial E2A interfaces respectively.

(b) The conversion of the 4-wire Order wire audio into it's PCM equivalent for routing through the system.

(c) The Alarm Logic and interface between the NCP and the Fuse Alarm Panel (FAP)/E2A Scanner.

(d) The A/B Enable function, which controls the enabling of the A/B function on the respective units, i.e. STT1/FTM1.

(e) The Enable/Disable function to the SBI Outputs.

(f) DataCom Channel Reprovisioning g) Lamp test

A serial communication bus provides the COA1 access to the NCP in the system. This link is used to exchange configuration, test and status information with the Active NCP.

2. Unit Description

The NCP is the primary driver of the COA1. The COA1 uses a microcontroller to interface with the rather large number of inputs and outputs (with the exception of the Craft and Orderwire interfaces and Lamp test). Local firmware translates the COA1's inputs to the required output signals. The microcontroller (U6) provides for the following functions:

1. A/B Select
2. Alarm/ACO
3. Enable/Disable of SBI Outputs and A/B enable function (On/Off) of respective units, i.e. FTM1 (STT1)
4. Watch Dog Timer
5. EEPROM Provisioning
6. DataCom Channel Reprovisioning The two Craft Ports provide either two RS-232 interfaces or one RS-232 interface and one RS-422 interface. The COA1 is transparent to the signals, except for the 2:1 muxing of the transmitted signals.

The two Orderwire interfaces provide the analog to PCM conversion and vice versa, as well as a four wire interface for each orderwire.

3. Detailed Description 3.1 Microcontroller: 80C31

The 8 bit microcontroller—80C31 features 128 bytes of on chip RAM, a Full duplex UART, and an extensive Boolean processing capability. The 80C31 supports 32 bidirectional and individually addressable I/O lines. Of these I/O lines, 16 lines are dedicated to External Program fetches:

Port 0 (8-bit Port): Multiplexed Address (PCL)/Data bus

Port 2 (8-bit Port): PCH address bus

The 80C31 runs from an 8.192 MHz clock which provides for a 1.465 us. machine cycle.

3.1.1 Program Memory

The 80C31 is a romless controller, thus Program memory is stored in a 27C64 (U36) EPROM. An instruction fetch is performed by addressing the instruction via the 16 dedicated I/O lines. By the time the ALE (Address Latch Enable) signal has latched the low byte (PCL) into the 74HCT373 (U33), the high byte is valid on Port 2. Finally, the code byte is read by the 80C31 when the Program Strobe Enable (PSEN) signal is valid.

3.1.2 DataCom Channel Reprovisioning

The Tm/ADM-50 systems use the SONET section DataCom Channel (D1-D3) for communications to the Operations Systems. The communication path/processing for some system configurations is via the Single Network Element Controller (SNC). For these configurations, the COA can be provisioned so that upon detecting an SNC failue, the COA can re-provision the TSM/TSI connect memory to by-pass the non-redundant SNC and route the DataCom Channel from the East High Speed Interface to the West High Speed Interface.

3.1.3 EXTERNAL DATA WRITE MEMORY MAP

A 74HCT137 decodes the external data Read/Write addresses as shown below.

| | |
|---|---|
| 8004H | A/B' STATUS |
| 8003H | A/B SEL-SBI EN-TRISTMSI-MODE-ID2-MULTIPLE |
| 8002H | STT1/FTM1 ENABLES - SET/RESET TEST |
| 8001H | ALARMS/ACO |
| 8000H | WATCH DOG TIMER |
| 7FFFH | EEPROM |
| 0000H | EEPROM |

3.1.3.1 EEPROM

The EEPROM maintains all of the provisional data required by the system.

3.1.3.2 WATCH DOG TIMER

The 80C31 must strobe this circuitry within the designated timeout period

Timeout = 0.1 uF * 162K * 0.7  = 11.34 ms

The Watch Dog allows for only one missed pulse. If a two missed pulse scenario occurs the Watch dog will reset the Processor (U6) and force MAJ1, MAJ2, ALMID2, and a UNIT Alarm. The 80C31 is reset by asserting a high on the RST pin for two machine cycles ( 2.93 usec).

The COA allows a periodic 10 ms window, after the has been Reset, in which to allow the 80C31 to return to its normal mode if it can.

3.1.3.3 Alarms/ACO

The COA1 supports two alarm sets; Set1 Alarms and Set2 Alarms.

Set1 Alarms: This alarm set supports

1) A visual Critical, Major, and Minor alarm.

2) An Automatic Cutoff (ACO) signal used if the system is configured with an Alcatel Fuse Alarm Panel (FAP)

If the system is configured as stand alone, Set1 Alarm ONLY provides for the Critical, Major, and Minor visual alarms.

Set2 Alarms: This alarm set supports
1) A minimum Parallel E2A interface
2) Both the individual, non-multiplied alarms case and the multiplied alarms case.

The 80C31 receives the System Alarm status, via the Multiprocessor Serial Interface (MSI), from the active NCP as they occur.

The Automatic Cutoff signal is driven via two possible paths:
1. MSI Message
2. Push button on the front panel or from a discrete remote ACO input; Port 1 pin 7

The active NCP receives status information from the system and asserts the proper alarms for the COA1 to translate to the outside world. When an alarm condition occurs, the alarm logic shall activate the corresponding Set1 and Set2 Alarm outputs to the Fuse and Alarm Panel (FAP)/E2A Scanner; light the corresponding LED on the front panel; and activate the Identification signal.

The Alarms are clocked into an 74HCT273, buffered with an HC244, and then output to the FAP via 6 optocouplers (SX, S2, S3, S4, S5, S6). One for each set of alarms.

Upon receipt of an Alarm cut off (ACO) signal to the COA1, the audible alarm shall be silenced (If an Alcatel FAP is configured in the system). Three primary ACO signals exist:
1. MSI CMD ACO: This signal is driven by the NCP destined for the COA1 via the MSI.
2. A discrete remote ACO: This signal is derived from a remote contact closure.
3. A push button switch located on the front panel.

The ACO function has an associated lamp that activates whenever the ACO is active. The ACO function is released whenever the initiating alarm is cleared, or when a different alarm is received by the COA1 from the NCP.

If set2 alarms are provisioned as Multiplied alarms, the ACO signal shall retire all set2 alarms If set2 alarms are provisioned as Non-Multiplied alarms, the ACO signal shall be transpartent to the set2 alarms.

3.1.3.4 A/B Function

The COA1 receives configuration information from the Active NCP to set the state of the A/B (On/Off) enable function of the respective units, FTM1 (STT1). This information is driven via the MSI.

A 10 bit Enable/Disable code, along with a sequence of rising edge pulses (Enable pulses), will be provided to the units, when the system has to be (re)configured.

The 10 bit code has the following format:

---
(HH) (LLLHLHL) (S)
Where: HH is the preface
LLLHLHL is the command code
S=1 Enable
S=0 disable
(H=logic level high/L=logic level low)
---

The Enable pulses are derived from the 80C31: port 1 pin 0. The Enable code is driven by the 80C31, and clocked into a 74HCT273. The signal is then output to the HDI connector.

The "receiving" units shall clock in the 10 bit Enable/Disable code with the Enable pulses (rising edge). Thus the Enable pulses will be broadcast when a new Enable signal is output.

3.1.3.5 SBI Output Enable

The COA1 is driven by the Active NCP to set the state of each side of the system and force a loss of synchronization, on the SBI's, when required. The Ready line is monitored by the 80C31 to determine when this forced switch is required.

The two signals required to Enable/Disable the SBI's are the previously defined 10 bit Enable signal and Enable pulses.

The Enable signal is driven by the 80C31 and clocked into a 74HCT175. The signal is then output to the HDI connector.

3.1.3.6 Set/Reset Test

The signal path between the COA1 and the "receiving" unit of the 10 bit Enable/Disable code has to be verified. An actual switch over will not occur during this test procedure. This verification shall occur when the NCP commands the COA1, via the MSI, to transmit a modified 10 bit Enable signal.

Again, the two signals required for this test procedure are the previously defined 10 bit Enable signal and Enable pulses.

The test mode Enable signal shall have the following format: HHLLHLLHLH.

After the signal path has been verified, the NCP shall then command the COA1 to take the respective unit out of its test mode. Again this command is driven via the MSI.

The reset test mode Enable signal shall have the following format: HHLLHLLHLL. he same output pins designated for the A/B enable function (On/Off) of the respective units (FTM1/STT1) shall be untilized during this set/reset test procedure.

3.1.3.7 A/B Select

The COA1 provides the control lines which select the proper side of the system to become active. The COA1 monitors the Ready lines of each processor and determines which side shall be the Active side.

On POR, the COA1 shall attempt to activate the A side NCP, if the NCP is asserting its Ready line. If the NCP asserts its Active line in acknowledgement, the COA1 shall then assert the 1 bit A/B' Status line.

The A/B' Status line is used internally within the PBA to place the Craft, Orderwire and Serial Link Interfaces on the proper side. This signal is driven by the 80C31, destined for the respective Multiplexers.

From then on, the COA1 shall monitor the Active/Ready lines of both NCP and determine when a switch over reconfiguration is required.

The active low A/B Select signals are clocked into a 74HCT175 and output to the HDI connector destined for the respective NCP.

(A select signal—A NCP)

(B select signal—B NCP)

3.2 Craft Interface

NOTE: ALL SIGNAL NAMES FOUND ON THE COA1 SCHEMATIC ARE WITH REFERENCE TO A DATA COMMUNICATIONS EQUIPMENT (DCE)

Craft Port 1

Craft Port1 is provided on the unit's front panel as a standard RS-232 Local Craft interface via a 9 pin "D" connector. The received input from the craft port is sent to both the A and B NCPs. The individually transmitted outputs from the A and B NCPs are selected based on the assertion of the A/B' Status line and transmitted to the craft interface device.

Craft Port 2

Craft Port 2 is provided at the rear of the unit via its I/O connector. This port is brought to an external front-access wire-wrap field for access by the customer.

Group 1: This port may be configured as a "Remote" interface. This configuration provides the same basic interface as Craft Port 1 with A/B selection.

Group 2: This port may be configured to provide a serial E2A interface to an E2A sub-system. This configuration, also A/B selected, provides for differentially driven lines to the CO sub-system. These signals may be tristated to operate as a 485 Interface.

System Software shall tristate the differential drivers via the RS-232 signal, Clear to Send (CTS).

Note: The COA1 provides no E2A translation, only the physical interface. The software at the NCP will provide the E2A protocol.

3.3 Order Wire Interface

The Order Wire Interface function provides two Order Wire Interfaces. They can be used as the Express and Local Order Wire Interfaces, or Local OW East and Local OW West with the Express OW passing through the system. This function provides the analog to PCM conversion and vice versa, as well as a four wire interface for each Order wire.

The Order Wire Interface function shall have inputs from both NCP. The inputs from each NCP shall be a Transmit PCM bit stream, a PCM bit clock and two channel clocks. The Transmit PCM bit stream shall carry the two Order Wire PCM channels. The PCM bit clock shall be a 2.048 MHz clock for clocking the PCM data and the two channel clocks shall each be eight bit periods in duration indicating when the channel is valid (i.e. 8 KHz). The A/B' Status line selects which PCM input to output to the OW panel.

The Order Wire Interface shall output a common Receive PCM bit stream, and send it to each of the NCPs. The Receive PCM bit stream shall carry the Receive PCM data for both of the Order Wire Channels.

The +5 V and −5 V supply to the CODECs are filtered before being applied to the device:

+5 V filter: (R42, C48)
−5 V filter: (CR3, CR2, R61, C50)

3.4 Lamp Test

A lamp test can be performed on the COA1 to verify if all lamps on the PBA are functional. Two lamp test signals are driven from NCP A and NCP B, onto the COA1 PBA, destined for the gated LEDs.

3.5 NCP Reset

The COA provides for an NCP reset by sensing a remote contact closure and forcing a logic level reset to the NCP's watch dog circuitry. The closure provides a temporary power on reset to the NCP.

4. Options

Port 2 can be optioned with either a "Remote" RS-232 Interface or a Serial E2A RS-422 Interface. Refer to section 3.2 (Craft Interface)

5. Unit Alarms

The COA1 PBA supports 4 unit alarms with associated outputs to the FAP.
CRITICAL—Red
MAJOR—Red
MINOR—Yellow
ACO—Green
UNIT—NO EXTERNAL PINOUTS For a description of these alarms, refer to section 3.1.3.3 (Alarms/ACO).

6. Test

Test

All local control interfaces to the system is provided via the COA1, i.e. CRAFT INTERFACE.

7. ACRONYMS
ACO—ALARM CUTOFF
COA—CRAFT/ORDERWIRE/ALARM
FTM1—FIBER OPTIC TRANSCEIVER, MEDIUM POWER
MSI—MULTIPROCESSOR SERIAL INTERFACE
NCP—GENERIC TERM FOR THE DNC/SNC/ALC
NCPA/NCPB—GENERIC TERM FOR DNCA/SNC ASIC A—DNCB/SNC ASIC B
STT1—STS1 ELECTRICAL TRANSCEIVER
TSI—TIME SLOT INTERCHANGER

TECHNICAL DESCRIPTION CLK PBA;
625211-000-001

1. Purpose and Scope

This document provides a technical description of the CLK101 (625211-000-110) PBA. The description begins by first identifying the functional blocks which make up the CLK101. The sections which follow then describe the implementation and general signal flow within each block.

2.0 General

Figure 41:
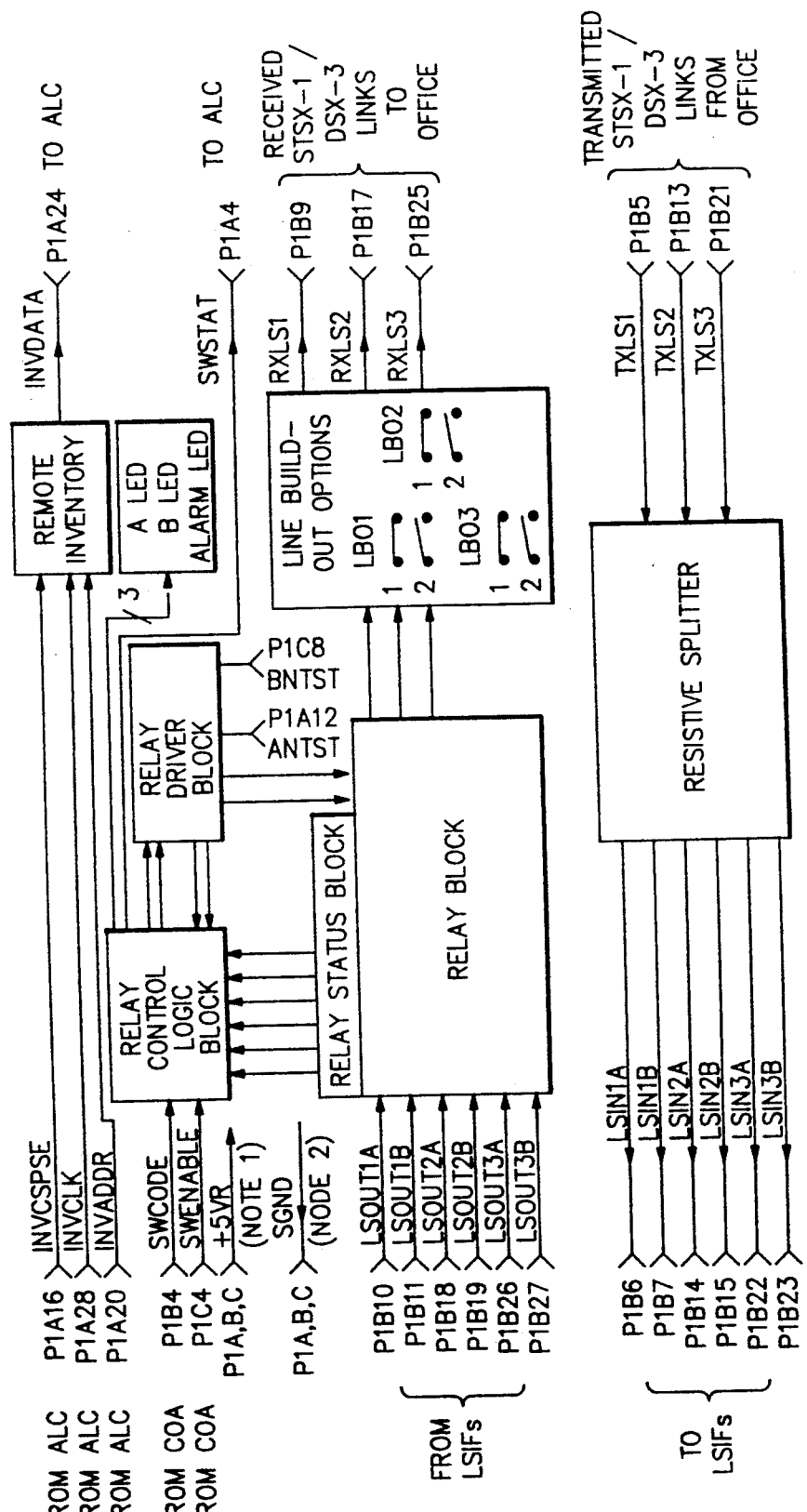
FIG. 41 is a block diagram of the protection switch element module.

The CLK101 is responsible for providing the synchronization required by the local system in which it is used. FIG. 41 shows the general signal flow within the CLK101. As shown in the diagram, most of the signals generated by the CLK101 are ultimately synchronized to one common reference, with the 21.618 MHz and 8 kHz Composite Clock signals being the only exceptions. All signals which leave or enter the CLK101 are separately buffered.

A serial communications bus provides the CLK101 access to a controller card in the system. The link is primarily used to exchange configuration and status information with the local controller.

3.0 Processor

The an eight-bit microcontroller with 128 bytes of on chip RAM. Externally, the 80C31 can separately address 64k of program memory and data memory. The 8-bit data bus and lower byte of the address bus are multiplexed onto one 8-bit bus.

The processor runs from an 8.192 MHz clock. A complete machine cycle requires twelve clock periods. Thus, a 1-byte, 1-cycle instruction is fetched and executed in 1.464 us.

3.1 Program Memory

Program memory is stored in a 27C64 EPROM, mapped into the lower 8k of the processor's memory map. The 80C31 performs an instruction fetch by driving the 16-bit address, activating PSEN*, and raising ALE. When ALE falls the lower byte addressing the 27C64 is latched in a 74HCT373 and the A/D bus turns around to read one byte of the instruction.

3.2 External Data Write Memory Map

A 74HC137 decodes the external data write addresses as shown in the map below. As there is only one external read address, no decoding is performed for RD*.

| | |
|---|---|
| 6000H | WATCHDOG |
| 5000H | PLL_STROBE |
| 4000H | ALIGN* |
| 3000H | CONFIG_WR |
| 2000H | PLL6_WR |
| 1000H | PLL32_WR |
| 0000H | PLL51_WR |

3.2.1 PLL Locations

PLL51_WR, PLL_32 WR, PLL6_WR, and PLL_STROBE allow the processor to load the PLL dividers. Section 8.1 describes their use.

3.2.2 ALIGN*

By strobing ALIGN*, the processor initiates alignment of the 2 kHz clocks which are compared in the 51.84 MHz PLL.

3.2.3 CONFIG_WR

The processor writes to CONFIG_WR to update the timing configuration latch.

3.2.4 WATCHDOG

The processor must repeatedly strobe the WATCHDOG location to prevent a processor reset from occurring.

4. Alarms

The processor monitors the status of eight active high alarm bits through one 74HC244 buffer. The bit assignment is shown below.

| 0 | 1 | 2 | 3 | 4 | 5 | 6 | 7 |
|---|---|---|---|---|---|---|---|
| REF LOS | MON LOS | CC1 LOS | CC2 LOS | PLL51 LOL | PLL32 LOL | PLL6 LOL | NOT USED |

4.1 Loss of Sync (LOS)

The LOS bits are driven by latching edge-triggered monitors which monitor the available incoming references and composite clocks.

4.2 Loss of Lock (LOL)

One LOL bit is allocated to each of the PLL's to detect the occurrence of a PLL being out of lock.

5. Configuration

5.1 Timing Configuration Latch

The timing configuration is stored in a 74HCT373 latch. The fields which make up this byte are shown below.

| 0 1 2 | 3 4 | 5 6 7 |
|---|---|---|
| MON SEL | CC SEL | REF SEL |

5.1.1 MON SEL

This 3-bit address field designates which of the 8 kHz references are being passively monitored.

| MON SEL | Reference Selected |
|---|---|
| 000 | BITR8K |
| 001 | BITL8K |
| 010 | DS1S8K |
| 011 | DS1RP8K |
| 100 | DS1LS8K |
| 101 | DS1LP8K |
| 110 | OC1W8K |

| MON SEL | Reference Selected |
|---|---|
| 111 | OC1E8K |

5.1.2 CC SEL

The two bits of CC SEL specify select the source from which the 8 kHz byte clock is extracted.

| CC SEL | CC Source Selected |
|---|---|
| 00 | Generated CC |
| 01 | CC2 |
| 10 | CC1 |
| 11 | Not used |

5.1.3 REF SEL

The 8 kHz reference specified by this field becomes the reference into the 51.84 MHz PLL. The selection table is the same as that given for the MON SEL field.

5.2 Processor Control Bits

Six of the processors Port 1 I/O pins are used as miscellaneous control lines as described below.

5.2.1 SER_EN*—P1(0)

The processor takes this line low when it wishes to drive the serial bus.

5.2.2 LOS RESET*—P1(2)

Upon detecting the occurrence of a loss of lock, the processor strobes this line low to reset the latches.

5.2.3 ALARM*—P1(3)

The Unit Alarm LED is lit when this line is taken low.

5.2.4 OSC SEL*—P1(4)

Activation of this line selects a clock derived from the on-board oscillator as the reference into the 51.84 MHz PLL.

5.2.5 CC TX EN—P1(5)

This line is taken high to enable the composite clock line drivers.

5.2.6 FAST LOCK—P1(6)

Taking the FAST LOCK signal high will force the 51.84 MHz PLL into a wider bandwidth, faster lock-up mode.

6. Processor Watchdog

The processor periodically strobes an HC4538 edge-triggered one-shot by writing this location. If 500 ms passes without a strobe, then the one-shot resets. This causes the "Unit Alarm" LED to light and delivers a pulsing reset to the processor. The pulsing reset, created by a 555C timer circuit, has a frequency of about 2 Hz with a processor reset period of about 300 ms. The timer output is also tied directly to timer input and interrupt pins on the processor.

7. Reference/Monitor Selectors

Eight timing references may be accepted through the backplane connector. Each reference signal is received through a resistor network, consisting of a pull-up resistor to +5V and a series resistor. A smaller value pull-up is used for the signals from the DS1 and BITS references so that these references may be driven open-drain. After the resistor network, the references are buffered through 74HC14 inverting, schmitt triggers.

The buffered signals are fanned into two independently controlled 74HC151 selectors. The signal chosen by the monitor selector is passively monitored. The signal selected by the reference selector becomes the active reference and is also monitored. Each monitor, an HC4538 missing-pulse detector, triggers an alarm after 332 us without a rising edge at its input. Alarms are latched by 74HC74's until reset by the processor.

A 2:1 selector, implemented in HC logic, chooses between the reference selector output and a 7.206 MHz on-board reference. The output of this 2:1 selector becomes the reference into the 51.84 MHz PLL.

8. 51.84 MHz PLL

The frequency reference into the PLL is taken from the REF/MON circuit. Both the reference and the looped back 6.48 MHz signal are divided down to a common 400 Hz reference in the MC145157. The pulsing output of the MC145157 is fed into an inverting, second order integrator built around an LT1013 opamp. The DC signal from the integrator passes through an inverting, amplifying stage with a gain of eight. The output of this amplifying stage controls the 51.84 MHz VCXO. The open loop bandwidth of the complete PLL circuit is 0.01 Hz.

The MC145157 provides a lock detect output which pulses low when the loop is out of lock. This output is RC filtered and fed to an LT1013 level detector which indicates an alarm when the DC average of the lock falls below the threshold.

8.1 The MC145157

The heart of this PLL, as well as the two which follow is the MC145157 PLL synthesizer. The MC145157 contains two 14-bit, programmable dividers and a tri-state phase detector.

To program the dividers, the 14-bit value is first clocked into a shift register in the MC145157. A control bit is also clocked in which designates the destination of the value. When the EN pin is strobe high the 14-bit value is loaded into the divider designated by the control bit.

The reference frequency enters the MC145157 at the OSCIN pin and after division is available at FR. The VCXO clock enters at the FIN pin and after division is available at FV. The tri-state phase comparator compares the rising edges of FV to FR, pulsing high if FV is lagging and pulsing low if FV is leading.

8.2 Fast Lock

Fast Lock provides a means of temporarily widening the PLL's bandwidth to achieve a shorter lock-up time. The fast lock is implemented, under processor control, by closing three switches of a DG212 analog switch which reduces the resistive elements of the integrator and the series resistor into the amplifying stage. This widens the open loop bandwidth of the PLL to 0.9 Hz. The lock-up time in this mode is about six seconds.

8.3 Clock Alignment

When switching to a new reference, the clock alignment circuit can reduce the initial phase difference between the two 2 kHz signals which are being compared in the 51.84 MHz PLL. The clock alignment circuit consists of two 74HC74's and a 74HC00 gate.

The processor initiates the alignment by clearing both flip-flops which enables the 6.48 MHz clock into the MC145157. When the FV output of the MC145157 triggers high the 6.48 MHz clock into the MC145157 is disabled. When the FR input then triggers high the the 6.48 MHz clock is again enabled into the MC145157 dividers and the divided 2 kHz clocks are aligned to within less than 154 ns nominal.

9. 51.84 MHz VCXO

The 51.84 MHz Voltage Controlled Crystal Oscillator (VCXO) is based around a Butler Oscillator. The NPN tansistor is in a common base configuration so the voltage-dependent current flow is taken from the emitter to the collector.

The sinusoidal current from the collector is fed to a parallel resonant LC network which presents a high impedance to the signal near the crystal's resonant frequency. The capacitors of the tank form a voltage divider through which the feedback signal is taken.

The feedback signal is passed through a series network consisting of the crystal, varactors, and inductors. The frequency of oscillation is determined by the frequency at which the series network presents the lowest impedance to the feedback signal. This frequency is varied, over a very narrow range, by the bias voltage across the varactors. Increasing the bias voltage increases the frequency of oscillation.

The oscillator output is ac-coupled to an NJFET source-follower which drives an AC244. The squared clock is buffered through the AC244 onto the backplane. It is also fed to a F163 which divides the clock down to 6.48 MHz. This signal is fed back to the MC145157 of the 51.84 MHz PLL. The 6.48 MHz clock also serves as the reference into the 32.768 MHz and 6.176 MHz PLLs.

10. 32.768 MHZ PLL

The 6.48 MHz signal from the 51.84 MHz PLL is the reference into the 32.768 MHz PLL. Both it and the looped back 2.048 MHz signal are divided down to a common 16 kHz reference in the MC145157. The pulsing output of the MC145157 is fed into an inverting, second order integrator built around an LT1013 opamp. The DC signal from the integrator passes through an inverting, amplifying stage with a gain of eight. The output of this amplifying stage controls the 32.768 MHz VCXO. The open loop bandwidth of the complete PLL circuit is 2 Hz. The lock-up time is less than five seconds.

The 32.768 MHz VCXO's TTL output is buffered through an AC244 onto the backplane and is also buffered into an F163 which divides the clock down to 16.384 MHz, 8.192 MHz and 2.048 MHz. The 2.048 MHz component is looped back into the PLL. The 16.384 MHz and 8.192 MHz signals are buffered through 74HCT04 inverters onto the backplane. One of the buffered 8.192 MHz signals does not go to the backplane but is used as the microprocessor clock.

Like the 51.84 MHz PLL, this PLL filters the lock detect output of the MC145157 and triggers and alarm if the DC average drops below the threshold.

11. 6.176 MHz PLL

The 6.48 MHz signal from the 51.84 MHz PLL is the reference into the 6.176 MHz PLL. Both it and the looped back 6.176 MHz signal are divided down to a common 16 kHz reference in the MC145157. The pulsing output of the MC145157 is fed into an inverting, second order integrator built around an LT1013 opamp. The DC signal from the integrator passes through an inverting, amplifying stage with a gain of eight. The output of this amplifying stage controls the 6.176 MHz VCXO. The open loop bandwidth of the complete PLL circuit is 2 Hz. The lock-up time is less than five seconds.

The TTL output of the 6.176 MHz VCXO is buffered through a 74HC125, looped back into the PLL and fanned out to eight 74HC244 buffers which drive the backplane.

Like the Pl1's previously described, the 6.176 MHz PLL generates a loss of lock alarm based on the MC145157 lock detect output.

12. Reference Oscillator

The 21.618 MHz reference oscillator has a stability of ±20 ppm. It's HC output is buffered through a 74HC125 and fanned out to eight HC244 buffers which drive the backplane. The 74HC125 output is also taken to a F163 counter which divides the clock by three. The resultant 7.02 MHz signal serves as a reference into the 51.84 MHz PLL in the event that all other references are lost.

13. Composite Clock Receive

A composite clock is a 64 kHz, all 1's, bipolar signal with bipolar violations repeating at an 8 kHz rate. The nominal pulse width is ⅝ of the 64 kHz period. There are two identical composite clock receive circuits on the CLK101. The operation of one of the circuits will be described.

The bipolar 64 kHz composite clock signal is transformer coupled from the line. The transformer has a turns ratio of 1:1:1 and is resistively terminated to present the line with a 133 ohm load impedance. The transformer secondary terminals are voltage divided to bias two NPN switching transistors. The inverting open-collector outputs of these transistors are inverted again through 74HC04 inverters. Thus the composite clock has been converted to two digital signals, representing the positive and negative 1's on the line. These digital signals are fed to the 8 kHz extraction circuit.

Transitions on either of these signals also trigger an HC4538 missing pulse detector. The missing pulse detector has a timeout period of 232 us. If the output of the HC4538 falls low, a 74HC74 latches the condition until the processor resets the flip-flop.

14. 8 kHz Extraction

A 74HC153 dual 4:1 multiplexer chooses either CC1, CC2 or the internally generated composite clock for 8 kHz extraction. The outputs of this multiplexer trigger two 74HC393's used as falling edge triggered flip-flops. One of the multiplexer's outputs going high causes the the flip-flop of the other line to reset. When the pulse ends, its falling edge triggers its own flip-flop. A bipolar violation will produce two consecutive pulse on one of the multiplexer's outputs. This will cause the output of the 74HC51 to go low for the duration of the pulse. With bipolar violations occurring every eight pulses, the output of the 74HC51 will be an 8 kHz clock with a low time of 9.76 us.

15. Composite Clock Generation and Transmit

The generated composite clock is derived from the 2.048 MHz signal from the 32.768 MHz PLL. The 2.048 MHz clock is fed into two cascaded 74HC393 stages, which make available clocks at 8 kHz, 16 kHz, 32 kHz, 64 kHz, 128 kHz, and 256 kHz. These signals are used to create a ⅝ duty cycle 64 kHz clock which sets the pulse width and an 8 kHz signal which causes the bipolar violations. In addition, the 8 kHz clock from the 74HC393 is buffered through a 74HC04 onto the backplane.

The composite clock is generated by toggling a 74HC74 with the rising edges of the ⅝ duty cycle, 64 kHz clock. The positive and negative data pulses are formed by a logical NOR of the clock with the Q and Q* outputs of the toggling flip-flop. The outputs of the NOR gates drive two NPN switching transistors whose outputs are transformer coupled to the composite clock transmit line.

The Q and Q* outputs of the flip-flop are fed back to a 74HC51 gate. Seven pulses out of eight the 74HC51 gates the inverted Q signal into the D input of the flip flop causing it to toggle. On the eighth clock however, the 74HC51 presents the inverted Q* signal to the D input cause the flip-flop to remain in the same state.

The 64 kHz clock into the 74HC74 also strobes an HC4538 missing pulse detector. If 50 us pass without a pulse the clock into the flip-flop is gated high. This forces the NOR outputs low, turning off the driving transistors.

TECHNICAL DESCRIPTION FTR1 OPTIC TRANSCEIVER PBA; 625115-000

1.0 General Description

The FTR1 PBA contains an optical transmitter and an optical receiver which provides the optical interface from/to the FTS-150 system and the customer's fiber optic plant. The fiber optic interface operates at the SONET OC3 level of 155.52 Mb/s. The electrical data and clock interface to the FTR1 is with the LSIF PBA at the same bit rate, the SONET STS-3 level.

The FTR1 PBA accepts clock and data at 155.52 Mb/s from the LSIF PBA and converts the electrical data to optical data. Optical data is also converted to electrical data and clock and sent to the LSIF PBA. A reference clock at 51.84 MHz from the system clock, CLK1 PBA, is multiplied by three on the FTR1 PBA and used by the LSIF PBA to synchronize and re-time the data sent to the FTR1. Unit alarms are communicated with the rest of the FTS-150 system via the PSBI bus and the ALC1 PBA alarm card.

2.0 Unit Description 2.1 Clock Section

Figure 38:
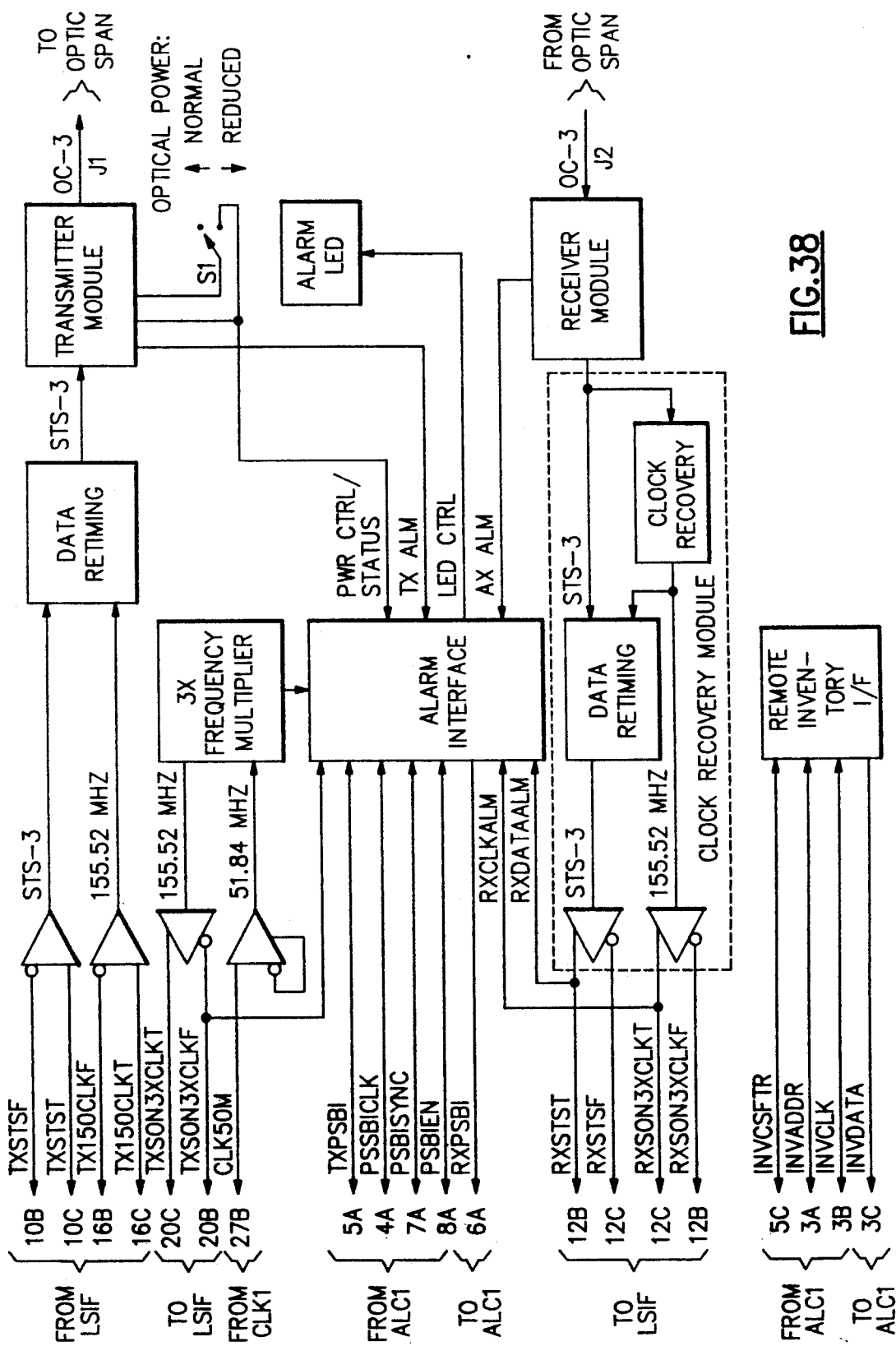
FIG. 38 is a block diagram of the optical transmitter/optical receiver (FTR) module.

Refer to the FTR block diagram, FIG. 38. In order to synchronize and re-time STS-3 data, a single-ended system clock signal from the clock card, CLK1, is input to the FTR1 PBA at edge connector pin 27B. This clock reference is at 51.84 MHz, and is multiplied by a factor of 3 in the 3X Frequency Multiplier circuit. The resulting 155.52 MHz clock signal is then buffered and output as a 50 ohm differential ECL signal to the edge connector to be used by the LSIF PBA.

2.2 Transmit Section

The LSIF PBA returns the 155.84 MHz clock along with synchronized STS-3 data to the FTR1 edge connector pins 16 B,C and 18 B,C respectively, as differential ECL signals. These inputs are characterized at 50 ohms impedance and drive two differential line receivers. The data is then clocked in the Data Re-timing flip-flop and used to drive the Transmitter Module. The Transmitter Module then converts the ECL data to an OC-3 level optical data stream which is output via a single-mode optical connector to the optic span line. The optical signal is generated by a single-mode laser diode. All laser diode drive, control and monitoring functions are incorporated within the Transmitter Module, a single hybrid package.

2.3 Receive Section

Optical data at the OC-3 rate is applied to the Receiver Module via the optic connector J2. The fiber pigtail input to the Receiver Module is multi-mode, so that J2 may be either a multi- or a single-mode connector. The Receiver Module converts the 155.52 Mb/s optic data stream to a 155.52 Mb/s ECL data stream. A clock is recovered from the data stream by the Clock Recovery Module, an individual hybrid package which contains a SAW (surface acoustic wave) resonator. The Clock Recovery Module also contains a flip-flop for re-timing the data, and outputs both clock and re-timed data in differential ECL to edge connector pins 12 B,C and 10 B,C, to be demultiplexed by the LSIF PBA. These outputs are designed to be operated into 50 ohm transmission lines.

2.4 Alarm Interface

The Alarm Interface communicates alarm status to/from the ALC1 PBA by means of the PSBI bus. The Alarm Interface monitors the activity of the transmit clock to the LSIF, the status of the transmit module (laser light, laser bias, and modulation activity), the presence of an optic signal to the receiver module, and the activity of the receiver clock and data outputs. If an alarm condition exists on any of these points, the Alarm Interface circuit encodes the corresponding bit of the PSBI serial data bus to the active state, and sends this status to the ALC1 PBA for reporting to the craft interface.

The FTR1 PBA unit alarm LED is not turned on directly by the PBA, but by an alarm status bit of the PSBI bus, under control of the ALC1 PBA. The unit alarm LED stays lit until cleared by another bit of the PSBI bus.

2.5 Remote Inventory

The FTR1 PBA is equipped with a Remote Inventory Feature. The Remote inventory feature allows the system to read from the unit the ALCATEL NS unit part number, unit serial number, Common Language Equipment Identifier (CLEI) code and the unit revision level. This feature is implemented via an on board EEPROM, designated Remote Inventory I/F on the block diagram, which communicates with the ALC1 PBA using a serial interface protocol.

3.0 Detailed Description

In general, the high frequency data and clock signals are routed as 50 ohm stripline pc tracks in the inner two layers, sandwiched between ground plane layers of the six layer pc board. This maintains good waveshape fidelity, as well as minimizes radiated RFI. Where high frequency track runs are very short and connect to surface mount parts, the track may be on the top surface, in microstrip form.

3.1 Clock Section

3.1.1 Clock Input Circuit

The reference clock at 51.84 MHz is input to the FTR1 at edge connector pin B27. This signal originated at the CLK1 PBA as a CMOS level signal, but has a series resistor at the CLK1 PBA to reduce the amplitude to a safe ECL level at the FTR1 PBA input. It is a.c. coupled to one section of the triple ECL line receiver, U5, by C15, and r.f. terminated at 51 ohms by R3. The line receiver input is also a.c. coupled to ground by C12 and C7. An ECL threshold voltage is also applied from pin 11 of U5 through R4 and R3, which in combination with C7 and C12 form a low pass filter to the inverting input of U5 and the threshold voltage source, pin 11.

3.1.2 Clock Edge Pulse Generation

The output of U5, pin 15, drives the inverting input of U6, a high speed voltage comparator, through a 50 ohm delay line built into an inner layer of the board. Resistors R46, R48, R49 and R69 provide 50 ohm input and output terminations to the delay line. R59 is U5's emitter pull down resistor. A non-delayed version of the signal is applied to the non-inverting input, pin 8 of U6. Resistors R51 and R53 bias this input slightly positive with respect to the inverting input to prevent U6 from amplifying noise in the event of loss of an input reference clock. Rise time is maintained through R51 by parallel C27. The presence of both delayed and non-delayed clock signals at the comparator inputs results in an output pulse of width equal to the time difference between the input signals. The design output pulse width is approximately 3.2 ns, or a half-period of a 155.52 MHz clock.

3.1.3 Ringing Tank Clock Multiplication

The outputs of this section of U6 drives differential amplifier Q1 and Q2. Base resistors R45 and R43 are for parasitic oscillation suppression, and R33 and R29 are U6 output pull down resistors. Variable inductor L1 and capacitors C30 and C38 at Q1's collector comprise a resonant tank circuit that is adjusted for maximum amplitude at 155.52 MHz. Thus the tank is pulsed for about one-half cycle at 155.52 MHz, once every third cycle, and continues ringing between the missing pulses to provide a continuous 155.52 MHz clock, three times the frequency of the input, 51.84 MHz. The capacitors C30 and C38 in series act as an impedance transformer so that test pad node N13 is at a relatively low impedance. This allows the connection of a high frequency FET probe for tuning purposes at N13 without significantly affecting the tuning of the tank.

3.1.4 Clock analog-to-ECL Conversion

The other half of comparator U6 senses the ringing tank at Q1's collector, and outputs a differential ECL clock signal of 155.52 MHz to 50 ohm loads at edge connector pins B20 and C20. The reference input of this comparator section is slightly negatively offset to prevent noise on the clock output in the absence of a signal on the ringing tank. This allows sensing the clock output lines for loss of signal to alarm for clock failure.

3.1.5 Transmit Clock Activity monitor

Without a signal at the collector of Q1, U6 pin 16 will be a constant ECL low, and pin 15 will be an ECL high. Pin 2 of U9, a low speed voltage comparator, will be at the midpoint of the ECL low and ECL high voltages due to the equal resistor value voltage divider R21 and R27. Pin 3 of U9 will be pulled negative by R15, causing the output of U9 to go to the negative rail, resulting in an alarm level, or a CMOS low signal at LOTXC. The alarm voltage is clamped to less than $-0.5$ volt by the Schottky diode CR2 and dropping resistor R58. If another clock failure mode occurs where U6 pin 16 is locked at an ECL high and pin 15 is a low, the other section of U9 will sense this and similarly cause an alarm condition at pin 2. Resistors R9 and R28 provide a positive offset to the alarm sense inputs to prevent alarms from U9 during normal operation.

3.2 Transmit Section

The transmit section consists of $\frac{2}{3}$ of ECL line receiver U5, $\frac{1}{2}$ of ECL D flip-flop U3, and optic transmitter module, U2.

3.2.1 Transmit Data Section

Differential 155.52 Mb/s data is input at P1 pins 18B and 18C, and is differentially terminated at 100 ohms by R35. Differential termination at 100 ohms is the a.c. equivalent of individual 50 ohm terminations at each input, but without the d.c. power dissipation of the 50 ohms to $-2$ volts input configuration. The data is buffered and converted to a single-ended signal by U5, and is then re-timed by U3.

3.2.2 Optic Transmitter Module

The differential outputs from U3 drive the differential inputs of U2. U2 is a hybrid optoelectric laser diode transmitter module. It contains circuitry which converts the differential input data into appropriate current pulses to the laser, provides laser bias current, and controls these currents in order to maintain a constant optical power output over temperature and power supply voltage variations.

Switch S1, located in the upper left quadrant of the PBA, provides a means of reducing the optical transmitter's output power. Closing S1 by pushing its activator bar toward the rear (edge connector end) of the PBA, applies a control voltage to pin 17 of U2 which reduces transmit power by a nominal 6 dB. This allows local optical loop testing or system operation over short optical spans of less than about 5 dB loss without overloading the optical receiver. Two sections of S1 are used in parallel for increased reliability. Operating S1 also applies a low signal to pin 22 of U8, which communicates the status of S1 to the PSB1.

Resistive trimming network, Z1, may be provided on some transmitter modules to externally trim output power, on/off ratio, and low light level alarms to within spec. Later, transmitter module models should be internally trimmed and should not require the installation of this network.

Output optical power is monitored by an internal photodiode and amplifier circuit which provides feedback to the laser diode drive circuit. Capacitor C51, connected to U2 pin 20, provides a time constant for the optical power monitor alarm circuit to prevent transient alarms due to long strings of zeroes in the data. The output of U8 at its fiber pigtail connector, J1, is the optical equivalent of its electrical input.

3.2.3 Transmit Clock Circuit

A differential ECL clock is received at P1 pins 16B and 16C, and is terminated differentially with 100 ohms by R50, similar to the data inputs described above. A second section of the U5 line receiver buffers the clock and converts it to a single-ended signal which drives the clock input of U3 to re-time the input data. The clock and data signals are both passed through two sections of the same line receiver package, and so the propagation delays tend to track each other over voltage and temperature variations. Test pads N9, N10, and N11 are for monitoring the inputs to the optic transmitter module if trouble shooting is required. The spacing of the test pads from the ground pad is made to fit a high frequency scope probe tip, either FET or passive.

3.2.4 Transmitter Alarms

Three alarm outputs from the transmitter module are used. All provide an active low signal when an alarm condition is present, and a Vcc level by means of pullup resistors R6, R19 and R25 when not alarmed. The optic transmitter alarms are: LL, Low Light output from the laser; BO, laser diode Over Bias; and LOM, Loss of modulation. See 600018-422 Fiber Optic Laser specifications for current alarm levels. These alarm signals are input to U8, The PSBI alarm data communications interface chip, which communicates the alarm status to the ALC1 PBA.

When switch SI is operated to the ON position to cause the optic transmitter to reduce its output power, a set of contacts closes to apply a logic low signal to U8, pin 22, This appears as an active low bit (LOWPR) on the PSBI bus to indicate the transmitter is in the low power mode. The low power mode will also cause a LL (Low Laster Output) alarm (active high) on the PSBI.

If a particular supplier of the transmitter module, U2, does not provide a Loss of Modulation (LOM) alarm output at pin 27, the loss of modulation is then detected at the input of U2 by the U10 activity detector circuit. The output of U10 is connected to U2's LOM alarm output, so that either alarm output going active low will send the alarm signal to the alarm interface circuit, U8. The internal LOM alarm is desirable in that it will detect internal failures of the transmitter module, which the U10 circuit will not.

3.3 Receive Section

3.3.1 Optic Receiver Module

The optical input to the optic connector J2 is fed to The optic receiver module, U7, through its fiber pigtail. The receiver module detects the optical data stream of 155.52 Mb/s amplifies the resultant electrical signal, and converts it to a differential ECL compatible signal at its D outputs. These open emitter outputs are pulled down by R1 and R2 and drive through short 50 ohm lines to U4, a clock recovery and re-timing module.

Test pads N5 and N14 along with ground pad N2 are provided for monitoring the optic receiver module output for trouble shooting purposes.

The Optic Receiver, U7 contains sensitive analog circuitry, and its power supply input pins are fairly heavily bypassed for optimum performance. Each Vee and Vcc pin is decoupled by a 0.01 uf and a 0.1 uf capacitor, plus a tantalum capacitor of 15 uf for each voltage. The capacitor at pin 26 is required for decoupling an analog circuit internal to the module. An alarm output is provided at pin 9, which goes to TTL low when a loss of input light to the receiver is detected. This is an open collector output pulled up to Vcc by R10. This alarm signal is connected to pin 26 of the alarm interface I.C, U8.

3.3.2 Clock Recovery

The clock recovery module utilizes a SAW (surface acoustic wave) resonator to recover a clock from the NRZ input data. This ECL clock is output differentially at U4 pins 12 and 13, and also used internally to re-time the data from the optic receiver module. The re-timed differential ECL data appears at U4 pins 15 and 16. Each clock and data output has a pulldown resistor, and connects to edge connector pins 10B, 10C, 12B, and 12C, respectively, through 50 ohm p.c. tracks. The matching load termination for these outputs is on the LSIF PBA.

3.4 Alarm Interface

3.4.1 Received Data and Clock Alarms

The board's data and clock outputs from U4 are monitored for loss of activity by the four sections of U1, a quad low speed voltage comparator. All four non-inverting inputs to U1 are connected to U4's Vbb output, a negative 1.3 volt ECL threshold voltage, which tracks U4's outputs over temperature and voltage variations. This reference voltage is filtered by R37 and C28. Isolation resistors, R7 and R23 connect the differential data outputs to two of U1's inputs. If the data output pins from U4 quit transitioning, one of the two outputs will be above Vbb, and the other below. The high output will cause its respective comparator output to go low. Since the comparator outputs are open collector and connected in parallel, a low on either output will cause an alarm on the Loss of Received Data line, LORXD* to U8 pin 19, the alarm interface EPLD (Eraseable Programmable Logic Device). Schottky diode CR1 in conjunction with current limiting resistor R56, clamps the negative voltage from the comparator output to less than 0.5 volt to protect U8's CMOS input.

The remaining two sections of U1, connected to the clock output connector pins B12 and C12 through isolation resistors R13 and R36 perform a similar function for the Loss of Received Clock alarm, LORXC*. The isolation resistors are used to sense the average voltage on the high frequency controlled impedance tracks from U4 to the edge connector without causing a significant impedance discontinuity which would degrade the signal's pulse shape. Since the average voltage appearing on the isolation resistors will normally be equal to the threshold voltage on the U1's non-inverting inputs, resistors R30, R11, R17, and R38 to ground are used to offset the sensed voltage slightly positive to prevent false alarms. Capacitors C18, C11, C14 and C23 provide approximately a 1 ms time constant to filter against noise and long transitionless periods of the NRZ signal on the data lines.

3.4.2 Transmit Loss of Modulation Detector

The loss of modulation, or activity detector, U10, at the data inputs of U2, operates in the same manner as the transmit clock activity detector circuit, U9. For an explanation, refer to section 3.1.5.

3.4.3 PSBI Interface IC

Edge connector input signals from the PSBI bus to U8 inputs are pulled up to Vcc through R52, R55, R57 and R63 in order to avoid floating inputs when the ALC1 PBA is not connected. Series current limiting resistors R60 and R64-R66 are also provided for input protection. Unused inputs to U8 are tied to ground through R54 for test access, if desired. Likewise, unused I/O pins are tied to ground in groups, through R61 and R67.

If an alarm is generated on the FTR1, U8 assigns it to the appropriate channel and bit of the PSBI bus. See Table 17, Paragraph 5.0 for channel and bit assignments. The ALC1 PBA in return, returns a logic true on bit 0 of channel 1, to turn on the FTR1 alarm LED. The alarm bit is latched in U8, which then outputs a low on U8, pin 5. This low turns on the unit alarm LED, DS1, and also outputs the signal to edge connector pin C23 for production test purposes. The alarm signal, FTRALM* has no connection external to the FTR1 PBA.

3.5 Remote Inventory 3.5.1 Description

The Remote Inventory feature is implemented by a serial data and clock communication bus to the ALC1 PBA from the EEPROM, U10, via its edge connector pins. The Remote Inventory I/F signals are described as follows.

Inventory Chip Select, FTR (INVCSFTR):

The Chip Select signal is an active high signal. When the Chip Select signal is a logic "0", the EEPROM of the FTR PBA is disabled and the Data Out will be in the high impedance state. When the Chip Select signal is a logic "1", the EEPROM will be enabled. When enabled, the EEPROM will be capable of being written to or read from.

Inventory Address (INVADDR):

The Address signal carries the memory address in serial form.

Inventory Data (INVDATA):

The Data signal carries the memory data in serial form.

Inventory Clock (INVCLK):

The Clock signal provides the system clock. Address information is clocked into the memory by the Clock signal and data is clocked out by the Clock signal.

3.5.2 Memory content and Addresses

The ALCATEL unit part number, unit revision level, unit serial number and Common Language Equipment Identifier (CLEI) code shall be stored in the memory at manufacture. The memory shall be organized as 64 registers of 16 bits each. The first register shall be at address 0 and the 64th register shall be at address 63 decimal. All data shall be stored in ASCII format. The aforementioned information shall be stored as follows:

a) ALCATEL unit part number

The ALCATEL NS unit part number shall require 7 registers and shall be stored in register 0 through 6. The part number shall be stored in ascending register order starting from the two left most digits in the part number. The left most digit of a digit pair shall be stored in the Most Significant Byte of the register. The ALCATEL NS unit part number shall be stored as follows:

| Register | Part Number Digits | ASCII Format (HEX) |
|---|---|---|
| 0 | 60 | 3630 |
| 1 | 02 | 3032 |
| 2 | 82 | 3832 |
| 3 | −3 | 2D33 |
| 4 | 93 | 3933 |
| 5 | −0 | 2D30 |
| 6 | 01 | 3031 |

The Unit Revision Level shall be a two digit decimal number and shall require 1 register. The revision level shall be stored in register 7. The most significant digit of the revision level shall be stored in the Most Significant Byte of the register. The unit revision level shall start at 01. The most significant digit of the revision level shall always be filled with a number even if it is zero.

c) Unit Serial Number

The Unit serial number shall be a 6 digit decimal number and shall require 3 registers. The unit serial number shall be stored in registers 8 through 10. The serial number shall be stored in ascending register order starting from the two left most digits in the serial number. The left most digit of a digit pair shall be stored in the Most Significant Byte of the register. All digits of the serial number shall be filled even if they are zero. The serial number shall start at 000001. The serial number shall be stored as follows:

| Register | Serial Number Digits |
|---|---|
| 8 | 6th, 5th |
| 9 | 4th, 3rd |
| 10 | 2nd, 1st | d) CLEI code

The CLEI code shall be a 10 character code and shall require 5 registers. The CLEI code shall be stored in register 11 through 15. The CLEI code shall be stored in ascending register order starting from the two left most characters in the code. The left most character of a character pair shall be stored in the Most Significant Byte of the register. The CLEI code shall be stored as follows:

| Register | CLEI Code Characters | ASCII Format (HEX) |
|---|---|---|
| 11 | X10 | X9 |
| 12 | X8 | X7 |
| 13 | X6 | X5 |
| 14 | X4 | X3 |
| 15 | X2 | X1 |

4.0 Unit Alarm Interface

Figure 39:
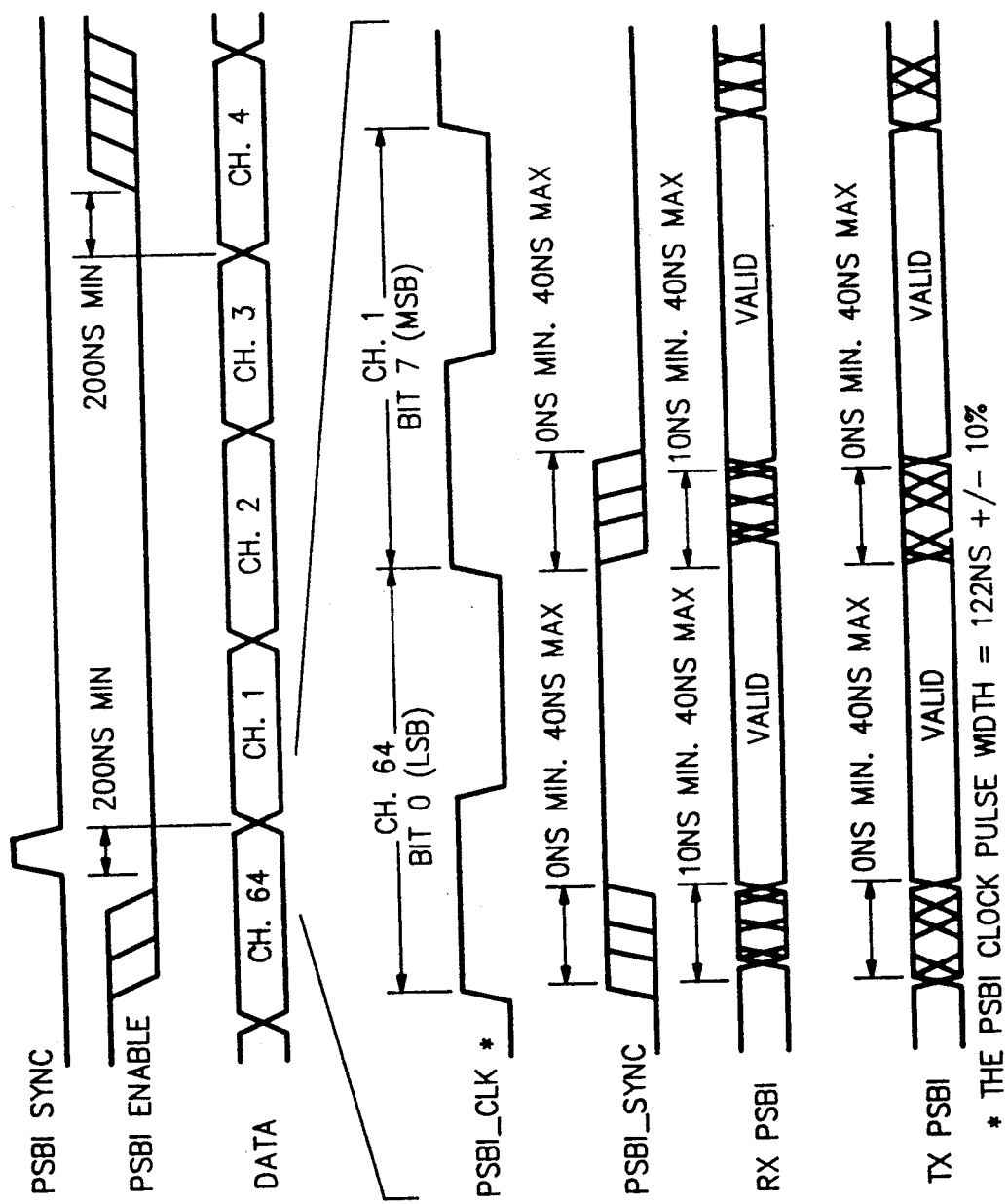
FIG. 39 is a timing diagram associated with the FTR module.

The PSBI interface provides the means of communicating status and alarm conditions between the ALC1 PBA and the FTR1 PBA. The format of the interface is 64 8-bit channels at 4.096 Mb/s. All of the channels are bit-mapped. The bit mappings for the FTR1 PSBI interface are defined in Table 17, below. See FIG. 39 for PSBI timing information.

TABLE 17

PSBI CHANNEL ASSIGNMENTS

TX PSBI:
| CH. 1 | BIT 0 | UNIT ALARM LED DRIVE |
| | BIT 1, 2 | not used |
| | BIT 3 | CLEAR LATCHED LOOPBACK BITS |
| | BIT 4 | not used |
| | BIT 5 | CLEAR LATCHED ALARMS |
| | BIT 6-7 | LOOPBACK BITS |
| CH 2-64 | BIT 0-7 | not used |

RX PSBI:
| CH. 1 | BIT 0 | LORXD (LOSS OF RX DATA) |
| | BIT 1 | LOS (LOSS OF RX FIBER SIGNAL) |
| | BIT 2 | LORXC (LOSS OF RX CLOCK) |
| | BIT 3-5 | not used |
| | BIT 6-7 | LOOPBACK BITS |
| CH. 2 | BIT 0 | LOTXC (LOSS OF TX CLOCK) |
| | BIT 1 | LL (LOW LASER OUTPUT) |
| | BIT 2 | BO (LASER OVER-BIAS) |
| | BIT 3 | NOT USED |
| | BIT 4 | LOM (LOSS OF TRANSMIT MODULATION) |
| | BIT 5-7 | not used |
| CH. 3-64 | BIT 0-7 | not used |

The unit alarm LED is turned on by bit 0 of channel 1 of the PSBI bus going low. This low data pulse is detected by the EPLD, U8, which drives pin 8 low, turning the LED on.

The LED is latched on by U8, and is turned off when a clear pulse is detected on bit 5 of channel 1.

TECHNICAL DESCRIPTION LOW SPEED
INTERFACE PBA; LSIF PBA; 625121-000-001 -
LSIF101; 625121-000-002 - LSIF102; 625121-000-003 -
LSIF103; 625121-000-004 - LSIF101

1. General Description

The LSIF101, LSIF102, LSIF103, and LSIF104 PBAs are bi-directional STS-1 to STS-3 multiplexers. It is the only multiplexer in the FTS150 System. It is the primary multiplexer in the FTS600 System.

The LSIF PBA accepts three bi-directional signals from the Protective Switch Element (PSE) PBA. (The bi-directional signals are hereafter called Low Speed or LS.)

In the FTS150 System, the LSIF PBA interfaces to the Fiber Transceiver (FTR) PBA with Transmit and Receive STS-3 signals. In the FTS600 System, the LSIF PBA interface to the Multiplexer (FMX) PBA and the Demultiplexer (FDM) PBA with non-scrambled STS-3 signals.

The LSIF PBA interfaces to the Alarm (ALC) PBA via a bi-directional Serial Bus Interface (SBI). The SBI transports overhead, command, alarm, status and provisioning information.

Four variants of the LSIF will be described in this document. They are:

| PBA MNEMONICS | PBA GROUP # | LOW SPEED INTERFACE | | |
|---|---|---|---|---|
| | | 1 | 2 | 3 |
| LSIF101 | −001 | STS-1 | STS-1 | STS-1 |
| LSIF102 | −002 | DS3 | DS3 | DS3 |
| LSIF103 | −003 | STS-1 | STS-1 | DS3 |
| LSIF104 | −004 | STS-1 | DS3 | DS3 |

2. Unit Description

Figure 40:
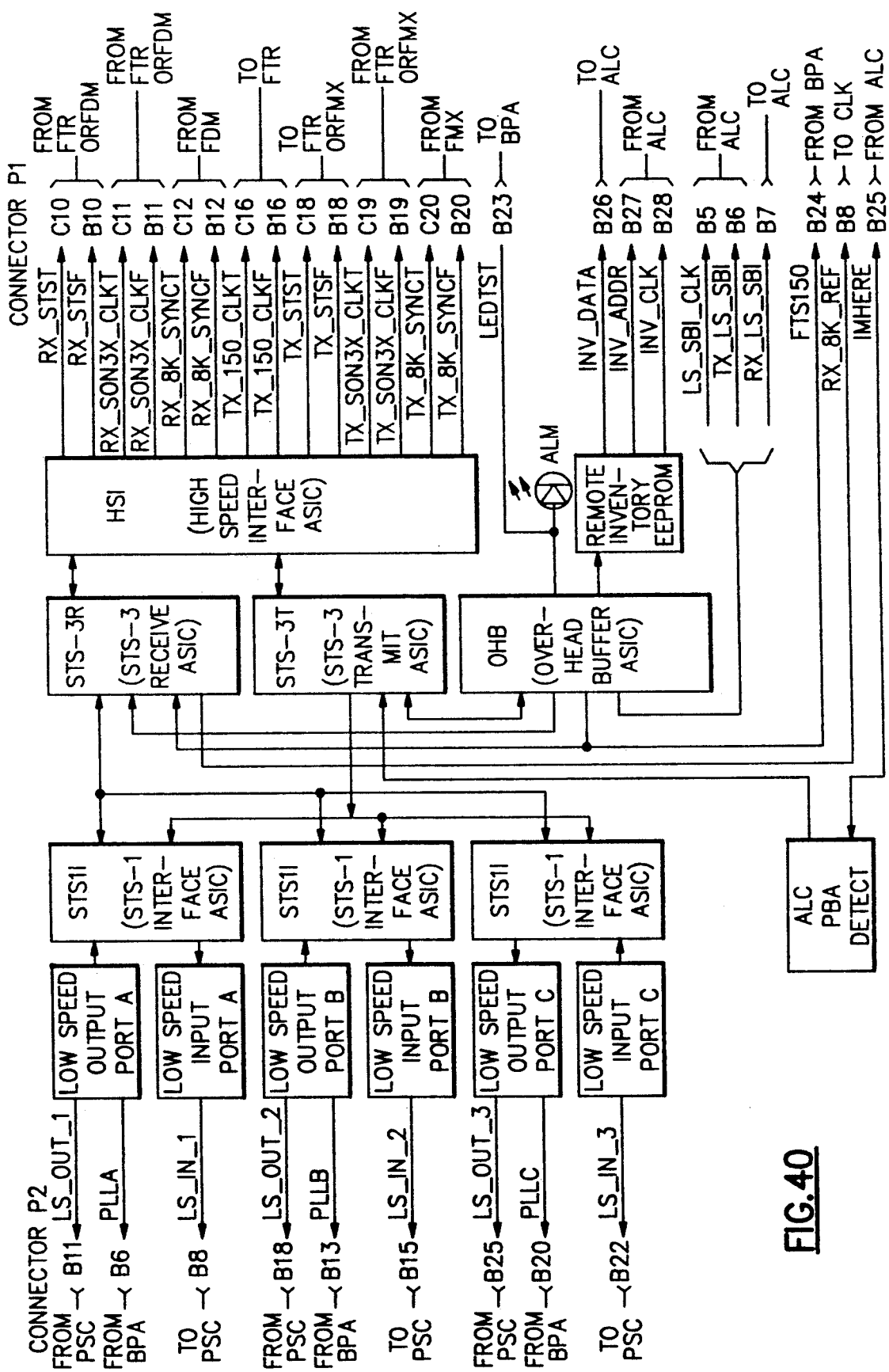
FIG. 40 is a block diagram of the low speed interface module (LSIF).

Refer to FIG. 40, LSIF PBA Block Diagram. In the transmit direction, the LS signal is input by one of three Low Speed Ports. The circuitry will automatically equalized for 0–450' of WE728A coaxial cable. A clock will be recovered from the data and the equalized data will be retimed.

STS-1I ASIC synchronizes the STS-1 input signal to the transmit clock and modifies Path overhead.

DS3I ASIC inserts the DS3 signal into the STS-1 payload and inserts Path overhead.

The STS-3T synchronizes the three STS-1 frames and byte interleave the STS-1 signals. The Line and Section overhead is inserted into the resulting STS-3 signal.

The HSI ASIC interfaces the transmit STS-3 signal to the FTR PBA or FMX PBA.

In the receive direction, the HSI ASIC inputs the receive STS-3 signal and clock from the FTR PBA or FDM PBA.

The STS-3R ASIC extracts the Section and Line overhead from the STS-3 signal. The STS-3 signal is split into the three STS-1 signals.

The STS-3I ASIC will convert the STS-1 signal to a scrambled B3ZS encoded STS-1 signal.

The DS3I ASIC will extract the DS3 signal from the STS-1 payload. The 44.736 MHz clock of the DS3 signal is recovered by a PLL. The DS3 signal is B3ZS encoded.

The Low Speed output ports will convert the B3ZS data to AMI signals. These signals are output to the PSE PBA.

The OHB ASIC is the LSIF PBA interface to the ALC PBA. The OHB transfers overhead to and from the ALC PBA over the SBI bus. The OHB also connects to the front panel alarm indication LED, which is controlled by the ALC PBA.

3. Detailed Description 3.1 Transmit Low Speed (LS) Port Interfaces

The three low speed ports will interface to either DS-3 or STS-1 unbalanced 75 Ohm signals. It will automatically equalize and AGC the input signal for WE728A coaxial cable lengths of 0–450 feet from an STSX-1 cross connect, or 0–450 feet from a DSX-3 cross connect.

Absense of an LS signal will be sensed by the clock recovery circuit and an alarm will be generated. The OHB and STS3T ASICs can provision each LS port as either equipped or unequipped.

The DS3I and/pr STS1I ASICs monitor each LS port for B3ZS errors. A maximum of 8 B3ZS errors will be reported per STS1 frame.

3.2 Transmit Payload Formatting 3.2.1 STS-1 Signals

The STS-1 LS signal payload is clocked into the elastic store of the STS1I ASIC using the recovered STS-1 clock. The payload is read out under control of the Transmit clock. The payloads from the three LS ports are byte interleaved in the STS3T ASIC, and the pointers are appropriately adjusted.

3.2.2 DS-3 Signals

Each DS-3 LS signal is clocked into the elastic store of a DS3I ASIC using the individually recovered DS-3 clock. It is read out of the elastic store under the control of the Transmit clock.

The DS-3 signal is stuffed with the Fixed Stuff bits (R), Stuff Control bits (C), Overhead bits (O) and Stuff Opportunity bits (S) and inserted into the STS-1 payload. In the stuff process, the elastic store read/write pointers are monitored. Stuff bits are added into the S bit location of each row of the STS-1 frame. These bits are added at a rate which will keep the elastic store at half full on average.

Path overhead is inserted. The following bytes of the Path overhead are broadcast: the Trace byte (J1), Signal Label (C2) and one of three possible Growth bytes, (Z3–Z5). The User Channel (F2), is inserted on a selectable basis. The overhead is input to the OHB ASIC from the ALC PBA via the SBI bus.

The Path Status byte (G1) is also inserted. It is the combination of the STS Path Yellow Indicator bit and three spare bits from the ALC PBA and a four bit error count of the Path Byte Interleave Parity - 8 (BIP-8) byte (B3) receive errors. These are errors that have been detected in the the previous Synchronous Payload Envelope (SPE).

The Path transmit BIP-8 is calculated by the DS3I ASIC and inserted into the B3 path overhead location of the following SPE. The STS-1 formatted payload will then be byte interleaved by the STS3T ASIC, with no particular SPE orientation in the frame, with the other STS-1 payloads to form a STS-3 payload.

3.3 Transmit AIS, FERF and Unequipped Signals

A Path Alarm Indication Signal (AIS) will be output by the STS3T and DS3I ASICs if there is a loss of clock on a port. The loss of clock is also interpreted as loss of signal. A Path AIS is defined as the SPE bytes, the Line Pointer bytes (H1 & H2) and the Pointer Action byte (H3) equal to all '1"s. An alarm will be generated and sent to the ALC PBA.

Each incoming STS-1 is monitored for a Line AIS condition. If present, the Line AIS is reported to the ALC PBA. The incoming signal is converted to a Path AIS. Path AIS is detected but not reported as an alarm. There will be no monitoring for an incoming DS-3 AIS signal.

A Far End Receive Error (FERF) is generated also if an Line AIS condition is detected by the STS1I ASIC on an incoming LS signal. The LSIF PBA will insert a FERF code into the APS Channel byte K2) of the LS output signal. A FERF will also be generated if a LS port Loss Of Clock (LOC) alarm is detected.

The STS3T ASIC will substitute the unequipped signal for the STS-1 payload if a LS port is provisioned as unequipped. The unequipped signal is all SPE bytes equal to zero.

3.4 Transmit Section and Line Overhead Insertion

New pointers are calculated and inserted by the STS3T ASIC into the Line Pointer byte (H1 and H2) location of each channel. The Pointer Action byte (H3) locations are reserved as pointer action bytes for STS-1 LS ports. They are only defined for negative justification of an STS-1 payload. STS-1 payloads from DS-3 LS ports will not use this byte.

The APS Channel bytes (K1 & K2), the Line Data Com bytes (D4–D12), the Growth bytes (Z1 & Z2) and the Orderwire byte (E2) are input by the OHB ASIC from the ALC PBA over the SBI bus. They are inserted into the proper locations of all three channels by the STS3T ASIC, i.e., one set of data is duplicated for all three.

Line BIP-8 will be calculated by the STS3T ASIC for each channel. This parity checks the line overhead and STS-1 payload in the STS-1 frame. The parity byte will be inserted into the B2 locations in the following frame.

The section overhead Framing bytes (A1 & A2) of each channel are inserted by the STS3T ASIC. The frame bytes are hex F628. The STS-1 ID byte (C1) is inserted into each channel. The channel IDs are assigned by the ALC PBA.

The Orderwire byte (E1), the Section User Channel byte (F1) and the Section Data Com Channel 1 bytes (D1–D3) are input by the OHB ASIC from the ALC PBA. These bytes are inserted by the STS3T ASIC into the proper location of all three channels.

The Section BIP-8, even parity, of the previous scrambled STS-3 frame is calculated by the STS3T ASIC. The value is inserted into the B1 location of STS-1 #1 before scrambling.

In the FTS150 system, all bytes in the STS-3 frame are scrambled by the STS3T ASIC with the exception of bytes A1, A2, and C1. In the FTS600 system, the bytes of the STS-3 signal are not scrambled. (The STS-3 signals from multiple LSIF PBAs will be byte interleaved in the FMX PBA. The resulting STS-12 signal will be scrambled.)

3.5 Transmit Multiplexer Port Interface

The HSI ASIC receives a 155 MHz Transmit clock from the FTR PBA or FMX PBA. In the FTS600 system, the HSI ASIC also receives an 8 kHz synchronization pulse. The FMX PBA outputs the sync pulse to frame align the STS-3 Transmit signals from the four LSIF PBAs. This function is performed by the STS3T ASIC. No STS-3 frame alignment is required in the FTS150 system since there is only one LSIF PBA.

The HSI ASIC outputs a 155 MHZ transmit clock. This clock is used in the FTS-150 system by the FTR PBA. 3.6 Transmit SBI Port Interface The SBI is the LSIF PBA interface to the ALC PBA. The SBI carries Transmit overhead, control, alarm, status and provisioning information.

The OHB ASIC recovers the data in this 4.096 Mb/s link by oversampling, using the 16.384 MHz SBI clock, and locating the SBI frame word.

3.7 Receive Demultiplexer Port Interface

The LSIF PBA will receive a STS-3 signal and a 155 MHz Receive clock from the FTR PBA or FDM PBA. In the FTS600 system, the LSIF PBA will also receive an 8 kHz sync pulse from the FDM PBA. This sync pulse is aligned with the STS-3 frame.

3.8 Receive Section and Line Overhead Removal

The STS3R ASIC locates the Framing bytes (A1 & A2) in the STS-3 signal. In the FTS150, the STS-3 frame is descrambled. The descrambler is not used in the FTS600, where the data is descrambled in the FDM PBA.

The STS-1 Channel ID bytes (C1) are extracted by the STS3R ASIC and sent to the OHB ASIC, to be read by the ALC PBA via the SBI bus. In the FTS150, the Section BIP-8 parity is calculated on the descrambled STS-3 frame. The calculated value is compared to the byte B1 of the following descrambled frame. A 13 bit counter will count the B1 errors. The error count is periodically sent to the OHB ASIC.

The STS3R ASIC extracts the Orderwire byte (E1), the Section User Channel byte (F1) and the Section Data Com Channel bytes (D1–D3) from STS-1 #1 of the STS-3 signal. These bytes are sent to the OHB ASIC.

The STS3R ASIC extracts the APS Channel bytes (K1 & K2), the Path Signal Label byte (C2), the Path Status byte (G1), the Line Data Com Channel bytes (D4–D12), the Orderwire byte (E2) and the Growth bytes (Z1 & Z2) from STS-1 #1. These bytes are sent the OHB ASIC. An interrupt will occur if K1 and K2 change value and the new value is received in three successive frames. This interrupt is sent to the OHB ASIC. G1 is also monitored for a Yellow Alarm.

The B2 parity will be calculated for each of the three STS-1s over the Line Overhead and Payload. The value will be compared to the corresponding B2 bytes in the following frame. B2 errors will be counted in one of three 13 bit counters. The error counts are periodically sent to the ALC PBA.

The three STS-1s are separated and sent to separate payload extraction circuits.

3.9 Receive Payload Extraction 3.9.1 STS-1 Signals

The STS1I ASIC will overwrite the Framing bytes (A1 & A2). The Line Pointer bytes (H1 & H2) and Pointer Action byte (H3) will be passed unchanged. The STS-1 Identification byte (C1) will be overwritten to ID code #1. All other Section and Line overhead bytes, except Section and Line BIP-8 (B1 & B2) will be output as 00. Line BIP-8 will be calculated and inserted into byte location B2 of the following frame. The frame will then be scrambled. The Section BIP-8 will calculated and inserted into byte location B1 of the following frame before scrambling. The resulting STS-1 signal will then be B3ZS encoded and sent to the Low Speed Port Interface.

3.9.2 DS-3 Signals

The payload extraction circuit of the DS3I ASIC will be extract the DS-3 signal from the STS-1 payload. The circuit will use the Line Pointer bytes (H1 & H2) to locate the Path Overhead. The Path BIP-8 will be calculated and compared to the value stored in B3 of the following SPE. Errors will be totalled in a 13 bit counter. The error count is periodically sent to the OHB ASIC.

The DS3I ASIC will extract the FEBE count from the Path Status byte (G1) and store the cumulative error count in a 13 bit counter. This error count is periodically sent to the OHB ASIC.

The Path User Channel (F2) and a Growth byte (either Z3, Z4 or Z5) from one DS-3 low speed port will be sent to the OHB ASIC. Both bytes must come from the same low speed port, but the port is selectable. The Path Trace byte (J1) may be selected from one of the DS-3 low speed ports to be sent to the OHB ASIC. The Path Signal Label (C2) and Path Status byte (G1) from each of the three low speed ports will be sent to the OHB ASIC.

The DS-3 payload will be extracted and put into a 14 byte elastic store. This elastic store will reduce the frame induced jitter (3–6 bytes). The DS-3 signal will be read out of the store using a 44.736 MHz clock. This clock is the output of a PLL which uses the elastic store half full signal as a control. The clock frequency will keep the elastic store half full on average. The DS-3 signal will be B3ZS encoded and sent to the Low Speed Port Interface.

3.10 Receive AIS, FERF and Unequipped Signals

The LSIF PBA will detect Line and Path AIS in the three STS-1 signals. If either is detected, the low speed port will output a Path AIS, i.e. the pointer bytes (H1 & H2, the Pointer Action byte (H3) and the SPE all '1's. (The SPE will be unchanged since is will already be all '1's. DS-3 LS ports will output a DS-3 AIS, i.e. DS-3 with proper framing and Stuck Stuffing.

It is necessary for the LSIF PBA to output Path AIS signals on the low speed ports when the receive 155 MHz clock has been lost. The LSIF PBA will substitute the transmit 155 MHz clock for the receive 155 MHz clock when a Receive LOC is detected. The low speed ports will generate a STS-1 Path AIS or a DS-3 AIS.

A FERF is generated if a STS-3 Line AIS condition is detected. The LSIF PBA will insert a FERF code into the APS Channel byte (K2) of the STS-3 output. A FERF will also be generated if a receive LOC alarm is detected.

An unequipped signal is indicated by the Path Signal Label byte (C2) equal to all '0's. DS-3 LS ports will output an all zero signal with B3ZS encoding, i.e., with no DS-3 framing and without proper destuffing. Note: the frequency will not be within the normal +/−20 ppm tolerance.

3.11 Receive Low Speed Port Interface

The B3ZS encoded signals from each of the payload extraction circuits will be sent to the AMI driver stage. The AMI driver stage will also input the receive clocks, either 51.84 MHz for the STS-1 signals or 44.736 MHz for the DS-3 signals. The driver will generate bipolar pulses with a 75 Ohm unbalanced output impedance.

3.12 Receive SBI Interface

The SBI is the LSIF PBA interface to the ALC pBA. The SBI carries Receive overhead, control, alarms, status and provisioning information.

The data in this 4.096 Mb/s link will be recovered by oversampling, using the 16.384 MHz SBI Clock, and locating the SBI frame word.

3.13 Receive Synchronization Output

The LSIF PBA will output an 8 kHz sync pulse. This pulse output is derived from the receive 155 MHz clock by the HSI and STS3R ASICs. This output will be used in the FTS150 system for loop timing synchronization of the System Clock PBA.

3.14 Visual Alarm

The LSIF PBA will contain a red LED to indicate a LSIF PBA failure. The LED is controlled by OHB ASIC.

3.15 Special Power Requirements

The LSIF PBA will operate with either a −5.2 V or −4.5 V supply. The FTS150 system operates with −5.2V. The FTS600 operates with −4.5V. WARNING: the LSIF PBA will not operate with both supplies simultaneously.

4. Options

The LSIF has no options.

5. Unit Alarms

LSIF PBA alarm condition is indicated by a red LED located on the front panel. The LED is controlled by the ALC PBA.

TECHNICAL DESCRIPTION Protection Switch Element 1 Printed Board Assembly; 625124-001-501

1. Scope of this Document

This document describes the Protection Switch Element (PSE1) in terms of how it serves the FTS150 and FTS600 of which it is a part, and gives a detailed description of how it accomplishes its function as keyed to the block diagram in FIG. 41. Included are descriptions of the options, alarms, and test and maintenance of the PSE1.

2. General Description

The protection Switch Element (PSE1) provides 1:1 protection switching for the FTS150 and FTS600. It does the actual switching of communications traffic on three customer lines between one set of electronics and a second (redundant) set of electronics of the FTS equipment. The customer lines can be either STS-1 or DS-3. It receives commands from the COA as to which set of electronics to switch to and provides status information as to which side is active to the ALC. Several key features include:

(a) The use of latching relays to reduce power required by the PSE1.

(b) The ability to provide periodic testing of the relay drive circuitry to reduce silent failures.

(c) The ability to select 0 or 225 feet of WE728A-equivalent line build-out.

3. Unit Description

The function of the PSE1 is best illustrated by the block diagram given in FIG. 41. As shown in FIG. 41, the PSE1 can be thought of as made up of seven blocks: the relay block, the relay driver block, the relay control logic block, the relay status block, the line build-out block, the resisitive splitter block, and the remote inventory block.

3.1 Relay block

The relay block contains three double-pole double-throw relays. The normally-closed contacts are used to connect the outgoing customer lines to the "A" side electronics of the FTS equipment. The normally open contacts are used to connect the outgoing customer line to the "B" side electronics of the FTS equipment. One set of contacts on contacts on each relay is left unused. The relays are single coil latching to reduce power requirements and allow testability of the relay driver.

3.2 Relay driver block

The relay is actuated by the relay driver block which provides the power necessary to switch the relay.

3.3 Relay control logic block

The PSE1 is controlled by the Craft/Order Wire /Alarm (COA) through the SWCODE and SWENABLE signals. A detailed description of these signals is given in the PSE1 Performance Specification (625124-001-301). These serial signals are decoded by the relay control logic block. There are seven codes that have meaning for the PSE1. One code provides an output to the relay driver block to cause the relays to become or remain latched on the A side. A second code causes the relays to become or remain latched on the B side. (A and B refer to the contacts attached to the A side and B side electronics of the FTS system). A third code causes the PSE1 to go into a test mode in which the integrity of the path between the COA and the PSE1 is verified, and the relay driver is tested (without actuating the relays). The fourth code takes the PSE1 out of test mode. The fifth code resets PSE1 error messages. The sixth code allows the system software to light an alarm LED on the PSE1 and the seventh code turns off that LED. The relay control logic block also decodes the information from the relay status block and provides a status signal SWSTAT to the Alarm Card (ALC).

3.4 Relay status block

The relay status block contains electronics which monitor directly each of the contacts which carry communications signals. The status information is decoded by the relay control logic block described above. The status monitored includes: whether each of the three relays is on the A or B side or "stuck" between the A and B sides. The relay control logic block will use this information, together with the a priori knowledge as to which side the relay was requested by the COA to switch to, to send the status signal SWSTAT to the ALC.

3.5 Resistive splitter

The resistive splitter block splits the three incoming customer lines into 3 pairs of lines, each pair containing one line to the A side electronics of the FTS system and one line to the B side electronics. At 22.4 MHz and 25.9 MHz, the splitter will have a 9.6 dB insertion loss, 75 ohm input and output impedance, and return loss (as seen at one output) of greater than 19 dB when the input is terminated in 75 ohms and the other output is open.

3.6 Remote Inventory Block

The remote inventory block contains an EEPROM device which the ALC can write to and read from regarding the identification of the PSE1 for inventory purposes.

4. Detailed Description

4.1 Relay block

The relays K1,K2, and K3 are SEL RZ 2T (or equivalent) 5 Volt double-pole double-throw latching relays.

4.2 Relay driver block

The relay driver U4 is an Intersil ICL7667 (or equivalent) Power MOSFET driver. It has TTL compatible inputs and high voltage - high current CMOS inverter outputs.

4.3 Relay control logic block

The relay control logic block U3 is an Altera EP-910 EPLD.

4.4 Relay status block

The relay status block contains electronics which monitor directly each of the contacts which carry communications signals. What resistor network is selected by a contact determines what voltage is detected by the LM319 comparators and sent to the relay control logic block. If the relay is switched to the A side, the upper comparator causes the A output to go high and the lower comparator causes the B output to go high. If the relay is switched to the B side, the upper comparator causes the A output to go low and the B output to go low. If the relay is stuck between sides, the A output is low and the B output is high. The A and B output pairs are fed into the relay control logic block and used to determine the status (SWSTAT) of the PSE1 PBA.

4.5 Line build out

A line build-out block is provided with the option of simulating 0 or 225 feet of WE728A cable. The DIP switches select either option. Switch 1 of each pair connects or disconnects the line build-out from the circuit. Switch 2 provides a logic low to the LSIF when line build-out is selected or a logic high when no build-out is selected. See the "OPTIONS" section for additional information. The line build-out will agree closely with the loss characteristics of WE728A cable.

4.6 Resistive splitter

The resistive splitter block splits the three incoming customer lines into 3 pairs of lines, each pair containing one line to the A side electronics of the FTS system and one line to the B side electronics.

4.7 Remote Inventory Block

The Remote Inventory Block contains a 93C46 1024-Bit Serial CMOS EEPROM. The ALC selects this device via the INVCSPSE line from the ALC. The data from the ALC (INVADDR) is clocked into the EEPROM by INVCLK from the ALC. Data out (INVDATA) goes to the ALC.

5. Options

A line build-out block is provided with the option of simulating 0 or 225 feet of WE728A cable. Three pairs of DIP switches select the option for the three customer lines connected to RXLS1, RXLS2, and RXLS3. DIP switch pair S1 corresponds to RXLS1, S2 corresponds to RXLS2, and S3 corresponds to RXLS3. If the customer uses 225 feet or less of WE728A coax, position 1 of each pair (S1,S2,S3) must be OFF and position 2 of each pair ON to select the 225 line build-out of the PSE1. If the customer uses greater than 225 feet (up to 450 feet) of WE728A coax, position 1 of each pair must be ON and position 2 of each pair must be OFF to select 0 feet of line build-out on the PSE1.

6. Unit Alarms

The LED (DS1) designated "ALM" can be lit by system software as an alarm. It is not controlled by the PSE1. Refer to the section, "Software Interface," in the PSE1 Performance Specification (625124-001-301) for details about how to control this LED. The other LEDs, DS2 and DS3, designated "B" and "A" respectively, indicate to which side the COA requested a switch. DS2 and DS3 are controlled by the relay control logic block described above. These LEDs do NOT indicate to which side the relays are actually switched; the condition of the signal SWSTAT indicates the actual position of the relays.

7. Appendix A: ACRONYMS

ALC—Alarm PBA
COA—Craft/Order wire/Alarm PBA
DS3—Digital Signal Level 3 (44.736 Mb/s)
FTS150—Fiber Transmission System
FTS600—
LBO—Line Build Out
LSIF—Low speed interface PBA
PBA—Printed board assembly
PDS—Product Design Specification
PSE1—Protection switch element PBA
STS-1—Synchronous Transmission Level 1

TECHNICAL DESCRIPTION SYNCH/MAINT INTERFACE; SMI101; 625123-001-501

1. Scope

This document gives a general description/ of the SMI101 PBA, which is used in the FTSXXX product line.

2. Overview

There will be two Synchronization/Maintenance Interface (SMI) PBAs used in the FTS150 and FTS600. Each SMI PBA will have three DS1/SBI Interfaces. One of these interfaces will provide an 8 kHz sync to each of the system's two clock PBAs. Each of the other two DS1 interfaces can provide a SBI to DS1 interface between the local ALC1 and the Maintenance Module Operations Support System (MMOSS). The SMI has the capability for remote inventory. There is a LED mounted on the SMI that will be externally activated to light in the event of a failure of the SMI.

3. General Description 3.1 System Interfaces

Figure 42:
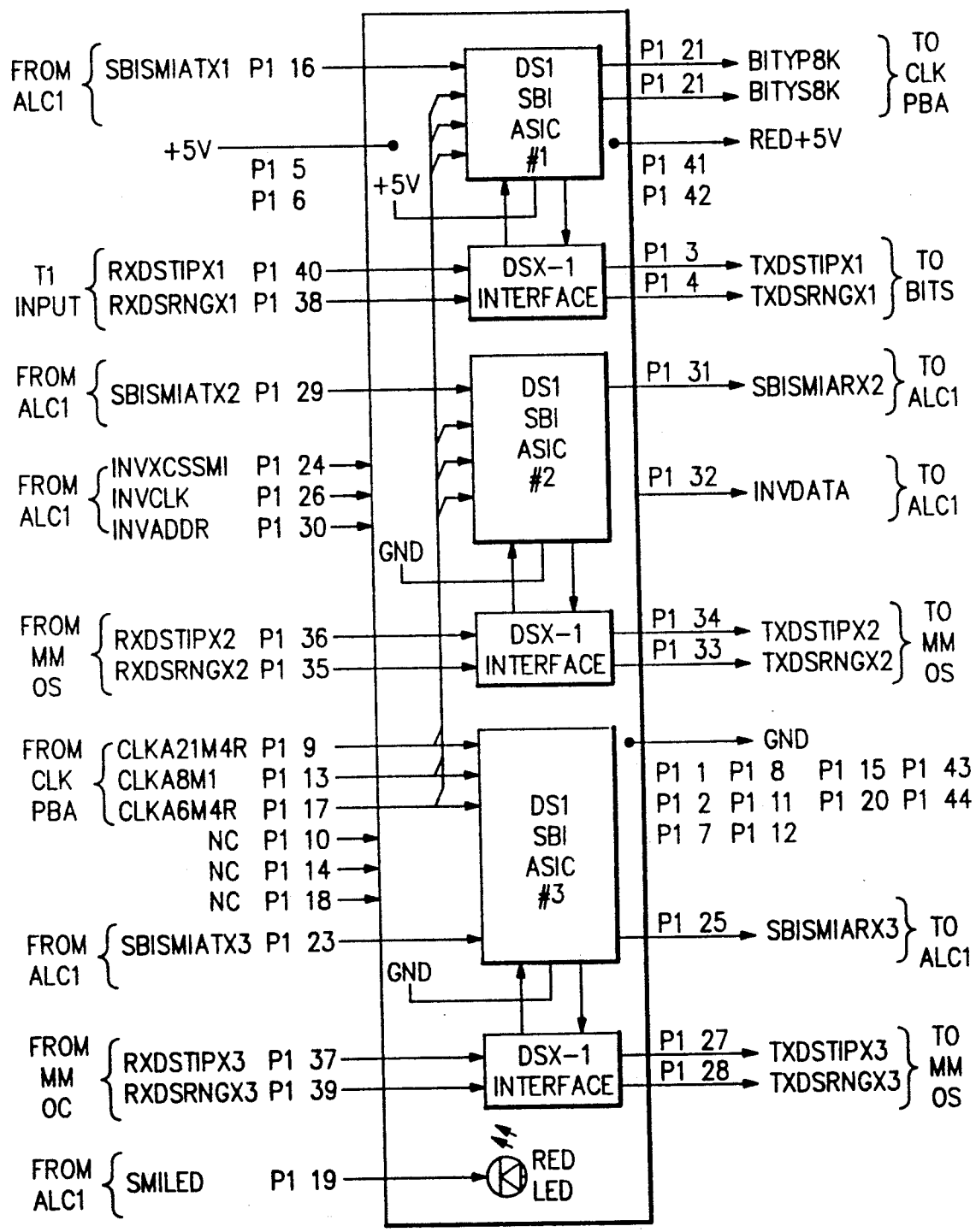
FIG. 42 is a block diagram of the synchronization/maintenance interface (SMI).

FIG. 42 is a block diagram showing the I/O pin assignments and the system interfaces to the SMI PBA.

The SMI PBA provides interfaces for three clock inputs. Each PBA receives a 21.616 MHz, a 8.192 MHz, and a 6.176 MHz clock from either Clock PBA "A" or "B" (CLKA21M4R, CLKA8M1, CLKA6M4R). Each clock is duplicated through a buffer and is connected to the A and B clock inputs of each DST1 ASIC. All of these clocks use TTL circuitry.

DST1 ASIC #1 will be configured in the synchronization mode where its mode input pin is connected to +5 Volts. DST1 ASICs #2 and #3 will be in the maintenance mode where their mode input pins are connected to ground.

In the synchronization mode, DS1 interface #1 transmits two 8 kHz syncs (BITYP8K, BITYS8K). These syncs are derived from the office BITS source. The data from the office is received on a DS1 data positive (tip) rail input, (RXDSTIPX1) and a DS1 data negative (ring) rail input (RXDSRNGX1) in Alternate Mark Inversion (AMI) or B8ZS coded signals. DS1 interface #1 also outputs a DS1 timing sync to the BITS source on DS1 positive (tip) and negative (ring) rail outputs (TXDSTIPX1, TXDSRNGX1). This sync output is derived from a SBI input (SBISMIATX1).

In the maintenance mode, DS1 interfaces #2 and #3 each provide a DS1/SBI interface. DS1 data is received on DS1 data positive (tip) rail inputs (RXDSTIPX2, RXDSTIPX3) and DS1 data negative (ring) rail inputs (RXDSRNGX2, RXDSRNGX3) in AMI or B8ZS coded signals. This data is then transmitted out in SBI format via SBI links (SBISMIARX2, SBISMIARX3). SBI data is received on SBI links (SBISMIATX2, SBISMIATX3) and is then output in a DS1 format on positive (tip) and negative (ring) data rails (TXDSTIPX2, TXDSTIPX3, TXDSRNGX2, TXDSRNGX3) in AMI or B8ZS coded signals. The SBI links use CMOS circuitry.

In the event of a failure of the SMI PBA, a LED on the SMI can be illuminated by an active low signal (SMILED) from an external source.

The SMI PBA has the capability of identifying itself for remote inventory. The identifying data is stored in an EEPROM. The identifying data is input (INVADDR) and output (INVDATA) serially and is clocked with an external clock (INVCLK). The read and write cycles are controlled by a chip select signal (INVXCSSMI).

4. Detailed Circuit Description

There are three DS1 interfaces on the SMI101 PBA. Each interface is electrically the same except for the SYNCMO. input, pin 37 on the DST1 ASIC. On DST1 ASIC #1 the syncmode pin is connected to +5 V, and on DST1 ASICs #2 and #3, that pin is grounded. The following is a detailed circuit description of a DS1 interface on the SMI101 PBA.

4.1 Receive Direction

Figure 43:
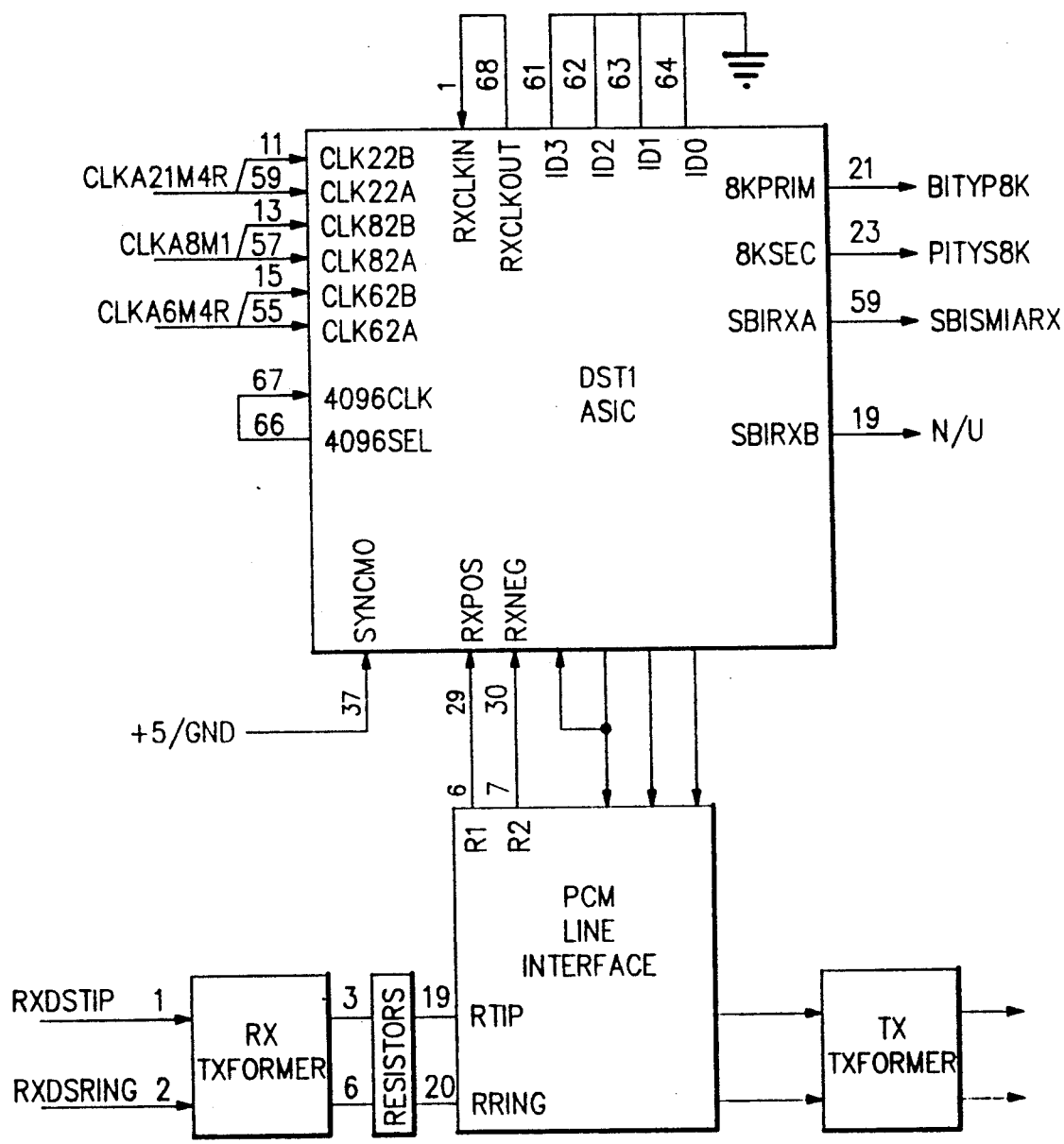
FIG. 43 is a block diagram of the DST1 and PCM line interface used in conjunction with the SMI module showing a receive direction of a DS1 interface.

FIG. 43 depicts the block diagram of the receive side. The detailed description of each stage of the receive path is given in the subsequent sections.

4.1.1 Line Transformer Receive Path

The balanced DSX-1 data enters on both ends of the primary side of the center-tapped, center-grounded transformer pins 1 and 2. The data leaves the transformer on pins 3 and 6 and enters the associated resistor circuitry which provides the unipolar signals RTIP and RRING for the PCM line interface IC.

4.1.2 PCM Line Interface Receive Path

RTIP and RRING pulses enter the PCM Line Interface IC on pins 19 and 20 respectively, and are detected by the comparators internal to the IC. The IC provides pulse stretching for the RZ outputs on R1 (pin 7) and R2 (pin 6) to aid in digital clock extraction in the DST1 ASIC. These comparator outputs, R1 and R2, provide the RXPOS and RXNEG signals for the DST1 Interface ASIC. 4.1.3 DST1 ASIC Receive Path The RXPOS and RXNEG data enters the DST1 ASIC as either RZ or NRZ on pins 29 and 30 of the IC (positive and negative rail, respectively). The data is retimed by one of two 21.616 MHZ clocks (CLK22A, CLK22B) and fed to a phase detector circuit. The two 21.616 MHZ clocks enter the DST1 on pins 59 and 11. Each of these two clocks are run through a 75 ohm controlled impedance line and are terminated by a 1 nanofarad capacitor and a 75 ohm resistor. Internal to the IC one of the clocks is selected and is divided by 14 to generate the 1.544 MHz receive clock. The 1.544 MHz clock leaves the IC on pin 68 (RXCLKOUT) and re-enters the IC on pin 1 (RXCLKIN) and is used to retime the received data.

The RX DS1 bit stream is converted to a SBI format and is retimed by the 4.096 MHz receive clock. The 4.096 MHz is derived from the two 8.192 MHz clock inputs (CLK82B, CLK82A) which enter the ASIC on pins 13 and 57. The retimed data is output on the SBIRXA link leaving the ASIC on pin 50. The A/B select indicator indicates that the A SBI link carries the active data since the SBIRXB (pin 19) is unused.

The ASIC can be put in syncmode by pulling pin 37 (SYNCMO) of the DST1 ASIC high. In syncmode, outputs 8KPRIM and 8KSEC are both enabled to output 8 khz sync pulses on pins 21 and 23, respectively. These sync pulses are derived from the recovered 1.544 MHz clock.

Pins 6.1 through 64 (ID3, ID2, ID1, ID0) on the DST1 ASIC are the identification inputs. When they are pulled low, they represent a unique identification code. This code is reported by the active RXSBI output over a VI communication channel.

4.2 Transmit Direction

Figure 44:
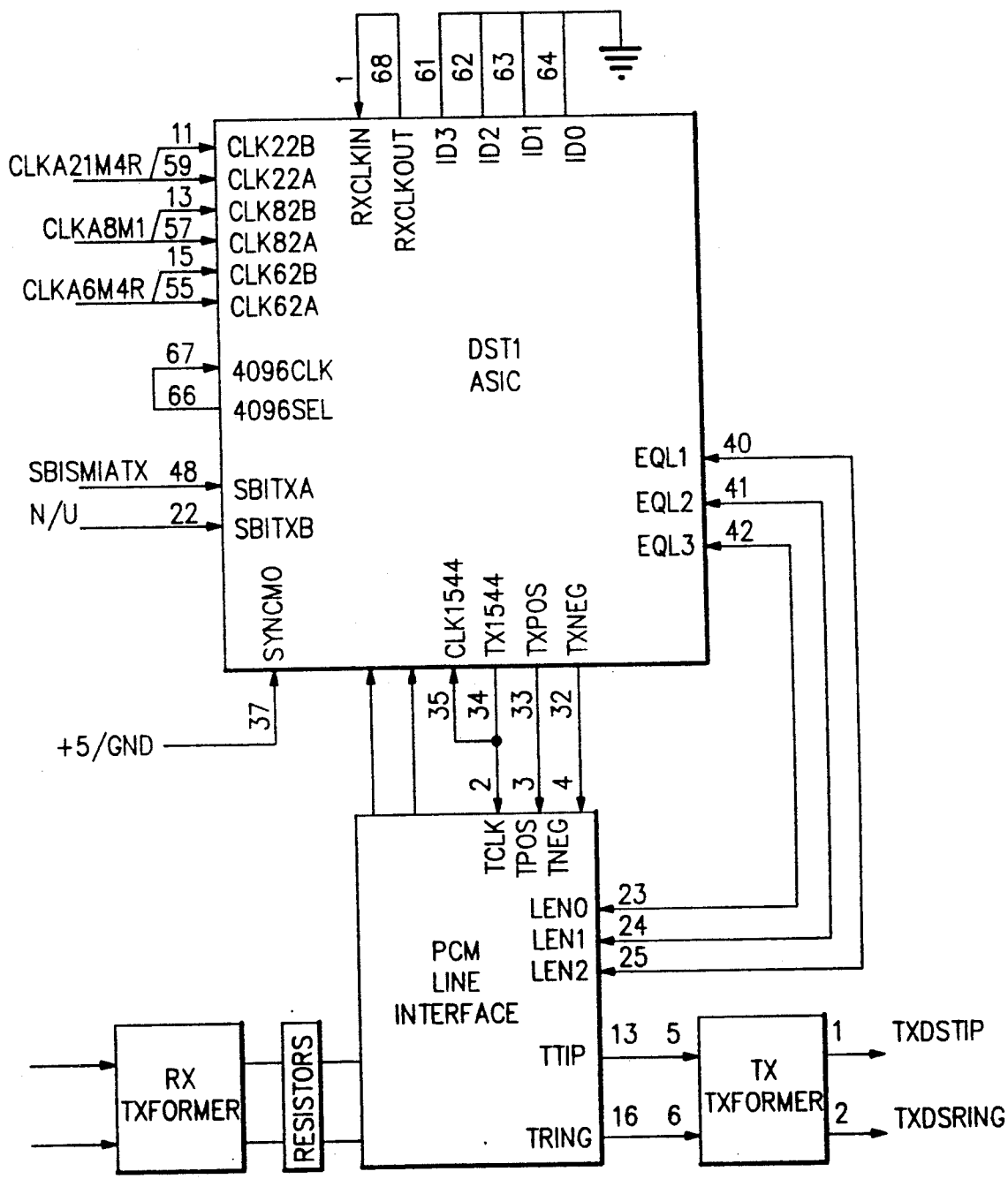
FIG. 44 is a block diagram similar to FIG. 43 showing the transmit direction of the DS1 interface.

FIG. 44 depicts the block diagram of the transmit side. The detailed description of each stage of the transmit path is given in the subsequent sections.

4.2.1 DST1 ASIC Transmit Path

The SBI bit stream SBITXA enters the DST1 ASIC on pin 48. The SBITXB input on pin 22 is unused. The SBITXA bit stream is clocked by the 8.192 MHz clocks. Two 4.096 MHz clocks are derived of which, one clocks the receive side and the other clocks the Transmit side. The 4.096 MHz clock for the transmit side leaves (4096SEL) and re-enters (4096CLK) the IC on pins 67 and 66, respectively.

The SBI data is converted to a DS1 format and is output from the DST1 ASIC as two rail data on pins 33 (TXPOS) and 32 (TXNEG), tip and ring, respectively. Two 6.176 MHz clocks (CLK62B, CLK62A) enter the DST1 ASIC on pins 15 and 55. The clocks are used to derive the 1.544 MHz transmit clock. This clock also leaves (TX1544) and re-enters (CLK1544) the IC on pins 34 and 35, respectively.

Pins 40, 41 and 42 (EQL1, EQL2, EQL3) of the DST1 ASIC are the transmit DS1 equalizer selection code output. These outputs are programmable via a VI communication channel and select one of five line length settings for the PCM Line Interface.

4.2.2 PCM Line Interface Transmit Path

In the transmit path, the PCM Line Interface receives the transmit binary data from the DST1 ASIC on pins 3 (TPOS) and 4 (TNEG). The 1.544 MHZ transmit clock (TCLK) enters the PCM IC on pin 2. The transmit clock and the transmit data are supplied synchronous by the DST1 ASIC, such that the data is sampled on the falling edge of the input clock.

The PCM Line Interface produces alternate bipolar pulses of appropriate shape with the line lengths ranging from 0 to 655 feet on pins 13 (TTIP) and pin 16 (TRING) as shown in TABLE 18. PCM IC pins 23, 24 and 25 LEN0, LEN1, LEN2) are connected directly to the DST1 ASIC pins 42, 41 and 40 respectively.

TABLE 18

| LINE LENGTH SELECTION | | | |
|---|---|---|---|
| LEN2 | LEN1 | LEN0 | LINE LENGTH (FEET) |
| 0 | 1 | 1 | 0–133 |
| 1 | 0 | 0 | 133–266 |
| 1 | 0 | 1 | 266–399 |
| 1 | 1 | 0 | 399–533 |
| 1 | 1 | 1 | 533–655 |

4.2.3 Line Transformer Transmit Path

The transmit tip (TTIP) and ring (TRING) are received on both ends of the primary side of the center-tapped, center-grounded transformer on pins 5 and 6. The transformer provides the bipolar DSX-1 signal on pins 1 and 2.

5 GLOSSARY

ALC1—Alarm Controller 1
ASIC—Application Specific Integrated Circuit
B8ZS—Binary 8 Zero Substitution
BITS—Building Integrated Timing Supply
CMOS—Complementary Metal Oxide Semiconductor
DS1—Digital Signal Level 1
LSI—Large Scale Integration
PBA—Printed Board Assembly
SBI—Serial Bus Interface
TTL—Transistor Transistor Logic

TECHNICAL DESCRIPTION
ALARM/CONTROL PROCESSOR (ALC101) PBA
TECHNICAL DESCRIPTION

1. General Description

The ALC101 (Alarm/Controller) PBA has been designed to serve as the main controller in the FTS150 and FTS600/2400 products.

Key features include:
* The ALC101 serves as either a simplex or a dual controller.
* The ALC101 is used in FTS150, FTS600, and FTS2400.
* The ALC101 has many hardware/software compatibilities with the ADM/TM controllers.
* A high functional density is achieved through SMT and LSI devices.

In system operation, the ALC101 provides for alarm collection and performance monitoring of the equipment and facilities. The ALC101 communicates (directly or indirectly) with every PBA in its shelf and upgrade cluster(s).

2. Unit Description

Figure 45:
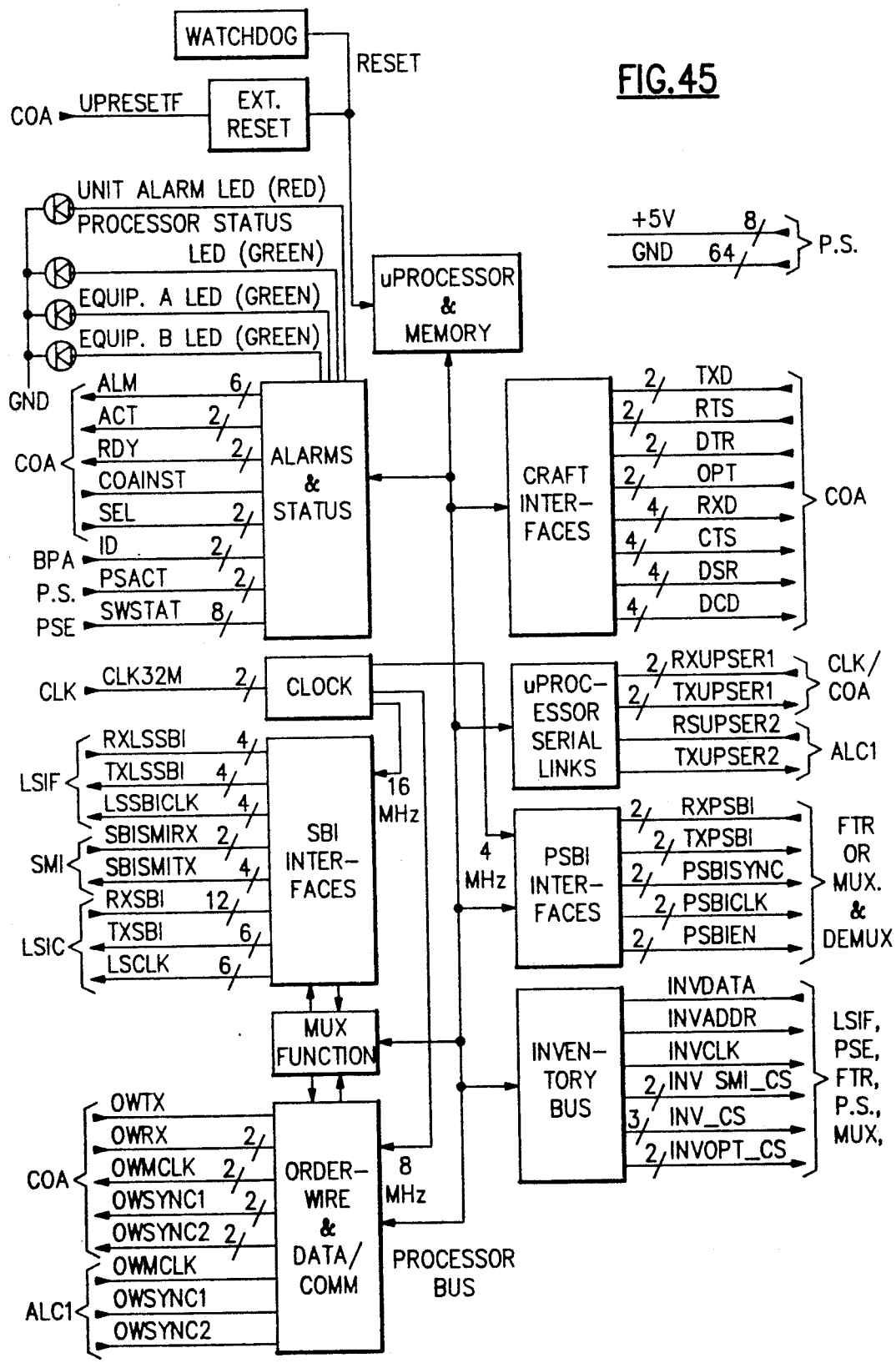
FIG. 45 is a block diagram of the alarm/control processor.

A block diagram of the ALC101 is shown in FIG. 45. All of the PBA I/O connections are displayed. The following sections briefly describe each block.

2.1 Microprocessor & Memory

The ALC101 uses an Intel 80C186 microprocessor with 640K bytes of EPROM and 192K bytes of RAM.

All 192K bytes of RAM is onboard. 256K bytes of the EPROM is onboard. The remaining 384K bytes is provided via an EPROM expansion board that plugs onto the ALC101.

2.2 Watchdog Timer

The watchdog timer consists of a 100 msec. sanity timer (Stage 1) and a 100 msec. alarm timer (Stage 2). Expiration of the sanity timer resets the ALC101. Expiration of the alarm timer resets the ALC101 and sets the minor alarm indication to the COA PBA. The unit alarm LED is also activated.

2.3 External Reset

This interface allows the ALC101 (80C186 and peripherals) to be reset via an externally applied signal. The signal is received from the COA PBA as a CMOS level. The effect is the same as if the 2nd stage of the watchdog timer had expired.

2.4 Alarms/Status

The ALC101 receives discrete alarm signals from the Power Supplies. Discrete control & status signals are received from the COA and PSE PBA's.

Under software control, discrete status and alarm signals are sent back to the COA PBA.

An ID is encoded into the BPA to identify the type of controller expected: simplex or dual. In the case of the dual controller, the side (A or B) is indicated in the ID.

2.5 Craft Interfaces

Signals are provided for two independent sets of craft ports. Under normal circumstances, one port is configured as a local craft port, the other as a remote craft port.

2.6 SBI Interfaces

Twelve external SBI links are provided by the ALC101. The SBI's connect to a certain number of LSIF PBA's, SMI PBA's, and LSIC's depending on the application.

2.7 Mux Function

Incoming SBI channels are routed to their destinations: either onto an outgoing SBI or onto an internally terminated SBI. The internally terminated SBI's allow processor access to the channels.

SBI channels written by the processor are routed to outgoing SBI's destined for an LSIF PBA, SMI PBA, or LSIC.

The routing table for the Mux Function is in RAM and is software alterable.

2.8 OW & Data/Comm

Local and express orderwire channels are routed between LSIF PBA #1 and the COA PBA. There are also timing signals that cross between ALC101's (in dual-controller configurations only). The timing signals allow two ALC101's to share a single OW output from the COA.

The 192Kb/s data/comm. channel is processed at this point.

The VI SBI channels containing provisioning and performance monitoring information are also processed at this point.

2.9 Clock Interface

A 32 Mhz clock is received from the CLK PBA for internal ALC101 timing. In the simplex controller configuration, a 1:2 selection is made on the 32 Mhz clocks since a clock is received from each of the 2 Clock PBA's. No selection is done in dual controller configurations.

2.10 Microprocessor Serial Interfaces

The ALC101 provides a total of three microprocessor serial interfaces (which emulate the 8051 microcontroller serial interface in Mode 2). The serial links are used for inter-processor communication. Only two of the three links are used in any given application.

Two of the serial interfaces are designed to connect to a COA/CLK combination (simplex controller). The other link is designed to connect to the other ALC101 (dual-controller configurations).

2.11 PSBI Links

Two PSBI interfaces are provided to connect the ALC101 to the FTS optic PBA's.

In the simplex controller configuration, the two interfaces connect to two FTR PBA's (one A, one B). In the dual controller configuration, the two interfaces connect to a MUX PBA and a DEMUX PBA (of either the A side or the B side). 2.12 Inventory Bus The ALC101 provides 8 chip selects for accessing inventory information in an FTS system. One chip select is dedicated to the ALC1O1 itself. The other 7 chip selects can be used to access other PBAs.

3. Detailed Description 3.1 Microprocessor: 80C186

The 80C186 microprocessor, U53, is timed by a 20 MHz oscillator, Y1. The Y1 output is tri-state buffered to allow clock insertion during testing.

The programmable chip selects and interrupt inputs are organized as shown in Appendix A.

The 10 MHz output signal of the 80C186, CLOCK-OUT, is distributed to other devices throughout the PBA. During test, the signal will be ½ of the clock input U53–59.

3.2 Microprocessor Program Memory

Non-volatile program memory is provided by 256K bytes of EPROM, U52 and U56. An additional 384K bytes of EPROM can be obtained by inserting an EPROM Expansion PBA into connectors J1/ J2. The EPROMS are selected via an address decoder, U65. The UCS signal from the 80C186 is not used. U65 also provides a latched output of address signals ADDR-19–ADDR16.

Strapping resistors W1–W3 provide a strategy for EPROM upgrade. W1 is installed for use with 256K byte EPROMS (27C2001). W1 and W2 are installed for use with 512K byte EPROMs (27C4001). With these upgrades, the Expansion board is not used.

U65 is a GAL, programmable logic device. Refer to 600821-412 for details on the equations implemented in the device.

3.3 Microprocessor Local Memory 192K bytes of data storage is provided by SRAMs; U47, U49, U50, U54, U55, and U57.

Chip select generation is performed by the 3:8 decoders, U26 and U27.

3.4 Processor Control/Status Register: PCR

The PCR is used to monitor discrete control/status signals from the COA PBA, power supplies, and various other PBAs.

The PCR is also used to transmit status and alarms back to the COA PBA, provide some inventory signals, etc..

The PCR appears as a memory-mapped register to the 80C186, selected with PCS4*.

Writes to the PCR latches, U24 and U25 MUST always be word (16-bit) operations. There is no use of the BHE* signal from the 80C186. A PBA power-on reset will clear the latches, resetting the status and alarms. A watchdog time-out will force the minor alarms, MINAALM and MINBALM, to go active.

The 16-bit read portion of the PCR is accessed via transparent latches, U41 and U42. Byte reads are possible.

3.5 3090 Wait State Generator

The hex F/F, U7, is configured as a shift register to provide 4 wait states when the 80C186 programs the Xilinx XC3090 device or otherwise accesses the XC3090, as in setting the upper address bits ADDR19-ADDR16 for DMA operations.

3.6 Hi/Lo Byte Transceiver

The bidirectional buffers, U79 and U80, provide 16-bit to 8-bit and 8-bit to 16-bit conversions. This is necessary during DMA transfers because the 82C37A is an 8-bit device, but the processor and its memory is organized in 16-bit words.

The direction of flow and tri-state enables of the buffers are controlled by the XC3090, U73.

3.7 Craft Ports

Two independent craft ports are provided by the 85C30 Serial Communication Controller (SCC), U70. The SCC is normally configured to act on an interrupt-per-character basis.

The electrical and mechanical compliance of the craft ports is met on the COA PBA. The craft signals at the ALC101 are CMOS compatible.

All of the craft input signals have a 10K pullup resistor and a 1K series resistor for latch-up protection.

3.8 NCP ASIC #0 and #1

The NCP ASICs, U59 and U68, provide a termination point for the 4 internal SBI links. The ASICs have read/write access to the SRAMs, U67 and U69, for storage of SBI data. The 80C186 acceses the SRAMs via the ASICs.

Each NCP ASIC also provides termination of a microprocessor serial interface, MSI (which emulates the 80C51, mode 2). The 2 links are used in simplex applications. In dual-controller applications, only the MSI from NCP ASIC#0 is used. The second MSI is implemented with the XC3090 (U73, pg. 18) and 87C51 (U45, pg. 24). This higher-throughput MSI is intended for inter-ALC101 communication, has less overhead than the NCP ASIC MSI.

The NCP ASIC will generate interrupt signals based on received VI channels. The interrupts from ASICs #0 and #1 are connected to 82C59A (U58, pg. 21) interrupt inputs 2 and 3, respectively. The ASICs have interrupt mask registers for each individual VI channel.

3.9 Watchdog Timer / Reset

A simple RC power-on circuit is provided by resistor, R27, capacitor, C65, and diode, CR1. The reset signal is tri-state buffered for testibility. A power-on reset creates a 150 msec. minimum reset pulse. The active low pulse is used to reset the 2 SBI LSIs, XC2018, 80C186, XC30390, 87C51, and 82C37. It also resets the watchdog timer circuit decribed below.

The watchdog timer consists of an HC4538 package, U29, an HC74 package, U74, and 2 RC timing circuits. One half of U29 is connected to a 1.75M Ohm resistor combination, R96/R36, and 0.15 uF capacitpr, C59. This results in about a 180 msec. timeout period.

The other half of U29 is connected to a 10K resistor, R30, and 0.15 uF capacitor, C60. This results in about a 1 msec timeout period. This 1 msec. timeout period is not begun until the 180 msec. timer has expired. When this does occur, the 1 msec. pulse is used to create a system reset signal, SYS_RESET*, which is primarily used to reset the 80C186.

In normal operation the 80C186 prevents the 180 msec. timer from expiring by performing a write to PCS6* before 180 msec. has elapsed.

If the timer does expire, it automatically re-arms itself for another timeout period. The F/F package, U74, counts the number of timeouts which have occurred. The first timeout results only in the processor being reset. A second timeout will again reset the processor, but also a minor alarm is activated and the red 'unit alarm' LED is lit. The LED and minor alarm remain active until the processor resets the watchdog via PCS6*.

A watchdog time-out and power-on reset both activate the REPROG inputs to the XC2018 (U64, pg. 16) and XC3090 (U73, pg. 18). This means that both parts must be re-programmed after a reset.

3.10 Data/Comm.

The 85C30 SCC, U66, serves as a termination point for the Sonet data/comm. channels, D1-D3. The device uses the 192 KHz clock, RXD/C_CLK, generated by the XC3090. The 82C37A DMA, U63, is used to make data transfers between the SCC and processor memory.

Both the SCC and DMA are interrupt-driven. The data/comm. channel is HDLC message-formatted such that interrupts generally only need to be generated at the beginning and end of messages.

3.11 Clock & Strobe Generation

Two 32MHz clocks, CLK32M1 (P1C 24) and CLK32M2 (P1C 26), are used to produce all the clocks and timing signals for the SBI and PSBI interfaces. The 32 MHz clocks are terminated with 75 Ohm resistors, R97 and R105. Capacitors, C63 and C64, reduce the power consumed should the clock signals ever fail and remain high.

The AC244 buffer, U43, is used to buffer the 32 MHz clocks and to perform a 1:2 selection. Either the A or B side clock is chosen to be distributed within the ALC101. The buffer for the other clock is tri-stated. The A/B select control are written by the processor via the PCR. It is actually the same bit used to indicate to the COA that the B side is active. If the B side is active, then the B Clock is chosen. If the B side is inactive, then the A Clock is choosen.

The two 16R8 GALs, U71 and U72, divide the 32 MHz clock down to 16 and 8 MHz. Various other timing signals (writes, buffer enables, etc) are also generated.

The ACT574 latch, U31, is used to retime signals out of U71, thereby reducing skew and delay.

3.12 SBI Channel Mux

Each of the 2 SBI LSIs, U44 and U46, serve to convert 8 received SBI links to parallel data. The parallel data is then stored in Switch Memory, U61 and U62. Likewise, the parallel data from the Switch Memory is converted into 8 transmit SBI links. U44 is configured as ASIC #0 via the inputs CA0 and CA1. U46 is configured as ASIC #1. Although up to 4 SBI LSIs may be supported, ASIC #2 and #3 are not used on the ALC101. A 511 Ohm resistor, R115, pulls up the MSB of the SBI address bus during the time periods when ASIC #2 and #3 would have control of the bus. This ensures that the Switch Memory data from the first 2 ASICs will not be corrupted.

Routing between any received SBI channel and its transmitted channel is stored in connect memory, U48 and U51. The connect memory is written by the processor via the XC2018, U64.

The XC2018 must be programmed after any processor reset. The data to be programmed (written) into the XC2018 is stored in the processor's program memeory.

Programming is accomplished through byte writes to MCS2*. Refer to 625207-001-501, Technical Description TSI1, for more information on the SBI LSI timing and the XC2018.

The PROG/DONE output from the XC2018 is connected to the PCR, bit 8. When this bit goes high, the device has been successfully completed.

Six SBI links (on SBI ASIC #1) are used for upgrades from FTS600. The links are differential to allow for upgrade clusters which may be in another shelf.

3.13 XC3090

The Xilinx XC3090, U73, must be programmed after any processor reset. The data to be programmed (written) into the XC3090 is stored in the processor EPROM. Programming is accomplished through byte writes to MCS2*. The interrupt signal, PGARDY_INT, becomes high after the device has completed its internal reset. The first configuration byte can then be written to the XC3090. PGARDY_INT remains high until another reset is received. After the first byte is written, PGABUSY_INT transitions high each time the XC3090 is ready to accept another byte.

The PROG/DONE output from the XC3090 is connected to the PCR, bit 9. When this bit goes high, the device has been successfully completed. Also, no further interrupts will be generated to indicate that another byte should be written.

The XC3090 performs several functions:

3.13.1 Chip Select Decode

MCS0-1, and PCS0-3 are brought into the XC3090 and decoded in accordance with the memory map shown in Appendix A.

3.13.2 Receive Orderwire (OW)

In an FTS600, the XC3090 retimes the OW received from the COA. This is because the COA outputs only one OW signal for both of the ALC101's. the retiming is based on whichever ALC is selected as 'ACTIVE'. Therefore the non-active ALC101 must adjust its timing in order to properly receive the OW.

In an FTS150, the OW from the COA is simply passed through the XC3090.

3.13.3 HDLC Control

The XC3090 performs the retiming of the D1-D3 dat/comm. channel. On one side, the NCP ASIC #0 has D1-D3 imbedded in 3 adjacent SBI channels. On the other side, the 85C30 SCC has a 192 Kb/s synchronous HDLC channel. The XC3090 also produces the 192 KHz clock for the SCC.

3.13.4 PSBI Interface

The control and storage for the 2 PSBI links is provided within the XC3090. Any alarm that causes an interrupt activates the interrupt signal, PSBI_INT. The signal is made for level-triggering. When the processor has read the PSBI channel that caused the interrupt, the interrupt will be cleared (if the alarm condition has gone away).

The I/O for the PSBI is shown on page 22 of the schematic. Inputs are pulled up with a 10K resistor such that alarms are generated when the input is unconnected. The 2 outputs, PSBIEN, are pulled up to insure that they are inactive during PBA initialization.

3.13.5 External DMA Address Latch

The XC3090 supplies the upper 4 address bits, ADDR19-ADDR16, during an external DMA operation. The address bits are set by software through a write to MCS2*. Data bits 3-0 correspond to ADDR19-ADDR16, respectively.

The XC3090 will also drive the BHE* signal during a DMA operation. Since all DMA transfers are byte transfers, BHE* is simply the inversion of A0.

3.14 Switch Status Registers

Each of the Protection Switch Element (PSE) PBAs in an FTS system sends a status signal to the ALC101. There is one PSE in an FTS150. There are 4 PSEs in an FTS600.

Each status input is connected to a tri-state latch, U40 or U39. The switch status signals can be read by the processor through activating the SWSTATRD* signal. This signal is decoded by the XC3090 from PCS2*, offset 0.

3.15 Programmable Interrupt Controller: PIC 18)

Eight interrupt inputs are used on the PIC, U58. The PIC allows masking of any of the interrupt inputs. The PIC must be configured in the level-triggered mode. (The 82C37 DMA generates a pulse-shaped EOP signal so its interrupt is connected to 80C186 input INT1, and is edge-triggered.)

The interrupt output of the PIC is connected to INT0 of the 80C186. The INTA input of the PIC is connected to INT2/INTA0 of the 80C186.

3.16 Microprocessor Serial Interface #3: MSI

The 87C51, U45, together with the XC3090 provides a high-speed MSI for inter-ALC101 communication. The 87C51 controller offloads the 80C186 processor from the relatively high overhead associated with the MSI of the NCP ASIC.

3.17 Inventory Bus

An EEPROM, U60, is equipped on the ALC101 to store inventoried information about the ALC101. The EEPROM is a serial device. The chip select, clock, and address to the device are all under software control. The XC3090, U73, decodes an Inventory WR pulse from PCS2*, offset 0. The chip select, clock, and address are latched by the HC273, U35, for each write.

Five additional chip selects are provided by U36, plus two more by the PCR, U25. These chip selects are designed to access EEPROMs on other PBAs. The chip selects are active high.

There will be several EEPROMs all sharing the same data bus. The EEPROM requires a 2 usecond access time (with 100 pF of bus capacitance) and has a 4 usecond minimum clock period. The device is only specified for a 2.2 Volt minimum high-level output. The 10K Ohm pullup, Z22, is used to insure a CMOS level high. The software should not try to receive Inventory Data less than 3 useconds after the clock is driven high. Timing for the EEPROM itself is shown in Table 19.

4. Unit Alarms

The unit alarm LED, ALM, is red. It is activated when the 2nd stage of the watchdog timer expires. It is cleared by a software reset of the watchdog timer. The LED is also controllable by the software.

There are three alarm signals to the COA: minor, major, and critical. The minor alarm is activated by the hardware if the 2nd stage of the watchdog timer expires. It is cleared by a software reset of the watchdog timer. The minor alarm is also controllable by software write to the PCR.

The major and critical alarms are completely under software control through the PCR.

A green LED, PRO, indicates that the processor is running and is able to assume its role as system controller. This LED could also be blinked by the software to indicate that a download is in progress.

There are two (green) LEDs, A and B, which indicate equipment status. Under normal operating conditions, one of the LEDs is lit to indicate which equipment side is active. If a fault is detected in the active equipment, the LED associated with that side will be turned off after a protection switch is performed. The LED for the newly active side will then be lit. (A dual-controller system only has one side of equipment associated with each ALC101. Therefore, the second green LED is never lit.)

5 Acronyms

ALC101—Alarm/Controller version 1
BPA—Backplane Assembly
CLK—Clock
COA—Craft, Orderwire & Alarm
LSIC—Low-Speed Interface Cluster
LSIF—Low-Speed Interface
MSI—Microprocessor Serial Interface
PCR—Processor Control (& status) Register
PS—Power Supply
PSBI—Pseudo-Synchronous Bus Interface
PSE—Protection Switch Element
SBI—Synchronous Bus Interface
SMI—Sync/Maintenance Interface Having described the invention, what is claimed is:

1. A synchronous optical transmission system for interfacing with high speed communication channels conforming to the synchronous optical network (SONET) standard so as to convey information to and from said high speed channels operating at different transmission rates, as well as to and from at least one said high speed channel and lower speed channels conforming to other communication standards comprising:

A) a fiber transmission system (FTS) having;
1) means for interfacing to a communication medium operating at a first SONET high speed channel transmission rate;
2) means for interfacing to a second communication medium comprising a plurality of channels, each operating at a lower transmission rate than the first SONET high speed channel; and
3) means for multiplexing said lower transmission rate channels to the first SONET channel as well as for demultiplexing the first SONET channel to the lower channels;

B) a terminal multiplexer (TM) having;
1) a means for interfacing to a SONET high speed channel;
2) a time slot multiplexer (TSM) having a lower speed output, the TSM interconnected to said interfacing means for cross-connecting lower speed channels to and from the SONET high speed channel at the lower speed output of the time slot multiplexer;
3) lower speed channel interfacing means connected to the lower speed output of the TSM for interfacing the lower speed output of the TSM with lower speed channels including means for reformatting the data of the lower speed channel so as to be compatible with the higher speed channel and for converting the formatting of the higher speed channel to the format of the lower speed channel; and
4) means for controlling the cross-connect function of the TSM; and C) an add/drop multiplexer (ADM) comprising:
1) first means for interfacing to a SONET high speed channel at a first location,
2) a time slot multiplexer (TSM) having a lower speed output, the TSM interconnected to said add/drop multiplexing interfacing means for cross-connecting lower speed channels to and from the SONET high speed channel and a second SONET high speed channel as well as to and from the lower speed output of the TSM;
3) a lower speed channel interfacing means connected to the lower speed output of the TSM for interfacing the lower speed output of the TSM with lower speed channels including means for reformatting the data of the lower speed channel so as to be compatible with the higher speed channel and for converting the formatting of the higher speed channel to the format of the lower speed channel;
4) second means for interfacing to a SONET high speed channel at a second location; and
5) means for controlling the cross-connect function of the TSM.

2. A synchronous optical transmission system as defined in claim 1, wherein the FTS, TM and ADM each further incorporate a craft orderwire alarm (COA) unit respectively interconnected to the interfacing means and multiplexing means of the FTS, to the interfacing means, lower speed channel interfacing means, TSM and the cross-connect controlling means of the TM, and to the first and second interfacing means, lower speed channel interfacing means, TSM and cross-connect controlling means of the ADM, for conveying craft orderwire and alarm information to and from the associated FTS, TM and ADM respectively.

3. A synchronous optical transmission system as defined in claim 2, wherein the TSM has means for removing one or more lower speed channels from a SONET high speed channel and for adding one or more lower speed channels to a SONET high speed channel as well as means for interconnecting lower speed channels interfaced with the first interface means to a SONET high speed channel interfaced to the second interface means, and wherein the ADM includes a network controller interconnected with the TSM for directing the adding and removing of lower speed channels by the TSM with respect to the SONET high speed channels, wherein the ADM comprises a watchdog timer for monitoring the performance of the microprocessor forming part of the network controller and wherein the COA for the ADM comprises reprovisioning means for sensing the timeout status of the watchdog timer so as to reprovision selected lower speed channels within the TSM when a watchdog timeout is detected, thereby connecting selected lower speed channels from the first interface means to the second interface means.

4. A synchronous optical transmission system as defined in claim 1, wherein the FTS, TM and ADM further comprise modules forming at least portions of the means and TSM defining the FTS, TM and ADM, and also comprises serial busses connected between modules thereof, wherein the format of the data conveyed on these serial busses is of a serial transport frame format such that the data is transferred in frames where each frame comprises N channels, where N is an integer greater than one, and wherein each channel has a fixed length of bits, and further wherein for each of M of said N channels, where M is an integer less than N, means for placing data, representing information to be conveyed, in one portion of the channel; for each of said M channels, means for placing control information related to the data in that channel in a second portion of the channel; and means for placing synchronization data in at least one channel of each frame, and further comprising means connected to said serial busses for generating serial data in said serial transport frame format.

5. A synchronous optical transmission system as defined in claim 1, wherein the FTS, TM and ADM interfaces to the SONET high speed channels further comprise means for scrambling said data to be placed on the communication medium as well as for scrambling said data to be received from said communication medium, wherein said scrambling function is performed by a parallel scrambling circuit which emulates a serial pseudo-random generator which generates a serial output such that the next serial output value is based upon an Exclusive OR combination of at least two preceding serial output values, the maximum preceding serial output value defined as the Pth preceding serial output value, where P is an integer greater than one; the parallel scrambling circuit comprising;
1) W latches, where W is an integer equal to or greater than P, each latch having an output having a logic value 1 or 0, the latched outputs designated Q0 to Q(W-1), each output for each latch i, where i is an integer from 0 to W-1, representing the next time sequential output of the serial pseudo-random generator so that the parallel composite latch outputs Q0 to Q(W-1) are the same as the serial pseudo-random generator output sequence for W successive outputs, each latch also having an input operated upon receipt of a clock signal for receipt of data for controlling the next logic value on the latch output;
2) W Exclusive OR gates, each having at least two inputs and one output, each Exclusive OR gate output connected to a corresponding input of one latch so as to define the next value of the latch output upon receipt of the next clock signal;
3) means for connecting each input of each Exclusive OR gate to one latch output Qi so that the output of each Exclusive OR gate represents the corresponding next value of the latch to which this Exclusive OR gate output is connected; and
4) means connected to the latch outputs for Exclusive OR for combining the latch outputs with the data to be scrambled.

6. A synchronous optical transmission system as defined in claim 1, wherein the TM and the ADM further incorporate a parallel frame synchronization circuit for detecting known frame synchronization information having a length of P bits, where P is an integer greater than one and at least equal to N, where N is an integer greater than one, the frame synchronization information denoting the presence of a frame of data, wherein the frame of data comprises a serial bit stream of data of frequency ($f_{in}$), the frame of data comprising more than P bits with the bits arranged in units of data, each unit of data comprising a fixed number of bits, the frame synchronization information also denoting the boundary between units of said data, comprising:
1) a serial to parallel convertor for converting the incoming serial bit stream into parallel data words, each word comprising N bits, said parallel data words occurring at a frequency, $f_{pdw}$, equal to $f_{in}/N$;
2) means for receiving the parallel data words from the serial to parallel convertor so as to present their output values on at least Q +0 R − 1 parallel output lines, where Q is an integer having a permissible range of values as set forth in element C) and R is an integer with a minimum value as set forth in element C), said receiving means receiving at least the truncated integer value of {(2Q/N) +1 (+1 if (2Q/N) has a remainder)}sequential parallel data words;
3) at least R addressable detectors, where R is an integer at least equal to N times the sum of the truncated integer value of the quotient of the frequency of the parallel data words ($f_{pdw}$) divided by the frequency at which detector comparisons are made ($f_{dc}$), plus one (plus one if $f_{pdw}/f_{dc}$ has a remainder), that is, $R = N \times \{\text{truncated}[f_{pdw}/f_{dc}] + 1 \ (+1 \text{ if } f_{pdw}/f_{dc} \text{ has a remainder})\}$, each detector having Q inputs, where Q is equal to at least R but not greater than P if P is >N, the Q inputs of each detector connected to Q parallel output lines of the receiving means so that for each detector i, where i is an integer from 2 to Q, Q −1 inputs are connected to the same parallel output lines as detector i −1, so that the Q detectors span the 2Q −1 parallel output lines of the receiving means, and further wherein each detector comprises means for determining at the detector comparison frequency ($f_{dc}$) if the incoming data bits from the receiving means parallel output lines correspond to at least a portion of the known frame synchronization information so as to generate an output if a comparison is made; and
4) means interconnected to each detector for receipt of the address of the detector that generated a comparison output, said means also connected to the Q + R −1 parallel output lines of the receiving means for generating a parallel output of data aligned with the boundary of said units of data.

7. A synchronous optical transmission system as defined in claim 1, wherein the interface means between the high speed SONET channel and the respective FTS, TM and ADM lower speed channels incorporate circuitry which operates at a clock frequency less than that of the high speed data stream, wherein said lower speed circuitry operates in parallel upon a plurality of data bits, wherein said circuitry further comprises a transfer strobe delay stage selector for insuring the accurate transfer of data between the high speed data stream associated with the high speed circuitry and a low speed parallel data stream associated with the low speed circuitry comprising:
1) means for periodically inserting a synchronization channel comprising N +1 bits of data of a predetermined bit pattern into the high speed stream of data, where N is a positive integer;
2) means for converting the high speed stream of data and periodic synchronization channel into words of parallel data, each word of parallel data containing N +1 bits;
3) means for generating a periodic latch signal having a repetition rate equal to the high speed bit transfer rate divided by N +1;
4) a delay stage module for receipt of the latch signal, the delay stage module comprising a plurality of delay stages, each stage having a time delay between its input and its output, each stage having a selectable output, and each stage, except the last stage, connected as an input to the next stage;
5) means for selecting any one of the delay stage outputs of the delay stage module so as to generate a transfer strobe signal having a repetition rate the same as the latch signal, but time delayed equal to the sum of the time delays of the selected delay stage plus all the preceding delay stages;

6) a synchronization channel identification module for receipt of the parallel data generated by the serial to parallel converting means and operable so as to perform an identification process upon receipt of the transfer strobe signal, the synchronization identification module having means for generating an "in sync" signal on an output when a word of parallel data periodically matches a predetermined parallel data bit pattern; wherein the periodic matching occurs at the same rate as the periodicity of the synchronization channel, thereby effectively determining the proper detection of the periodic synchronization channel; and 7) a delay stage control module connected to said output of the synchronization channel identification module for causing the delay stage selecting means to change the delay stage selected if an "in-sync" signal is not received by the delay stage control circuit, and wherein modification of the selected delay stage is halted if an "in-sync" signal is received.

8. A synchronous optical transmission system as defined in claim 1, wherein the plurality of channels associated with the second communication medium each comprise a SONET channel operating at a lower transmission rate than the first SONET channel.

9. A parallel pseudo-random generator as defined in claim 5, wherein the next serial output value based upon an Exclusive OR combination of at least two preceding serial output values is defined by a polynomial of the form $1 + x^M + \ldots + x^P$, where M is a positive integer less than P, so that any stage "n" of the serial pseudo-random generator, where n is an integer, is defined by the identity $Q(n) \equiv Q(n + M) + \ldots + Q(n + P)$, and wherein the means for connecting each input of each Exclusive OR gate to one latch output Qi comprises determination of the relationship of each next output Qi based upon the present outputs Q0 through Q(W − 1) by determining the relationship of Q(i − W), which is equivalent to the next output of Qi, and then successively applying the serial pseudo-random generator identify for a value of n equal to i − W until the righthand portion of the identity only represents latch outputs from the group of latch output comprising Q0 to Q(W − 1).

10. A parallel pseudo-random generator as defined in claim 9, further wherein the means for connecting each input of each Exclusive OR gate to one latch output Qi comprises elimination of Exclusive OR combinations of the type Qj + Qj, for any integer value of j from 0 to W − 1.

11. A synchronous optical transmission system as defined in claim 1, wherein the FTS, TM and ADM interfaces to the SONET high speed channels further comprise means for scrambling said data to be placed on the communication medium as well as for descrambling data to be received from said communication medium, wherein said scrambling function is performed by a parallel scrambling circuit which emulates a serial pseudo-random generator which generates a serial output such that the next serial output value is based upon an Exclusive OR combination of at least two preceding serial output values, the maximum preceding serial output value defined as the Pth preceding serial output value, where P is an integer greater than one, wherein the next serial output value is defined by a polynomial of the form $1 + x^M + \ldots + x^P$, where M is a positive integer less than P, so that any stage "n" of the serial pseudo-random generator, where n is an integer, is defined by the identity $Q(n) \equiv Q(n + M) + \ldots + Q(n + P)$, the parallel scrambler circuit being executed on W parallel data lines, where W is an integer equal to or greater than P, the parallel scrambler circuit comprising:

A) W latches, each latch having an output having a logic value 1 or 0, the latched outputs designated Q0 to Q(W − 1), each output for each latch i, wherein i is an integer from 0 to W − 1, representing the next time sequential output of the serial pseudo-random generator so that the parallel composite latch outputs Q0 to Q(W − 1) are the same as the serial pseudo-random generator output sequence for W successive outputs, each latch also having an input operated upon receipt of a clock signal for receipt of data for controlling the next logic value on the latch output;

b) W Exclusive OR gates, each having at least two inputs and one output, each Exclusive OR gate output connected to a corresponding input of one latch so as to define the next value of the latch output upon receipt of the next clock signal;

C) means for connecting each input of each Exclusive OR gate to one latch output Qi so that the output of each Exclusive OR gate represents the corresponding next value of the latch to which this Exclusive OR gate output is connected, wherein said means comprises determination of the relationship of each next output Qi based upon the present outputs Q0 through Q(W − 1) by determining the relationship of Q(i − W), which is equivalent to the next output of Qi, and then successively applying the serial pseudo-random generator identity for a value of n equal to i − W until the righthand portion of the identity only represents latch outputs from the group of latch outputs comprising Q0 to Q(W − 1); and D) a second set of W Exclusive OR gates each having one input connected to one latch output and a second input connected to one of the W data lines, the output of each said Exclusive OR gate representing the pseudo-random scrambled version of the data on the corresponding data line.

12. A parallel pseudo-random generator scrambler as defined in claim 11, wherein the serial Exclusive OR combination defining the serial pseudo-random generator determines its next output value based upon the sixth and seventh preceding serial output values (P = 7).

13. A parallel pseudo-random generator scrambler as defined in claim 12, wherein the number of latches is eight, the latches having corresponding outputs Q0 through Q7, and wherein the corresponding Exclusive OR gates Ex0–Ex7 each have their output connected to the corresponding latch input, and having their inputs connected to the following latch outputs:

Ex0 inputs connected to Q4 and Q6
Ex1 inputs connected to Q5 and Q7
Ex2 inputs connected to Q0 and Q1
Ex3 inputs connected to Q1 and Q2
Ex4 inputs connected to Q2 and Q3
Ex5 inputs connected to Q3 and Q4
Ex6 inputs connected to Q4 and Q5
Ex7 inputs connected to Q5 and Q6.

14. A synchronous optical transmission system as defined in claim 1, wherein the TM and the ADM further incorporate a parallel frame synchronization circuit for detecting known frame synchronization information having a length of P bits, where P is an integer greater than one, the frame synchronization information denoting the presence of a frame of data, wherein the frame of data comprises a serial bit stream of data of frequency ($f_{in}$), the frame synchronization information forming part of a serial bit stream of data having a frequency $f_{in}$, comprising:

A) a serial to parallel converter for converting the incoming serial bit stream into parallel data words, each word comprising N bits, where N is an integer greater than 1;

B) means for receiving the parallel data words from the serial to parallel converter so as to present their output values on a plurality of parallel output lines;

C) a plurality of detectors, each detector having a third plurality of inputs so that the plurality of detector inputs span the parallel output lines of the receiving means, wherein each detector comprises means for determining if the data presented at its third plurality of inputs corresponds to at least a portion of the frame synchronization information so as to generate an output if a comparison is made; and D) means interconnected to each detector and to the parallel output lines of the receiving means for generating parallel output data aligned with the detection location of the frame synchronization information.

15. A parallel frame synchronization circuit as defined in claim 14, further comprising a second group of detectors for detecting a second portion of the frame synchronization information after detection of a first portion of the frame synchronization information by the first second plurality of detectors, the second group of detectors connected to the parallel output lines of the receiving means in the same manner as the first detectors, and wherein the means for generating a parallel output of data does not generate such a output of data until both the first and second portions of the frame synchronization information are detected.

16. A parallel frame synchronization circuit as defined in claim 14, wherein the frame synchronization information comprises at least first and second time adjacent portions having the same information and wherein the parallel frame synchronization further comprises a fourth plurality of flip-flops, each having an input connected to an output of one of the second plurality of detectors and each having an output which reflects the state of its input one clock cycle earlier, and further comprising means for receipt of the output of each flip-flop and each output of each detector, the output of said logic means interposed between each detector and the means for generating the parallel output of data aligned with the boundary of the units of data so that frame synchronization is determined when the adjacent portions of the frame synchronization information are detected by the detector and flip-flop consecutively.

17. A synchronous optical transmission system as defined in claim 7, wherein the transfer strobe delay stage further comprises:

8) a second, auxiliary, means for independently selecting any one of the time delay stage outputs of the delay stage module so as to generate an auxiliary transfer strobe signal;

9) a second, auxiliary, synchronization channel identification module for receipt of the parallel data generated by the serial to parallel converting means and operable so as to perform an identification process upon receipt of the auxiliary transfer strobe signal, the auxiliary synchronization identification module having means for generating an "in sync" signal on an output when a word of parallel data periodically matches a predetermined parallel data bit pattern; wherein the periodic matching occurs at the same rate as the periodicity of the synchronization channel, thereby effectively determining the proper detection of the periodic synchronization channel;

10) a second, auxiliary, delay stage control module connected to the output of the second synchronization channel identification module for causing the auxiliary delay stage selecting means to determine an optimal delay stage for synchronization channel detection; and 11) means for dynamically adjusting the selected delay stage of the delay stage selecting means associated with the transfer strobe once synchronization channel detection has occurred if the selected delay stage varies from the selected auxiliary delay stage by more than a predetermined amount.

18. A synchronous optical transmission system as defined in claim 1, wherein the FTS, TM and ADM further comprise modules forming at least portions of the means and TSM defining the FTS, TM and ADM, and also comprises serial busses connected between modules thereof, wherein the format of the data conveyed on these serial busses is of a serial transport frame format for positioning data to be transferred in a serial bit stream, wherein means are associated with each of these serial busses so as to arrange the data to be transferred in a plurality of frames, where each frame comprises N channels, each having a fixed length of bits, where N is an integer greater than 1, means for each of M of said N channels and at least some of the plurality of frames, where M is an integer greater than 0 and less than N, for placing data representing information to be conveyed, in one portion of the channel, means for each of said M channels, for placing control information related to the data in that channel, in a second portion of the channel, and means for placing synchronization data in at least one channel of each frame.

19. A synchronous optical transmission system for interfacing with high speed communication channels conforming to the synchronous optical network (SONET) standard so as to convey information to and from said high speed channels operating at different transmission rates, as well as to and from at least one said high speed channel and lower speed channels conforming to other communication standards comprising:

A) a fiber transmission system (FTS) having;

1) means for interfacing to a communication medium operating at a first SONET high speed channel transmission rate;

2) means for interfacing to a second communication medium comprising a plurality of channels, each operating at a lower transmission rate than the first SONET high speed channel; and 3) means for multiplexing said lower transmission rate channels to the first SONET channel as well as for demultiplexing the first SONET channel to the lower channels; and B) a terminal multiplexer (TM) having:
1) means for interfacing to a SONET high speed channel;
2) a time slot multiplexer (TSM) having a lower speed output, the TSM interconnected to said interfacing means for cross-connecting lower speed channels to and from the SONET high speed channel at the lower speed output of the time slot multiplexer;
3) lower speed channel interfacing means connected to the lower speed output of the TSM for interfacing the lower speed output of the TSM with lower speed channels including means for reformatting the data of the lower speed channel so as to be compatible with the higher speed channel and for converting the formatting of the higher speed channel to the format of the lower speed channel; and
4) means for controlling the cross-connect function of the TSM.

20. A synchronous optical transmission system for interfacing with high speed communication channels conforming to the synchronous optical network (SONET) standard so as to convey information to and from said high speed channels operating at different transmission rates, as well as to and from at least one said high speed channel and lower speed channels conforming to other communication standards comprising:

A) a fiber transmission system (FTS) having;
1) means for interfacing to a communication medium operating at a first SONET high speed channel transmission rate;
2) means for interfacing to a second communication medium comprising a plurality of channels, each operating at a lower transmission rate than the first SONET high speed channel; and
3) means for multiplexing said lower transmission rate channels to the first SONET channel as well as for demultiplexing the first SONET channel to the lower channels; and B) an add/drop multiplexer (ADM) comprising:
1) first means for interfacing to a SONET high speed channel at a first location,
2) a time slot multiplexer (TSM) having a lower speed output, the TSM interconnected to said add/drop multiplexing interfacing means for cross-connecting lower speed channels to and from the SONET high speed channel and a second SONET high speed channel as well as to and from the lower speed output of the TSM;
3) a lower speed channel interfacing means connected to the lower speed output of the TSM for interfacing the lower speed output of the TSM with lower speed channels including means for reformatting the data of the lower speed channel so as to be compatible with the higher speed channel and for converting the formatting of the higher speed channel to the format of the lower speed channel;
4) second means for interfacing to a SONET high speed channel at a second location; and
5) means for controlling the cross-connect function of the TSM.

21. A synchronous optical transmission system for interfacing with high speed communication channels conforming to the synchronous optical network (SONET) standard so as to convey information to and from said high speed channels, as well as to and from at least one said high speed channel and lower speed channels conforming to other communication standards comprising:

A) a terminal multiplexer (TM) having;
1) means for interfacing to a SONET high speed channel;
2) a time slot multiplexer (TSM) having a lower speed output, the TSM interconnected to said interfacing means for cross-connecting lower speed channels to and from the SONET high speed channel at the lower speed output of the time slot multiplexer;
3) lower speed channel interfacing means connected to the lower speed output of the TSM for interfacing the lower speed output of the TSM with lower speed channels including means for reformatting the data of the lower speed channel so as to be compatible with the higher speed channel and for converting the formatting of the higher speed channel to the format of the lower speed channel; and
4) means for controlling the cross-connect function of the TSM; and B) an add/drop multiplexer (ADM) comprising:
2) first means for interfacing to a SONET high speed channel at a first location,
2) a time slot multiplexer (TSM) having a lower speed output, the TSM interconnected to said add/drop multiplexing interfacing means for cross-connecting lower speed channels to and from the SONET high speed channel and a second SONET high speed channel as well as to and from the lower speed output of the TSM;
3) a lower speed channel interfacing means connected to the lower speed output of the TSM for interfacing the lower speed output of the TSM with lower speed channels including means for reformatting the data of the lower speed channel so as to be compatible with the higher speed channel and for converting the formatting of the higher speed channel to the format of the lower speed channel;
4) second means for interfacing to a SONET high speed channel at a second location; and
5) means for controlling the cross-connect function of the TSM.

* * * * *

UNITED STATES PATENT AND TRADEMARK OFFICE
CERTIFICATE OF CORRECTION

PATENT NO. : 5,185,736

DATED : February 9, 1993

INVENTOR(S) : Tyrrell et al

It is certified that error appears in the above-identified patent and that said Letters Patent is hereby corrected as shown below:

Title page, item [76], add the following inventors:

Michael Sutton, Raleigh, North Carolina; Reynolds Starnes, Houston, Texas; Jeffrey A. York, Cary, North Carolina; Susan P. Hemler, Sudbury, Massachusetts; W. Harold Goodnight, Raleigh, North Carolina.

At column 181, line 47, please delete "a" prior to "means".

At column 183, please delete "scrambling said" at line 10 and insert --descrambling--.

At column 183, line 68, please delete "Q + 0 R - 1" and substitute --Q+R-1-- therefor.

At column 186, line 23, please change "b)" to --B)--.

At column 190, line 37, please change "2)" to --1)--.

Signed and Sealed this

Twenty-second Day of March, 1994

*Attest:*

BRUCE LEHMAN

*Attesting Officer*     Commissioner of Patents and Trademarks